United States Patent
Akutsu et al.

(10) Patent No.: US 8,647,230 B2
(45) Date of Patent: Feb. 11, 2014

(54) MOVING APPARATUS

(75) Inventors: Shigemitsu Akutsu, Saitama-ken (JP); Shinji Fujimoto, Saitama-ken (JP); Mitsuhiro Takeda, Saitama-ken (JP); Noriyuki Abe, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 132 days.

(21) Appl. No.: 13/497,897

(22) PCT Filed: Jul. 23, 2010

(86) PCT No.: PCT/JP2010/062427
§ 371 (c)(1),
(2), (4) Date: Mar. 23, 2012

(87) PCT Pub. No.: WO2011/036938
PCT Pub. Date: Mar. 31, 2011

(65) Prior Publication Data
US 2012/0277059 A1  Nov. 1, 2012

(30) Foreign Application Priority Data
Sep. 25, 2009  (JP) ................. 2009-221038

(51) Int. Cl.
 B60W 10/08  (2006.01)
 B60W 10/20  (2006.01)
(52) U.S. Cl.
 USPC .............................. 477/4; 477/183
(58) Field of Classification Search
 USPC .............. 475/5; 477/4, 183; 180/65.265
See application file for complete search history.

(56) References Cited

U.S. PATENT DOCUMENTS

| | | | |
|---|---|---|---|
| 7,086,977 B2 * | 8/2006 | Supina et al. | 475/5 |
| 2006/0025260 A1 * | 2/2006 | Klemen et al. | 475/5 |
| 2010/0029428 A1 * | 2/2010 | Abe et al. | 475/5 |
| 2010/0071974 A1 * | 3/2010 | Akutsu et al. | 180/65.265 |

FOREIGN PATENT DOCUMENTS

| | | |
|---|---|---|
| JP | 08-079915 A | 3/1996 |
| JP | 09-056009 A | 2/1997 |
| JP | 2001-298806 A | 10/2001 |
| JP | 2005-048805 A | 2/2005 |
| JP | 2006-009751 A | 1/2006 |
| JP | 2007-230255 A | 9/2007 |
| JP | 2008-039045 A | 2/2008 |

(Continued)

OTHER PUBLICATIONS

International Search Report corresponding to International Application No. PCT/JP2010/062427 dated Aug. 24, 2010.

*Primary Examiner* — Sherry Estremsky
*Assistant Examiner* — Lillian Nguyen
(74) *Attorney, Agent, or Firm* — Squire Sanders (US) LLP

(57) ABSTRACT

A moving apparatus that is capable of properly driving an accessory while preventing driven parts from being driven when the accessory is driven in a state where the driven parts are at rest. In the moving apparatus VE1, out of first to third elements S, C, and R configured such that they rotate during transmission of motive power therebetween while maintaining a collinear relationship in rotational speed, the first element S is mechanically connected to a first rotor 13 of a first rotating machine 11, one of the second and third elements C and R is mechanically connected to an output portion 3a of a prime mover 3 and an input portion 32 of an accessory 31, and the other of the second and third elements C and R is mechanically connected to driven parts DW and DW.

16 Claims, 56 Drawing Sheets

(56) References Cited

FOREIGN PATENT DOCUMENTS

| JP | 2008-154307 A | 7/2008 |
| JP | 2008-179344 A | 8/2008 |
| JP | 2008-179348 A | 8/2008 |
| JP | 2009-184559 A | 8/2009 |
| WO | WO2009/128287 A1 | 10/2009 |

* cited by examiner

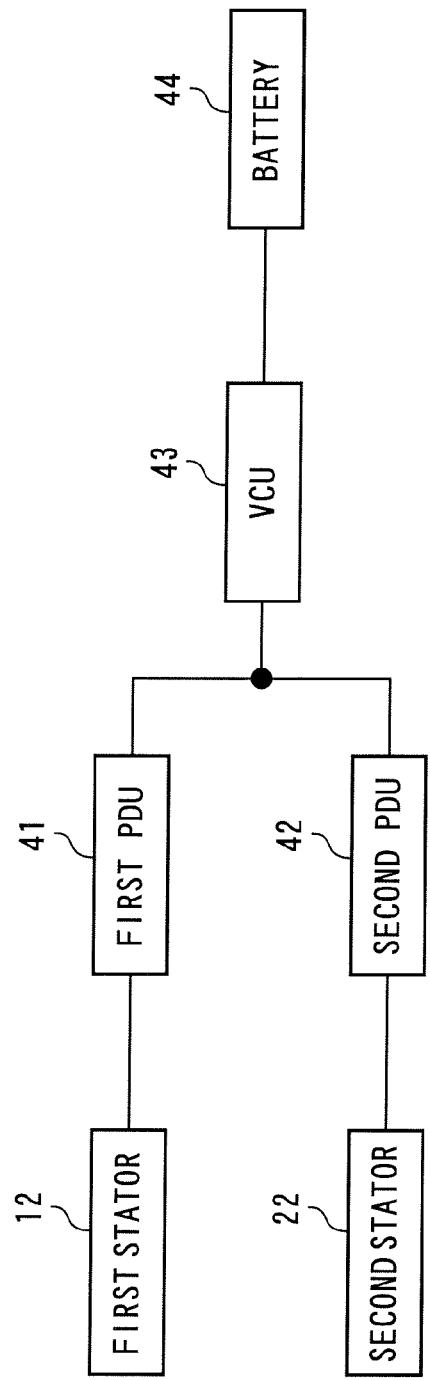

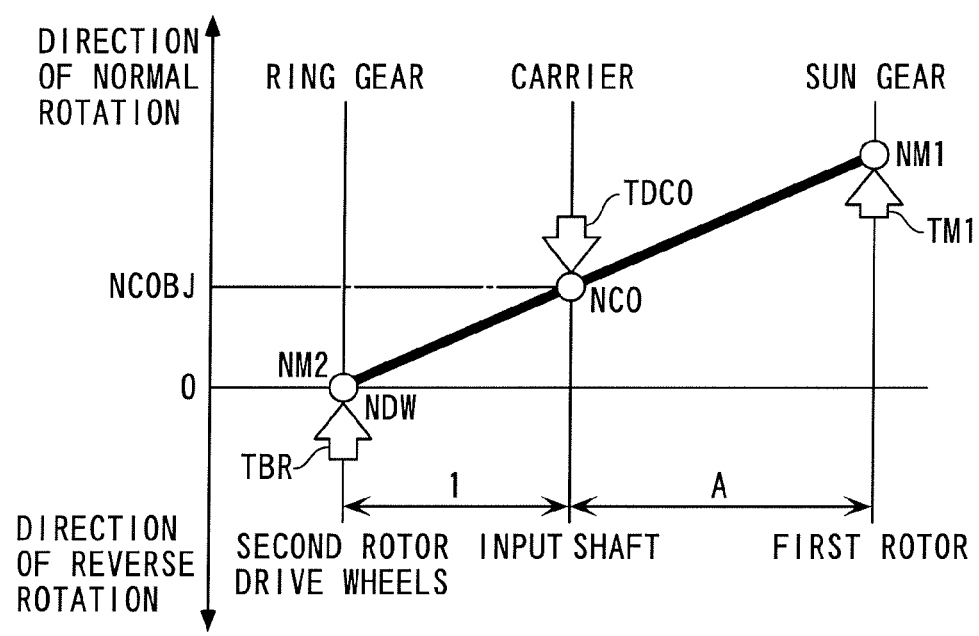
F I G. 8

F I G. 2 1
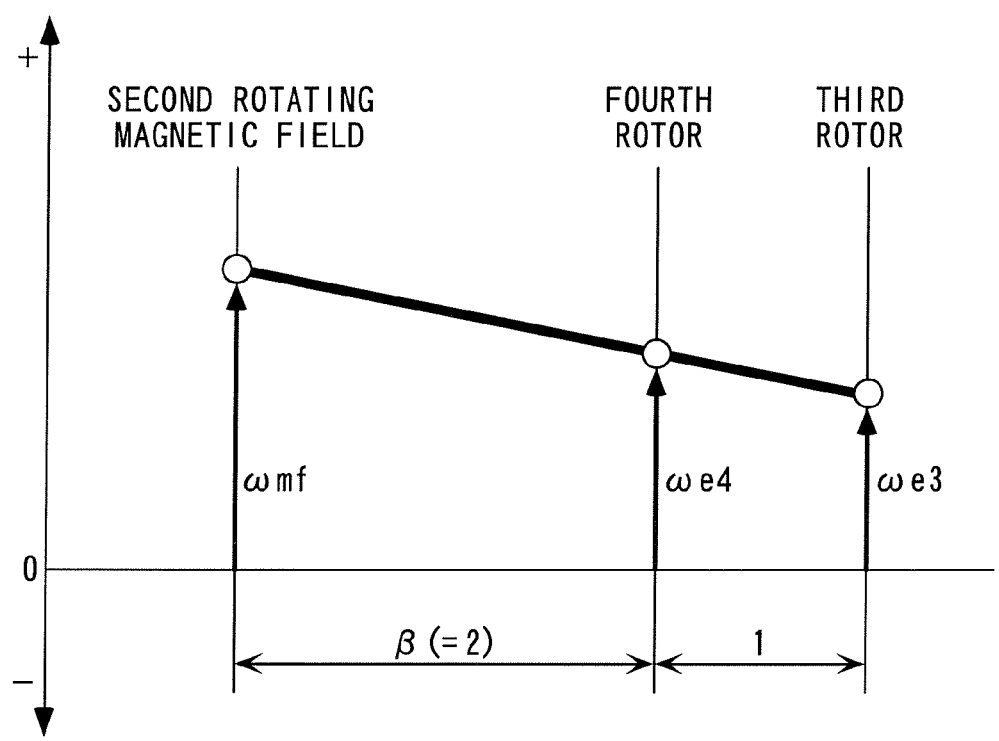

F I G. 2 9
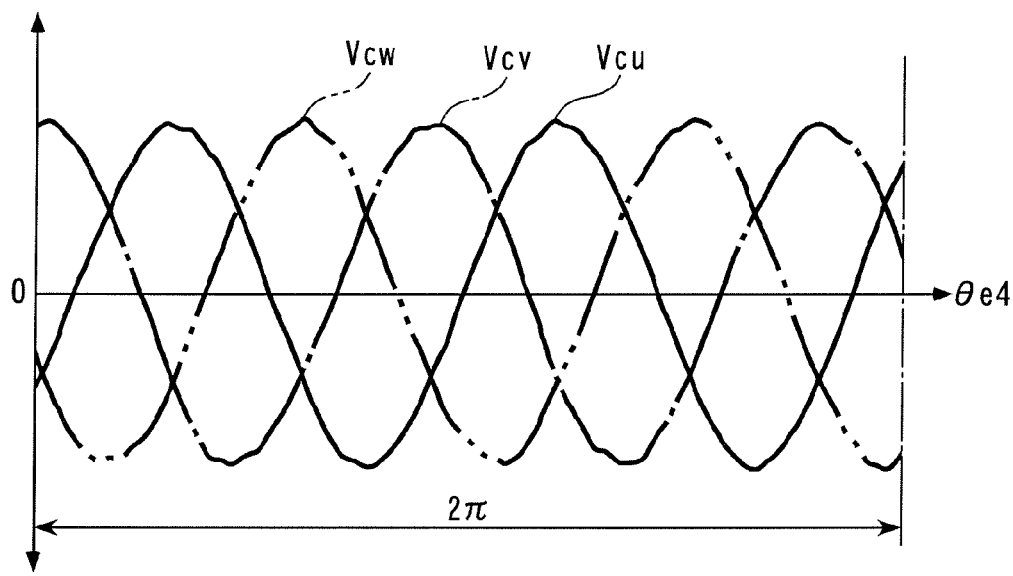
F I G. 3 0
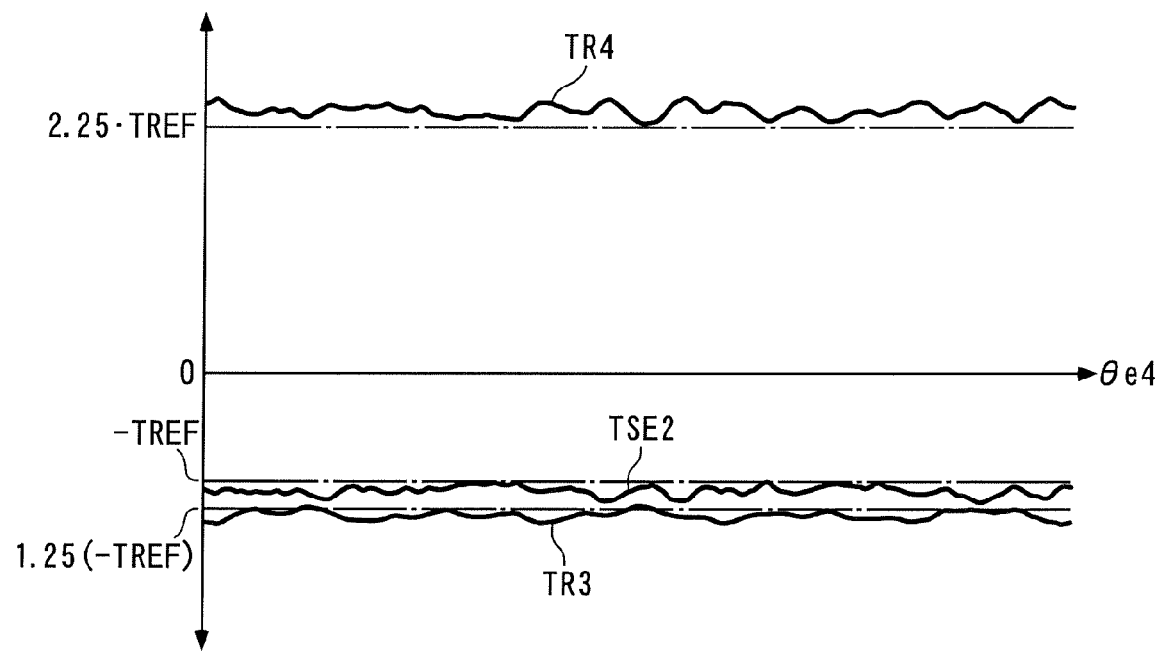

MOVING APPARATUS

TECHNICAL FIELD

The present invention relates to a moving apparatus equipped with a plurality of motive power sources different from each other.

BACKGROUND ART

Conventionally, as the moving apparatus of this kind, one disclosed in Patent Literature 1 is known. This moving apparatus is a hybrid vehicle, and is equipped with an internal combustion engine, first and second rotating machines as motive power sources, and a planetary gear unit for transmitting motive power. These first and second rotating machines are configured to be capable of converting input electric power to motive power, for outputting the motive power, and converting input motive power to electric power, for outputting the electric power. Further, the planetary gear unit is of a general single pinion type, and comprises a sun gear, a carrier and a ring gear. These sun gear, carrier and ring gear are connected to the first rotating machine, the engine, and drive wheels of a vehicle. Further, the second rotating machine is connected to the drive wheels, and an oil pump for supplying lubricating oil to various types of gears is connected to the carrier. Further, a one-way clutch is provided between the engine, and the oil pump and the carrier. In such a case as motive power is transmitted from the engine to the carrier and the oil pump, the one-way clutch connects between the engine, and the carrier and the oil pump, whereas in such a case as motive power is transmitted from the carrier to the engine, the one-way clutch disconnects between the carrier and the oil pump, and the engine.

In the conventional hybrid vehicle configured as above, in driving the oil pump during stoppage of the engine and at the same time during stoppage of the vehicle, by outputting motive power from the first rotating machine, the motive power is transmitted from the first rotating machine to the oil pump via the sun gear and the carrier, so that the oil pump is driven. In this case, the one-way clutch disconnects between the carrier and the engine, whereby the motive power of the first rotating machine is not transmitted to the engine. Thus, in the above conventional hybrid vehicle, in driving the oil pump during stoppage of the engine and at the same time during stoppage of the vehicle, the oil pump is driven without driving the engine.

CITATION LIST

Patent Literature

[PTL 1] Japanese Laid-Open Patent Publication (Kokai) No. H09-56009

SUMMARY OF INVENTION

Technical Problem

In the above-described conventional hybrid vehicle, however, in driving the oil pump during stoppage of the engine and at the same time during stoppage of the vehicle, motive power transmitted from the first rotating machine to the sun gear is transmitted not only to the carrier but also to the ring gear, and in turn to the drive wheels. As a result, although the vehicle should be stopped, the hybrid vehicle travels, which can give a sense of discomfort to the driver.

The present invention has been made to provide a solution to the above-described problems, and an object thereof is to provide a moving apparatus which is capable of properly driving an accessory while preventing driven parts from being driven, when the accessory is to be driven in a state where the driven parts are at rest.

Solution to Problem

To attain the object, the invention as claimed in claim 1 is a moving apparatus (vehicles VE1 to VE4, VE9, VE10) that moves by transmitting motive power to driven parts (drive wheels DW and DW in embodiments (the same applies hereinafter in this section)) thereof, comprising a prime mover (engine 3) including an output portion (crankshaft 3a) for outputting motive power, an accessory (compressor 31) driven by input of motive power to an input portion (input shaft 32) thereof, a first rotating machine 11 that includes a first rotor 13 and is capable of converting input electric power to motive power to output the motive power from the first rotor 13, and converting motive power input to the first rotor 13 to electric power, restriction means (second rotating machine 21, brakes BR, second rotating machine 71) for restricting rotation of the driven parts, a controller (ECU 2, first PDU 41, second PDU 42, VCU 43) for controlling operations of the first rotating machine 11 and the restriction means, and a power transmission mechanism (planetary gear unit PG, first planetary gear unit PS1, second planetary gear unit PS2) including a first element (sun gear S, first ring gear R1), a second element (carrier C, first carrier C1, second sun gear S2), and a third element (ring gear R, first sun gear S1, second carrier C2) that are capable of transmitting motive power therebetween, the first to third elements being configured to rotate during transmission of the motive power while maintaining a collinear relationship in rotational speed therebetween, with straight lines representing respective rotational speeds of the first to third elements being sequentially aligned in a collinear chart representing the collinear relationship in rotational speed, wherein the first element is mechanically connected to the first rotor 13, one of the second and third elements being mechanically connected to the output portion and the input portion while the other of the second and third elements being mechanically connected to the driven parts, and wherein when the accessory is driven in a state where the driven parts are at rest during stoppage of the prime mover, the controller controls the operations of the first rotating machine and the restriction means such that motive power is input to the input portion and a rotational speed of the driven parts is restricted to approximately 0 (FIGS. 4, 8, 10, 33, 63, and 66).

According to this moving apparatus, in the power transmission mechanism, the first element, the second element, and the third element are capable of transmitting motive power therebetween. The first to third elements are configured to rotate during transmission of the motive power while holding the collinear relationship in rotational speed therebetween, with the straight lines representing the respective rotational speeds of the first to third elements being sequentially aligned in the collinear chart representing the relationship between the rotational speeds of the first to third elements. Further, the first element is mechanically connected to the first rotor of the first rotating machine. One of the second and third elements is mechanically connected to the output portion of the prime mover and the input portion of the accessory while the other of the second and third elements is mechanically connected to the driven parts. Further, the operation of the first rotating machine and the operation of the restriction means for restricting the rotation of the driven parts are controlled by the controller. With the arrangement described above, the driven parts can be driven using the motive power from the prime mover.

Further, when the accessory is driven in the state where the driven parts are at rest during stoppage of the prime mover, the operations of the first rotating machine and the restriction means are controlled such that the motive power is input to the input portion of the accessory and the rotational speed of the driven parts is restricted to approximately 0. This makes it possible to properly drive the accessory while preventing the driven parts from being driven, when the accessory is driven in the state where the driven parts are at rest. Note that it is assumed that the term "mechanical connection" used in the specification and the claims is intended to encompass not only connecting various types of elements using a shaft, gears, a pulley, a chain, or the like but also directly connecting (direct connection of) the elements using e.g. a shaft, without via a transmission, such as gears.

The invention as claimed in claim 2 is the moving apparatus (vehicle VE3) as claimed in claim 1, wherein the power transmission mechanism (first planetary gear unit PS1, second planetary gear unit PS2) further includes a fourth element (second ring gear R2), the first to fourth elements (first element: first ring gear R1, second element: first carrier C1 and second sun gear S2, third element: first sun gear S1 and second carrier C2) being configured to rotate during transmission of the motive power while maintaining a collinear relationship in rotational speed therebetween, with straight lines representing respective rotational speeds of the first to fourth elements being sequentially aligned in a collinear chart representing the collinear relationship in rotational speed, wherein the second element is mechanically connected to the output portion and the input portion, and the third element is mechanically connected to the driven parts, and wherein the restriction means is a second rotating machine 21 that includes a second rotor 23 mechanically connected to the fourth element and is configured to be capable of converting input electric power to motive power to output the motive power from the second rotor 23, and converting motive power input to the second rotor 23 to electric power.

With this arrangement, in the power transmission mechanism, the first element, the second element, the third element, and the fourth element are configured to be capable of transmitting motive power therebetween, and rotate during transmission of the motive power while maintaining a collinear relationship in rotational speed therebetween such that straight lines representing respective rotational speeds of the first to fourth elements are sequentially aligned in a collinear chart representing the collinear relationship in rotational speed. Further, the first element is mechanically connected to the first rotor of the first rotating machine, the second element is mechanically connected to the output portion of the prime mover and the input portion of the accessory, the third element is mechanically connected to the driven parts, and the fourth element is mechanically connected to the second rotor of the second rotating machine.

Furthermore, as already described in the description as to claim 1, when the accessory is driven in the state where the driven parts are at rest during stoppage of the prime mover, the operations of the first and second rotating machines are controlled such that the motive power is input to the input portion and the rotational speed of the driven parts is restricted to approximately 0. As described above, the first to fourth elements rotate during transmission of the motive power therebetween while holding the collinear relationship in rotational speed therebetween, and the straight lines representing respective rotational speeds of the first to fourth elements are sequentially aligned in the collinear chart representing the collinear relationship in rotational speed. Further, the above first element is mechanically connected to the first rotor, the second element is mechanically connected to the output portion and the input portion, the third element is mechanically connected to the driven parts, and the fourth element is mechanically connected to the second rotor. From the above, similarly to the moving apparatus as claimed in claim 1, when the accessory is driven in the state where the driven parts are at rest, by controlling the operations of the first and second rotating machines, it is possible to input motive power to the input portion to properly drive the accessory, and restrict the rotational speed of the driven parts to approximately 0 to prevent the driven parts from being driven.

In this case, in the collinear chart, the straight line representing the rotational speed of the third element is located between the straight line representing the rotational speed of the first element and the straight line representing the rotational speed of the fourth element, and the first rotor, the driven parts, and the second rotor are connected to the first element, the third element, and the fourth element, arranged as above, respectively. From the above, during driving of the accessory in the above-described state where the driven parts are at rest, the rotational speed of the third element becomes approximately equal to 0, the first and fourth elements rotate in the opposite directions, the rotational speeds of the first and fourth elements become higher than 0, and the rotational speeds of the first and fourth rotors connected to the respective first and fourth elements also become higher than 0.

On the other hand, in a case where rotating machines each including multi-phase coils are used as the first and second rotating machines, and electric power is input to and output from the first and second rotating machines, via an electric circuit, such as an inverter having switching elements, when the rotational speeds of the first and second rotors of the first and second rotating machines are controlled such that they become equal to 0, there can occur the following inconvenience: In this case, there is a fear that electric currents flow through only specific phase coils of the first and second rotating machines, and only switching elements associated with the specific phase coils are turned on, so that the coils and the switching elements are overheated. When the maximum values of the electric currents input to and output from the first and second rotating machines are made smaller so as to suppress such overheating of the coils and the switching elements, the torques of the first and second rotating machines becomes small.

According to the present invention, however, both the rotational speeds of the first and second rotors become higher than 0, as described above, and hence it is possible to prevent the above-mentioned overheating of the electric circuit and the first and second rotating machines and secure sufficiently large torques of the first and second rotating machines.

The invention as claimed in claim 3 is the moving apparatus (vehicle VE3) as claimed in claim 2, further including a clutch CL for connecting and disconnecting between the output portion and the second element, and the controller controls an operation of the clutch CL.

As described hereinabove, the second element is connected not only to the input portion of the accessory but also to the output portion of the prime mover. Therefore, when the accessory is driven during stoppage of the driven parts and the prime mover as described in the description as to claim 2, motive power is wastefully transmitted not only to the input portion but also to the output portion, which degrades driving efficiency in driving the accessory.

With the arrangement described above, the clutch connects and disconnects the output portion to and from the second element, and the controller controls the operation of the clutch. Therefore, by holding the output portion in a state disconnected from the second element using the clutch during the above-mentioned driving of the accessory, it is possible to prevent motive power from being transmitted to the output portion, thereby making it possible to enhance the driving efficiency in driving the accessory.

The invention as claimed in claim 4 is the moving apparatus (vehicle VE3) as claimed in claim 3, wherein the prime mover is an internal combustion engine (engine 3), and wherein the controller controls the operation of the clutch CL so as to disconnect the output portion from the second element during an EV operation mode in which the controller causes the driven parts to be driven by controlling operations of the first and second rotating machines 11, 21 during stoppage of the prime mover (FIGS. 11 and 12), controls the operations of the first and second rotating machines 11, 21 when the prime mover is started during the EV operation mode, such that the rotational speed of the second element becomes approximately equal to 0, and when the rotational speed of the second element has become approximately equal to 0, controls the operation of the clutch CL so as to connect between the output portion and the second element, and starts the prime mover (FIGS. 13 and 14).

With this arrangement, the operation of the clutch is controlled such that the output portion of the prime mover is disconnected from the second element during the EV operation mode in which the driven parts are driven by controlling the operations of the first and second rotating machines during stoppage of the prime mover. This makes it possible to prevent motive power from being wastefully transmitted to the output portion during the EV operation mode, and therefore it is possible to improve driving efficiency in driving the driven parts.

Further, when the prime mover is started during the EV operation mode, the operation of the clutch is controlled such that the output portion is connected to the second element, and the prime mover is started. Thus, the output portion is thus connected to the second element at the start of the prime mover during the EV operation mode, whereby motive power can be transmitted to the output portion so that it is possible to cause the output portion to rotate and in turn properly start the prime mover, which is the engine. Further, in this case, the output portion at rest is connected to the second element when the rotational speed of the second element has become approximately equal to 0, and hence the connection causes no shock. For the same reason, it is possible to employ, as the clutch, a dog clutch simpler in construction and smaller in energy required for driving than a friction clutch.

The invention as claimed in claim 5 is the moving apparatus (vehicle VE4) as claimed in claim 1, wherein the restriction means is a second rotating machine 71 that includes an unmovable stator (second stator 73) for generating a rotating magnetic field, a second rotor (third rotor 74) formed by magnets (permanent magnets 74*a*) and disposed in a manner opposed to the stator, and a third rotor (fourth rotor 75) formed by a soft magnetic material (cores 75*a*) and disposed between the stator and the second rotor, and is configured such that electric power and motive power are input and output between the stator and the second and third rotors along with generation of the rotating magnetic field, and such that the rotating magnetic field and the third and second rotors rotate along with input and output of the electric power and the motive power while maintaining a collinear relationship in rotational speed therebetween, with straight lines representing respective rotational speeds of the rotating magnetic field and the third and second rotors being sequentially aligned in a collinear chart representing the collinear relationship in rotational speed, and wherein the second element and the second rotor are mechanically connected to the output portion and the input portion, and the third element and the third rotor are mechanically connected to the driven parts.

With this arrangement, in the second rotating machine, which is the restriction means, as the rotating magnetic field is generated in the stator, electric power and motive power are input and output between the stator and the second and third rotors, the rotating magnetic field and the third and second rotors rotate while holding the collinear relationship in rotational speed therebetween, and the straight lines representing the respective rotational speeds of the rotating magnetic field and the third and second rotors are sequentially aligned in the collinear chart representing the collinear relationship in rotational speed. Further, the second element of the power transmission mechanism and the second rotor are mechanically connected to the output portion of the prime mover and the input portion of the accessory, and the third element and the third rotor are mechanically connected to the driven parts. Furthermore, as described in the description as to claim 1, when the accessory is driven in the state where the driven parts are at rest during stoppage of the prime mover, the operations of the first and second rotating machines are controlled such that motive power is input to the input portion and the rotational speed of the driven parts is restricted to approximately 0.

As described hereinabove, in the power transmission mechanism, the first to third elements rotate during transmission of motive power therebetween while holding the collinear relationship in rotational speed therebetween, and the straight lines representing the respective rotational speeds of the first to third elements are sequentially aligned in the collinear chart representing the collinear relationship in rotational speed. Further, as described hereinabove, in the second rotating machine, the rotating magnetic field and the third and second rotors rotate along with input and output of the electric power and the motive power between the stator and the second and third rotors, while holding the collinear relationship in rotational speed therebetween, and the straight lines representing the respective rotational speeds of the rotating magnetic field and the third and second rotors are sequentially aligned in the collinear chart representing the collinear relationship in rotational speed. Furthermore, the first element is connected to the first rotor of the first rotating machine, the second element and the first rotor are connected to the output portion and the input portion, and the first element and the second rotor are connected to the driven parts. From the above, similarly to the moving apparatus as claimed in claim 1, when the accessory is driven in the state where the driven parts are at rest, by controlling the operations of the first and second rotating machines, it is possible to input motive power to the input portion to properly drive the accessory, and restrict the rotational speed of the driven parts to approximately 0 to prevent the driven parts from being driven.

In this case, out of the first to third elements which are in the collinear relationship in rotational speed, the rotational speed of the third element connected to the driven parts becomes approximately equal to 0, the rotational speed of the second element connected to the input portion becomes higher than 0, the rotational speed of the first element becomes higher than the rotational speed of the second element, and the rotational speed of the first rotor to which is connected the first element also becomes higher than 0. Further, out of the rotating magnetic field and the third and second rotors which are in the collinear relationship in rotational speed, the rotational speed of the second rotor connected to the input portion becomes higher than 0, the rotational speed of the third rotor connected to the driven parts becomes approximately equal to 0, and the rotating magnetic field rotates in a direction opposite to the direction of rotation of the second rotor, and the rotational speed thereof becomes higher than 0.

On the other hand, in a case where a rotating machine including multi-phase coils is used as the first rotating machine, the stator is formed using e.g. multi-phase coils for generating a rotating magnetic field, and electric power is input to and output from the first rotating machine and the stator, via an electric circuit, such as an inverter having switching elements, when the rotational speeds of the first rotor and the rotating magnetic field are controlled such that they become equal to 0, there can occur the following inconvenience: In this case, there is a fear that electric currents flow through only specific phase coils of the first rotating machine and the stator, and only switching elements associated with the specific phase coils are turned on, so that the coils and the switching elements are overheated. When the maximum values of the electric currents input to and output from the first rotating machine and the stator are made smaller so as to suppress such overheating of the coils and the switching elements, the torques of the first and second rotating machines become small.

According to the present invention, however, both the rotational speeds of the first rotor and the rotating magnetic field become higher than 0 as described above, and hence it is possible to prevent the above-mentioned overheating of the electric circuit and the first and second rotating machines and secure sufficiently large torques of the first and second rotating machines.

The invention as claimed in claim 6 is the moving apparatus (vehicle VE4) as claimed in claim 5, wherein a predetermined plurality of magnet magnetic poles arranged in a circumferential direction are formed by the magnets, and a magnetic pole row is formed by arranging the plurality of magnet magnetic poles such that each two magnet magnetic poles adjacent to each other have polarities different from each other, wherein the second rotor is configured to be rotatable in the circumferential direction, wherein the stator has an armature row (iron core 73*a*, U-phase to W-phase coils 73*c* to 73*e*) that generates a predetermined plurality of armature magnetic poles, to thereby cause the rotating magnetic field rotating in the circumferential direction to be generated between the stator and the magnetic pole row, wherein the soft magnetic material is formed by a predetermined plurality of soft magnetic material elements arranged in the circumferential direction in a manner spaced from each other, and a soft magnetic material element row formed by the plurality of soft magnetic material elements is disposed between the magnetic pole row and the armature row, wherein the third rotor is configured to be rotatable in the circumferential direction, and wherein a ratio between the number of the armature magnetic poles, the number of the magnet magnetic poles, and the number of the soft magnetic material elements is set to 1:m:(1+m)/2 (m≠1.0).

With this arrangement, in the second rotating machine, for a reason described hereinafter, by setting the ratio between the number of the armature magnetic poles, the number of the magnet magnetic poles, and the number of the soft magnetic material elements as desired, within a range satisfying the condition of 1:m:(1+m)/2 (m≠1.0), it is possible to set the collinear relationship in rotational speed between the rotating magnetic field and the second and third rotors, as desired. Therefore, it is possible to enhance the degree of freedom in design of the second rotating machine.

Further, as described in the description as to claim 5, when the accessory is driven in the state where the driven parts are at rest, to prevent the overheating of the electric circuit and the second rotating machine, and to secure a sufficiently large torque of the second rotating machine, it is preferable to set larger the distance between a straight line representing the rotational speed of the third rotor and a straight line representing the rotational speed of the rotating magnetic field in the collinear chart representing the relationship between the rotational speeds of the rotating magnetic field and the second and third rotors, since the second and third rotors are connected to the input portion and the driven parts, respectively, as described above. According to the present invention, the collinear relationship in rotational speed between the rotating magnetic field and the second and third rotors of the second rotating machine can be set as desired, as described above, and hence it is possible to easily make the above-mentioned preferable setting, thereby making it possible to effectively obtain the advantageous effects provided by the above-described claim 5.

The invention as claimed in claim 7 is the moving apparatus (vehicle VE4) as claimed in claim 5 or 6, further including a clutch CL for connecting and disconnecting the output portion to and from the second element and the second rotor, and the controller controls an operation of the clutch CL.

As described hereinabove, the second element and the second rotor are connected not only to the input portion of the accessory but also to the output portion of the prime mover. Therefore, when the accessory is driven during stoppage of the driven parts and the prime mover as described in the description as to claim 5, motive power is wastefully transmitted not only to the input portion but also to the output portion, which degrades driving efficiency in driving the accessory.

With the arrangement described above, the clutch connects and disconnects the output portion to and from the second element and the second rotor, and the controller controls the operation of the clutch. Therefore, by holding the output portion in the state disconnected from the second element and the second rotor using the clutch during the above-mentioned driving of the accessory, it is possible to prevent motive power from being transmitted to the output portion, thereby making it possible to further enhance the driving efficiency in driving the accessory.

The invention as claimed in claim 8 is the moving apparatus (vehicle VE4) as claimed in claim 7, wherein the prime mover is an internal combustion engine (engine 3), and wherein the controller controls the operation of the clutch CL so as to disconnect the output portion from the second element and the second rotor during an EV operation mode in which the controller causes the driven parts to be driven by controlling operations of the first and second rotating machines 11, 71 during stoppage of the prime mover (FIGS. 34 and 35), controls the operations of the first and second rotating machines 11, 71 when the prime mover is started during the EV operation mode, such that the respective rotational speeds of the second element and the second rotor become approximately equal to 0, and when the respective rotational speeds of the second element and the second rotor have become approximately equal to 0, controls the operation of the clutch CL so as to connect the output portion to the second element and the second rotor, and starts the prime mover (FIGS. 36, 37).

With this arrangement, the operation of the clutch is controlled such that the output portion is disconnected from the second element and the second rotor during the EV operation mode in which the driven parts are driven by controlling the operations of the first and second rotating machines during stoppage of the prime mover. This makes it possible to prevent motive power from being wastefully transmitted to the output portion during the EV operation mode, and therefore it is possible to enhance the driving efficiency in driving the driven parts.

Further, when the prime mover is started during the EV operation mode, the operation of the clutch is controlled such that the output portion is connected to the second element and the second rotor, and the prime mover is started. The output portion is thus connected to the second element and the second rotor at the start of the prime mover during the EV operation mode, whereby motive power can be transmitted to the output portion, so that it is possible to cause the output portion to rotate, and in turn properly start the prime mover, which is the engine. Further, in this case, the output portion at rest is connected to the second element and the second rotor when the rotational speeds of the second element and the second rotor have become approximately equal to 0, and hence the connection causes no shock. For the same reason, it is possible to employ, as the clutch, a dog clutch simpler in construction and smaller in energy required for driving than a friction clutch.

To attain the above object, the invention as claimed in claim 9 is a moving apparatus (vehicles VE5 to VE8, VE11, VE12) that moves by transmitting motive power to driven parts (drive wheels DW and DW in embodiments (the same applies hereinafter in this section)) thereof, comprising a prime mover (engine 3) including a first output portion (crankshaft 3a) for outputting motive power, an accessory (compressor 31) driven by input of motive power to an input portion (input shaft 32) thereof, a first rotating machine 91 including an unmovable first stator 93 for generating a first rotating magnetic field, a first rotor 94 formed by first magnets (permanent magnets 94a) and disposed in a manner opposed to the first stator 93, and a second rotor 95 formed by a first soft magnetic material (cores 95a) and disposed between the first stator 93 and the first rotor 94, the first rotating machine 91 being configured such that electric power and motive power are input and output between the first stator 93 and the first and second rotors 94, 95 along with generation of the first rotating magnetic field, and such that the first rotating magnetic field and the second and first rotors 95, 94 rotate along with input and output of the electric power and the motive power while maintaining a collinear relationship in rotational speed therebetween, with straight lines representing respective rotational speeds of the first rotating magnetic field and the second and first rotors 95, 94 being sequentially aligned in a collinear chart representing the collinear relationship in rotational speed, restriction means (second rotating machine 21, brakes BR, second rotating machine 71) for restricting rotation of the driven parts, and a controller (ECU 2, first PDU 41, second PDU 42, VCU 43) for controlling operations of the first rotating machine 91 and the restriction means, wherein one of the first and second rotors 94, 95 is mechanically connected to the first output portion and the input portion while the other of the first and second rotors 94, 95 is mechanically connected to the driven parts, and wherein when the accessory is driven in a state where the driven parts are at rest during stoppage of the prime mover, the controller controls the operations of the first rotating machine 91 and the restriction means such that motive power is input to the input portion and a rotational speed of the driven parts is restricted to approximately 0 (FIGS. 42, 46, 50, 57, 68, and 71).

With this arrangement, in the first rotating machine, as the first rotating magnetic field is generated in the first stator, electric power and motive power are input and output between the first stator and the first and second rotors, the first rotating magnetic field and the second and first rotors rotate while holding the collinear relationship in rotational speed therebetween, and the straight lines representing the respective rotational speeds of the first rotating magnetic field and the second and first rotors are sequentially aligned in the collinear chart representing the collinear relationship in rotational speed. Further, one of the first and second rotors is mechanically connected to the first output portion of the prime mover and the input portion of the accessory, and the other of the first and second rotors is mechanically connected to the driven parts. Furthermore, the operation of the first rotating machine and the operation of the restriction means for restricting rotation of the driven parts are controlled by the controller. With the arrangement described above, the driven parts can be driven using the motive power from the prime mover.

Further, when the accessory is driven in the state where the driven parts are at rest during stoppage of the prime mover, the operations of the first rotating machine and the restriction means are controlled such that the motive power is input to the input portion of the accessory and the rotational speed of the driven parts is restricted to approximately 0. This makes it possible to properly drive the accessory while preventing the driven parts from being driven, when the accessory is driven in the state where the driven parts are at rest.

The invention as claimed in claim 10 is the moving apparatus (vehicles VE5 to VE8, VE11, VE12) as claimed in claim 9, wherein a predetermined plurality of first magnet magnetic poles arranged in a first circumferential direction are formed by the first magnets, and a first magnetic pole row is formed by arranging the plurality of first magnet magnetic poles such that each two first magnet magnetic poles adjacent to each other have polarities different from each other, wherein the first rotor is configured to be rotatable in the first circumferential direction, wherein the first stator has a first armature row (iron core 93a, U-phase to W-phase coils 93b) that generates a predetermined plurality of first armature magnetic poles, to thereby cause the first rotating magnetic field rotating in the first circumferential direction to be generated between the first stator and the first magnetic pole row, wherein the first soft magnetic material is formed by a predetermined plurality of first soft magnetic material elements arranged in the first circumferential direction in a manner spaced from each other, and a first soft magnetic material element row formed by the plurality of first soft magnetic material elements is disposed between the first magnetic pole row and the first armature row, wherein the second rotor is configured to be rotatable in the first circumferential direction, and wherein a ratio between the number of the first armature magnetic poles, the number of the first magnet magnetic poles, and the number of the first soft magnetic material elements is set to $1:m:(1+m)/2$ $(m\neq 1.0)$.

With this arrangement, in the first rotating machine, for a reason described hereinafter, by setting the ratio between the number of the first armature magnetic poles, the number of the first magnet magnetic poles, and the number of the first soft magnetic material elements as desired, within the range satisfying the condition of $1:m:(1+m)/2$ $(m\neq 1.0)$, it is possible to set the collinear relationship in rotational speed between the first rotating magnetic field and the first and second rotors, as desired. Therefore, it is possible to enhance the degree of freedom in design of the first rotating machine.

The invention as claimed in claim 11 is the moving apparatus (vehicle VE7) as claimed in claim 9 or 10, further including a power transmission mechanism (second planetary gear unit PS2) including a first element (second sun gear S2), a second element (second carrier C2), and a third element (second ring gear R2) that are capable of transmitting motive power therebetween, the first to third elements being configured to rotate during transmission of the motive power while maintaining a collinear relationship in rotational speed therebetween, with straight lines representing respective rotational speeds of the first to third elements being sequentially aligned in a collinear chart representing the collinear relationship in rotational speed, and wherein the restriction means is a second rotating machine 21 that includes a second output portion (second rotor 23) and is configured to be capable of converting input electric power to motive power to output the motive power from the second output portion, and converting motive power input to the second output portion to electric power, and wherein the first rotor 94 and the second element are mechanically connected to the driven parts, the second rotor 95 and the first element are mechanically connected to the first output portion and the input portion, and the third element is mechanically connected to the second output portion.

With this arrangement, in the power transmission mechanism, the first element, the second element, and the third element are configured to be capable of transmitting motive power therebetween, and rotate during transmission of the motive power while holding the collinear relationship in rotational speed therebetween, with the straight lines representing the respective rotational speeds of the first to third elements being sequentially aligned in the collinear chart representing the collinear relationship in rotational speed. Further, the second rotor and the first element of the first rotating machine are mechanically connected to the first output portion of the prime mover and the input portion of the accessory, the first rotor and the second element are mechanically connected to the driven parts, and the third element is mechanically connected to the second output portion of the second rotating machine, which is the restriction means. Furthermore, as described in the description as to claim 9, when the accessory is driven in the state where the driven parts are at rest during stoppage of the prime mover, the operations of the first and second rotating machines are controlled such that motive power is input to the input portion and the rotational speed of the driven parts is restricted to approximately 0.

As described hereinabove, in the first rotating machine, the first rotating magnetic field and the second and first rotors rotate along with input and output of the electric power and the motive power between the first stator and the first and second rotors while holding the collinear relationship in rotational speed therebetween, and the straight lines representing the respective rotational speeds of the first rotating magnetic field and the second and first rotors are sequentially aligned in the collinear chart representing the collinear relationship in rotational speed. Further, as described hereinabove, the first to third elements rotate during transmission of motive power therebetween while holding the collinear relationship in rotational speed therebetween, and the straight lines representing the respective rotational speeds of the first to third elements are sequentially aligned in the collinear chart. Furthermore, the first rotor and second element are connected to the driven parts, the second rotor and the first element are connected to the first output portion and the input portion, and the third element is connected to the second output portion. From the above, similarly to the moving apparatus as claimed in claim 9, when the accessory is driven in the state where the driven parts are at rest, by controlling the operations of the first and second rotating machines are controlled, it is possible to input motive power to the input portion to properly drive the accessory, and restrict the rotational speed of the driven parts to approximately 0 to prevent the driven parts from being driven.

In this case, out of the first rotating magnetic field and the second and first rotors which are in the collinear relationship in rotational speed, the rotational speed of the first rotor connected to the driven parts becomes approximately equal to 0, the rotational speed of the second rotor connected to the input portion becomes higher than 0, and the rotational speed of the first rotating magnetic field becomes higher than the rotational speed of the second rotor and hence becomes higher than 0. Further, out of the first to third elements which are in the collinear relationship in rotational speed, the rotational speed of the first element connected to the input portion becomes higher than 0, the rotational speed of the second element connected to the driven parts becomes approximately equal to 0, the third element rotates in a direction opposite to the direction of rotation of the first element, with the rotational speed thereof becoming higher than 0, and the rotational speed of the second output portion to which is connected the third element also becomes higher than 0.

On the other hand, in a case where the first stator is formed e.g. by multi-phase coils for generating the first rotating magnetic field, and a rotating machine including multi-phase coils is used as the second rotating machine such that electric power is input to and output from the first stator and the second rotating machine, via an electric circuit, such as an inverter having switching elements, when the rotational speeds of the first rotating magnetic field and the second output portion are controlled such that they become equal to 0, there can occur the following inconvenience: In this case, there is a fear that electric currents flow through only specific phase coils of the first stator and the second rotating machine, and only switching elements associated with the specific phase coils are turned on, so that the coils and the switching elements are overheated. When the maximum values of the electric currents input to and output from the first stator and the second rotating machine are made smaller so as to suppress such overheating of the coils and the switching elements, the torques of the first and second rotating machines becomes small.

According to the present invention, however, both the rotational speeds of the first rotating magnetic field and the second output portion become higher than 0, as described above, and hence it is possible to prevent the above-mentioned overheating of the electric circuit and the first and second rotating machines and secure sufficiently large torques of the first and second rotating machines.

In this case, to efficiently obtain the above-described advantageous effects, it is preferable to set larger the distance between a straight line representing the rotational speed of the second rotor and a straight line representing the rotational speed of the first rotating magnetic field in a collinear chart representing the relationship between the rotational speeds of the first rotating magnetic field and the first and second rotors, since the first and second rotors are connected to the driven parts and the input portion, respectively, as described above. According to the present invention, the collinear relationship in rotational speed between the first rotating magnetic field and the first and second rotors of the first rotating machine can be set as desired, as described above, and hence it is possible to easily make the above-mentioned preferable setting, thereby making it possible to efficiently obtain the above-mentioned advantageous effects, i.e. the advantageous effects that it is possible to prevent overheating of the electric circuit and the first rotating machine and that it is possible to secure a sufficiently large torque of the first rotating machine.

The invention as claimed in claim 12 is the moving apparatus (vehicle VE7) as claimed in claim 11, further including a clutch CL for connecting and disconnecting the first output portion to and from the second rotor 95 and the first element.

As described hereinabove, the second rotor and the first element are connected not only to the input portion of the accessory but also to the first output portion of the prime mover. Therefore, when the accessory is driven during stoppage of the driven parts and the prime mover as described in the description as to claim 11, motive power is wastefully transmitted not only to the input portion but also to the first output portion, which degrades driving efficiency in driving the accessory.

With the arrangement described above, the clutch connects and disconnects the first output portion to and from the second rotor and the first element, and the controller controls the operation of the clutch. Therefore, by holding the first output portion in the state disconnected from the second rotor and the first element using the clutch during the above-mentioned driving of the accessory, it is possible to prevent motive power from being transmitted to the first output portion, thereby making it possible to further enhance the driving efficiency in driving the accessory.

The invention as claimed in claim 13 is the moving apparatus (vehicle VE7) as claimed in claim 12, wherein the prime mover is an internal combustion engine (engine 3), and wherein the controller controls the operation of the clutch CL so as to disconnect the first output portion from the second rotor 95 and the first element during an EV operation mode in which the controller causes the driven parts to be driven by controlling operations of the first and second rotating machines 91, 21 during stoppage of the prime mover (FIGS. 51, 52), controls the operations of the first and second rotating machines 91, 21 when the prime mover is started during the EV operation mode, such that the respective rotational speeds of the second rotor 95 and the first element become approximately equal to 0, and when the respective rotational speeds of the second rotor and the first element have become approximately equal to 0, controls the operation of the clutch CL so as to connect the first output portion to the second rotor 95 and the first element, and starts the prime mover (FIGS. 53, 54).

With this arrangement, the operation of the clutch is controlled such that the first output portion of the prime mover is disconnected from the second rotor and the first element during the EV operation mode in which the driven parts are driven by controlling the operations of the first and second rotating machines during stoppage of the prime mover. This makes it possible to prevent motive power from being wastefully transmitted to the first output portion during the EV operation mode, and therefore it is possible to enhance the driving efficiency in driving the driven parts.

Further, when the prime mover is started during the EV operation mode, the operation of the clutch is controlled such that the first output portion is connected to the second rotor and the first element, and the prime mover is started. The first output portion is thus connected to the second rotor and the first element at the start of the prime mover during the EV operation mode, whereby motive power can be transmitted to the first output portion, so that it is possible to cause the first output portion to rotate and in turn properly start the prime mover, which is the engine. Further, in this case, the first output portion at rest is connected to the second rotor and the first element when the rotational speeds of the second rotor and the first element have become approximately equal to 0, and hence this connection causes no shock. For the same reason, it is possible to employ, as the clutch, a dog clutch simpler in construction and smaller in energy required for driving than a friction clutch.

The invention as claimed in claim 14 is the moving apparatus (vehicle VE8) as claimed in claim 9 or 10, wherein the restriction means is a second rotating machine 71 that includes an unmovable second stator 73 for generating a second rotating magnetic field, a third rotor 74 formed by second magnets (permanent magnets 74a) and disposed in a manner opposed to the second stator 73, and a fourth rotor 75 formed by a second soft magnetic material (cores 75a) and disposed between the second stator 73 and the third rotor 74, and is configured such that electric power and motive power are input and output between the second stator 73 and the third and fourth rotors 74, 75 along with generation of the second rotating magnetic field, and such that the second rotating magnetic field and the fourth and third rotors 75, 74 rotate along with input and output of the electric power and the motive power while maintaining a collinear relationship in rotational speed therebetween, with straight lines representing respective rotational speeds of the second rotating magnetic field and the fourth and third rotors 75, 74 being sequentially aligned in a collinear chart representing the collinear relationship in rotational speed, and wherein the second and third rotors 95, 74 are mechanically connected to the first output portion and the input portion, and the first and fourth rotors 94, 75 are mechanically connected to the driven parts.

With this arrangement, in the second rotating machine, which is the restriction means, as the second rotating magnetic field is generated in the second stator, electric power and motive power are input and output between the second stator and the third and fourth rotors, the second rotating magnetic field and the fourth and third rotors rotate while holding the collinear relationship in rotational speed therebetween, and straight lines representing the respective rotational speeds of the second rotating magnetic field and the fourth and third rotors are sequentially aligned in the collinear chart representing the collinear relationship in rotational speed. Further, the second rotor of the first rotating machine and the third rotor of the second rotating machine are mechanically connected to the first output portion of the prime mover and the input portion of the accessory, and the first rotor of the first rotating machine and the fourth rotor of the second rotating machine are mechanically connected to the driven parts. Furthermore, as described in the description as to claim 9, when the accessory is driven in the state where the driven parts are at rest during stoppage of the prime mover, the operations of the first and second rotating machines are controlled such that motive power is input to the input portion and the rotational speed of the driven parts is restricted to approximately 0.

As described hereinabove, in the first rotating machine, the first rotating magnetic field and the second and first rotors rotate along with input and output of electric power and motive power between the first stator and the first and second rotors while holding the collinear relationship in rotational speed therebetween, and the straight lines representing the respective rotational speeds of the first rotating magnetic field and the second and first rotors are sequentially aligned in the collinear chart representing the collinear relationship in rotational speed. Further, as described hereinabove, in the second rotating machine, the second rotating magnetic field and the fourth and third rotors rotate along with input and output of the electric power and the motive power between the second stator and the third and fourth rotors while holding the collinear relationship in rotational speed therebetween, and the straight lines representing the rotational speeds of the second rotating magnetic field and the fourth and third rotors are sequentially aligned in the collinear chart.

Furthermore, the second and third rotors are connected to the first output portion and the input portion, and the first and fourth rotors are connected to the driven parts. From the above, similarly to the moving apparatus as claimed in claim 9, when the accessory is driven in the state where the driven parts are at rest, by controlling the operations of the first and second rotating machines, it is possible to input motive power to the input portion to properly drive the accessory, and restrict the rotational speed of the driven parts to approximately 0 to prevent the driven parts from being driven.

In this case, out of the first rotating magnetic field and the second and first rotors which are in the collinear relationship in rotational speed, the rotational speed of the first rotor connected to the driven parts becomes approximately equal to 0, the rotational speed of the second rotor connected to the input portion becomes higher than 0, and the rotational speed of the first rotating magnetic field becomes higher than the rotational speed of the second rotor and hence becomes higher than 0. Further, out of the second rotating magnetic field and the fourth and third rotors which are in the collinear relationship in rotational speed, the rotational speed of the third rotor connected to the input portion becomes higher than 0, the rotational speed of the fourth rotor connected to the driven parts becomes approximately equal to 0, and the second rotating magnetic field rotates in a direction opposite to the direction of rotation of the third rotor, with the rotational speed thereof becoming higher than 0.

On the other hand, in a case where the first and second stators are each formed e.g. by multi-phase coils for generating the first and second rotating magnetic fields, and electric power is input to and output from the first and second stators, via an electric circuit, such as an inverter having switching elements, when the rotational speeds of the first and second rotating magnetic fields are controlled such that they become equal to 0, there can occur the following inconvenience: In this case, there is a fear that electric currents flow through only specific phase coils of the first and second stators, and only switching elements associated with the specific phase coils are turned on, so that the coils and the switching elements are overheated. When the maximum values of the electric currents input to and output from the first and second stators are made smaller so as to suppress such overheating of the coils and the switching elements, the torques of the first and second rotating machines becomes small.

According to the present invention, however, both the rotational speeds of the first and second rotating magnetic fields become higher than 0 as described above, and hence it is possible to prevent the above-mentioned overheating of the electric circuit and the first and second rotating machines and secure sufficiently large torques of the first and second rotating machines.

The invention as claimed in claim 15 is the moving apparatus (vehicle VE8) as claimed in claim 14, wherein a predetermined plurality of second magnet magnetic poles arranged in a second circumferential direction are formed by the second magnets, and a second magnetic pole row is formed by arranging the plurality of second magnet magnetic poles such that each two second magnet magnetic poles adjacent to each other have polarities different from each other, wherein the third rotor is configured to be rotatable in the second circumferential direction, wherein the second stator has a second armature row (iron core 73a, U-phase to W-phase coils 73c to 73e) that generates a predetermined plurality of second armature magnetic poles, to thereby cause the second rotating magnetic field rotating in the second circumferential direction to be generated between the second stator and the second magnetic pole row, wherein the second soft magnetic material is formed by a predetermined plurality of second soft magnetic material elements arranged in the second circumferential direction in a manner spaced from each other, and a second soft magnetic material element row formed by the plurality of second soft magnetic material elements is disposed between the second magnetic pole row and the second armature row, wherein the fourth rotor is configured to be rotatable in the second circumferential direction, and wherein a ratio between the number of the second armature magnetic poles, the number of the second magnet magnetic poles, and the number of the second soft magnetic material elements is set to $1:n:(1+n)/2$ ($n \neq 1.0$).

With this arrangement, in the second rotating machine, for a reason described hereinafter, by setting the ratio between the number of the second armature magnetic poles, the number of the second magnet magnetic poles, and the number of the second soft magnetic material elements as desired, within a range satisfying the condition of $1:n:(1+n)/2$ ($n \neq 1.0$), it is possible to set the collinear relationship in rotational speed between the second rotating magnetic field and the third and fourth rotors, as desired. Therefore, it is possible to enhance the degree of freedom in design of the second rotating machine.

Further, as described in the description as to claim 14, when the accessory is driven in the state where the driven parts are at rest, to prevent the above-mentioned overheating of the electric circuit and the second rotating machine, and to secure a sufficiently large torque of the second rotating machine, it is preferable to set larger the distance between a straight line representing the rotational speed of the fourth rotor and a straight line representing the rotational speed of the second rotating magnetic field in the collinear chart representing the relationship between the rotational speeds of the second rotating magnetic field and the third and fourth rotors, since the third and fourth rotors are connected to the input portion and the driven parts, respectively, as described above. According to the present invention, the collinear relationship in rotational speed between the second rotating magnetic field and the third and fourth rotors of the second rotating machine can be set as desired, as described above, and hence it is possible to easily make the above-mentioned preferable setting, thereby making it possible to efficiently obtain the advantageous effects provided by the above-described claim 14.

The invention as claimed in claim 16 is the moving apparatus (vehicle VE8) as claimed in claim 14 or 15, further including a clutch CL for connecting and disconnecting the first output portion to and from the second and third rotors 95, 74.

As described hereinabove, the second and third rotors are connected not only to the input portion of the accessory but also to the first output portion of the prime mover. Therefore, when the accessory is driven during stoppage of the driven parts and the prime mover as described in the description as to claim 14, motive power is wastefully transmitted not only to the input portion but also to the first output portion, which degrades driving efficiency in driving the accessory.

With the arrangement described above, the clutch connects and disconnects the first output portion to and from the second and third rotors, and the controller controls the operation of the clutch. Therefore, by holding the first output portion in the state disconnected from the second and third rotors using the clutch during the above-mentioned driving of the accessory, it is possible to prevent motive power from being transmitted to the first output portion, thereby making it possible to further enhance the driving efficiency.

The invention as claimed in claim 17 is the moving apparatus (vehicle VE8) as claimed in claim 16, wherein the prime mover is an internal combustion engine (engine 3), and wherein the controller controls the operation of the clutch so as to disconnect the first output portion from the second and third rotors 95, 74 during an EV operation mode in which the controller causes the driven parts to be driven by controlling operations of the first and second rotating machines 91, 71 during stoppage of the prime mover (FIGS. 58, 59), controls the operations of the first and second rotating machines 91, 71 when the prime mover is started during the EV operation mode, such that the respective rotational speeds of the second and third rotors 95, 74 become approximately equal to 0, and when the respective rotational speeds of the second and third rotors 95, 74 have become approximately equal to 0, controls the operation of the clutch CL so as to connect the first output portion to the second and third rotors 95, 74, and starts the prime mover (FIGS. 60, 61).

With this arrangement, the operation of the clutch is controlled such that the first output portion of the prime mover is disconnected from the second and third rotors during the EV operation mode in which the driven parts are driven by controlling the operations of the first and second rotating machines during stoppage of the prime mover. This makes it possible to prevent motive power from being wastefully transmitted to the first output portion during the EV operation mode, and therefore it is possible to enhance the driving efficiency in driving the driven parts.

Further, when the prime mover is started during the EV operation mode, the operation of the clutch is controlled such that the first output portion is connected to the second and third rotors, and the prime mover is started. The first output portion is thus connected to the second and third rotors at the start of the prime mover during the EV operation mode, whereby motive power can be transmitted to the first output portion, and hence it is possible to cause the first output portion to rotate and in turn properly start the prime mover, which is the engine. Further, in this case, the first output portion at rest is connected to the second and third rotors when the rotational speeds of the second and third rotors have become approximately equal to 0, and hence the connection causes no shock.

BRIEF DESCRIPTION OF THE DRAWINGS

FIG. 3 A block diagram showing a relationship of connections between a first stator, a second stator, a battery, and so forth, which are mounted on the vehicle shown in FIG. 1.

FIG. 8 A velocity collinear chart illustrating an example of the relationship between the rotational speeds of various types of rotary elements of the vehicle shown in FIG. 6 and the relationship between torques thereof, during the vehicle stoppage-time compressor drive mode.

FIG. 21 A velocity collinear chart illustrating an example of the relationship between a magnetic field electrical angular velocity, and third and fourth rotor electrical angular velocities of the second rotating machine appearing in FIG. 15.

FIG. 29 A diagram illustrating an example of changes in U-phase to W-phase counter-electromotive force voltages in the second rotating machine appearing in FIG. 15, in a case where the number of the second armature magnetic poles, the number of the cores and the number of the second magnet magnetic poles are set to 16, 18 and 20, respectively, and the third rotor is held unrotatable.

FIG. 30 A diagram illustrating an example of changes in a second driving equivalent torque and third and fourth rotor-transmitted torques in the second rotating machine appearing in FIG. 15, in the case where the number of the second armature magnetic poles, the number of the cores and the number of the second magnet magnetic poles are set to 16, 18 and 20, respectively, and the third rotor is held unrotatable.

MODE FOR CARRYING OUT INVENTION

Figure 1:
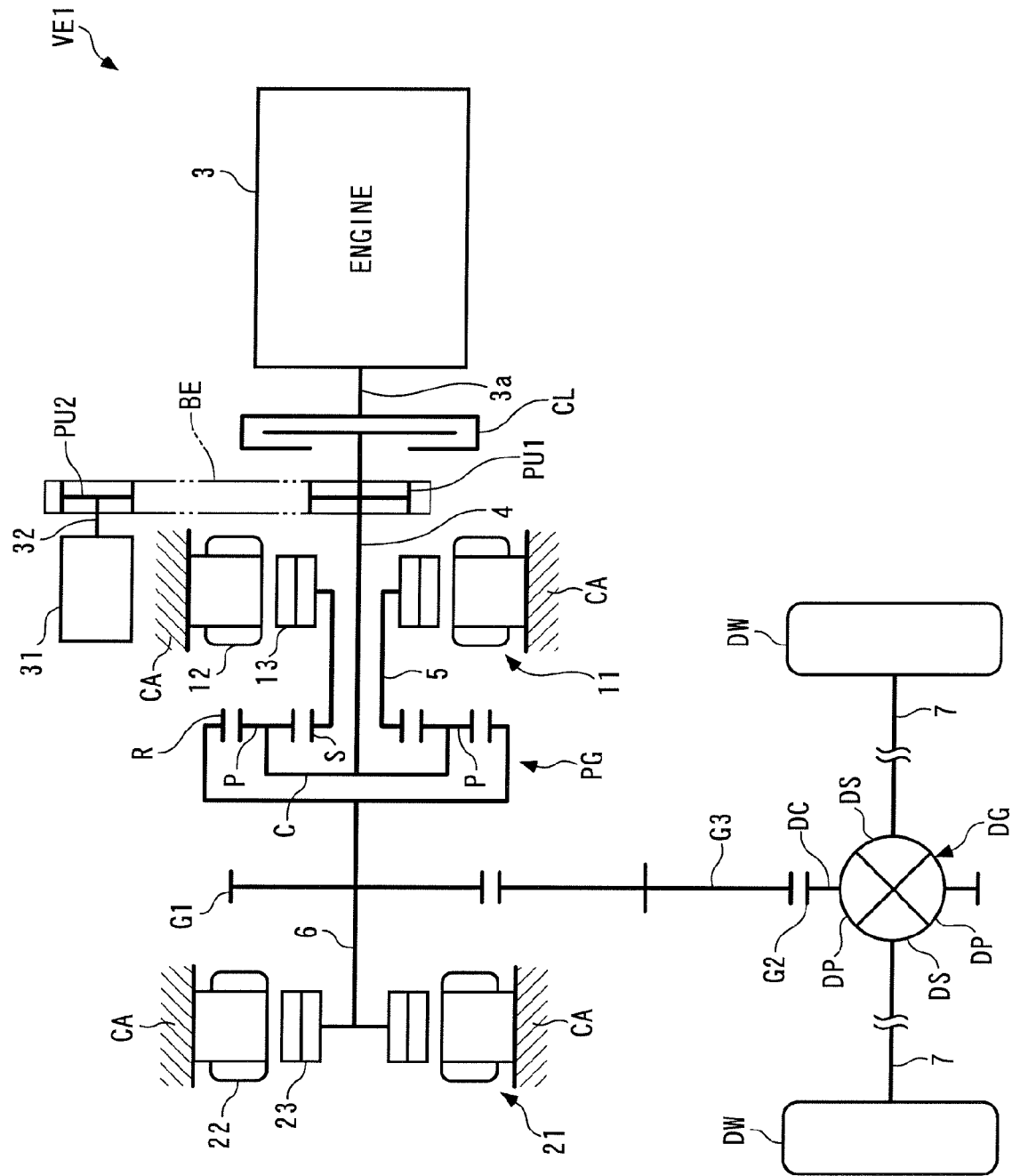
FIG. 1 A schematic view of a vehicle as a moving apparatus according to a first embodiment of the present invention.
Figure 2:
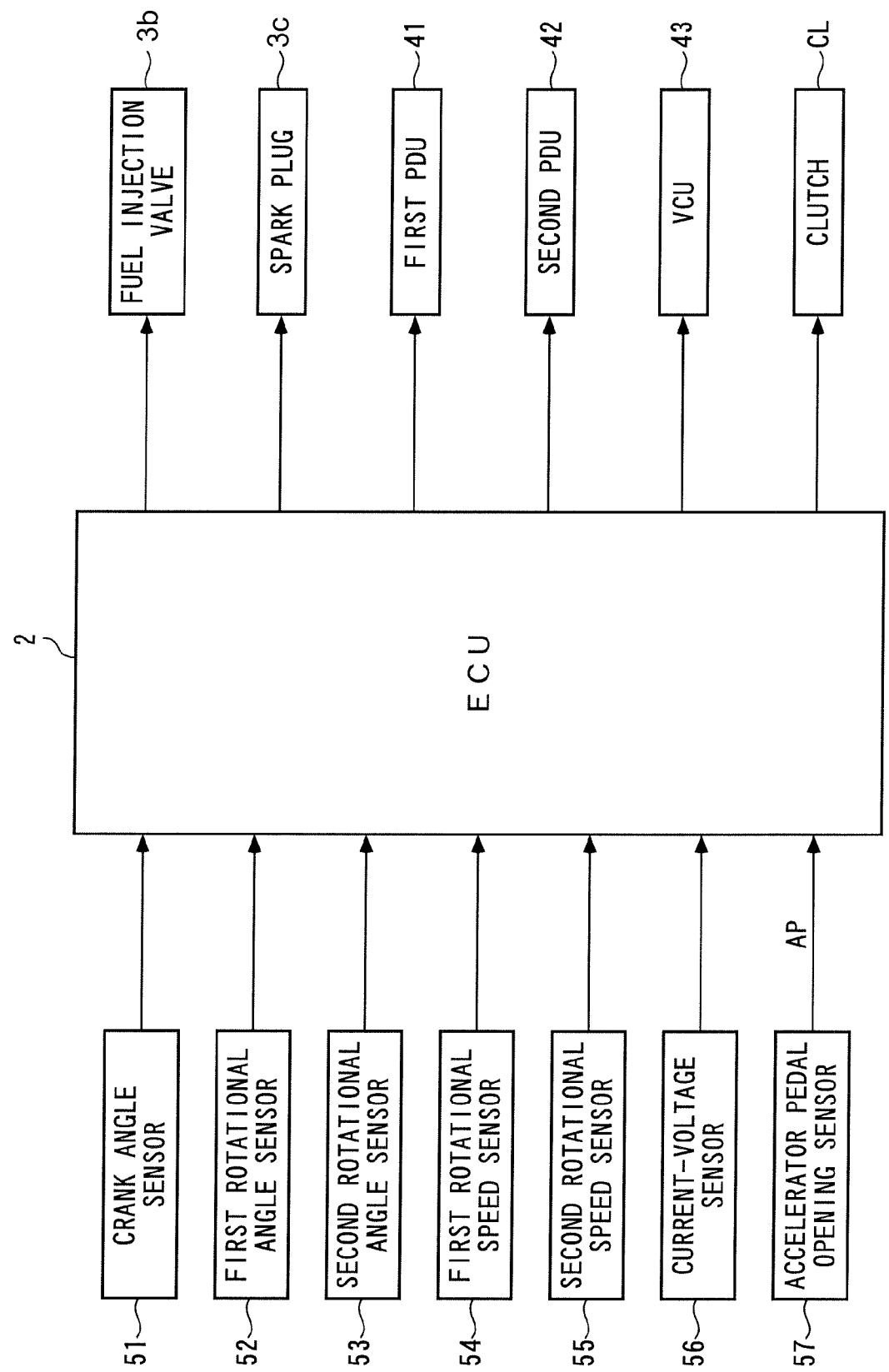
FIG. 2 A block diagram showing an ECU etc. mounted on the vehicle shown in FIG. 1.

The present invention will now be described in detail with reference to the drawings showing preferred embodiments thereof. A vehicle VE1 as a moving apparatus according to a first embodiment of the present invention is a four-wheel vehicle. Referring to FIGS. 1 and 2, the vehicle VE1 includes left and right drive wheels DW and DW, an internal combustion engine 3, a first rotating machine 11, and a second rotating machine 21, as motive power sources, a planetary gear unit PG and a differential gear DG, for transmitting motive power, a compressor 31, and an ECU 2 for controlling the operations of the internal combustion engine 3 and the first and second rotating machines 11 and 21. Note that in FIG. 1 and other figures, referred to hereinafter, hatching in portions illustrating cross-sections is omitted for convenience, if appropriate. Hereinafter, connection between elements directly by a shaft or the like without via a transmission mechanism, such as gears, is referred to as "direct connection" as deemed appropriate.

The internal combustion engine (hereinafter referred to as the "engine") 3 is a gasoline engine, and includes a crankshaft 3a for outputting motive power, fuel injection valves 3b, and spark plugs 3c (see FIG. 2). The valve-opening time period and the valve-opening timing of each fuel injection valve 3b, and the ignition operation of each spark plug 3c are controlled by the ECU 2.

The first rotating machine 11 is a general one-rotor-type brushless DC motor, and includes an unmovable first stator 12, and a rotatable first rotor 13. The first stator 12 is formed e.g. by three-phase coils, and is fixed to an immovable casing CA. Further, when electric power is supplied or generated, the first stator 12 generates a first rotating magnetic field rotating in a circumferential direction. The first rotor 13 is formed e.g. by a plurality of magnets, and is disposed in a manner opposed to the first stator 12.

The second rotating machine 21 is a general one-rotor-type brushless DC motor, similarly to the first rotating machine 11, and includes an unmovable second stator 22, and a rotatable second rotor 23. The second stator 22 is formed e.g. by three-phase coils, and is fixed to the casing CA. Further, when electric power is supplied or generated, the second stator 22 generates a second rotating magnetic field rotating in the circumferential direction. The second rotor 23 is formed e.g. by a plurality of magnets, and is disposed in a manner opposed to the second stator 22.

The first stator 12 is electrically connected to a battery 44 capable of being charged and discharged, via a first power drive unit (hereinafter referred to as the "first PDU") 41 and a voltage control unit (hereinafter referred to as the "VCU") 43. Further, the second stator 22 is electrically connected to the battery 44 via a second power drive unit (hereinafter referred to as the "second PDU") 42 and the VCU 43.

Each of the first and second PDUs 41 and 42 is implemented as an electric circuit comprising an inverter having a switching element, and outputs DC power input from the battery 44 in a state converted to three-phase AC power by turning on/off the switching element. Further, the first and second PDUs 41 and 42 are electrically connected to each other. As described above, the first and second stators 12 and 22 are electrically connected to each other via the first and second PDUs 41 and 42.

The above-described VCU 43, which is implemented as an electric circuit comprising a DC/DC converter, outputs electric power supplied from the battery 44, to the first PDU 41 and/or the second PDU 42 in a state where the voltage of the electric power is boosted, and outputs electric power supplied from the first PDU 41 and/or the second PDU 42, to the battery 34 in a state where the voltage of the electric power is dropped. Further, the VCU 43, and the first and second PDUs 41 and 42 are electrically connected to the above-described ECU 2 (see FIG. 2).

With the above arrangement, in the first rotating machine 11, as electric power is supplied from the battery 44 to the first stator 12 via the VCU 43 and the first PDU 41, the first rotating magnetic field is generated in the first stator 12 to thereby rotate the first rotor 13. That is, the electric power supplied to the first stator 12 is converted to motive power, and is output from the first rotor 13. Further, when no electric power is supplied, when the first rotor 13 rotates relative to the first stator 12, the first rotating magnetic field is generated in the first stator 12 and generate electric power. That is, motive power input to the first rotor 13 is converted to electric power in the first stator 12. Further, both in the case where motive power is output from the first rotor 13, as described above, and in the case where electric power is generated in the first stator 12, the first rotor 13 is caused to rotate synchronously with the first rotating magnetic field.

The ECU controls the first PDU 41 and the VCU 43 to thereby control electric power supplied to the first rotating machine 11, electric power generated in the first rotating machine 11, and the rotational speed of the first rotor 13 (hereinafter referred to as the "first rotating machine rotational speed") NM1.

Further, in the second rotating machine 21, similarly to the first rotating machine 11, as electric power is supplied from the battery 44 to the second stator 22 via the VCU 43 and the second PDU 42, the second rotating magnetic field is generated in the second stator 22 and the second rotor 23 is rotated. That is, the electric power supplied to the second stator 22 is converted to motive power, and is output from the second rotor 23. Further, when no electric power is supplied, when the second rotor 23 rotates relative to the second stator 22, the second rotating magnetic field is generated in the second stator 22 and electric power is generated. That is, motive power input to the second rotor 23 is converted to electric power in the second stator 22. Further, both in the case where motive power is output from the second rotor 23, as described above, and in the case where electric power is generated in the second stator 22, the second rotor 23 is caused to rotate synchronously with the second rotating magnetic field.

By controlling the second PDU 42 and the VCU 43, the ECU 2 controls electric power supplied to the second rotating machine 21, electric power generated in the second rotating machine 21, and the rotational speed of the second rotor 23 (hereinafter referred to as the "second rotating machine rotational speed") NM2.

The planetary gear unit PG is of a general single pinion type, and comprises a sun gear S, a ring gear R disposed around a periphery of the sun gear S, a plurality of planetary gears P in mesh with the gears S and R, and a carrier C rotatably supporting the planetary gears P. As is widely known, the sun gear S, the carrier C and the ring gear R are capable of transmitting motive power therebetween, and are configured such that during transmission of motive power, they rotate while maintaining a collinear relationship in rotational speed therebetween, and straight lines representing the respective rotational speeds thereof are sequentially aligned in a collinear chart representing the relationship between the rotational speeds. Further, the sun gear S, the carrier C and the ring gear R are arranged coaxially with the crankshaft 3a of the engine 3.

Furthermore, the carrier C is integrally formed on a first rotating shaft 4. The first rotating shaft 4 is rotatably supported by bearings (not shown) together with the carrier C, and is coaxially directly connected to the crankshaft 3a via a clutch CL and a flywheel (not shown). The clutch CL is a so-called dog clutch, and is engaged and disengaged under the control of the ECU 2 to thereby connect and disconnect between the crankshaft 3a and the first rotating shaft 4. Further, a first pulley PU1 is integrally formed on the first rotating shaft.4.

Further, the sun gear S and the above-described first rotor 13 of the first rotating machine 11 are integrally formed on a hollow cylindrical second rotating shaft 5. The second rotating shaft 5 is rotatably supported by bearings (not shown) together with the sun gear S and the first rotor 13, and is disposed coaxially with the crankshaft 3a. As described above, the sun gear S and the first rotor 13 are directly connected to each other such that they are rotatable together therewith. Further, the first rotating shaft 4 is rotatably fitted through the second rotating shaft 5. Further, the ring gear R and the above-described second rotor 23 of the second rotating machine 21 are integrally formed on a third rotating shaft 6. The third rotating shaft 6 is rotatably supported by bearings (not shown) together with the ring gear R and the second rotor 23, and is disposed coaxially with the crankshaft 3a. As described above, the ring gear R and the second rotor 23 are directly connected to each other such that they are rotatable together therewith. Further, a gear G1 is integrally formed on the third rotating shaft 6.

The above-described differential gear DG is for distributing input motive power to the left and right drive wheels DW and DW, and comprises left and right side gears DS and DS having gear teeth equal in number to each other, a plurality of pinion gears DP in mesh with the gears DS and DS, and a differential case DC rotatably supporting the pinion gears DP. The left and right side gears DS and DS are connected to the left and right drive wheels DW and DW via left and right axles 7 and 7, respectively.

In the differential gear DG constructed as above, motive power input to the differential case DC is distributed to the left and right side gears DS and DS via the pinion gears DP, and is further distributed to the left and right drive wheels DW and DW via the left and right axles 7 and 7. Further, the differential case DC is integrally formed with a gear G2. The gear G2 is in mesh with the above-described gear G1 via an intermediate gear G3.

The above-described compressor 31 is for compressing refrigerant of an air conditioner mounted on the vehicle VE1. The compressor 31 includes an input shaft 32, and is driven by having motive power input to the input shaft 32. Further, a second pulley PU2 is integrally formed on the input shaft 32. A belt BE extends around the first pulley PU1 formed on the above-described first rotating shaft 4.

As described above, in the vehicle VE1, the sun gear S of the planetary gear unit PG is mechanically directly connected to the first rotor 13 of the first rotating machine 11, and the carrier C is mechanically connected to the input shaft 32 via the belt BE and the first and second pulleys PU1 and PU2. Further, the input shaft 32 and the carrier C are mechanically connected to the crankshaft 3a via the clutch CL. Furthermore, the ring gear R and the second rotor 23 of the second rotating machine 21 are mechanically directly connected to each other, and are mechanically connected to the drive wheels DW and DW e.g. via the differential gear DG. Note that it is assumed in the present specification that the rotational speeds of the left and right drive wheels DW and DW are equal to each other.

Further, as shown in FIG. 2, a crank angle sensor 51, a first rotational angle sensor 52, and a second rotational angle sensor 53 are connected to the ECU 2. The crank angle sensor 51 detects the rotational angular position of the crankshaft 3a, and delivers a signal indicative of the detected rotational angular position to the ECU 2. The ECU 2 calculates the rotational speed of the crankshaft 3a (hereinafter referred to as the "engine speed") NE based on the detected rotational angular position of the crankshaft 3a.

The above-described first rotational angle sensors 52 and 53 detect the rotational angular position of the first rotor 13 with respect to the first stator 12 and the rotational angular position of the second rotor 23 with respect to the second stator 22, respectively, to deliver respective signals indicative of the detected rotational angular positions of the first and second rotors 13 and 23, to the ECU 2. The ECU 2 calculates first and second rotating machine rotational speeds NM1 and NM2 (rotational speeds of the first and second rotors 13 and 23) based on the detection signals from the first and second rotational angle sensors 52 and 53, respectively.

Furthermore, delivered to the ECU 2 are a detection signal indicative of the rotational speed of the drive wheels DW and DW (hereinafter referred to as the "drive wheel rotational speed") NDW from a first rotational speed sensor 54, and a detection signal indicative of the rotational speed of the input shaft (hereinafter referred to as the "input shaft rotational speed") NCO from a second rotational speed sensor 55. Further, delivered to the ECU 2 are detection signals indicative of the values of current and voltage input to and output from the battery 44, from a current-voltage sensor 56, and a detection signal indicative of an operation amount of an accelerator pedal (not shown) of the vehicle (hereinafter referred to as the "accelerator pedal opening") AP from an accelerator pedal opening sensor 57. The ECU 2 calculates the charge of the battery 44 based on the detection signal from the current-voltage sensor 56.

The ECU 2 is implemented by a microcomputer comprising an I/O interface, a CPU, a RAM and a ROM. The ECU 2 controls the operations of the engine 3, the clutch CL, and the first and second rotating machines 11 and 21 based on the detection signals from the aforementioned sensors 51 to 57, according to control programs stored in the ROM. This causes the vehicle VE1 to be operated in various operation modes.

Hereinafter, the above-mentioned operation modes will be described with reference to velocity collinear charts shown in FIG. 4 and so forth. First, a description is given of the FIG. 4 velocity collinear chart. As is apparent from the above-described relationship of connections between various types of rotary elements of the vehicle VE1, the rotational speed of the sun gear S and the first rotating machine rotational speed NM1 are equal to each other. Further, the rotational speed of the ring gear R and the second rotating machine rotational speed NM2 are equal to each other, and are equal to the drive wheel rotational speed NDW provided that a change in speed by the differential gear DG and the like is ignored. Furthermore, the rotational speed of the carrier C is equal to the input shaft rotational speed NCO provided that a change in speed by the belt BE and the first and second pulleys PU1 and PU2 is ignored. Further, the clutch CL is engaged and disengaged to thereby connect and disconnect the crankshaft 3a to and from the input shaft 32 and the carrier C. Furthermore, the rotational speeds of the sun gear S, the carrier C, and the ring gear R are in a predetermined collinear relationship defined by the number of the gear teeth of the sun gear S and that of the gear teeth of the ring gear R.

Figure 4:
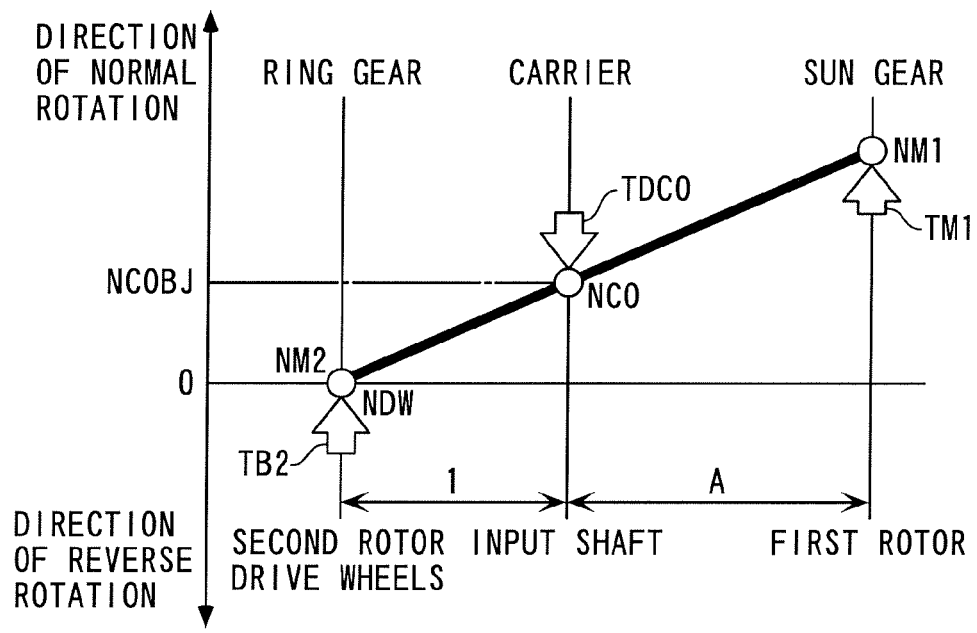
FIG. 4 A velocity collinear chart illustrating an example of the relationship between the rotational speeds of various types of rotary elements of the vehicle shown in FIG. 1 and the relationship between torques thereof, during a vehicle stoppage-time compressor drive mode.

From the above, during disengagement of the clutch CL, the relationship between the input shaft rotational speed NCO, the drive wheel rotational speed NDW, and the first and second rotating machine rotational speeds NM1 and NM2 is represented by a velocity collinear chart as shown in FIG. 4. Note that in FIG. 4 and other velocity collinear charts, described hereinafter, vertical lines intersecting with a horizontal line indicative of a value of 0 are for representing the rotational speeds of the rotary elements, and the distance from the horizontal line to a white circle shown on each vertical line corresponds to the rotational speed of each of the rotary elements denoted at opposite ends of the vertical line. For convenience, symbols indicative of the rotational speeds of the rotary elements are denoted close to the white circles associated therewith. Further, "A" represents the ratio of the number of the gear teeth of the ring gear R to the number of the gear teeth of the sun gear S.

The operation modes include a vehicle stoppage-time compressor drive mode and an EV travel-time compressor drive mode. Now, a description will be given of these operation modes, in order from the vehicle stoppage-time compressor drive mode. Note that in the following description, the change in speed e.g. by the differential gear DG is ignored.

[Vehicle Stoppage-Time Compressor Drive Mode]

The vehicle stoppage-time compressor drive mode is an operation mode for driving the compressor 31 during stoppage of the vehicle VE1 and the engine 3. The vehicle stoppage-time compressor drive mode is selected when the calculated charge of the battery 44 is larger than a first predetermined value, indicating that the amount of electric power remaining in the battery 44 is large enough. In the vehicle stoppage-time compressor drive mode, the clutch CL is disengaged, thereby disconnecting the crankshaft 3a from the input shaft 32 and the carrier C. In this state, electric power is supplied from the battery 44 to the first stator 12 of the first rotating machine 11 to cause the first rotor 13 to perform normal rotation. Further, electric current is caused to flow through the second stator 22 of the second rotating machine 21 so as to hold the second rotor 23 at rest. FIG. 4 illustrates the relationship between the rotational speeds of the various types of rotary elements and the relationship between torques thereof, during the vehicle stoppage-time compressor drive mode.

In FIG. 4, TM1 represents an output torque of the first rotating machine 11 generated along with the supply of electric power to the first stator 12 (hereinafter referred to as the "first powering torque"), and TB2 represents a braking torque of the second rotating machine 21 generated along with causing electric current to flow though the second stator 22, as described above (hereinafter referred to as the "second braking torque"). Further, TDCO represents a torque transmitted to the input shaft 32 (hereinafter referred to as the "compressor-transmitted torque").

As is apparent from FIG. 4, the first powering torque TM1 is transmitted to the sun gear S, whereby the sun gear S performs normal rotation together with the first rotor 13. Further, the first powering torque TM1 transmitted to the sun gear S is transmitted to the input shaft 32 via the carrier C, using the second braking torque TB2 acting on the ring gear R as a reaction force, thereby causing the input shaft 32 to perform normal rotation together with the carrier C. As described above, motive power is transmitted (input) from the first rotating machine 11 to the input shaft 32, whereby the compressor 31 is driven.

Further, in the vehicle stoppage-time compressor drive mode, the electric power supplied to the first stator 12 is controlled such that the compressor-transmitted torque TDCO becomes equal to a target torque TCOBJ. Specifically, the electric power supplied to the first stator 12 is controlled such that there holds the following equation (1) between the first powering torque TM1 and the target torque TCOBJ. The target torque TCOBJ is set to a fixed value in advance.

$$TM1 = -TCOBJ/(1+A) \quad (1)$$

Furthermore, the first rotating machine rotational speed NM1 is controlled such that the input shaft rotational speed NCO becomes equal to a target rotational speed NCOBJ, i.e. such that there holds the following equation (2). The target rotational speed NCOBJ is set to a fixed value in advance.

$$NM1 = (1+A)NCOBJ \quad (2)$$

In the vehicle stoppage-time compressor drive mode, as is apparent from FIG. 4, although the first powering torque TM1 transmitted to the sun gear S acts on the ring gear R and the drive wheels DW and DW to cause the ring gear R and the drive wheels DW and DW to perform reverse rotation, using the load of the compressor 31 acting on the carrier C as a reaction force, the second rotor 23 is held at rest together with the ring gear R and the drive wheels DW and DW, as described above, which prevents the drive wheels DW and DW from performing reverse rotation.

[EV Travel-Time Compressor Drive Mode]

The EV travel-time compressor drive mode is an operation mode for driving the compressor 31 during an EV travel mode. The EV travel mode is an operation mode for driving the vehicle VE1 using only the second rotating machine 21 as a motive power source, in a state where the engine 3 is stopped. Both the EV travel-time compressor drive mode and the EV travel mode are selected when the calculated charge of the battery 44 is larger than the first predetermined value. First, a brief description will be given of the EV travel mode.

During the EV travel mode, the clutch CL is disengaged, thereby disconnecting the crankshaft 3a from the input shaft 32 and the carrier C. In this state, electric power is supplied from the battery 44 to the second stator 22 to cause the second rotor 23 to perform normal rotation. The motive power of the second rotating machine 21 generated thereby is transmitted to the ring gear R and the drive wheels DW and DW, whereby the ring gear R and the drive wheels DW and DW are driven for normal rotation, in turn causing the vehicle VE1 to move forward In this case, when the load of the compressor 31 acting on the carrier C is larger than a friction of the second rotor 23 acting on the sun gear S, the rotational speed of the carrier C and the input shaft rotational speed NCO become approximately equal to 0, and the motive power transmitted from the second rotating machine 21 to the ring gear R, as described above, is transmitted to the sun gear S and the first rotor 13, so that the two S and 13 idly rotate in the direction of reverse rotation.

Figure 5:
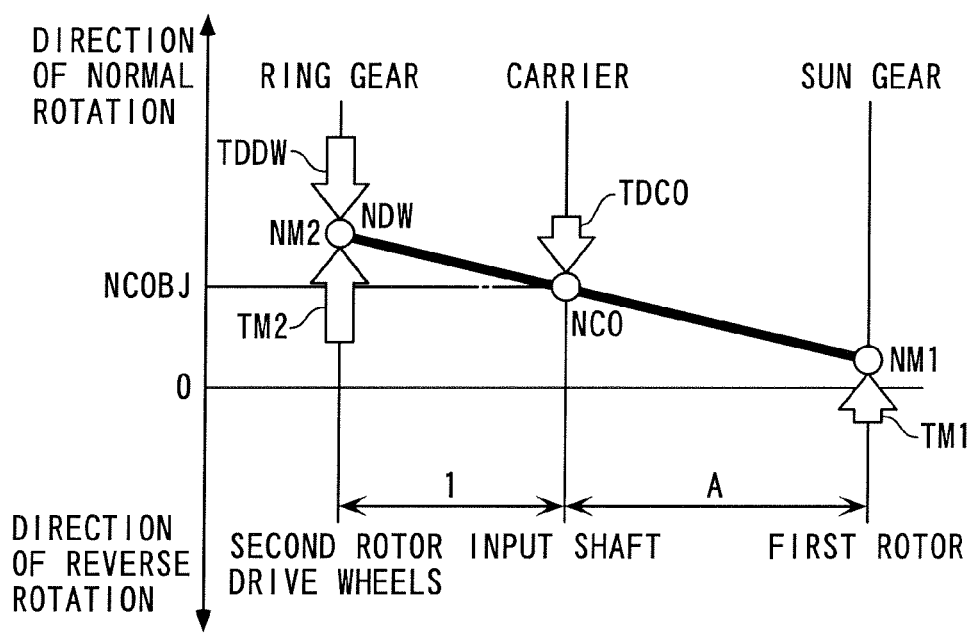
FIG. 5 A velocity collinear chart illustrating an example of the relationship between the rotational speeds of the various types of rotary elements of the vehicle shown in FIG. 1 and the relationship between the torques thereof, during an EV travel-time compressor drive mode.

In a case where the operation mode is shifted to the EV travel-time compressor drive mode from the above state to drive the compressor 31, the clutch CL and the second rotating machine 21 are controlled similarly to the EV travel mode whereby the crankshaft 3a continues to be held in a state disconnected from the input shaft 32 and the carrier C, and the drive wheels DW and DW continue to be caused to perform normal rotation. In this state, electric power is generated in the first stator 12 using the motive power transmitted to the first rotor 13, as described above, and the generated electric power is supplied to the second stator 22, and the first rotating machine rotational speed NM1 is controlled such that it becomes equal to 0. Then, after the first rotating machine rotational speed NM1 has become equal to 0, electric power is supplied from the battery 44 to the first stator 12 to cause the first rotor 13 to perform normal rotation. FIG. 5 illustrates the relationship between the rotational speeds of the various types of rotary elements and the relationship between the torques thereof, in this case.

In FIG. 5, TM2 represents an output torque of the second rotating machine 21 generated along with the supply of electric power to the second stator 22 (hereinafter referred to as the "second powering torque"), and TDDW represents a torque transmitted to the drive wheels DW and DW (hereinafter referred to as the "drive wheel-transmitted torque").

As is apparent from FIG. 5, part of the second powering torque TM2 is transmitted to the ring gear R, and is transmitted to the carrier C, using the first powering torque TM1 transmitted to the sun gear S as a reaction force, for being further transmitted to the input shaft 32. In other words, combined torque formed by combining the torque transmitted to the ring gear R and the torque transmitted to the sun gear S is transmitted to the input shaft 32. This causes the input shaft 32 to perform normal rotation to drive the compressor 31. Further, the remainder of the second powering torque TM2 is transmitted to the drive wheels DW and DW, whereby the drive wheels DW and DW continue to perform normal rotation.

In this case, the electric powers supplied to the first and second stators 12 and 22 are controlled such that the compressor-transmitted torque TDCO becomes equal to the above-mentioned target torque TCOBJ, and the drive wheel-transmitted torque TDDW becomes equal to a demanded torque TREQ. The demanded torque TREQ is a torque demanded of the drive wheels DW and DW, and is calculated by searching a predetermined map (not shown) according to the calculated engine speed NE and the detected accelerator pedal opening AP.

Specifically, the electric power supplied to the first stator 12 is controlled such that the aforementioned equation (1) holds between the first powering torque TM1 and the target torque TCOBJ. Further, the second powering torque TM2 transmitted to the ring gear R is transmitted to the input shaft 32 and the drive wheels DW and DW, as described above, and hence the electric power supplied to the second stator 22 is controlled such that there holds the following equation (3) between the second powering torque TM2, the target torque TCOBJ, and the demanded torque TREQ.

$$TM2 = -\{[A \cdot TCOBJ/(1+A)] + TREQ\} \quad (3)$$

Furthermore, the second rotating machine rotational speed NM2 is controlled such that it becomes equal to the drive wheel rotational speed NDW. Further, the first rotating machine rotational speed NM1 is controlled such that the input shaft rotational speed NCO becomes equal to the target rotational speed NCOBJ, while maintaining the drive wheel rotational speed NDW at the time, i.e. such that there holds the following equation (4):

$$NM1 = (A+1)NCOBJ - A \cdot NDW \quad (4)$$

Note that the Direction of Rotation of the First rotor 13 determined by the relationship between the drive wheel rotational speed NDW and the target rotational speed NCOBJ sometimes becomes the direction of reverse rotation. In this case, electric power is generated in the first stator 12, and the generated electric power is supplied to the second stator 22.

Further, assuming that a braking torque generated along with the electric power generation in the first stator 12 is represented by the "first electric power generation torque TG1", the electric power generated in the first stator 12 is controlled such that there holds the following equation (5) obtained by replacing the first powering torque TM1 of the aforementioned equation (1) with the first electric power generation torque TG1.

$$TG1=-TCOBJ/(1+A) \quad (5)$$

Further, in the vehicle VE1, operation modes other than the vehicle stoppage-time compressor drive mode and the EV travel-time compressor drive mode, described heretofore, include an operation mode for starting the engine 3 during the EV travel mode, an operation mode for transmitting the motive power from the engine 3 to the drive wheels DW and DW while steplessly changing the speed thereof, an operation mode for starting the engine 3 during stoppage of the vehicle VE1, an operation mode for generating electric power using inertia energy of the vehicle VE1 and charging the battery 44 with the generated electric power, during decelerating traveling of the vehicle VE1, and so forth. Detailed description thereof is omitted.

The above-described first embodiment corresponds to the invention as claimed in claim 1. Correspondence between the various types of elements of the first embodiment and various types of elements of the invention as claimed in claim 1 (hereinafter referred to as the "first invention") is as follows: The vehicle VE1 and the drive wheels DW and DW of the first embodiment correspond to a moving apparatus and driven parts of the first invention, and the engine 3, the crankshaft 3a, the compressor 31, and the input shaft 32 of the first embodiment correspond to a prime mover, an output portion, an accessory, and an input portion of the first invention, respectively. Further, the ECU 2, the VCU 43, and the first and second PDUs 41 and 42 of the first embodiment correspond to a controller of the first invention. Furthermore, the planetary gear unit PG of the first embodiment corresponds to a power transmission mechanism of the first invention, and the sun gear S, the carrier C, and the ring gear R of the first embodiment correspond to a first element, a second element, and a third element of the first invention.

Further, the second rotating machine 21 of the first embodiment corresponds to restriction means of the first invention.

As described hereinabove, according to the first embodiment, when the compressor 31 is driven in a state where the drive wheels DW and DW are at rest during stoppage of the engine 3, the vehicle stoppage-time compressor drive mode controls the operation of the first rotating machine 11 to thereby input motive power to the input portion 32 to drive the compressor 31, and controls the operation of the second rotating machine 21 to thereby restrict the wheel rotational speed NDW such that it becomes equal to 0. This makes it possible to properly drive the compressor 31 while positively preventing the drive wheels DW and DW from being driven. Further, in the vehicle stoppage-time compressor drive mode, the clutch CL holds the crankshaft 3a in a state disconnected from the input shaft 32 and the carrier C, so that it is possible to prevent motive power from being transmitted from the first rotating machine 11 to the crankshaft 3a, thereby making it possible to improve driving efficiency in driving the compressor 31.

In the EV travel-time compressor drive mode, the operations of the first and second rotating machines 11 and 21 are controlled such that the compressor-transmitted torque TDCO becomes equal to the target torque TCOBJ, and the input shaft rotational speed NCO becomes equal to the target rotational speed NCOBJ, and hence it is possible to properly drive the compressor 31. Further, in this case, predetermined fixed values are used as the target torque TCOBJ and the target rotational speed NCOBJ, respectively. Therefore, compared with a case where the two TCOBJ and NCOBJ are calculated (set) at respective associated times, it is possible to reduce computation load on the ECU 2.

Figure 6:
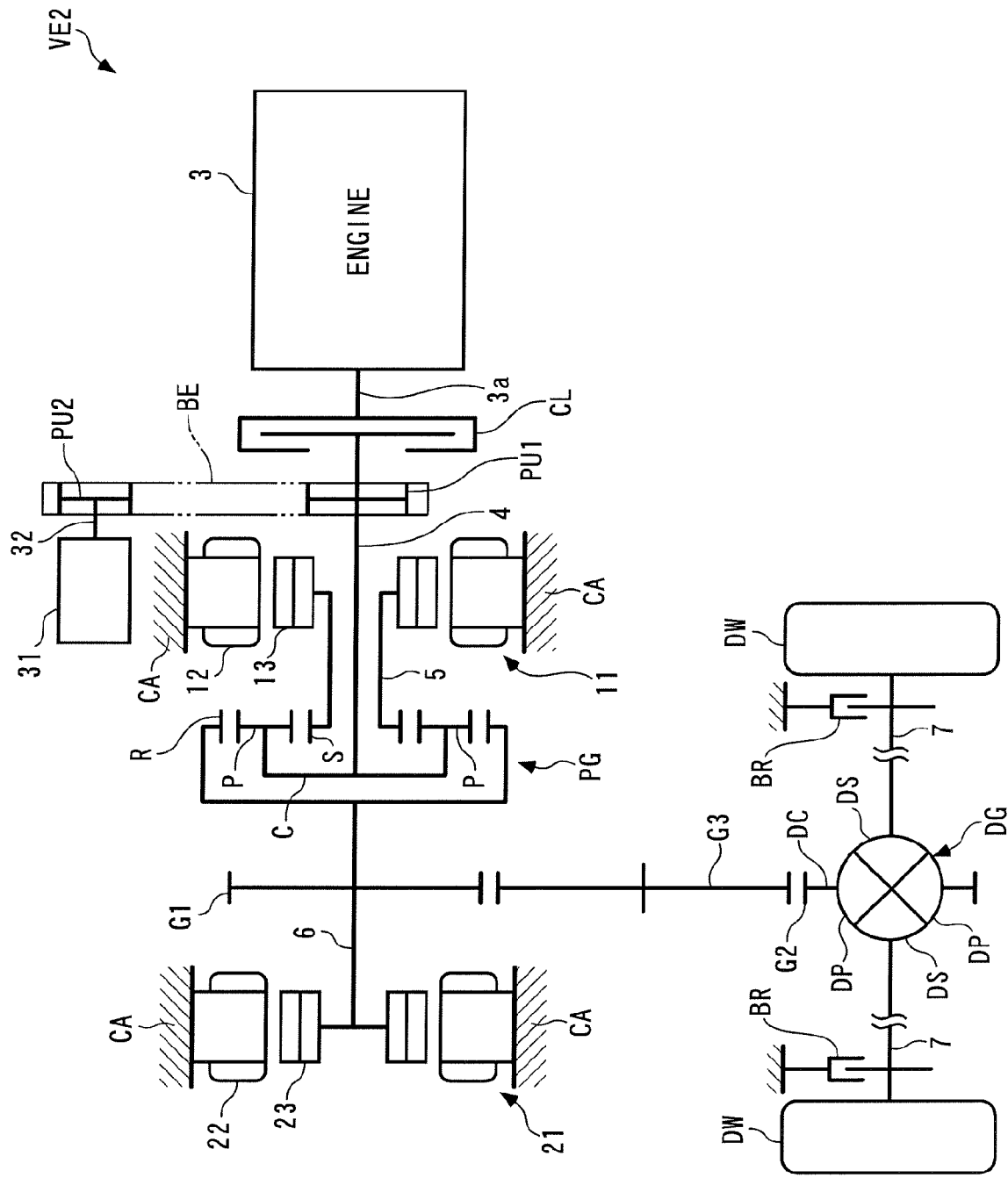
FIG. 6 A schematic view of a vehicle as a moving apparatus according to a second embodiment of the present invention.

Next, a vehicle VE2 as a moving apparatus according to a second embodiment of the present invention will be described with reference to FIG. 6. The vehicle VE2 is distinguished from the first embodiment mainly in that it further includes left and right brakes BR and BR for braking the drive wheels DW and DW. In FIG. 6 and other figures, referred to hereinafter, the same component elements as those of the first embodiment are denoted by the same reference numerals. The following description is mainly given of different points of the vehicle VE2 from the first embodiment.

Figure 7:
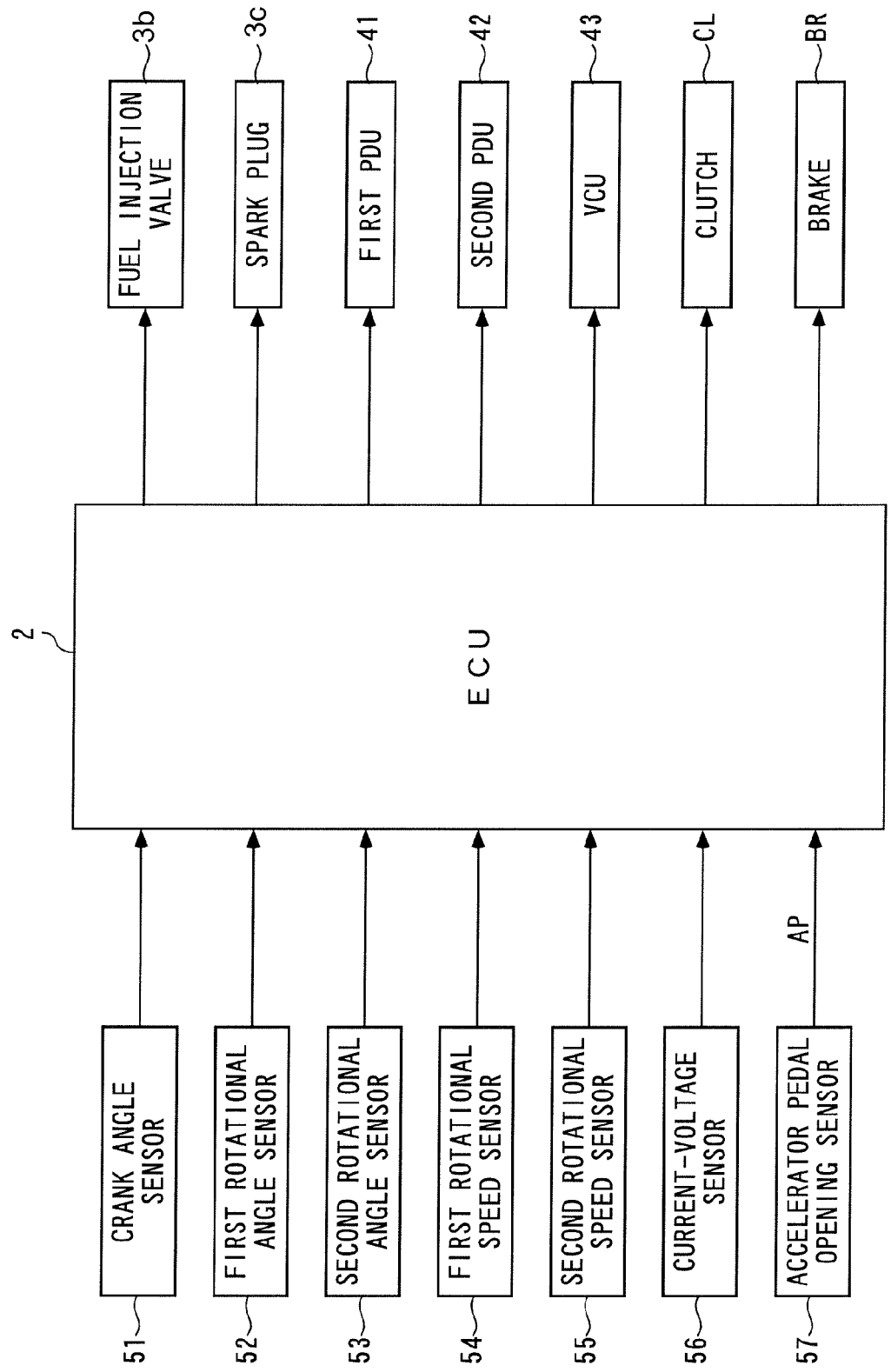
FIG. 7 A block diagram showing an ECU etc. mounted on the vehicle shown in FIG. 6.

Each of the brakes BR and BR is a hydraulic brake including a disk and a caliper. The brakes BR are mechanically connected to the drive wheels DW and DW, respectively, and are connected to the ECU 2 (see FIG. 7). Further, under the control of the ECU 2, the brakes BR brake the drive wheels DW and DW when they are applied, whereas when they are released, the brakes BR permit rotation of the drive wheels DW and DW. Further, the degree of application of the brakes BR is changed by the ECU 2, whereby the braking force of each brake BR is controlled.

The ECU 2 controls the operations of the engine 3, the clutch CL, the brakes BR, and the first and second rotating machines 11 and 21 based on the detection signals from the aforementioned sensors 51 to 57 of various types, according to control programs stored in the ROM. Similarly to the first embodiment, this causes the vehicle VE2 to be operated in various types of operation modes. Next, a description will be mainly given of different points of the vehicle stoppage-time compressor drive mode from the first embodiment.

[Vehicle Stoppage-Time Compressor Drive Mode]

In the second embodiment, the control of the second rotating machine 21, described in the first embodiment, is not performed. The brakes BR are each controlled to an applied state, whereby the drive wheels DW and DW are held at rest. Note that the control of the clutch CL and the first rotating machine 11 is carried out similarly to the first embodiment. FIG. 8 illustrates the relationship between the rotational speeds of various types of rotary elements of the vehicle VE2 and the relationship between torques thereof, during the vehicle stoppage-time compressor drive mode. In the figure, TBR represents a braking torque generated by the brakes BR.

As is apparent from FIG. 8, the first powering torque TM1 transmitted to the sun gear S is transmitted to the input shaft 32 via the carrier C, using the braking torque TBR of the brakes BR acting on the ring gear R as a reaction force, thereby causing the input shaft 32 to perform normal rotation together with the carrier C. Thus, motive power is transmitted from the first rotating machine 11 to the input shaft 32, whereby the compressor 31 is driven. Further, in this case, similarly to the first embodiment, although the first powering torque TM1 acts on the drive wheels DW and DW to cause the same to perform reverse rotation, using the load of the compressor 31 as a reaction force, the drive wheels DW and DW are held at rest as described above, which prevents the drive wheels DW and DW from performing reverse rotation.

Note that in the EV travel-time compressor drive mode, the control of various types of elements, such as the first rotating machine 11, is carried out similarly to the first embodiment, except that the brakes BR are controlled to a released state. Further, when the vehicle stoppage-time compressor drive mode is shifted to the EV travel mode to cause the vehicle to make a standing start, the braking torque TBR of the brakes BR is progressively reduced.

Further, the above-described second embodiment corresponds to the first invention (invention as claimed in claim 1). Correspondence between various types of elements of the second embodiment and various types of elements of the first invention is as follows: The vehicle VE2 and the brakes BR and BR of the second embodiment correspond to the moving apparatus and the restriction means of the first invention, respectively. Correspondence between the other elements is the same as in the first embodiment.

As described hereinabove, according to the second embodiment, when the compressor 31 is driven in the state where the drive wheels DW and DW are at rest during stoppage of the engine 3, the vehicle stoppage-time compressor drive mode controls the operation of the first rotating machine 11 to thereby input motive power to the input portion 32 to drive the compressor 31, and controls the operation of the brakes BR and BR to thereby restrict the drive wheel rotational speed NDW such that it becomes equal to 0. This makes it possible to properly drive the compressor 31 while positively preventing the drive wheels DW and DW from being driven. In addition to this, according to the present embodiment, it is possible to obtain the same advantageous effects as provided by the first embodiment, i.e. the advantageous effect of improving the driving efficiency in driving the compressor 31 using the clutch CL in the vehicle stoppage-time compressor drive mode.

Further, a hydraulic brake of which the braking force can be changed is used as each of the brakes BR and BR, and when the vehicle stoppage-time compressor drive mode is shifted to the EV travel mode to cause the vehicle to make a standing start, the braking torque TBR of the brakes BR is progressively reduced, and hence it is possible to progressively increase the drive wheel rotational speed NDW, thereby making it possible to cause the vehicle to make a smooth standing start.

Note that although in the first and second embodiments, the carrier C is directly connected to the crankshaft 3a, it may be mechanically connected to the crankshaft 3a via gears, a pulley, a chain, a transmission, or the like. Further, although in the first and second embodiments, the sun gear S is directly connected to the first rotor 13, it may be mechanically connected to the first rotor 13 via gears, a pulley, a chain, a transmission, or the like. Furthermore, although in the first and second embodiments, the ring gear R and the second rotor 23 are directly connected to each other, if they are mechanically connected to the drive wheels DW and DW, they are not necessarily required to be directly connected to each other. Furthermore, although in the first and second embodiments, the ring gear R and the second rotor 23 are connected to the drive wheels DW and DW via the differential gear DG and the like, they may be mechanically directly connected to the drive wheels DW and DW. Further, although in the first and second embodiments, the carrier C is connected to the input shaft 32 e.g. via the first and second pulleys PU1 and PU2, it may be mechanically directly connected to the input shaft 32.

Further, although in the first and second embodiments, the sun gear S is connected to the first rotor 13, and the ring gear R is connected to the drive wheels DW and DW, the relationship of the connections may be reversed, that is, the sun gear S may be mechanically connected to the drive wheels DW and DW, and the ring gear R may be mechanically connected to the first rotor 13. In this case, naturally, mechanical direct connection or mechanical connection using gears, a pulley, a chain, a transmission, or the like may be provided between the sun gear S and the drive wheels DW and DW, and between the ring gear R and the first rotor 13.

Figure 9:
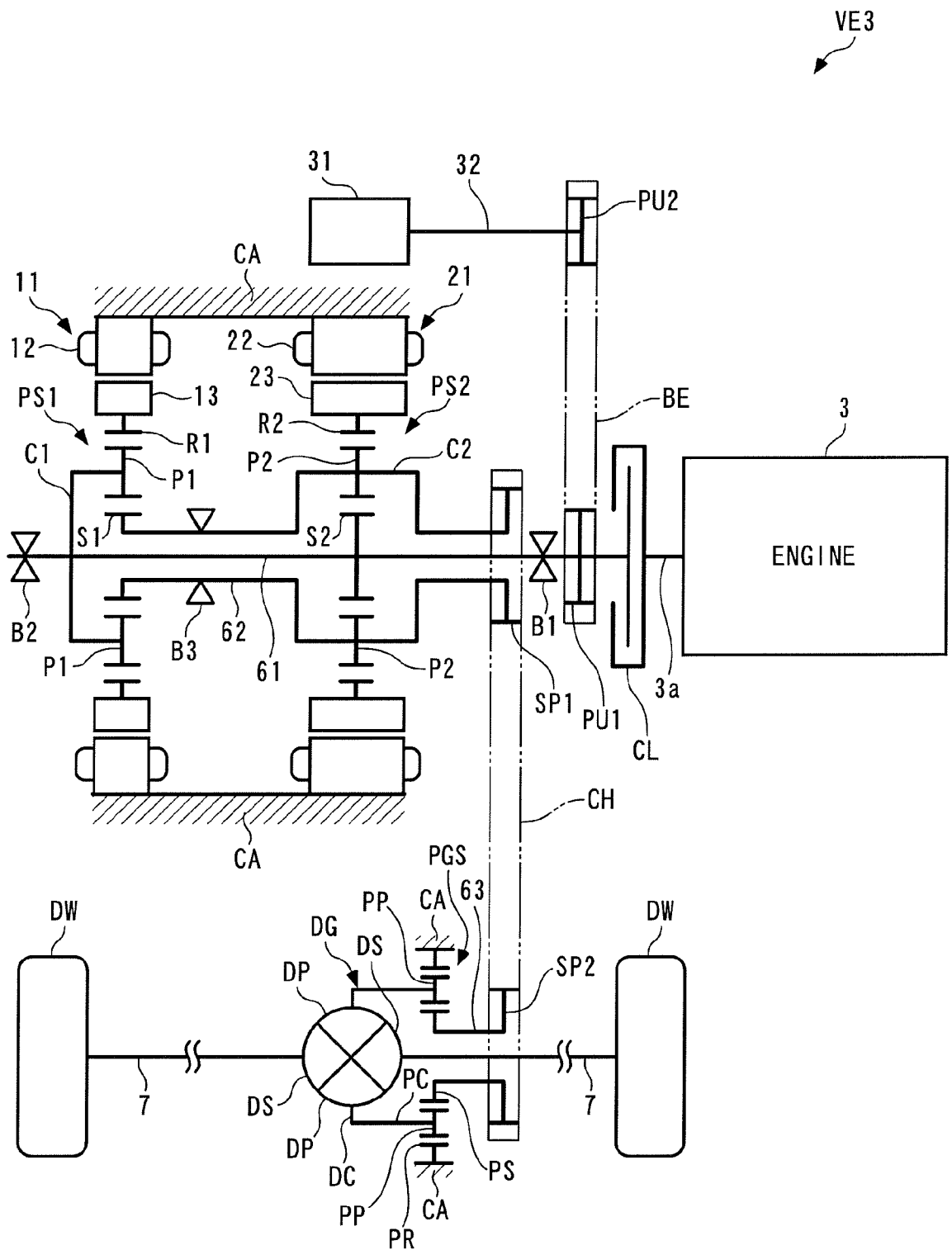
FIG. 9 A schematic view of a vehicle as a moving apparatus according to a third embodiment of the present invention.

Next, a vehicle VE3 as a moving apparatus according to a third embodiment of the present invention will be described with reference to FIG. 9. The vehicle VE3 is distinguished from the first embodiment mainly in that it includes a first planetary gear unit PS1 and a second planetary gear unit PS2 in place of the above-described planetary gear unit PG, and that the crankshaft 3a, the drive wheels DW and DW, and the first and second rotors 13 and 23 are mechanically connected to four rotary elements, which are formed by mechanically connecting the first and second planetary gear units PS1 and PS2 to each other, respectively. In FIG. 9 and other figures, referred to hereinafter, the same component elements as those of the first embodiment are denoted by the same reference numerals. The following description is mainly given of different points of the vehicle VE3 from the first embodiment.

Both the first and second planetary gear units PS1 and PS2 are of a general single pinion type similar to the planetary gear unit PG. The first planetary gear unit PS1 comprises a first sun gear S1, a first ring gear R1, a plurality of first planetary gears P1 in mesh with the gears S1 and R1, and a first carrier C1 rotatably supporting the first planetary gears P1. As is widely known, the first sun gear S1, the first carrier C1, and the first ring gear R1 are capable of transmitting motive power therebetween, and are configured such that during transmission of motive power, they rotate while maintaining a collinear relationship in rotational speed therebetween, and straight lines representing the respective rotational speeds thereof are sequentially aligned in a collinear chart representing the relationship between the rotational speeds. Further, the first sun gear S1, the first carrier C1, and the first ring gear R1 are arranged coaxially with the crankshaft 3a of the engine 3.

The second planetary gear unit PS2 comprises a second sun gear S2, a second ring gear R2, a plurality of second planetary gears P2 in mesh with the gears S2 and R2, and a second carrier C2 rotatably supporting the second planetary gears P2. As is widely known, the second sun gear S2, the second carrier C2, and the second ring gear R2 are capable of transmitting motive power therebetween, and are configured such that during transmission of motive power, they rotate while maintaining a collinear relationship in rotational speed therebetween, and straight lines representing the respective rotational speeds thereof are sequentially aligned in a collinear chart representing the relationship between the rotational speeds. Further, the second sun gear S2, the second carrier C2, and the second ring gear R2 are arranged coaxially with the crankshaft 3a of the engine 3.

Furthermore, the first carrier C1 and the second sun gear S2 are integrally formed on a first rotating shaft 61. The first rotating shaft 61 is rotatably supported by bearings B1 and B2 together with the first carrier C1 and the second sun gear S2, and is coaxially directly connected to the crankshaft 3a via the clutch CL and a flywheel (not shown). The bearing B1 is disposed toward the engine 3, and the bearing B2 is disposed on a side opposite from the engine 3. The first carrier C1 is disposed between the bearings B1 and B2 toward the bearing B2, and the second sun gear S2 is disposed between the bearings B1 and B2 toward the bearing B1. Further, the above-mentioned first pulley PU1 is integrally formed on the first rotating shaft 61. The first pulley PU1 is disposed between the clutch CL and the bearing B1.

Further, the first sun gear S1 and the second carrier C2 are integrally formed on a hollow cylindrical second rotating shaft 62. The second rotating shaft 62 is rotatably supported by a bearing B3 together with the first sun gear S1 and the second carrier C2, and is disposed coaxially with the crankshaft 3a. Further, the first rotating shaft 61 is rotatably fitted through the second rotating shaft 62. Furthermore, a hollow cylindrical first sprocket SP1 is coaxially mounted on the second carrier C2.

Further, the first rotor 13 of the first rotating machine 11 and the second rotor 23 of the second rotating machine 21 are coaxially mounted on the first ring gear R1 and the second ring gear R2, respectively, such that the first ring gear R1 and the first rotor 13, and the second ring gear R2 and the second rotor 23 are respectively rotatable together. Furthermore, the compressor 31 is disposed in the vicinity of a portion of the casing CA, provided with the second stator 22.

Further, the above-described differential case DC of the differential gear DG is provided with a planetary gear unit PGS. This planetary gear unit PGS is configured similarly to the first and second planetary gear units PS1 and PS2, and comprises a sun gear PS, a ring gear PR, a plurality of planetary gears PP in mesh with the gears PS and PR, and a carrier PC rotatably supporting the planetary gears PP. The carrier PC is integrally formed with the differential case DC, and the ring gear PR is fixed to the casing CA. Further, the sun gear PS is integrally formed on a hollow cylindrical third rotating shaft 63, and the right axle 7 is rotatably fitted through the above-mentioned third rotating shaft 63. Furthermore, a second sprocket SP2 is integrally formed on the third rotating shaft 63, and a chain CH extends around the second sprocket SP2 and the above-described first sprocket SP1. With the above arrangement, motive power transmitted to the second sprocket SP2 is transmitted to the differential gear DG in a state reduced in speed by the planetary gear unit PGS.

As described above, in the vehicle VE3, the first carrier C1 and the second sun gear S2 are mechanically directly connected to each other, and are mechanically connected to the input shaft 32 of the compressor 31 via the belt BE and the first and second pulleys PU1 and PU2. Further, the input shaft 32, the first carrier C1, and the second sun gear S2 are mechanically directly connected to the crankshaft 3a via the clutch CL. Furthermore, the first sun gear S1 and the second carrier C2 are mechanically directly connected to each other, and are mechanically connected to the drive wheels DW and DW via the chain CH, the planetary gear unit PGS, the differential gear DG, and the like. Further, the first and second ring gears R1 and R2 are mechanically directly connected to the first and second rotors 13 and 23, respectively.

The ECU 2 controls the respective operations of the engine 3, the clutch CL, and the first and second rotating machines 11 and 21 based on the detection signals from the aforementioned sensors 51 to 57 of various types, according to control programs stored in the ROM. This causes the vehicle VE3 to be operated in various types of operation modes.

Hereinafter, the above-mentioned operation modes will be described with reference to velocity collinear charts shown in FIG. 10 and so forth. First, a description is given of the FIG. 10 velocity collinear chart. As is apparent from the above-described relationship of connections between the various types of rotary elements of the vehicle VE3, the rotational speeds of the first carrier C1 and the second sun gear S2 are equal to each other, and are equal to the input shaft rotational speed NCO (rotational speed of the input shaft 32) provided that a change in speed by the belt BE and the first and second pulleys PU1 and PU2 is ignored. Further, the engagement and disengagement of the clutch CL cause the crankshaft 3a to be connected to and disconnected from the input shaft 32, the first sun gear S1, and the second carrier C2. Furthermore, the rotational speeds of the first sun gear S1 and the second carrier C2 are equal to each other, and are equal to the drive wheel rotational speed NDW (rotational speed of the drive wheels DW and DW) provided that a change in speed by the planetary gear unit PGS and the like is ignored.

Further, the rotational speed of the first ring gear R1 is equal to the first rotating machine rotational speed NM1 (rotational speed of the first rotor 13), and the rotational speed of the second ring gear R2 is equal to the second rotating machine rotational speed NM2 (rotational speed of the second rotor 23). Furthermore, the rotational speeds of the first sun gear S1, the first carrier C1, and the first ring gear R1 are in a predetermined collinear relationship defined by the number of the gear teeth of the first sun gear S1 and that of the gear teeth of the first ring gear R1, and the rotational speeds of the second sun gear S2, the second carrier C2, and the second ring gear R2 are in a predetermined collinear relationship defined by the number of the gear teeth of the second sun gear S2 and that of the gear teeth of the second ring gear R2.

Figure 10:
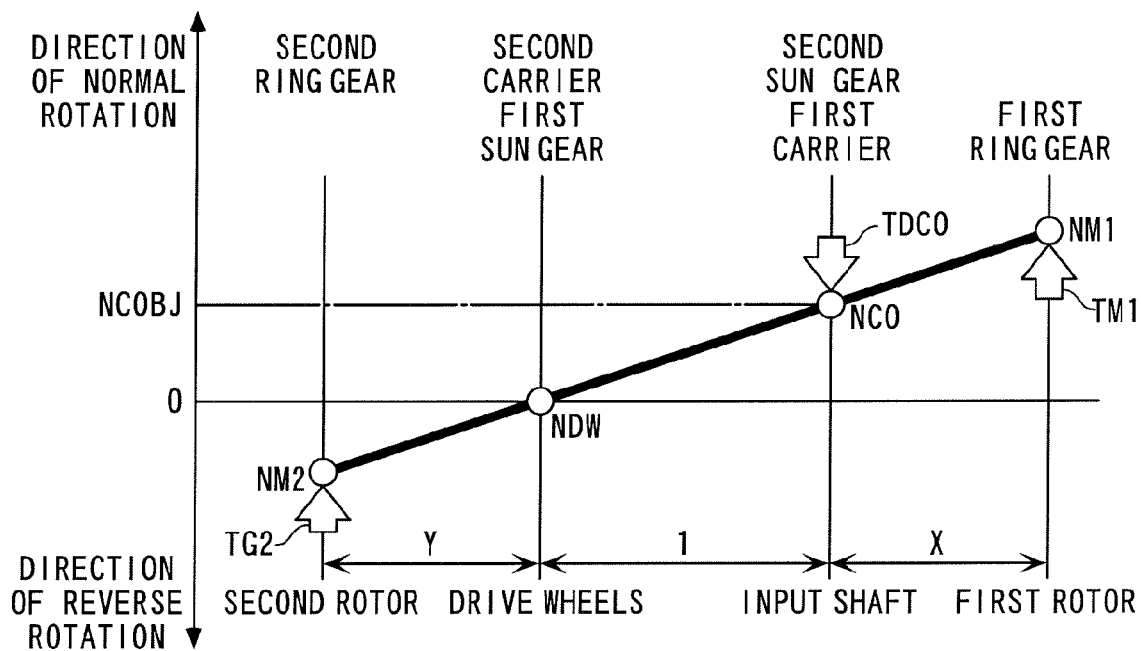
FIG. 10 A velocity collinear chart illustrating an example of the relationship between the rotational speeds of various types of rotary elements of the vehicle shown in FIG. 9 and the relationship between torques thereof, during the vehicle stoppage-time compressor drive mode.

From the above, during disengagement of the clutch CL, the relationship between the input shaft rotational speed NCO, the drive wheel rotational speed NDW, and the first and second rotating machine rotational speeds NM1 and NM2 is represented by a velocity collinear chart as shown in FIG. 10. Further, in the figure, X represents the ratio of the number of the gear teeth of the first sun gear S1 to the number of the gear teeth of the first ring gear R1, and Y represents the ratio of the number of the gear teeth of the second sun gear S2 to the number of the gear teeth of the second ring gear R2.

The operation modes of the vehicle VE3 include the vehicle stoppage-time compressor drive mode and the EV travel-time compressor drive mode, similarly to the first embodiment, and further include a compressor drive-time EV standing start mode and an EV travel-time ENG start mode. First, a description is given of the vehicle stoppage-time compressor drive mode.

[Vehicle Stoppage-Time Compressor Drive Mode]

In the vehicle stoppage-time compressor drive mode, the clutch CL is disengaged, thereby disconnecting the crankshaft 3a from the input shaft 32, the first carrier C1, and the second sun gear S2. In this state, electric power is supplied from the battery 44 to the first stator 12 of the first rotating machine 11 to cause the first rotor 13 to perform normal rotation. Further, electric power is generated in the second stator 22 by using motive power transmitted to the second rotor 23, as described hereinafter, and the generated electric power is further supplied to the first stator 12. FIG. 10 illustrates the relationship between the rotational speeds of the various types of rotary elements and the relationship between torques thereof, during the vehicle stoppage-time compressor drive mode. In the figure, TG2 represents a braking torque of the second rotating machine 21 generated along with the electric power generation in the second stator 22 (hereinafter referred to as the "second electric power generation torque").

As is apparent from FIG. 10, the first powering torque TM1 is transmitted to the first ring gear R1, whereby the first ring gear R1 performs normal rotation together with the first rotor 13. Further, the first powering torque TM1 transmitted to the first ring gear R1 is transmitted to the second rotor 23 via the second ring gear R2, using the load of the drive wheels DW and DW acting on the second carrier C2, as a reaction force, thereby causing the second rotor 23 to perform reverse rotation together with the second ring gear R2. Electric power is generated in the second stator 22, as described above, using motive power thus transmitted to the second rotor 23, and the second electric power generation torque TG2 generated thereby acts on the second rotating machine rotational speed NM2 of the second rotor 23 performing reverse rotation to lower the second rotating machine rotational speed NM2. As a consequence, the first powering torque TM1 is transmitted to the input shaft 32, using the second electric power generation torque TG2 as a reaction force, to thereby cause the input shaft 32 to perform normal rotation.

Furthermore, in the vehicle stoppage-time compressor drive mode, the electric power supplied to the first stator 12 and the electric power generated in the second stator 22 are controlled such that the compressor-transmitted torque TDCO becomes equal to the aforementioned target torque TCOBJ. Specifically, the electric power supplied to the first stator 12 is controlled such that there holds the following equation (6) between the first powering torque TM1 and the target torque TCOBJ. Further, the electric power generated in the second stator 22 is controlled such that there holds the following equation (7) between the second electric power generation torque TG2 and the target torque TCOBJ.

$$TM1 = -(Y+1)TCOBJ/(Y+1+X) \tag{6}$$

$$TG2 = -X \cdot TCOBJ/(X+1+Y) \tag{7}$$

Further, the first and second rotating machine rotational speeds NM1 and NM2 are controlled such that the input shaft rotational speed NCO becomes equal to the target rotational speed NCOBJ, and the drive wheel rotational speed NDW becomes equal to 0, i.e. such that there hold the following equations (8) and (9):

$$NM1 = (1+X)NCOBJ \tag{8}$$

$$NM2 = -Y \cdot NCOBJ \tag{9}$$

Next, the other operation modes will be described in the order of the compressor drive-time EV standing start mode, the EV travel-time compressor drive mode, and the EV travel-time ENG start mode.

[Compressor Drive-Time Ev Standing Start Mode]

This compressor drive-time EV standing start mode is an operation mode for causing the vehicle VE3 to make a standing start while driving the compressor 31, using only the first and second rotating machines 11 and 21 as motive power sources, in the state where the engine 3 is stopped. The compressor drive-time EV standing start mode is selected in succession to the vehicle stoppage-time compressor drive mode when the charge of the battery 44 is larger than the aforementioned first predetermined value.

Figure 11:
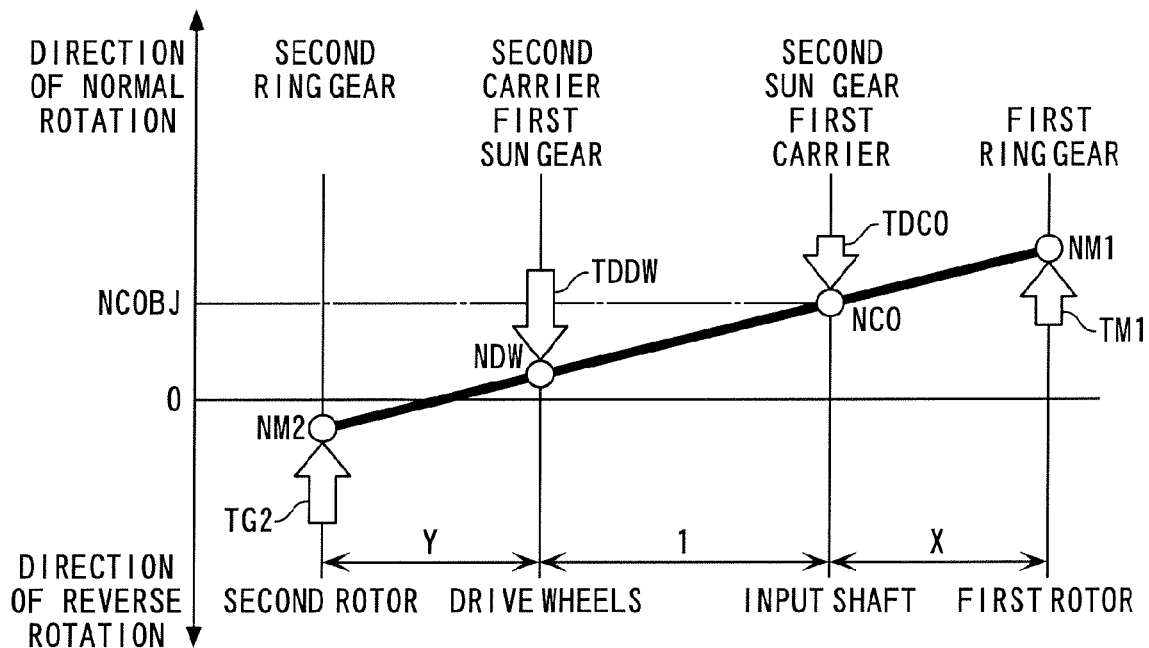
FIG. 11 A velocity collinear chart illustrating an example of the relationship between the rotational speeds of the various types of rotary elements of the vehicle shown in FIG. 9 and the relationship between the torques thereof, at the start of a compressor drive-time EV standing start mode.

In the compressor drive-time EV standing start mode, similarly to the case of the vehicle stoppage-time compressor drive mode, in the state where the clutch CL is disengaged, thereby disconnecting the crankshaft 3a from the input shaft 32, the first carrier C1, and the second sun gear S2, electric power is supplied from the battery 44 to the first stator 12 to cause the first rotor 13 to perform normal rotation, and the electric power supplied to the first stator 12 is increased. Further, electric power is generated in the second stator 22 by using motive power transmitted to the second rotor 23 to further supply the generated electric power to the first stator 12, and the second rotating machine rotational speed NM2 is controlled such that it becomes equal to 0. FIG. 11 illustrates the relationship between the rotational speeds of the various types of rotary elements and the relationship between torques thereof, in this case.

By controlling the operations of the first and second rotating machines 11 and 21 as described above, motive power is transmitted not only to the input shaft 32 but also to the drive wheels DW and DW. As shown in FIG. 11, this causes the drive wheels DW and DW to perform normal rotation to increase the drive wheel rotational speed NDW, whereby the vehicle VE3 makes a standing start.

In the compressor drive-time EV standing start mode, the electric power supplied to the first stator 12 and the electric power generated in the second stator 22 are controlled such that the compressor-transmitted torque TDCO becomes equal to the target torque TCOBJ, and the drive wheel-transmitted torque TDDW becomes equal to the above-mentioned demanded torque TREQ. Specifically, the electric power supplied to the first stator 12 is controlled such that there holds the following equation (10) between the first powering torque TM1, the target torque TCOBJ, and the demanded torque TREQ. Further, the electric power generated in the second stator 22 is controlled such that there holds the following equation (11) between the second electric power generation torque TG2, the target torque TCOBJ, and the demanded torque TREQ.

$$TM1 = -\{(Y+1)TCOBJ + Y \cdot TREQ\}/(Y+1+X) \tag{10}$$

$$TG2 = -\{X \cdot TCOBJ + (X+1)TREQ\}/(X+1+Y) \tag{11}$$

Furthermore, the first and second rotating machine rotational speeds NM1 and NM2 are controlled such that the input shaft rotational speed NCO becomes equal to the target rotational speed NCOBJ, while maintaining the drive wheel rotational speed NDW at the time. Specifically, the first and second rotating machine rotational speeds NM1 and NM2 are controlled such that between the drive wheel rotational speed NDW and the target rotational speed NCOBJ, there hold the following equations (12) and (13):

$$NM1 = (X+1)NCOBJ - X \cdot NDW \tag{12}$$

$$NM2 = (Y+1)NDW - Y \cdot NCOBJ \tag{13}$$

Figure 12:
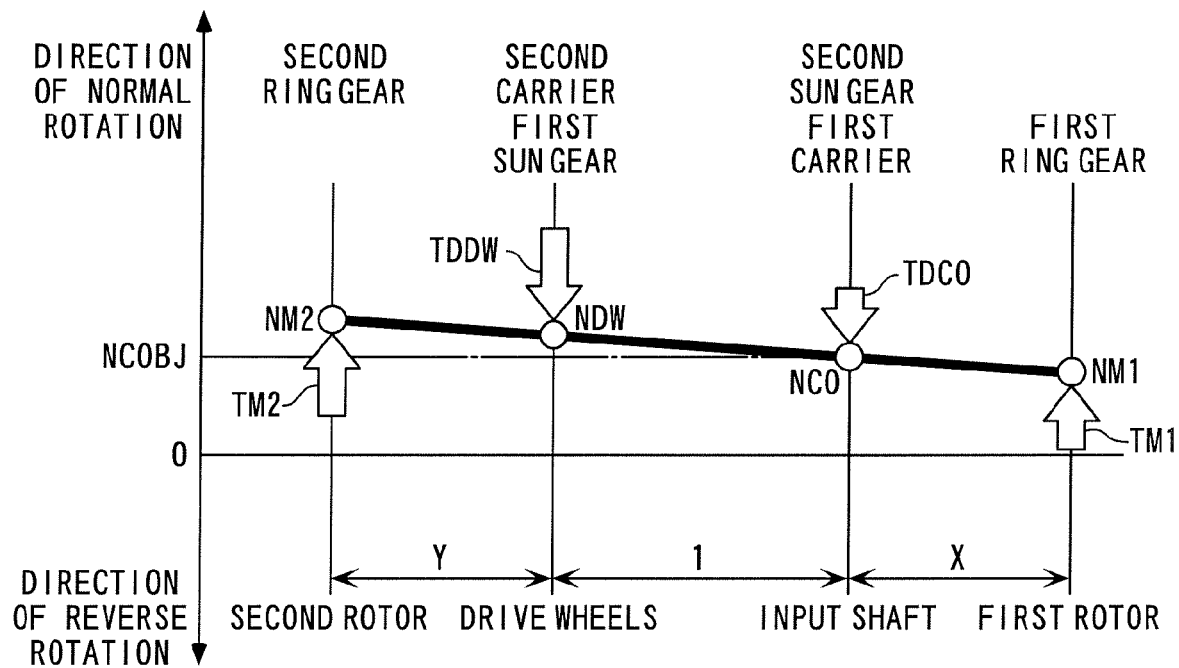
FIG. 12 A velocity collinear chart illustrating an example of the relationship between the rotational speeds of the various types of rotary elements of the vehicle shown in FIG. 9 and the relationship between the torques thereof, after the start of the compressor drive-time EV standing start mode.

Further, in the compressor drive-time EV standing start mode, after the second rotating machine rotational speed NM2 has become equal to 0, electric power is supplied from the battery 44 not only to the first stator 12 but also to the second stator 22, to cause the second rotor 23 to perform normal rotation. FIG. 12 illustrates the relationship between the rotational speeds of the various types of rotary elements and the relationship between the torques thereof, in this case.

In the above case, as is apparent from FIG. 12, the first and second powering torques TM1 and TM2 are combined in the first and second planetary gear units PS1 and PS2, and the combined torque is transmitted to the input shaft 32 and the drive wheels DW and DW, whereby the input shaft 32 and the drive wheels DW and DW continue to perform normal rotation. Further, as is apparent from a comparison between FIG. 11 and FIG. 12, the electric power supplied to the first stator 12 is controlled such that the aforementioned equation (10) holds, and the electric power supplied to the second stator 22 is controlled such that there holds the following equation (14) obtained by replacing the second electric power generation torque TG2 of the aforementioned equation (11) with the second powering torque TM2. Furthermore, the first and second rotating machine rotational speeds NM1 and NM2 are controlled such that there hold the aforementioned equations (12) and (13), respectively.

$$TM2 = -\{X \cdot TCOBJ + (X+1)TREQ\}/(X+1+Y) \tag{14}$$

[EV Travel-Time Compressor Drive Mode]

This EV travel-time compressor drive mode is selected subsequent to the compressor drive-time EV standing start mode when the charge of the battery 44 is larger than the first predetermined value. In the EV travel-time compressor drive mode, similarly to the case of the compressor drive-time EV standing start mode shown in FIG. 12, in the state where the clutch CL is disengaged, thereby disconnecting the crankshaft 3a from the input shaft 32, the first carrier C1, and the second sun gear S2, electric power is supplied from the battery 44 to the first and second stators 12 and 22 to cause the first and second rotors 13 and 23 to perform normal rotation. This causes combined torque formed by combining the first and second powering torques TM1 and TM2 to be transmitted to the input shaft 32 and the drive wheels DW and DW, whereby the input shaft 32 and the drive wheels DW and DW continue to perform normal rotation.

Further, in the EV travel-time compressor drive mode, the electric power supplied to the first and second stators 12 and 22 is controlled such that the aforementioned equations (10) and (14) hold, respectively, and the first and second rotating machine rotational speeds NM1 and NM2 are controlled such that the aforementioned equations (12) and (13) hold, respectively.

[EV Travel-Time ENG Start Mode]

This EV travel-time ENG start mode is an operation mode for starting the engine 3 at rest during traveling of the vehicle VE3 in the above-described EV travel-time compressor drive mode. Further, the EV travel-time ENG start mode is selected subsequent to the EV travel-time compressor drive mode when the charge of the battery 44 becomes equal to the first predetermined value. In the EV travel-time ENG start mode, immediately after a shift from the EV travel-time compressor drive mode, in the state where the clutch CL is disengaged, thereby disconnecting the crankshaft 3a from the input shaft 32, the first carrier C1, and the second sun gear S2, electric power is supplied from the battery 44 to the first and second stators 12 and 22 to cause the first and second rotors 13 and 23 to perform normal rotation. Further, by controlling the electric power supplied to the first and second stators 12 and 22, the second rotating machine rotational speed NM2 is increased and the first rotating machine rotational speed NM1 is controlled such that it becomes equal to 0, so as to maintain the drive wheel rotational speed NDW at the time.

Figure 13:
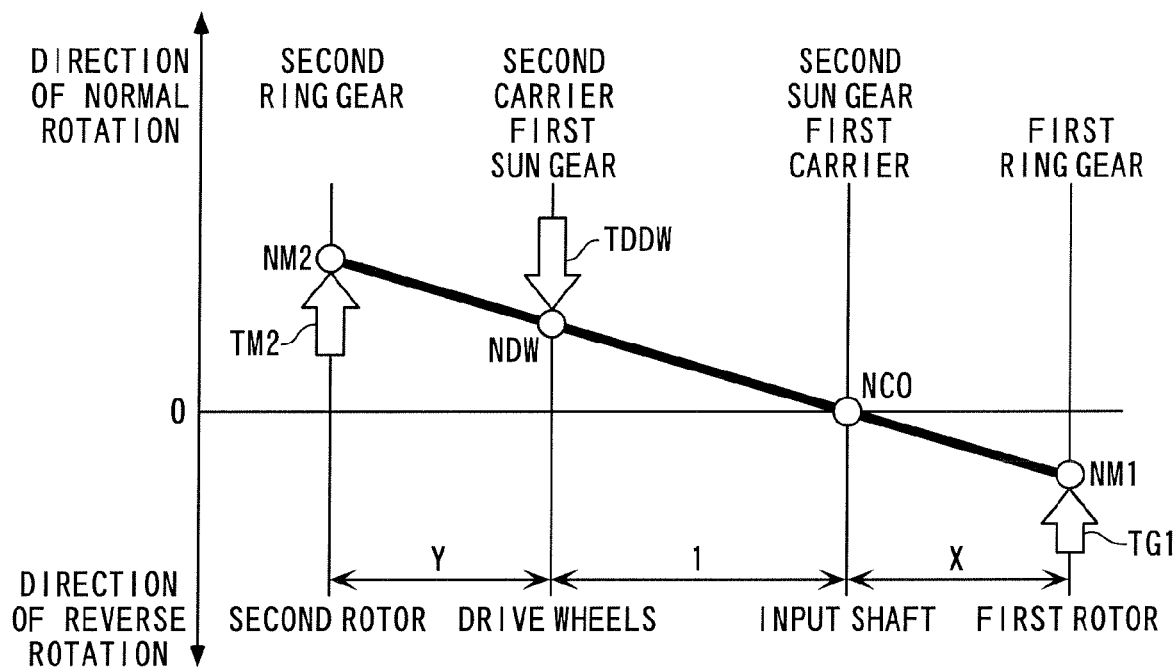
FIG. 13 A velocity collinear chart illustrating an example of the relationship between the rotational speeds of the various types of rotary elements of the vehicle shown in FIG. 9 and the relationship between the torques thereof, at the start of an EV travel-time ENG start mode.

When the first rotating machine rotational speed NM1 has become equal to 0, the supply of electric power from the battery 44 to the first stator 12 is stopped, and electric power is generated in the first stator 12 using motive power transmitted from the second rotor 23 to the first rotor 13 via the second and first planetary gear units PS2 and PS1. The generated electric power is further supplied to the second stator 22. In this case, the electric power generated in the first stator 12 and the electric power supplied to the second stator 22 are controlled, whereby while maintaining the drive wheel rotational speed NDW at the time, the second rotating machine rotational speed NM2 is increased and the first rotating machine rotational speed NM1 is increased in the direction of reverse rotation such that the rotational speeds of the first carrier C1 and the second sun gear S2 become equal to 0. FIG. 13 illustrates the relationship between the rotational speeds of the various types of rotary elements and the relationship between the torques thereof, in this case.

As is apparent from FIG. 13, the first electric power generation torque TG1 acts such that the first rotating machine rotational speed NM1 the first rotor 13 performing reverse rotation is lowered. Further, the second powering torque TM2 is transmitted to the drive wheels DW and DW, using the first electric power generation torque TG1 as a reaction force. In this case, by controlling the electric power generated in the first stator 12 and the electric power supplied to the second stator 22, the first electric power generation torque TG1 and the second powering torque TM2 are controlled such that the drive wheel-transmitted torque TDDW becomes equal to the demanded torque TREQ. Further, the first and second rotating machine rotational speeds NM1 and NM2 are controlled such that the rotational speeds of the first carrier C1 and the second sun gear S2 become equal to 0, while maintaining the drive wheel rotational speed NDW at the time.

Specifically, the electric power generated in the first stator 12 is controlled such that there holds the following equation (15) between the first electric power generation torque TG1 and the demanded torque TREQ. Further, the electric power supplied to the second stator 22 is controlled such that there holds the following equation (16) between the second powering torque TM2 and the demanded torque TREQ.

$$TG1 = -Y \cdot TREQ/(Y+1+X) \tag{15}$$

$$TM2 = -(X+1)TREQ/(X+1+Y) \tag{16}$$

Further, the first and second rotating machine rotational speeds NM1 and NM2 are controlled such that there hold the following equations (17) and (18):

$$NM1 = -X \cdot NDW \tag{17}$$

$$NM2 = (Y+1)NDW \tag{18}$$

Figure 14:
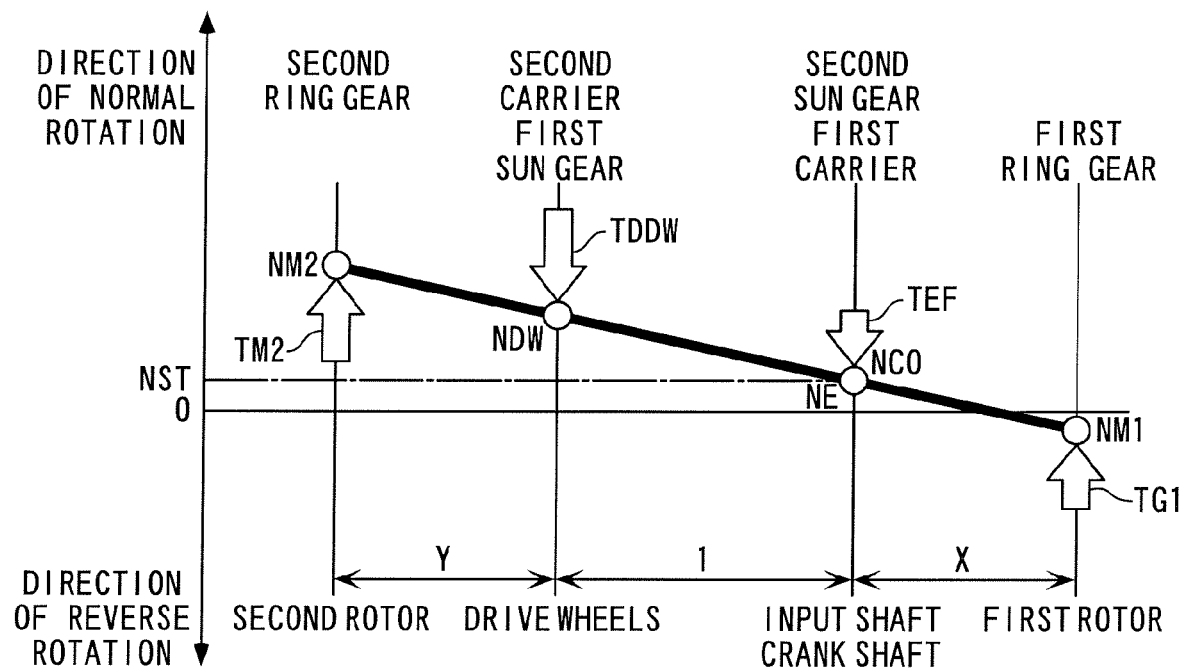
FIG. 14 A velocity collinear chart illustrating an example of the relationship between the rotational speeds of the various types of rotary elements of the vehicle shown in FIG. 9 and the relationship between the torques thereof, after the start of the EV travel-time ENG start mode.

When the rotational speeds of the first carrier C1 and the second sun gear S2 have become equal to 0, the clutch CL, which has been disengaged, is engaged to thereby connect the crankshaft 3a to the first carrier C1 and the second sun gear S2. Further, by controlling the electric power generated in the first stator 12 and the electric power supplied to the second stator 22, the first rotating machine rotational speed NM1 of the first rotor 13 performing reverse rotation is controlled such that it becomes equal to 0 and the second rotating machine rotational speed NM2 of the second rotor 23 performing normal rotation is reduced, while maintaining the drive wheel rotational speed NDW currently detected at the time. FIG. 14 illustrates the relationship between the rotational speeds of the various types of rotary elements and the relationship between the torques thereof, in this case. In the figure, TEF represents the friction of the engine 3 (hereinafter referred to as the "engine friction").

Through the above-described control of the clutch CL and the first and second rotating machines 11 and 21, torques are transmitted not only to the drive wheels DW and DW but also to the crankshaft 3a to cause them to perform normal rotation. As a consequence, the drive wheels DW and DW continue to perform normal rotation, and the crankshaft 3a performs normal rotation to increase the engine speed NE. In this state, by controlling the ignition operations of the fuel injection valves 3b and the spark plugs 3c of the engine 3, the engine 3 at rest is started.

In this case, by controlling the electric power generated in the first stator 12 and the electric power supplied to the second stator 22, the first electric power generation torque TG1 and the second powering torque TM2 are controlled such that the drive wheel-transmitted torque TDDW becomes equal to the demanded torque TREQ. Further, the first and second rotating machine rotational speeds NM1 and NM2 are controlled such that the engine speed NE becomes equal to a predetermined value NST suitable for starting the engine 3, while maintaining the drive wheel rotational speed NDW at the time.

Specifically, the electric power generated in the first stator 12 is controlled such that there holds the following equation (19) between the first electric power generation torque TG1, the demanded torque TREQ, and the engine friction TEF. Further, the electric power supplied to the second stator 22 is controlled such that there holds the following equation (20) between the second powering torque TM2, the demanded torque TREQ, and the engine friction TEF. In this case, the engine friction TEF is calculated by searching a predetermined map (not shown) according to the engine speed NE.

This map is formed by determining the engine friction TEF in advance by experiment, and mapping the same.

$$TG1 = -\{Y \cdot TREQ + (Y+1)TEF\}/(Y+1+X) \quad (19)$$

$$TM2 = -\{(X+1)TREQ + X \cdot TEF\}/(X+1+Y) \quad (20)$$

Further, the first and second rotating machine rotational speeds NM1 and NM2 are controlled such that there hold the following equations (21) and (22):

$$NM1 = (X+1)NST - X \cdot NDW \quad (21)$$

$$NM2 = (Y+1)NDW - Y \cdot NST \quad (22)$$

Note that in the case where the engine speed NE is controlled to the predetermined value NST as described above, when the drive wheel rotational speed NDW is relatively low, the direction of rotation of the first rotor 13 determined by the relationship between the two NST and NDW sometimes becomes the direction of normal rotation. In this case, electric power is supplied from the battery 44 to the first stator 12, and the first rotor 13 is caused to perform normal rotation. Further, electric power supplied to the first rotating machine 11 is controlled such that there holds an equation obtained by replacing the first powering torque TM1 of the aforementioned equation (19) with the first powering torque TM1. Furthermore, not only the engine friction TEF but also the load of the compressor 31 acts on the first carrier C1 and the second sun gear S2, and hence in the EV travel-time ENG start mode, the operations of the first and second rotating machines 11 and 21 may be controlled according to the load of the compressor 31.

Further, after the start of the engine 3 in the EV travel-time ENG start mode, electric power is generated in the first stator 12 by using motive power of the engine 3 transmitted to the first rotor 13, and the generated electric power is charged into the battery 44. The EV travel-time compressor drive mode is not selected before the charge of the battery 44 exceeds a second predetermined value larger than the first predetermined value.

The above-described third embodiment corresponds to the invention as claimed in claims 1 and 2 to 4. Correspondence between various types of elements of the third embodiment and various types of elements of the invention as claimed in claims 1 and 2 to 4 (hereinafter referred to, generically, as the "second invention") is as follows: The vehicle VE3 and the drive wheels DW and DW of the third embodiment correspond to a moving apparatus and driven parts of the second invention, respectively. Further, the engine 3, the crankshaft 3a, the compressor 31, and the input shaft 32 of the third embodiment corresponds to a prime mover, an output portion, an accessory, and an input portion of the second invention. Further, the ECU 2, the VCU 43, and the first and second PDUs 41 and 42 of the third embodiment correspond to a controller of the second invention. Furthermore, the second rotating machine 21 of the third embodiment corresponds to the restriction means of the invention as claimed in claim 1.

Further, the first and second planetary gear units PS1 and PS2 of the third embodiment correspond to a power transmission mechanism of the second invention. Furthermore, the first ring gear R1 of the third embodiment correspond to a first element of the second invention; the first carrier C1 and the second sun gear S2 of the third embodiment correspond to a second element of the second invention; and the first sun gear S1 and the second carrier C2 of the third embodiment correspond to a third element of the second invention. The second ring gear R2 of the third embodiment corresponds to a fourth element of the invention as claimed in claims 2 to 4.

As described heretofore, according to the third embodiment, when the compressor 31 is driven in the state where the drive wheels DW and DW are at rest during stoppage of the engine 3, the operations of the first and second rotating machines 11 and 21 are controlled in the vehicle stoppage-time compressor drive mode, whereby motive power is input to the input portion 32 to drive the compressor 31, and the drive wheel rotational speed NDW is restricted such that it becomes equal to 0. Therefore, it is possible to properly drive the compressor 31 while positively preventing the drive wheels DW and DW from being driven. Further, in the vehicle stoppage-time compressor drive mode, both the first and second rotating machine rotational speeds NM1 and NM2 become higher than 0, so that it is possible to prevent the overheating of the first PDU 41, the first rotating machine 11, the second PDU 42, and the second rotating machine 21, and secure sufficiently large torques of the first and second rotating machines 11 and 21.

Furthermore, in the vehicle stoppage-time compressor drive mode, the clutch CL holds the crankshaft 3a in a state disconnected from the input shaft 32, the first carrier C1, and the second sun gear S2, whereby it is possible to prevent motive power from being transmitted from the first rotating machine 11 to the crankshaft 3a, and make it possible to improve driving efficiency in driving the compressor 31. Further, similarly to the first embodiment, in the EV travel-time compressor drive mode, the operations of the first and second rotating machines 11 and 21 are controlled such that the compressor-transmitted torque TDCO becomes equal to the target torque TCOBJ, and the input shaft rotational speed NCO becomes equal to the target rotational speed NCOBJ, and hence it is possible to properly drive the compressor 31 and reduce computation load on the ECU 2.

Furthermore, in the compressor drive-time EV standing start mode and the EV travel-time compressor drive mode, the clutch CL holds the crankshaft 3a in the state disconnected from the input shaft 32, the first carrier C1, and the second sun gear S2, so that it is possible to prevent motive power from being wastefully transmitted to the crankshaft 3a, and therefore it is possible to improve driving efficiency in driving the drive wheels DW and DW. Further, in the subsequent EV travel-time ENG start mode, the operations of the first and second rotating machines 11 and 21 are controlled to thereby control the rotational speeds of the first carrier C1 and the second sun gear S2 such that they become equal to 0. When the rotational speeds of the two C1 and S2 have become equal to 0, the clutch CL connects the crankshaft 3a to the input shaft 32, the first carrier C1, and the second sun gear S2, and the engine 3 is started. Therefore, it is possible to properly start the engine 3 without causing a shock due to engagement of the clutch CL. This makes it possible to reduce energy required to drive the dog clutch used as the clutch CL.

Note that although in the third embodiment, the first carrier C1 and the second sun gear S2 are directly connected to each other, if they are mechanically connected to the crankshaft 3a and the input shaft 32, they are not necessarily required to be directly connected to each other, and although the first sun gear S1 and the second carrier C2 are directly connected to each other, if they are mechanically connected to the drive wheels DW and DW, they are not necessarily required to be directly connected to each other. Further, although in the third embodiment, the first carrier C1 and the second sun gear S2 are directly connected to the crankshaft 3a, they may be mechanically connected to the crankshaft 3a via gears, a pulley, a chain, a transmission, or the like. Furthermore, although in the third embodiment, the first carrier C1 and the second sun gear S2 are connected to the input shaft 32 via the belt BE, and the first and second pulleys PU1 and PU2, they may be mechanically directly connected to the input shaft 32.

Further, although in the third embodiment, the first sun gear S1 and the second carrier C2 are connected to the drive wheels DW and DW via the differential gear DG and the like, they may be mechanically directly connected to the drive wheels DW and DW. Furthermore, although in the third embodiment, the first and second ring gears R1 and R2 are directly connected to the first and second rotors 13 and 23, respectively, they may be mechanically connected to the first and second rotors 13 and 23 via gears, a pulley, a chain, a transmission, or the like.

Further, although in the third embodiment, the first ring gear R1 is connected to the first rotor 13, and the first sun gear S1 is connected to the drive wheels DW and DW, the relationship of these connections may be reversed, that is, the first ring gear R1 may be mechanically connected to the drive wheels DW and DW, and the first sun gear S1 may be mechanically connected to the first rotor 13. Similarly, although the second ring gear R2 is connected to the second rotor 23, and the second sun gear S2 is connected to the crankshaft 3a and the input shaft 32, the relationship of these connections may be revered, that is, the second ring gear R2 may be mechanically connected to the crankshaft 3a and the input shaft 32, and the second sun gear S2 may be mechanically connected to the second rotor 23. In these cases, naturally, mechanical direct connection or mechanical connection using gears, a pulley, a chain, a transmission, or the like may be provided between the first ring gear R1 and the drive wheels DW and DW, between the first sun gear S1 and the first rotor 13, between the second ring gear R2, and the crankshaft 3a and the input shaft 32, and between the second sun gear S2 and the second rotor 23.

Furthermore, although in the third embodiment, a combination of the first and second planetary gear units PS1 and PS2 is used as the power transmission mechanism of the invention as claimed in claim 2, another suitable power transmission mechanism, such as a so-called Ravigneaux type planetary gear unit, which has a carrier and a ring gear in shared use in a planetary gear unit of a single pinion type or a double pinion type, may be used insofar as it includes the first to fourth elements which are capable of transmitting motive power while holding the collinear relationship therebetween in respect of the rotational speed.

Further, although in the third embodiment, the first pulley PU1 is provided on the first rotating shaft 61 between the clutch CL and the bearing B1, and the compressor 31 is disposed in the vicinity of a portion of the casing CA, where the second stator 22 is provided, the two PU1 and 31 may be provided e.g. in the following manner: The first pulley PU1 may be provided on the first rotating shaft 61 in the vicinity of the bearing B2, and the compressor 31 may be disposed in the vicinity of a portion of the casing CA, where the first stator 12 is provided.

Figure 15:
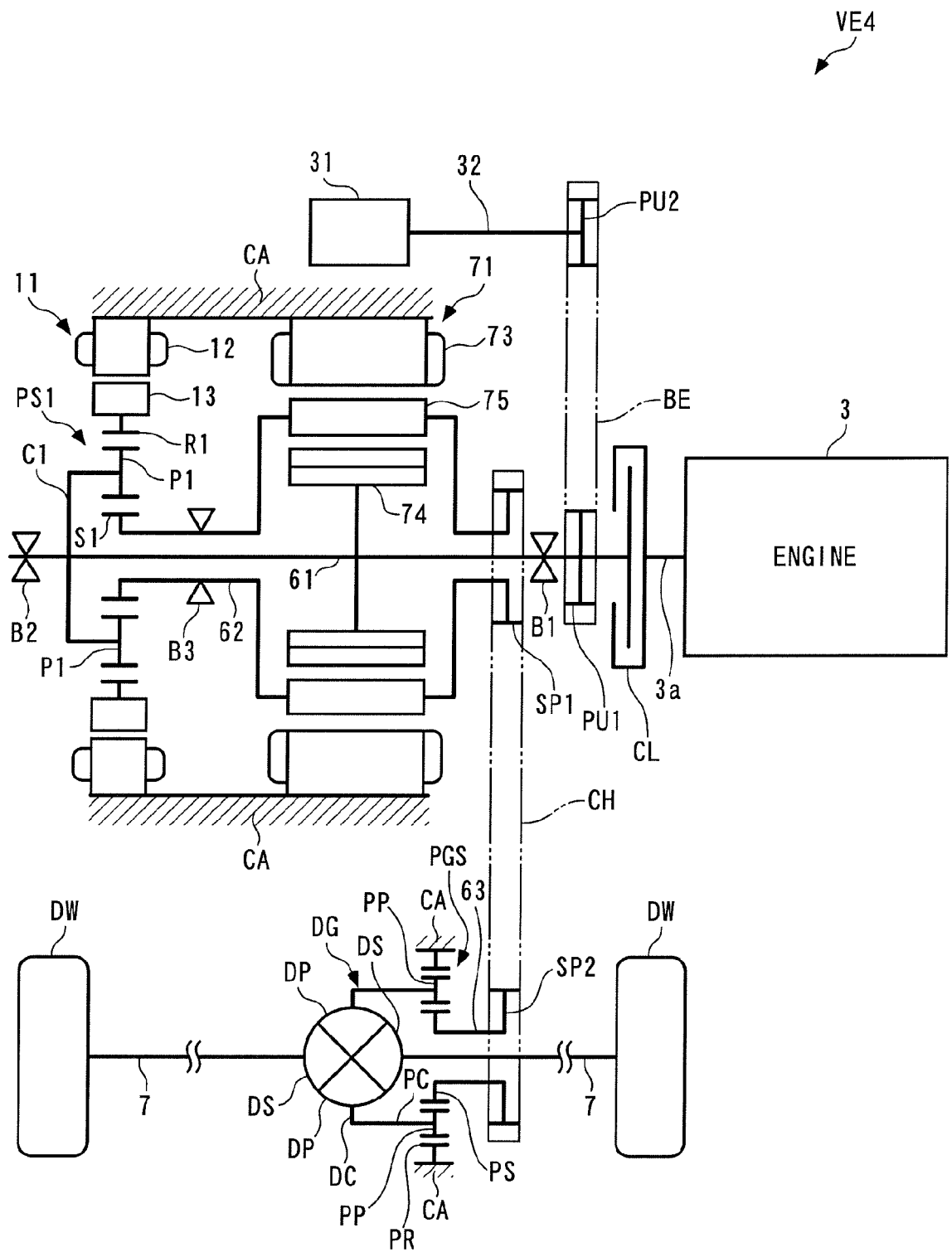
FIG. 15 A schematic view of a vehicle as a moving apparatus according to a fourth embodiment of the present invention.

Next, a vehicle VE4 as a moving apparatus according to a fourth embodiment of the present invention will be described with reference to FIG. 15. The vehicle VE4 is distinguished from the third embodiment mainly in that it includes a second rotating machine 71 in place of the second rotating machine 21 and the second planetary gear unit PS2. In FIG. 15 and other figures, referred to hereinafter, the same component elements as those of the third embodiment are denoted by the same reference numerals. The following description is mainly given of different points of the vehicle VE4 from the third embodiment.

Figure 18:
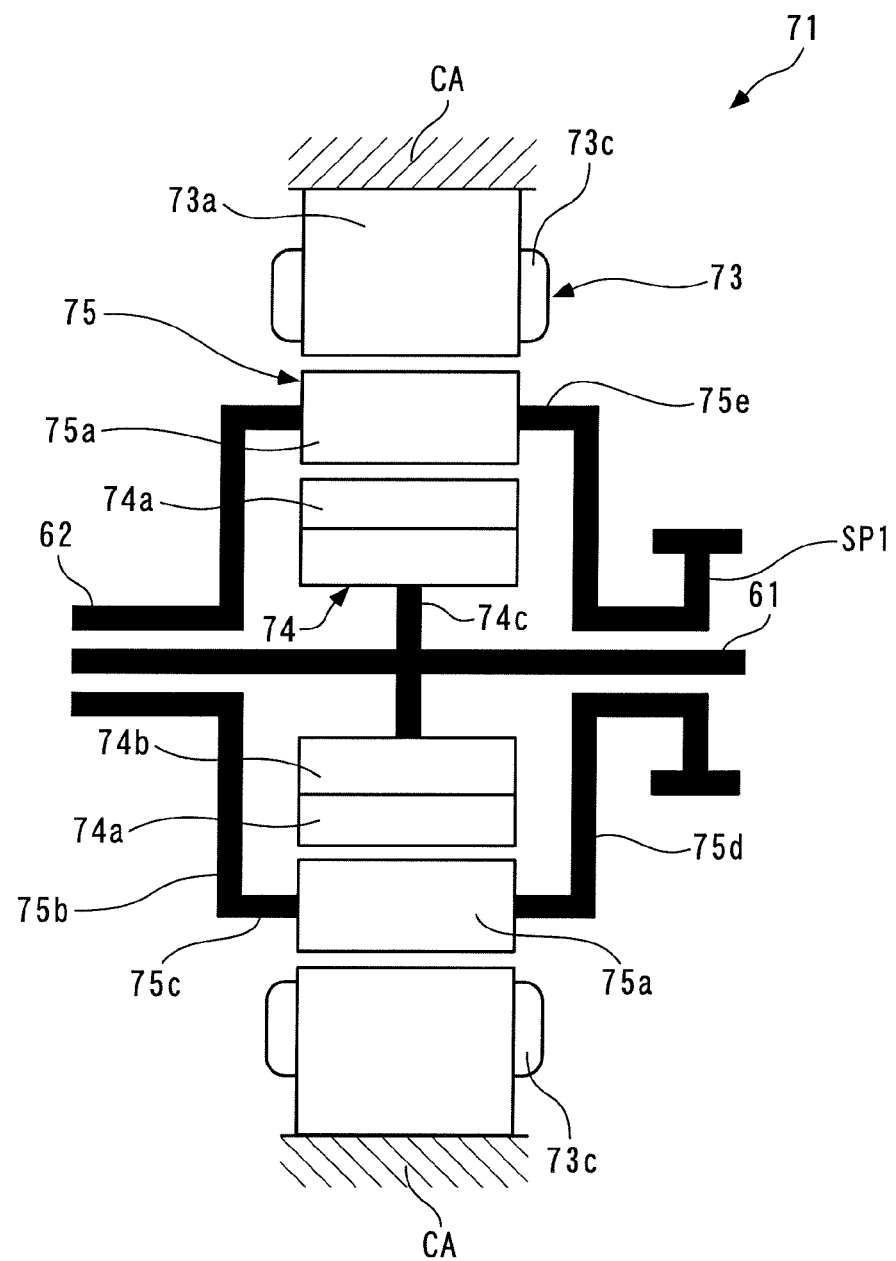
FIG. 18 An enlarged cross-sectional view of a second rotating machine appearing in FIG. 15.

As shown in FIGS. 15 and 18, differently from the second rotating machine 21 of the third embodiment, the second rotating machine 71 is a two-rotor-type rotating machine, and includes a second stator 73, a third rotor 74 provided in a manner opposed to the second stator 73, and a fourth rotor 75 disposed between the two 73 and 74. The second stator 73, the fourth rotor 75, and the third rotor 74 are arranged coaxially with each other in the radial direction of the aforementioned first rotating shaft 61, in the mentioned order from outside.

Figure 17:
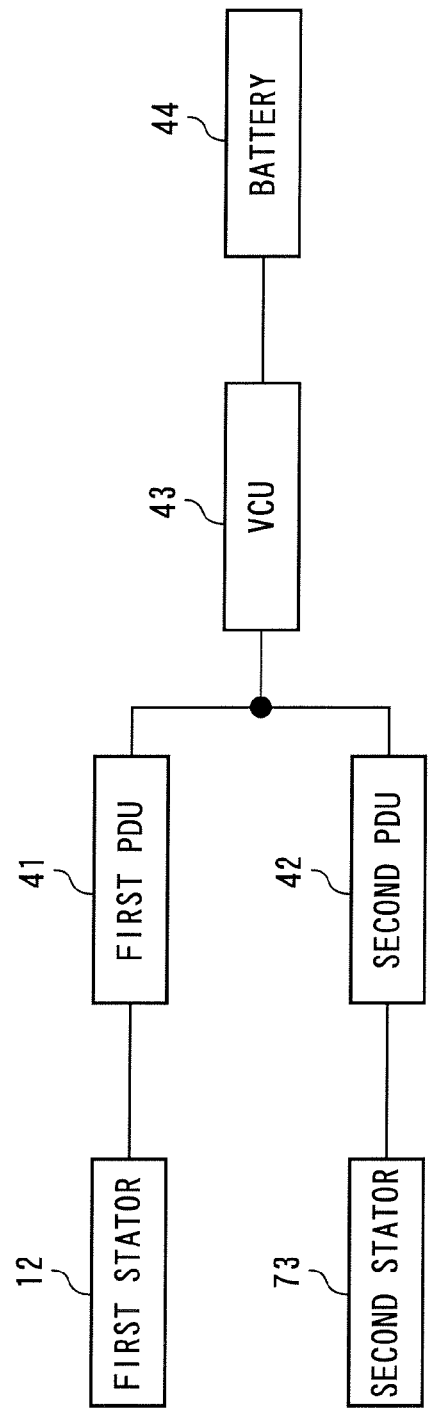
FIG. 17 A block diagram showing a relationship of connections between the first stator, the second stator, the battery, and so forth, which are mounted on the vehicle shown in FIG. 15.
Figure 19:
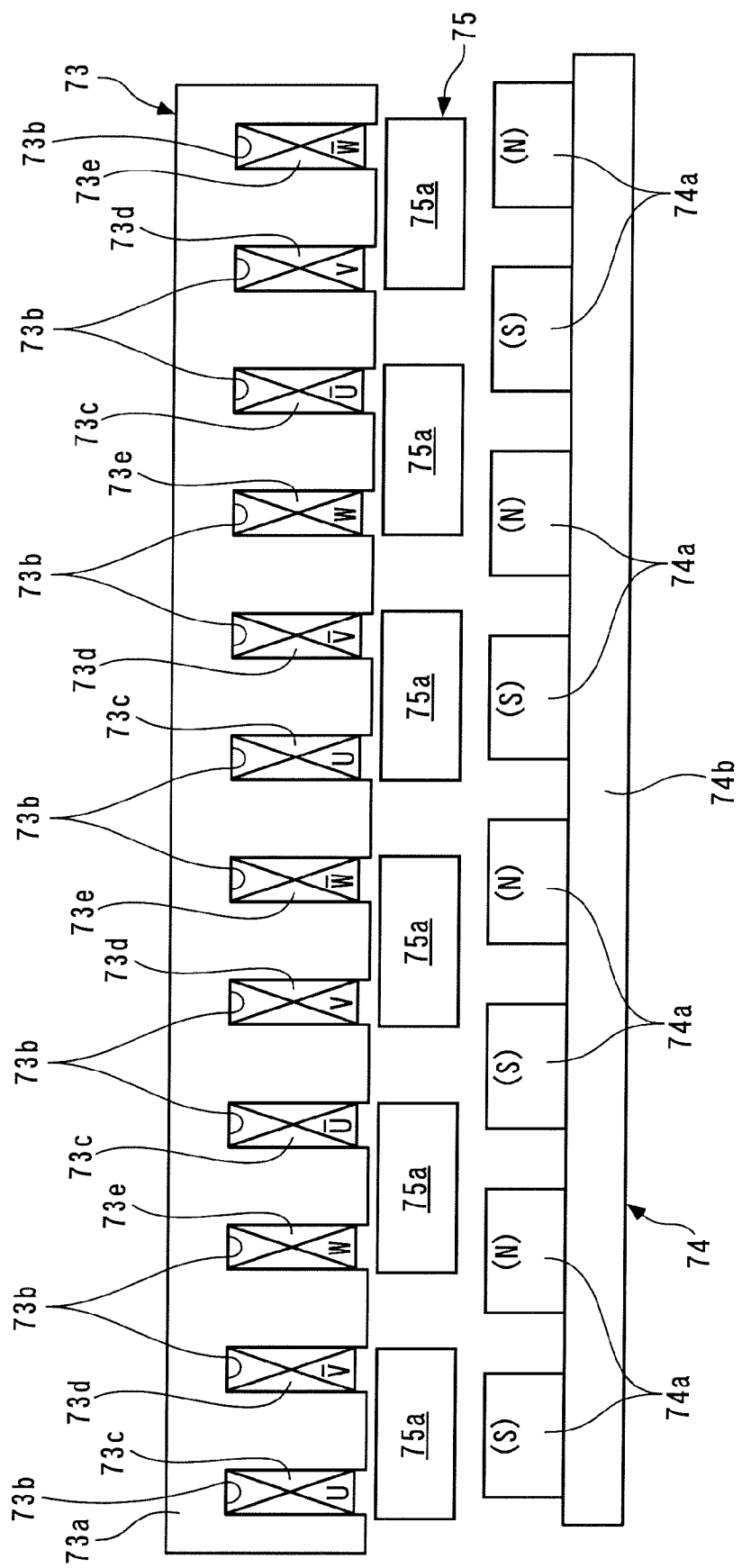
FIG. 19 A schematic development view showing a second stator and third and fourth rotors of the second rotating machine appearing in FIG. 15, in a state developed in the circumferential direction.

The aforementioned second stator 73 is for generating a second rotating magnetic field, and as shown in FIGS. 18 and 19, includes an iron core 73a, and U-phase, V-phase and W-phase coils 73c, 73d and 73e provided on the iron core 73a. Note that in FIG. 18, only the U-phase coil 73c is shown for convenience. The iron core 73a, which has a hollow cylindrical shape formed by laminating a plurality of steel plates, extends in the axial direction of the first rotating shaft 61 (hereinafter simply referred to as the "axial direction"), and is fixed to the casing CA. Further, the inner peripheral surface of the iron core 73a is formed with twelve slots 73b. The slots 73b extend in the axial direction, and are arranged at equally-spaced intervals in the circumferential direction of the first rotating shaft 61 (hereinafter simply referred to as the "circumferential direction"). The U-phase to W-phase coils 73c to 73e are wound in the slots 73b by distributed winding (wave winding). As shown in FIG. 17, the second stator 73 including the U-phase to W-phase coils 73c to 73e is electrically connected to the battery 44 via the above-mentioned second PDU 42 and VCU 43. That is, the first and second stators 12 and 73 are electrically connected to each other via the first and second PDUs 41 and 42.

Figure 22:
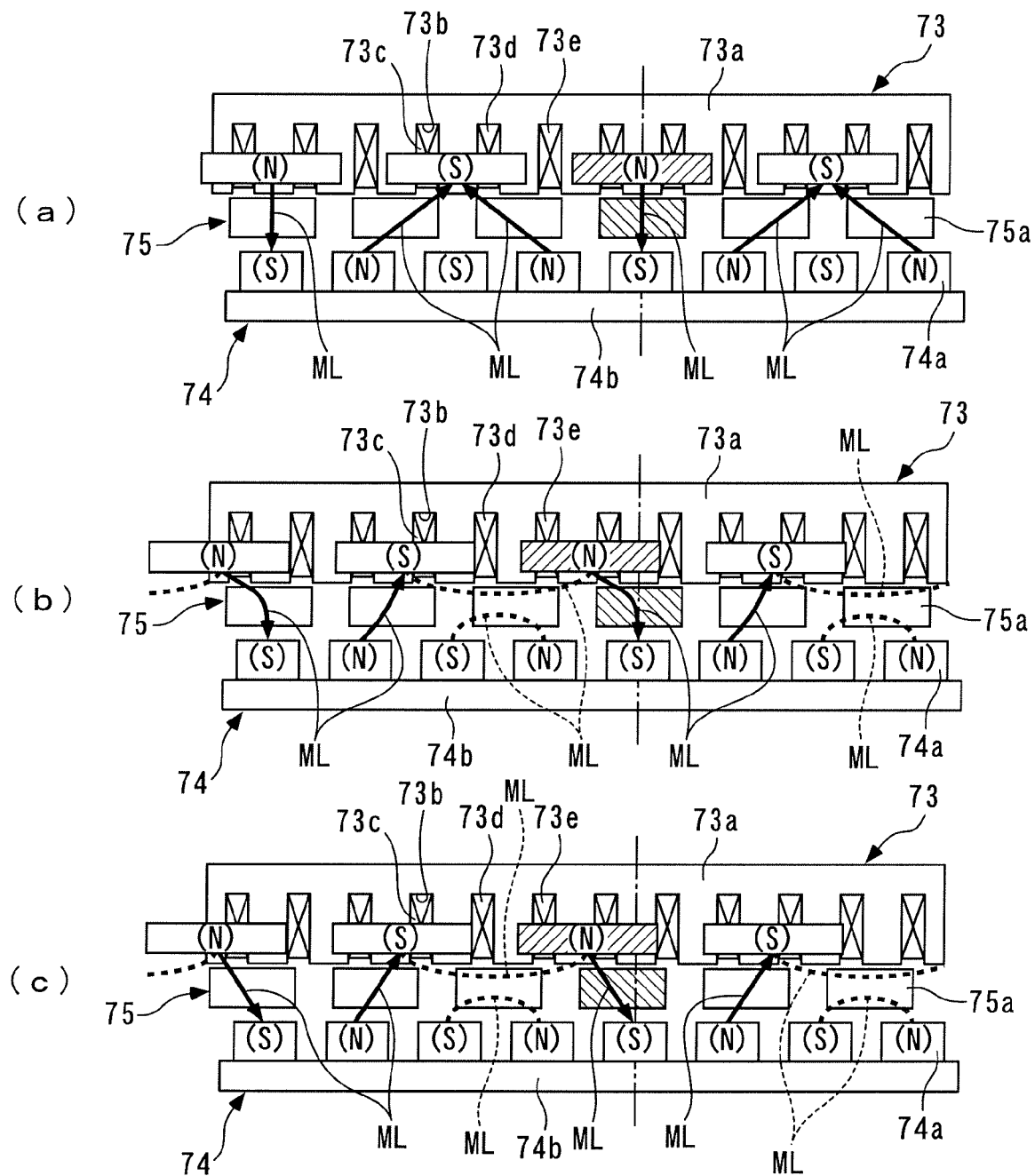
FIG. 22 Diagrams illustrating the operation of the second rotating machine appearing in FIG. 15 in a case where electric power is supplied to the second stator in a state of a third rotor being held unrotatable.

In the second stator 73 constructed as above, when electric power is supplied from the battery 44, to thereby cause electric currents to flow through the U-phase to W-phase coils 73c to 73e, or when electric power is generated, as described hereinafter, four magnetic poles are generated at an end of the iron core 73a toward the third rotor 74 at equally-spaced intervals in the circumferential direction (see FIG. 22), and the second rotating magnetic field generated by the magnetic poles rotates in the circumferential direction. Hereinafter, the magnetic poles generated on the iron core 73a are referred to as the "second armature magnetic poles". Further, each two second armature magnetic poles which are circumferentially adjacent to each other have polarities different from each other. Note that in FIG. 22 and other figures, referred to hereinafter, the second armature magnetic poles are represented by (N) and (S) over the iron core 73a and the U-phase to W-phase coils 73c to 73e.

As shown in FIG. 19, the third rotor 74 includes a second magnetic pole row comprising eight permanent magnets 74a. These permanent magnets 74a are arranged at equally-spaced intervals in the circumferential direction, and the second magnetic pole row is opposed to the iron core 73a of the second stator 73. Each permanent magnet 74a extends in the axial direction, and the length thereof in the axial direction is set to the same length as that of the iron core 73a of the second stator 73.

Further, the permanent magnets 74a are mounted on an outer peripheral surface of an annular mounting portion 74b. This mounting portion 74b is formed by a soft magnetic material, such as iron or a laminate of a plurality of steel plates, and has an inner peripheral surface thereof attached to an outer peripheral surface of a disk-shaped flange 74c. The flange 74c is coaxially and integrally formed on the aforementioned first rotating shaft 61. With this arrangement, the third rotor 74 including the permanent magnets 74a is mechanically directly connected to the above-described first carrier C1, is mechanically connected to the input shaft 32 of the compressor 31 via the belt BE and the first and second pulleys PU1 and PU2, and is mechanically directly connected to the crankshaft 3a via the clutch CL. Further, the third rotor 74 is disposed between the bearings B1 and B2 toward the bearing B1, and the compressor 31 is disposed in the vicinity of a portion of the casing CA, where the second stator 73 is provided.

Furthermore, the permanent magnets 74a are attached to the outer peripheral surface of the mounting portion 74b formed by the soft magnetic material, as described above, and hence a magnetic pole of (N) or (S) appears on an end of each permanent magnet 74a toward the second stator 73. Note that in FIG. 19 and other figures, referred to hereinafter, the magnetic poles of the permanent magnets 74a are denoted by (N) and (S). Further, each two permanent magnets 74a circumferentially adjacent to each other have polarities different from each other.

The fourth rotor 75 includes a second soft magnetic material element row formed by six cores 75a. These cores 75a are arranged at equally-spaced intervals in the circumferential direction, and the second soft magnetic material element row is disposed between the iron core 73a of the second stator 73 and the second magnetic pole row of the third rotor 74, in a manner spaced therefrom by respective predetermined distances. Each core 75a is formed by a soft magnetic material, such as a laminate of a plurality of steel plates, and extends in the axial direction. Further, similarly to the permanent magnet 74a, the length of the core 75a in the axial direction is set to the same length as that of the iron core 73a of the second stator 73.

Furthermore, an end of the core 75a toward the first rotating machine 11 is mounted on an outer end of an annular plate-shaped flange 75b via a hollow cylindrical connecting portion 75c slightly extending in the axial direction. This flange 75b is integrally formed on the aforementioned second rotating shaft 62 coaxially therewith. With this arrangement, the fourth rotor 75 including the cores 75a is mechanically directly connected to the first sun gear S1. Further, an end of the core 75a toward the engine 3 is mounted on an outer end of an annular plate-shaped flange 75d via a hollow cylindrical connecting portion 75e slightly extending in the axial direction. The flange 75d is integrally formed with the above-described first sprocket SP1. With this arrangement, the fourth rotor 75 including the cores 75a is mechanically connected to the drive wheels DW and DW together with the first sun gear S1. Note that in FIGS. 19 and 22, the connecting portion 75c and the flange 75b are omitted from illustration for convenience.

In the second rotating machine 71 constructed as above, between the third rotor 74 and the second stator 73, the second rotating magnetic field is generated by the plurality of second armature magnetic poles, and further the cores 75a are arranged, so that each core 75a is magnetized by the magnetic poles of the permanent magnets 74a (hereinafter referred to as the "second magnet magnetic poles") and the second armature magnetic poles. With this and the fact that the gap is provided between each adjacent two cores 75a, as described above, there are generated magnetic force lines ML in a manner connecting the second magnet magnetic poles, the cores 75a, and the second armature magnetic poles (see FIG. 22). Therefore, when the second rotating magnetic field is generated by the supply of electric power to the second stator 73, the action of magnetism of the magnetic force lines ML converts the electric power supplied to the second stator 73 to motive power, and the motive power is output from the third rotor 74 or the fourth rotor 75.

Now, a torque equivalent to the electric power supplied to the second stator 73 and the electrical angular velocity ωmf of the second rotating magnetic field is represented by "second driving equivalent torque TSE2". Hereafter, a description will be given of a relationship between the second driving equivalent torque TSE2, torques transmitted to the third and fourth rotors 74 and 75 (hereinafter referred to as the "third rotor-transmitted torque TR3" and the "fourth rotor-transmitted torque TR4", respectively), and a relationship between the second rotating magnetic field, and the electrical angular velocities of the third and fourth rotors 74 and 75.

Figure 20:
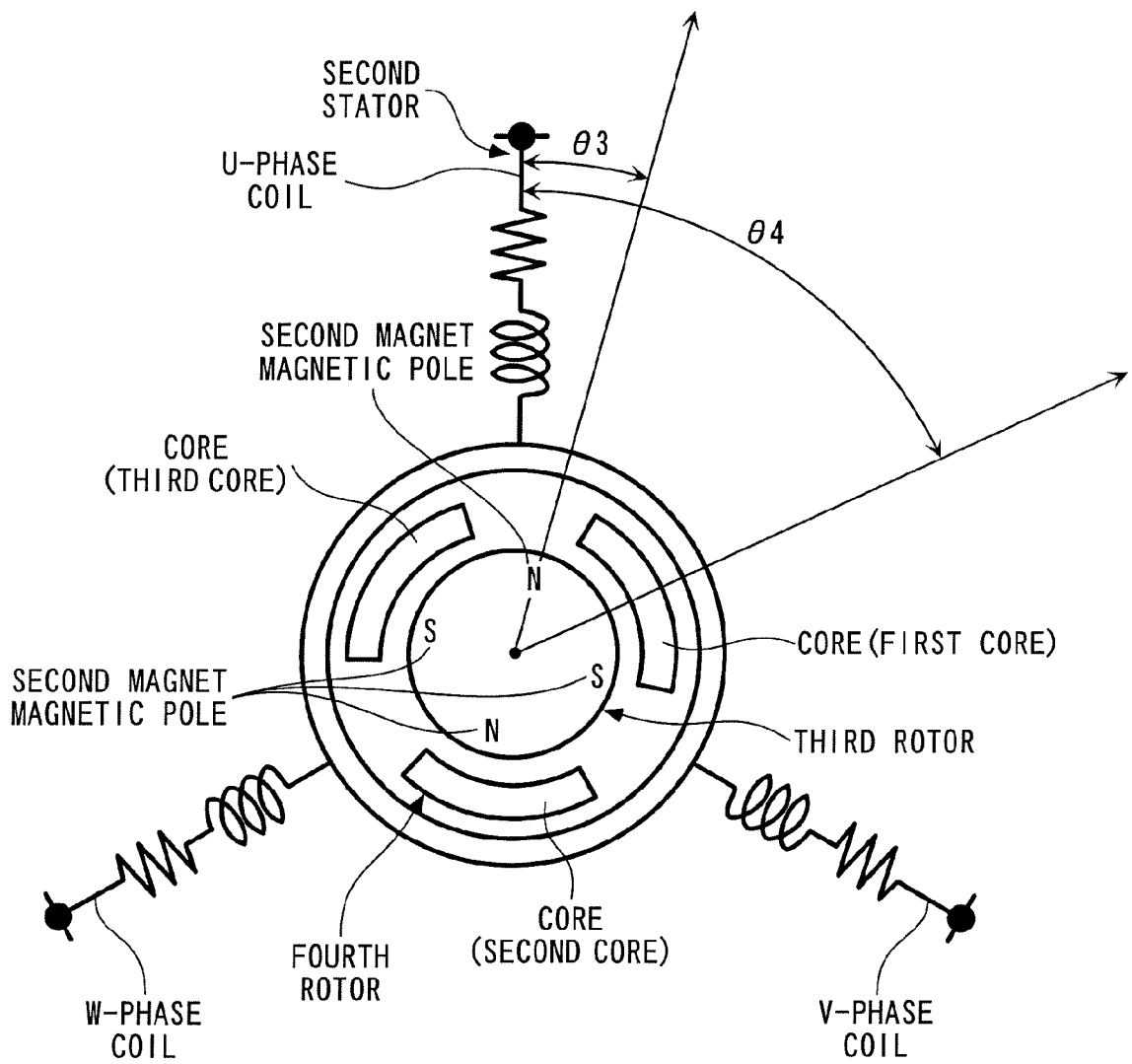
FIG. 20 A diagram showing an equivalent circuit of the second rotating machine appearing in FIG. 15, in a case where the equivalent circuit is formed by two second armature magnetic poles, four second magnet magnetic poles, and three cores.

When the second rotating machine 71 is configured under the following condition (A), an equivalent circuit corresponding to the second rotating machine 71 is expressed as shown in FIG. 20.

(A) The number of the second armature magnetic poles is 2, and the number of the second magnet magnetic poles is 4, that is, a pole pair number of the second armature magnetic poles, each pair being formed by an N pole and an S pole of the second armature magnetic poles, has a value of 1, a pole pair number of the second magnet magnetic poles, each pair being formed by an N pole and an S pole of the second magnet magnetic poles, has a value of 2, and the number of the cores 75a is 3 (first to third cores).

Note that as described above, throughout the specification, the term "pole pair" is intended to mean a pair of an N pole and an S pole.

In this case, a magnetic flux $\Psi k1$ of a second magnet magnetic pole passing through the first core of the cores 75a is expressed by the following equation (23):

$$\Psi k1 = \psi f \cdot \cos[2(\theta 4 - \theta 3)] \quad (23)$$

wherein ψ represents the maximum value of the magnetic flux of the second magnet magnetic pole, and θ3 and θ4 represent a rotational angle position of the second magnet magnetic pole and a rotational angle position of the first core, with respect to the U-phase coil 73c, respectively. Further, in this case, since the ratio of the pole pair number of the second magnet magnetic poles to the pole pair number of the second armature magnetic poles is 2.0, the magnetic flux of the second magnet magnetic pole rotates (changes) at a repetition period of the twofold of the repetition period of the second rotating magnetic field, so that to represent this, in the aforementioned equation (23), (θ4−θ3) is multiplied by 2.0.

Therefore, a magnetic flux $\Psi u1$ of the second magnet magnetic pole passing through the U-phase coil 73c via the first core is expressed by the following equation (24) obtained by multiplying the equation (23) by θ4.

$$\Psi u1 = \psi f \cos[2(\theta 4 - \theta 3)] \cos \theta 4 \quad (24)$$

Similarly, a magnetic flux $\Psi k2$ of the second magnetic pole passing through the second core of the cores 75a is expressed by the following equation (25):

$$\Psi k2 = \psi f \cdot \cos\left[2\left(\theta 4 + \frac{2\pi}{3} - \theta 3\right)\right] \quad (25)$$

In this case, the rotational angle position of the second core with respect to the second stator 73 leads that of the first core by 2π/3, so that to represent this, in the aforementioned equation (25), 2 π/3 is added to θ4.

Therefore, a magnetic flux $\Psi u2$ of the second magnet magnetic pole passing through the U-phase coil 73c via the second core is expressed by the following equation (26) obtained by multiplying the equation (25) by cos(θ4+2π/3).

$$\Psi u2 = \psi f \cdot \cos\left[2\left(\theta 4 + \frac{2\pi}{3} - \theta 3\right)\right]\cos\left(\theta 4 + \frac{2\pi}{3}\right) \tag{26}$$

Similarly, a magnetic flux $\Psi u3$ of the second magnet magnetic pole passing through the U-phase coil 73c via the third core of the cores 75a is expressed by the following equation (27):

$$\Psi u3 = \psi f \cdot \cos\left[2\left(\theta 4 + \frac{4\pi}{3} - \theta 3\right)\right]\cos\left(\theta 4 + \frac{4\pi}{3}\right) \tag{27}$$

In the second rotating machine 71 as shown in FIG. 20, a magnetic flux $\Psi u$ of the second magnet magnetic pole passing through the U-phase coil 73c via the cores 75a is obtained by adding up the magnetic fluxes $\Psi u1$ to $\Psi u3$ expressed by the above-mentioned equations (24), (26) and (27), and hence the magnetic flux $\Psi u$ is expressed by the following equation (28):

$$\Psi u = \psi f \cdot \cos[2(\theta 4 - \theta 3)]\cos\theta 4 + \tag{28}$$
$$\psi f \cdot \cos\left[2\left(\theta 4 + \frac{2\pi}{3} - \theta 3\right)\right]\cos\left(\theta 4 + \frac{2\pi}{3}\right) +$$
$$\psi f \cdot \cos\left[2\left(\theta 4 + \frac{4\pi}{3} - \theta 3\right)\right]\cos\left(\theta 4 + \frac{4\pi}{3}\right)$$

Further, when this equation (28) is generalized, the magnetic flux $\Psi u$ of the second magnet magnetic pole passing through the U-phase coil 73c via the cores 75a is expressed by the following equation (29):

$$\Psi u = \sum_{i=1}^{b} \psi f \cdot \cos\left\{a\left[\theta 4 + (i-1)\frac{2\pi}{b} - \theta 3\right]\right\}\cos\left\{c\left[\theta 4 + (i-1)\frac{2\pi}{b}\right]\right\} \tag{29}$$

wherein a, b and c represent the pole pair number of second magnet magnetic poles, the number of cores 75a, and the pole pair number of second armature magnetic poles. Further, when the above equation (29) is changed based on the formula of the sum and product of the trigonometric function, there is obtained the following equation (30):

$$\Psi u = \sum_{i=1}^{b} \frac{1}{2} \cdot \psi f \left\{ \begin{array}{l} \cos\left[(a+c)\theta 4 - a\cdot\theta 3 + (a+c)(i-1)\frac{2\pi}{b}\right] + \\ \cos\left[(a-c)\theta 4 - a\cdot\theta 3 + (a-c)(i-1)\frac{2\pi}{b}\right] \end{array} \right\} \tag{30}$$

When b=a+c is set in this equation (30), and the rearrangement based on $\cos(\theta+2\pi)=\cos\theta$ is performed, there is obtained the following equation (31):

$$\Psi u = \frac{b}{2} \cdot \psi f \cdot \cos[(a+c)\theta 4 - a\cdot\theta 3] + \tag{31}$$
$$\sum_{i=1}^{b} \frac{1}{2} \cdot \psi f \left\{\cos\left[(a-c)\theta 4 - a\cdot\theta 3 + (a-c)(i-1)\frac{2\pi}{b}\right]\right\}$$

When this equation (31) is rearranged based on the addition theorem of the trigonometric function, there is obtained the following equation (32):

$$\Psi u = \frac{b}{2} \cdot \psi f \cdot \cos[(a+c)\theta 4 - a\cdot\theta 3] + \tag{32}$$
$$\frac{1}{2} \cdot \psi f \cdot \cos[(a-c)\theta 4 - a\cdot\theta 3]\sum_{i=1}^{b}\cos\left[(a-c)(i-1)\frac{2\pi}{b}\right] -$$
$$\frac{1}{2} \cdot \psi f \cdot \sin[(a-c)\theta 4 - a\cdot\theta 3]\sum_{i=1}^{b}\sin\left[(a-c)(i-1)\frac{2\pi}{b}\right]$$

When the second term on the right side of the equation (32) is rearranged based on the sum total of the series and the Euler's formula on condition that a-c≠0, it is equal to 0, as is apparent from the following equation (33):

$$\sum_{i=1}^{b}\cos\left[(a-c)(i-1)\frac{2\pi}{b}\right] = \sum_{i=0}^{b-1}\frac{1}{2}\left\{e^{j[(a-c)\frac{2\pi}{b}i]} + e^{-j[(a-c)\frac{2\pi}{b}i]}\right\} \tag{33}$$
$$= \frac{1}{2}\left\{\frac{e^{j[(a-c)\frac{2\pi}{b}b]}-1}{e^{j[(a-c)\frac{2\pi}{b}]}-1} + \frac{e^{-j[(a-c)\frac{2\pi}{b}b]}-1}{e^{-j[(a-c)\frac{2\pi}{b}]}-1}\right\}$$
$$= \frac{1}{2}\left\{\frac{e^{j[(a-c)2\pi]}-1}{e^{j[(a-c)\frac{2\pi}{b}]}-1} + \frac{e^{-j[(a-c)2\pi]}-1}{e^{-j[(a-c)\frac{2\pi}{b}]}-1}\right\}$$
$$= \frac{1}{2}\left\{\frac{0}{e^{j[(a-c)\frac{2\pi}{b}]}-1} + \frac{0}{e^{-j[(a-c)\frac{2\pi}{b}]}-1}\right\}$$
$$= 0$$

Further, when the third term on the right side of the above-described equation (32) is rearranged based on the sum total of the series and the Euler's formula on condition that a−c≠0, it is also equal to 0, as is apparent from the following equation (34):

$$\sum_{i=1}^{b}\sin\left[(a-c)(i-1)\frac{2\pi}{b}\right] = \sum_{i=0}^{b-1}\frac{1}{2}\left\{e^{j[(a-c)\frac{2\pi}{b}i]} - e^{-j[(a-c)\frac{2\pi}{b}i]}\right\} \tag{34}$$
$$= \frac{1}{2}\left\{\frac{e^{j[(a-c)\frac{2\pi}{b}b]}-1}{e^{j[(a-c)\frac{2\pi}{b}]}-1} - \frac{e^{-j[(a-c)\frac{2\pi}{b}b]}-1}{e^{-j[(a-c)\frac{2\pi}{b}]}-1}\right\}$$
$$= \frac{1}{2}\left\{\frac{e^{j[(a-c)2\pi]}-1}{e^{j[(a-c)\frac{2\pi}{b}]}-1} - \frac{e^{-j[(a-c)2\pi]}-1}{e^{-j[(a-c)\frac{2\pi}{b}]}-1}\right\}$$
$$= \frac{1}{2}\left\{\frac{0}{e^{j[(a-c)\frac{2\pi}{b}]}-1} - \frac{0}{e^{-j[(a-c)\frac{2\pi}{b}]}-1}\right\}$$
$$= 0$$

From the above, when a−c≠0 holds, the magnetic flux $\Psi u$ of the second magnet magnetic pole passing through the U-phase coil 73c via the cores 75a is expressed by the following equation (35):

$$\Psi u = \frac{b}{2} \cdot \psi f \cdot \cos[(a+c)\theta 4 - a\cdot\theta 3] \tag{35}$$

Further, in this equation (35), if a/c=β, there is obtained the following equation (36):

$$\Psi u = \frac{b}{2} \cdot \psi f \cdot \cos[(\beta+1)c \cdot \theta 4 - \beta \cdot c \cdot \theta 3] \tag{36}$$

Furthermore, in this equation (36), assuming that c·θ4=θe4 and c·θ3=θe3, there is obtained the following equation (37):

$$\Psi u = \frac{b}{2} \cdot \psi f \cdot \cos[(\beta+1)\theta e 4 - \beta \cdot \theta e 3] \tag{37}$$

In this equation, as is clear from the fact that θe4 is obtained by multiplying the rotational angle position θ4 of the first core with respect to the U-phase coil 73c by the pole pair number c of the first armature magnetic poles, θe4 represents the electrical angular position of the core 75a with respect to the U-phase coil 73c (hereinafter referred to as the "fourth rotor electrical angle"). Further, as is apparent from the fact that θe3 is obtained by multiplying the rotational angle position θ3 of the second magnet magnetic pole with respect to the U-phase coil 73c by the pole pair number c of the second armature magnetic poles, θe3 represents the electrical angular position of the second magnet magnetic pole with respect to the U-phase coil 73c (hereinafter referred to as the "third rotor electrical angle").

Similarly, since the electrical angular position of the V-phase coil 73d leads that of the U-phase coil 73c by an electrical angle of 2π/3, the magnetic flux Ψv of the second magnet magnetic pole passing through the V-phase coil 73d via the cores 75a is expressed by the following equation (38). Further, since the electrical angular position of the W-phase coil 73e is delayed from that of the U-phase coil 73c by an electrical angle of 2π/3, the magnetic flux Ψw of the second magnet magnetic pole passing through the W-phase coil 73e via the cores 75a is expressed by the following equation (39).

$$\Psi v = \frac{b}{2} \cdot \psi f \cdot \cos\left[(\beta+1)\theta e 4 - \beta \cdot \theta e 3 - \frac{2\pi}{3}\right] \tag{38}$$

$$\Psi w = \frac{b}{2} \cdot \psi f \cdot \cos\left[(\beta+1)\theta e 4 - \beta \cdot \theta e 3 + \frac{2\pi}{3}\right] \tag{39}$$

Further, when the magnetic fluxes Ψu to Ψw expressed by the aforementioned equations (37) to (39), respectively, are differentiated with respect to time, there are obtained the following equations (40) to (42):

$$\frac{d\Psi u}{dt} = -\frac{b}{2} \cdot \psi f \{[(\beta+1)\omega e 4 - \beta \cdot \omega e 3]\sin[(\beta+1)\theta e 4 - \beta \cdot \theta e 3]\} \tag{40}$$

$$\frac{d\Psi v}{dt} = -\frac{b}{2} \cdot \psi f \left\{[(\beta+1)\omega e 4 - \beta \cdot \omega e 3]\sin\left[(\beta+1)\theta e 4 - \beta \cdot \theta e 3 - \frac{2\pi}{3}\right]\right\} \tag{41}$$

$$\frac{d\Psi w}{dt} = \tag{42}$$
$$-\frac{b}{2} \cdot \psi f \left\{[(\beta+1)\omega e 4 - \beta \cdot \omega e 3]\sin\left[(\beta+1)\theta e 4 - \beta \cdot \theta e 3 + \frac{2\pi}{3}\right]\right\}$$

wherein ωe3 represents a third rotor electrical angular velocity, which is a value obtained by differentiating the third rotor electrical angle θe3 with respect to time, i.e. a value obtained by converting an angular velocity of the third rotor 74 with respect to the second stator 73 to an electrical angular velocity. Furthermore, ωe4 represents a fourth rotor electrical angular velocity, which is a value obtained by differentiating the fourth rotor electrical angle θe4 with respect to time, i.e. a value obtained by converting an angular velocity of the fourth rotor 75 with respect to the second stator 73 to an electrical angular velocity.

Further, magnetic fluxes of the second magnet magnetic poles that directly pass through the U-phase to W-phase coils 73c to 73e without via the cores 75a are very small, and hence influence thereof is negligible. Therefore, dΨu/dt to dΨw/dt (equations (40) to (42)), which are values obtained by differentiating with respect to time the magnetic fluxes Ψu to Ψw of the second magnet magnetic poles, which pass through the U-phase to W-phase coils 73c to 73e via the cores 75a, respectively, represent counter-electromotive force voltages (induced electromotive voltages), which are generated in the U-phase to W-phase coils 73c to 73e as the second magnet magnetic poles and the cores 75a rotate with respect to the second stator 73 (hereinafter referred to as the "U-phase counter-electromotive force voltage Vcu", the "V-phase counter-electromotive force voltage Vcv" and the "W-phase counter-electromotive force voltage Vcw", respectively).

From the above, electric currents Iu, Iv and Iw, flowing through the U-phase, V-phase and W-phase coils 73c to 73e, respectively, are expressed by the following equations (43), (44) and (45):

$$Iu = I \cdot \sin[(\beta+1)\theta e 4 - \beta \cdot \theta e 3] \tag{43}$$

$$Iv = I \cdot \sin\left[(\beta+1)\theta e 4 - \beta \cdot \theta e 3 - \frac{2\pi}{3}\right] \tag{44}$$

$$Iw = I \cdot \sin\left[(\beta+1)\theta e 4 - \beta \cdot \theta e 3 + \frac{2\pi}{3}\right] \tag{45}$$

wherein I represents the amplitude (maximum value) of electric currents Iu to Iw flowing through the U-phase to W-phase coils 73c to 73e, respectively.

Further, from the above equations (43) to (45), the electrical angular position θmf of the vector of the second rotating magnetic field with respect to the U-phase coil 73c is expressed by the following equation (46), and the electrical angular velocity ωmf of the second rotating magnetic field with respect to the U-phase coil 73c (hereinafter referred to as the "magnetic field electrical angular velocity") is expressed by the following equation (47).

$$\theta mf = (\beta+1)\theta e 4 - \beta \cdot \theta e 3 \tag{46}$$

$$\omega mf = (\beta+1)\omega e 4 - \beta \cdot \omega e 3 \tag{47}$$

Therefore, when the relationship between the magnetic field electrical angular velocity ωmf and the third and fourth rotor electrical angular velocities ω e3 and ωe4 is represented in a so-called collinear chart, it is illustrated e.g. as in FIG. 21. Note that in FIG. 21 and other velocity collinear charts, described hereinafter, similarly to the velocity collinear chart shown in FIG. 3, referred to hereinabove, vertical lines intersecting with a horizontal line indicative of a value of 0 are for representing the respective angular velocities (rotational speeds) of rotary elements, and the distance from the horizontal line to a white circle shown on each vertical line corresponds to the angular velocity (rotational speed) of each of the rotary elements.

Further, the mechanical output (motive power) W, which is output to the third and fourth rotors 74 and 75 by the flowing of the respective electric currents Iu to Iw through the U-phase to W-phase coils 73c to 73e, is represented, provided that an reluctance-associated portion is excluded therefrom, by the following equation (48):

$$W = \frac{d\Psi u}{dt} \cdot Iu + \frac{d\Psi v}{dt} \cdot Iv + \frac{d\Psi w}{dt} \cdot Iw \quad (48)$$

When the above equations (40) to (45) are substituted into this equation (48) for rearrangement, there is obtained the following equation (49):

$$W = -\frac{3 \cdot b}{4} \cdot \psi f \cdot I[(\beta+1)\omega e4 - \beta \cdot \omega e3] \quad (49)$$

Furthermore, the relationship between this mechanical output W, the aforementioned third and fourth rotor-transmitted torques TR3 and TR4, and the third and fourth rotor electrical angular velocities ωe3 and ωe4 is expressed by the following equation (50):

$$W = TR3 \cdot \omega e3 + TR4 \cdot \omega e4 \quad (50)$$

As is apparent from the above equations (49) and (50), the third and fourth rotor-transmitted torques TR3 and TR4 are expressed respectively by the following equations (51) and (52):

$$TR3 = \beta \cdot \frac{3 \cdot b}{4} \cdot \psi f \cdot I \quad (51)$$

$$TR4 = -(\beta+1) \cdot \frac{3 \cdot b}{4} \cdot \psi f \cdot I \quad (52)$$

Further, from the fact that the electric power supplied to the second stator 73 and the mechanical output W are equal to each other (provided that losses are ignored), and from the aforementioned equations (47) and (49), the above-described second driving equivalent torque TSE2 (torque equivalent to the electric power supplied to the second stator 73 and the magnetic field electrical angular velocity ωmf) is expressed by the following equation (53):

$$TSE2 = \frac{3 \cdot b}{4} \cdot \psi f \cdot I \quad (53)$$

Further, from the above equations (51) to (53), there is obtained the following equation (54):

$$TSE2 = \frac{TR3}{\beta} = \frac{-TR4}{(\beta+1)} \quad (54)$$

The relationship between the torques, expressed by the equation (54), and the relationship between the electrical angular velocities, expressed by the equation (47), are quite the same as the relationship between the torques and the relationship between the rotational speeds of the sun gear, ring gear and carrier of a planetary gear unit.

Further, as described above, on condition that b=a+c and a−c≠0, there hold the relationship between the electrical angular velocities, expressed by the equation (47) and the relationship between the torques, expressed by the equation (54). The above condition b=a+c is expressed by b=(p+q)/2, i.e. b/q=(1+p/q)/2, assuming that the number of the second magnet magnetic poles is represented by p and that of the second armature magnetic poles by q. Here, as is apparent from the fact that if p/q=m, b/q=(1+m)/2 is obtained, the satisfaction of the above condition of b=a+c represents that the ratio between the number of the second armature magnetic poles, the number of the second magnet magnetic poles, and the number of the cores 75a is 1:m:(1+m)/2. Further, the satisfaction of the above condition of a−c≠0 represents that m≠1.0 holds.

As is apparent from the above, if the ratio between the number of the second armature magnetic poles, the number of the second magnet magnetic poles, and the number of the cores 75a is set to 1:m:(1+m)/2 (m≠1.0), the second rotating machine 71 properly operates, and there hold the relationship between the electrical angular velocities, expressed by the equation (47) and the relationship between the torques, expressed by the equation (54). In the present embodiment, as described hereinabove, the number of the second armature magnetic poles is 4, the number of the second magnet magnetic poles is 8, and the number of the cores 75a is 6, i.e. the number of the second armature magnetic poles, the number of the second magnet magnetic poles, and the number of the cores 75a is 1:2:(1+2)/2. Therefore, the second rotating machine 71 properly operates, and there hold the relationship between the electrical angular velocities, expressed by the equation (47), and the relationship between the torques, expressed by the equation (54).

Figure 23:
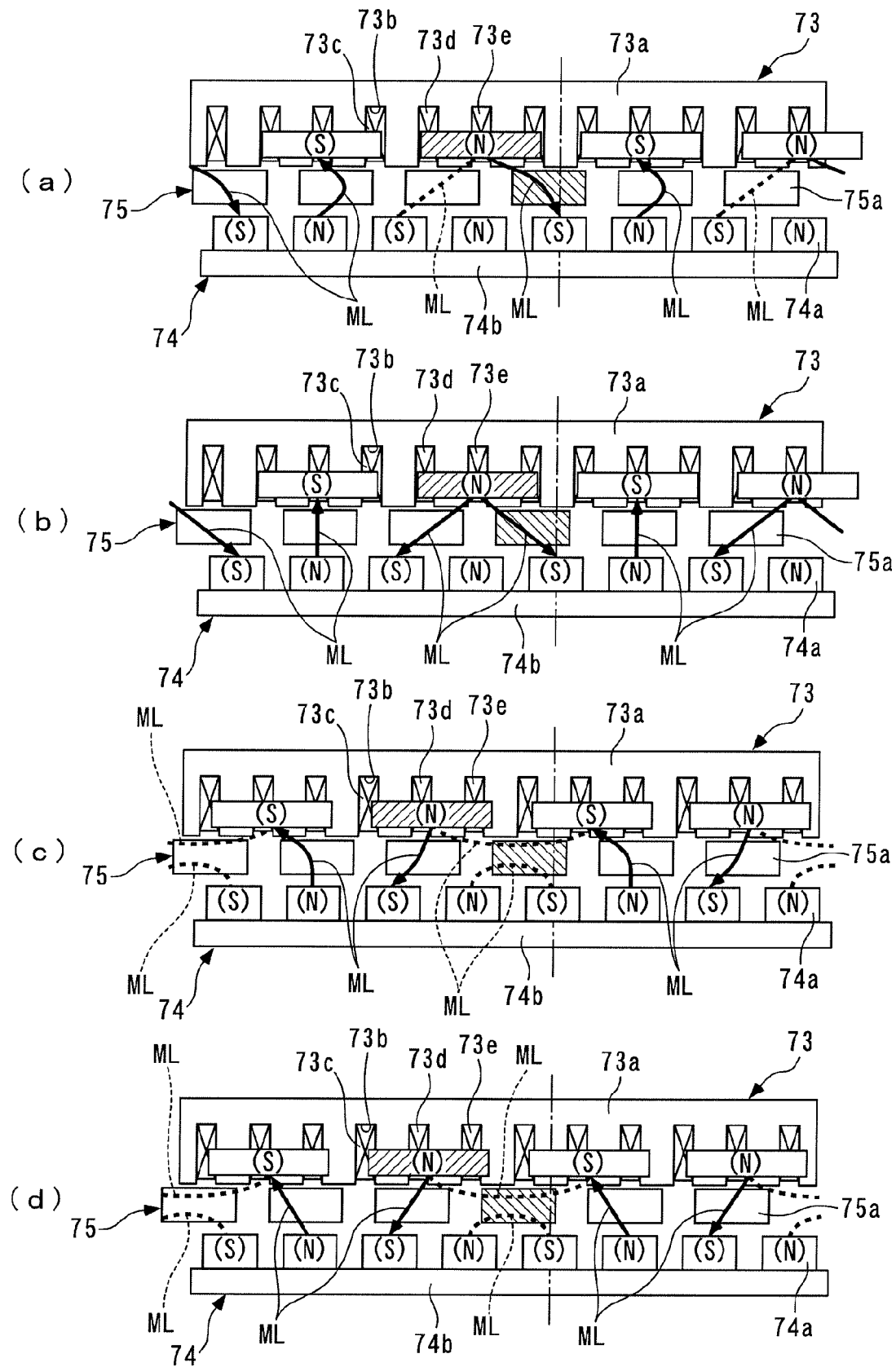
FIG. 23 Diagrams illustrating a continuation of the operation illustrated in FIG. 22.
Figure 24:
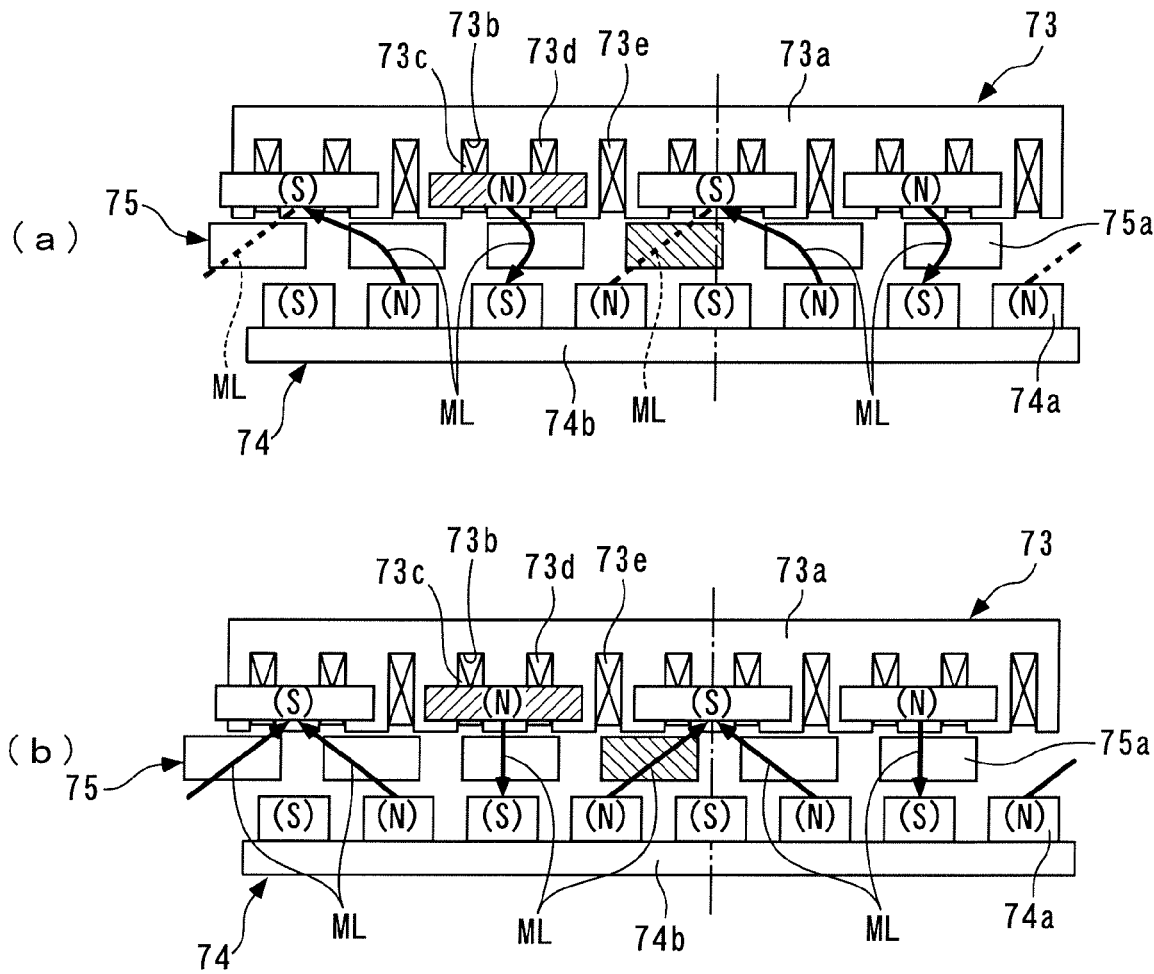
FIG. 24 Diagrams illustrating a continuation of the operation illustrated in FIG. 23.

Next, a more specific description will be given of how electric power supplied to the second stator 73 is converted to motive power and is output from the third rotor 74 and the fourth rotor 75. First, a case where electric power is supplied to the second stator 73 in a state in which the third rotor 74 is held unrotatable will be described with reference to FIGS. 22 to 24. Note that in FIGS. 22 to 24, reference numerals indicative of a plurality of component elements are omitted from illustration for convenience. This also applies to other figures, referred to hereinafter. Further, in FIGS. 22 to 24, one identical second armature magnetic pole and one identical core 75a are indicated by hatching for clarity.

First, as shown in FIG. 22(a), from a state where the center of a certain core 75a and the center of a certain permanent magnet 74a are circumferentially coincident with each other, and the center of a third core 75a from the certain core 75a and the center of a fourth permanent magnet 74a from the certain permanent magnet 74a are circumferentially coincident with each other, the second rotating magnetic field is generated such that it rotates leftward, as viewed in the figure. At the start of generation of the second rotating magnetic field, the positions of two second armature magnetic poles adjacent but one to each other that have the same polarity are caused to circumferentially coincide with the centers of ones of the permanent magnets 74a the centers of which are coincident with the centers of cores 75a, respectively, and the polarity of these second armature magnetic poles is made different from the polarity of the second magnet magnetic poles of these permanent magnets 74a.

Since the second rotating magnetic field is generated by the second stator 73, between the same and the third rotor 74, and the fourth rotor 75 having the cores 75a is disposed between the second stator 73 and the third rotor 74, as described hereinabove, the cores 75a are magnetized by the second armature magnetic poles and the second magnet magnetic poles. Because of this fact and the fact that the cores 75a adjacent to each other are spaced from each other, magnetic force lines ML are generated in a manner connecting between the second armature magnetic poles, the cores 75a, and the second magnet magnetic poles. Note that in FIGS. 22 to 24, magnetic force lines ML at the iron core 73a and the mounting portion 74b are omitted from illustration for convenience. This also applies to other figures, referred to hereinafter.

In the state shown in FIG. 22(a), the magnetic force lines ML are generated in a manner connecting each second armature magnetic pole, core 75a, and second magnet magnetic pole, the circumferential positions of which are coincident with each other, and at the same time in a manner connecting second armature magnetic poles, cores 75a, and second magnet magnetic poles, which are adjacent to the above-mentioned second armature magnetic pole, core 75a, and second magnet magnetic pole, on respective circumferentially opposite sides thereof. Further, in this state, since the magnetic force lines ML are straight, no magnetic forces for circumferentially rotating the cores 75a act on the cores 75a.

When the second armature magnetic poles rotate from the positions shown in FIG. 22(a) to respective positions shown in FIG. 22(b) in accordance with rotation of the second rotating magnetic field, the magnetic force lines ML are bent, and accordingly magnetic forces act on the cores 75a in such a manner that the magnetic force lines ML are made straight. In this case, the magnetic force lines ML are bent at the cores 75a in a manner convexly curved in an opposite direction to a direction of rotation of the second rotating magnetic field (hereinafter, this direction is referred to as the "magnetic field rotation direction") with respect to the straight lines each connecting a second armature magnetic pole and a second magnet magnetic pole which are connected to each other by an associated one of the magnetic force lines ML. Therefore, the above-described magnetic forces act on the cores 75a in a manner driving the same in the magnetic field rotation direction. The cores 75a are driven in the magnetic field rotation direction by such action of the magnetic forces caused by the magnetic force lines ML, and rotated to respective positions shown in FIG. 22(c), and the fourth rotor 75 provided with the cores 75a is also rotated in the magnetic field rotation direction. Note that broken lines in FIGS. 22(b) and 22(c) represent very small magnetic flux amounts of the magnetic force lines ML, and hence weak magnetic connections between the second armature magnetic poles, the cores 75a, and the second magnet magnetic poles. This also applies to other figures, referred to hereinafter.

As the second rotating magnetic field further rotates, a sequence of the above-described operations, that is, the operations that "the magnetic force lines ML are bent at the cores 75a in a manner convexly curved in the direction opposite to the magnetic field rotation direction→the magnetic forces act on the cores 75a in such a manner that the magnetic force lines ML are made straight→the cores 75a and the fourth rotor 75 rotate in the magnetic field rotation direction" are repeatedly performed as shown in FIGS. 23(a) to 23(d), and FIGS. 24(a) and 24(b). Thus, in the case where electric power is supplied to the second stator 73 in the state of the third rotor 74 being held unrotatable, the action of the magnetic forces caused by the magnetic force lines ML as described above converts electric power supplied to the second stator 73 to motive power, and outputs the motive power from the fourth rotor 75.

Figure 25:
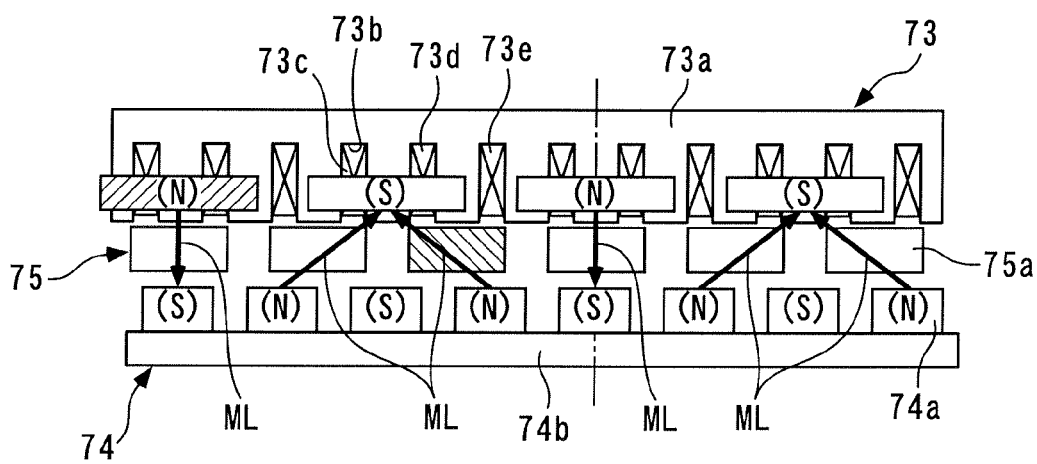
FIG. 25 A diagram illustrating a positional relationship between the second armature magnetic poles and the cores in a case where the second armature magnetic poles have rotated through an electrical angle of 2π from the state shown in FIG. 22.

FIG. 25 shows a state in which the second armature magnetic poles have rotated from the FIG. 22(a) state through an electrical angle of 2π. As is apparent from a comparison between FIG. 25 and FIG. 22(a), it is understood that the cores 75a have rotated in the same direction through ⅓ of a rotational angle of the second armature magnetic poles. This agrees with the fact that by substituting $\omega e3=0$ into the aforementioned equation (47), $\omega e4=\omega mf/((\beta+1)=\omega mf/3$ is obtained.

Figure 26:
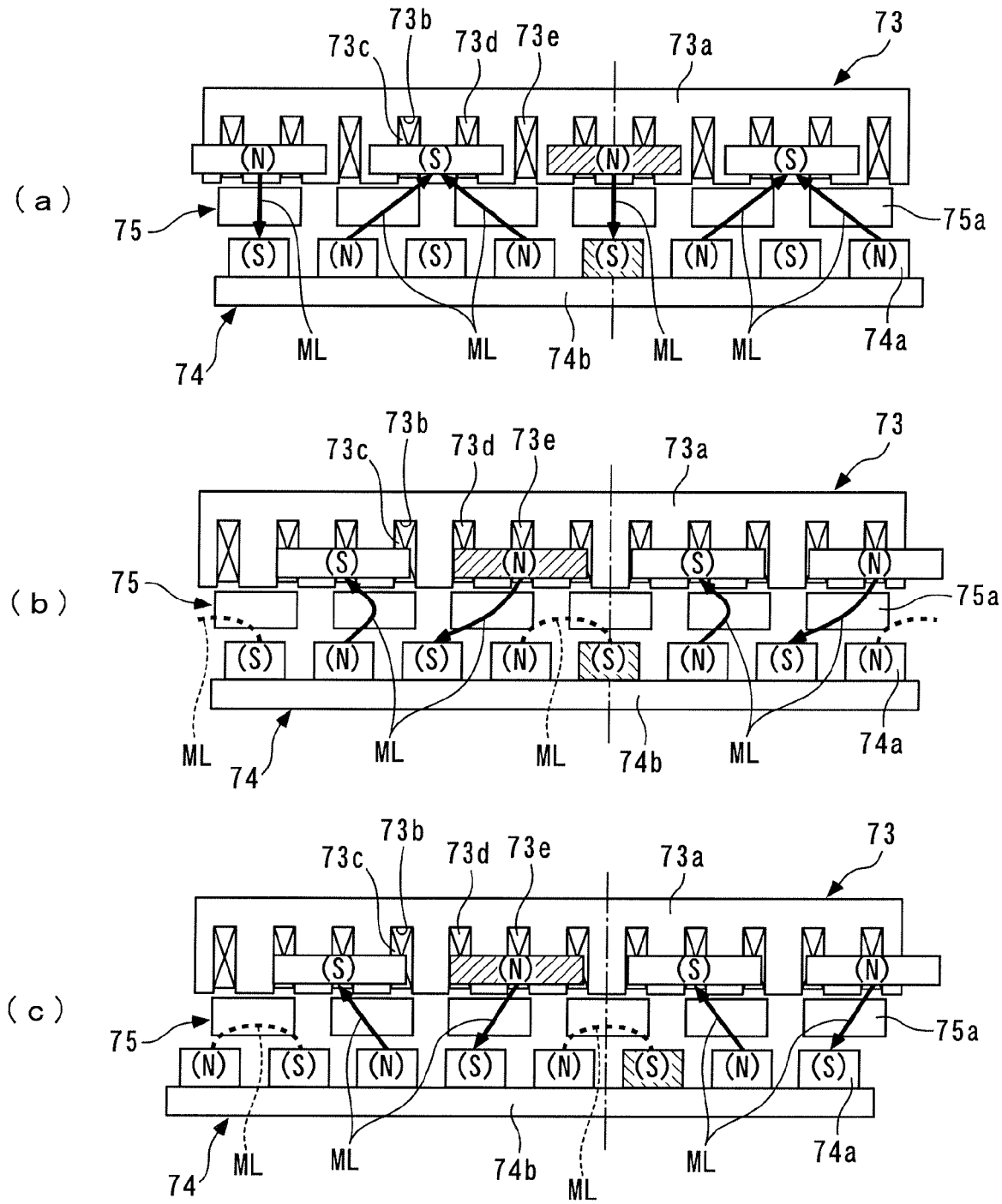
FIG. 26 Diagrams illustrating the operation of the second rotating machine appearing in FIG. 15 in a case where electric power is supplied to the second stator in a state of a fourth rotor being held unrotatable.

Next, an operation in a case where electric power is supplied to the second stator 73 in a state in which the fourth rotor 75 is held unrotatable will be described with reference to FIGS. 26 to 28. Note that in FIGS. 26 to 28, one identical second armature magnetic pole and one identical permanent magnet 74a are indicated by hatching for clarity. First, as shown in FIG. 26(a), similarly to the above-described case shown in FIG. 22(a), from a state where the center of a certain core 75a and the center of a certain permanent magnet 74a are circumferentially coincident with each other, and the center of the third core 75a from the certain core 75a and the center of the fourth permanent magnet 74a from the certain permanent magnet 74a are circumferentially coincident with each other, the second rotating magnetic field is generated such that it rotates leftward, as viewed in the figure. At the start of generation of the second rotating magnetic field, the positions of second armature magnetic poles adjacent but one to each other that have the same polarity are caused to circumferentially coincide with the centers of corresponding ones of the respective permanent magnets 74a having centers coincident with the centers of cores 75a, and the polarity of these first armature magnetic poles is made different from the polarity of the second magnet magnetic poles of these permanent magnets 74a.

In the state shown in FIG. 26(a), similarly to the case shown in FIG. 22(a), magnetic force lines ML are generated in a manner connecting each second armature magnetic pole, core 75a, and second magnet magnetic pole, the circumferential positions of which are coincident with each other, and at the same time in a manner connecting second armature magnetic poles, cores 75a, and second magnet magnetic poles, which are adjacent to the above-mentioned second armature magnetic pole, core 75a, and second magnet magnetic pole, on respective circumferentially opposite sides thereof. Further, in this state, since the magnetic force lines ML are straight, no magnetic forces for circumferentially rotating the permanent magnets 74a act on the permanent magnets 74a.

When the second armature magnetic poles rotate from the positions shown in FIG. 26(a) to respective positions shown in FIG. 26(b) in accordance with rotation of the second rotating magnetic field, the magnetic force lines ML are bent, and accordingly magnetic forces act on the permanent magnets 74a in such a manner that the magnetic force lines ML are made straight. In this case, the permanent magnets 74a are each positioned forward of an extension of a line connecting between a second armature magnetic pole and a core 75a which are connected to each other by an associated one of the magnetic force lines ML, in the magnetic field rotation direction, and therefore the above-described magnetic forces act on the permanent magnets 74a such that each permanent magnet 74a is caused to be positioned on the extension, i.e. such that the permanent magnet 74a is driven in a direction opposite to the magnetic field rotation direction. The permanent magnets 74a are driven in the direction opposite to the magnetic field rotation direction by such action of the magnetic forces caused by the magnetic force lines ML, and are thereby rotated to respective positions shown in FIG. 26(c). The third rotor 74 provided with the permanent magnets 74a is also rotated in the direction opposite to the magnetic field rotation direction.

Figure 27:
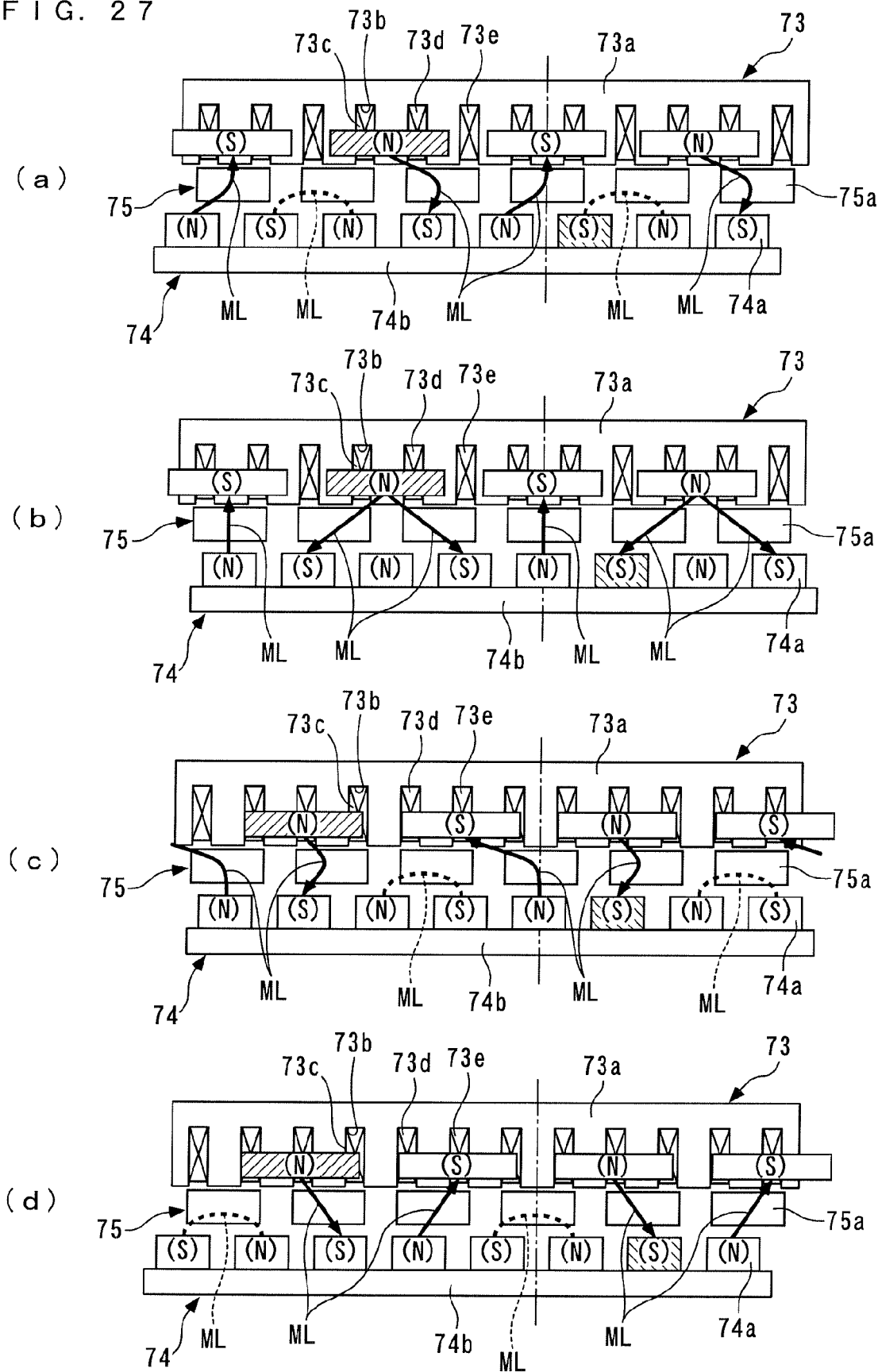
FIG. 27 Diagrams illustrating a continuation of the operation illustrated in FIG. 26.
Figure 28:
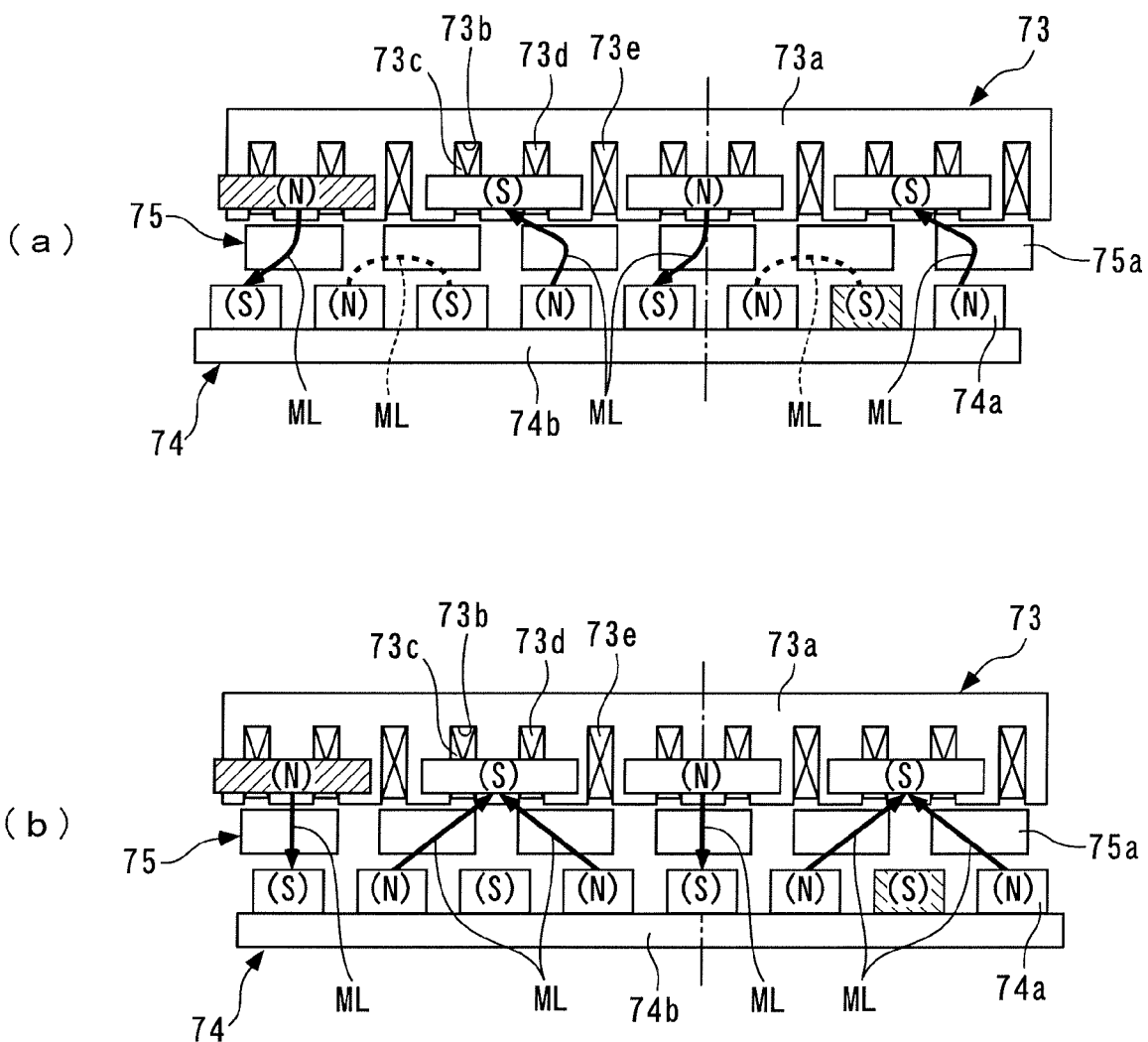
FIG. 28 Diagrams illustrating a continuation of the operation illustrated in FIG. 27.

As the second rotating magnetic field further rotates, a sequence of the above-described operations, that is, the operations that "the magnetic force lines ML are bent and the permanent magnets 74*a* are each positioned forward of an extension of a line connecting between a second armature magnetic pole and a core 75*a* which are connected to each other by an associated one of the magnetic force lines ML, in the magnetic field rotation direction→the magnetic forces act on the permanent magnets 74*a* in such a manner that the magnetic force lines ML are made straight→the permanent magnets 74*a* and the third rotor 74 rotate in the direction opposite to the magnetic field rotation direction" are repeatedly performed as shown in FIGS. 27(*a*) to 27(*d*), and FIGS. 28(*a*) and 28(*b*). As described above, in the case where electric power is supplied to the second stator 73 in the state of the fourth rotor 75 being held unrotatable, the above-described action of the magnetic forces caused by the magnetic force lines ML converts electric power supplied to the second stator 73 to motive power, and outputs the motive power from the third rotor 74.

FIG. 28(*b*) shows a state in which the second armature magnetic poles have rotated from the FIG. 26(*a*) state through the electrical angle of 2π. As is apparent from a comparison between FIG. 28(*b*) and FIG. 26(*a*), it is understood that the permanent magnets 74*a* have rotated in the opposite direction through ½ of a rotational angle of the second armature magnetic poles. This agrees with the fact that by substituting $\omega e4=0$ into the aforementioned equation (47), $-\omega e3=\omega mf/\beta=\omega mf/2$ is obtained.

FIGS. 29 and 30 show results of a simulation of control in which the numbers of the second armature magnetic poles, the cores 75*a*, and the second magnet magnetic poles are set to 16, 18 and 20, respectively; the third rotor 74 is held unrotatable; and motive power is output from the fourth rotor 75 by supplying electric power to the second stator 73. FIG. 29 shows an example of changes in the U-phase to W-phase counter-electromotive force voltages Vcu to Vcw during a time period over which the fourth rotor electrical angle θe4 changes from 0 to 2π.

In this case, from the fact that the third rotor 74 is held unrotatable and the fact that the pole pair numbers of the second armature magnetic poles and the second magnet magnetic poles are equal to 8 and 10, respectively, and from the aforementioned equation (47), the relationship between the magnetic field electrical angular velocity ωmf and the third and fourth rotor electrical angular velocities ωe3 and ωe4 is expressed by ωmf=2.25·ωe4. As shown in FIG. 29, during a time period over which the fourth rotor electrical angle θ e4 changes from 0 to 2π, the U-phase to W-phase counter-electromotive force voltages Vcu to Vcw are generated over approximately 2.25 repetition periods thereof. Further, FIG. 29 shows changes in the U-phase to W-phase counter-electromotive force voltages Vcu to Vcw, as viewed from the fourth rotor 75. As shown in the figure, with the fourth rotor electrical angle θe4 as the horizontal axis, the counter-electromotive force voltages are arranged in the order of the W-phase counter-electromotive force voltage Vcw, the V-phase counter-electromotive force voltage Vcv, and the U-phase counter-electromotive force voltage Vcu. This represents that the fourth rotor 75 rotates in the magnetic field rotation direction. The simulation results described above with reference to FIG. 29 agree with the relationship of ωmf=2.25·ωe4, based on the aforementioned equation (47).

Further, FIG. 30 shows an example of changes in the second driving equivalent torque TSE2, and the third and fourth rotor-transmitted torques TR3 and TR4. In this case, from the fact that the pole pair numbers of the second armature magnetic poles and the second magnet magnetic poles are equal to 8 and 10, respectively, and from the aforementioned equation (54), the relationship between the second driving equivalent torque TSE2, and the third and fourth rotor-transmitted torques TR3 and TR4 is represented by TSE2=TR3/1.25=−TR4/2.25. As shown in FIG. 30, the second driving equivalent torque TSE2 is approximately equal to −TREF; the third rotor-transmitted torque TR3 is approximately equal to 1.25·(−TREF); and the fourth rotor-transmitted torque TR4 is approximately equal to 2.25·TREF. This symbol TREF represents a predetermined torque value (e.g. 200 Nm). The simulation results described above with reference to FIG. 30 agree with the relationship of TSE2=TR3/1.25=−TR4/2.25, based on the aforementioned equation (54).

Figure 31:
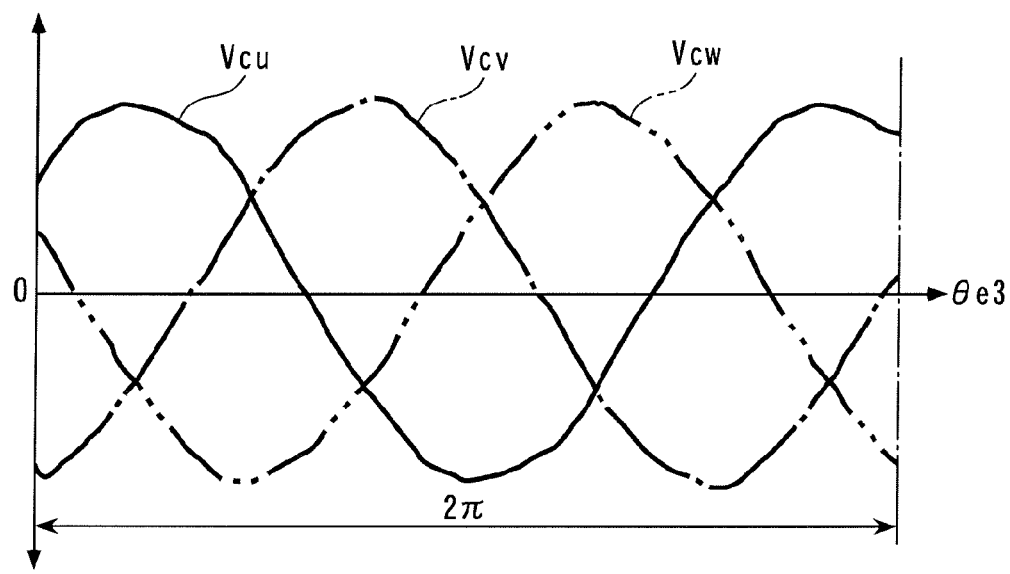
FIG. 31 A diagram illustrating an example of changes in U-phase to W-phase counter-electromotive force voltages in the second rotating machine appearing in FIG. 15, in a case where the number of the second armature magnetic poles, the number of the cores and the number of the second magnet magnetic poles are set to 16, 18 and 20, respectively, and the fourth rotor is held unrotatable.
Figure 32:
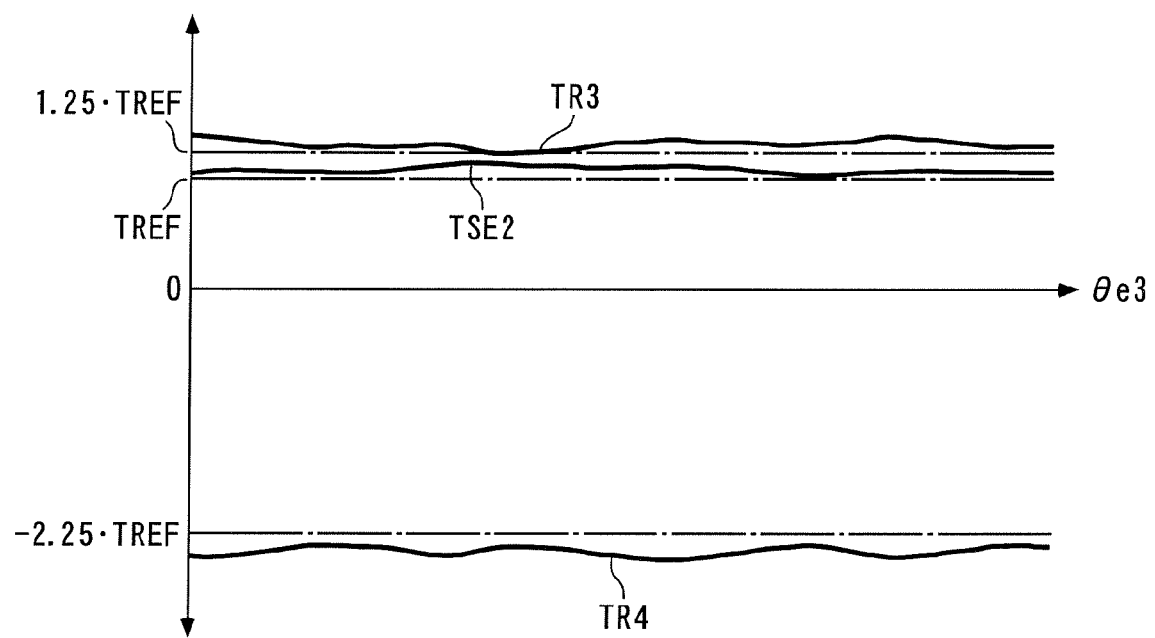
FIG. 32 A diagram illustrating an example of changes in the second driving equivalent torque and the third and fourth rotor-transmitted torques in the second rotating machine appearing in FIG. 15, in the case where the number of the second armature magnetic poles, the number of the cores and the number of the second magnet magnetic poles are set to 16, 18 and 20, respectively, and the fourth rotor is held unrotatable.

FIGS. 31 and 32 show results of a simulation of control in which the numbers of the second armature magnetic poles, the cores 75*a*, and the second magnet magnetic poles are set in the same manner as in the cases illustrated in FIGS. 29 and 30; the fourth rotor 75 is held unrotatable in place of the third rotor 74; and motive power is output from the third rotor 74 by supplying electric power to the second stator 73. FIG. 31 shows an example of changes in the U-phase to W-phase counter-electromotive force voltages Vcu to Vcw during a time period over which the third rotor electrical angle θe3 changes from 0 to 2π.

In this case, from the fact that the fourth rotor 75 is held unrotatable, and the fact that the pole pair numbers of the second armature magnetic poles and the second magnet magnetic poles are equal to 8 and 10, respectively, and from the aforementioned equation (47), the relationship between the magnetic field electrical angular velocity ωmf, and the third and fourth rotor electrical angular velocities ωe3 and ωe4 is expressed by ωmf=−1.25·ωe3. As shown in FIG. 31, during a time period over which the third rotor electrical angle θe3 changes from 0 to 2π, the U-phase to W-phase counter-electromotive force voltages Vcu to Vcw are generated over approximately 1.25 repetition periods thereof. Further, FIG. 31 shows changes in the U-phase to W-phase counter-electromotive force voltages Vcu to Vcw, as viewed from the third rotor 74. As shown in the figure, with the third rotor electrical angle θe3 as the horizontal axis, the counter-electromotive force voltages are arranged in the order of the U-phase counter-electromotive force voltage Vcu, the V-phase counter-electromotive force voltage Vcv, and the W-phase counter-electromotive force voltage Vcw. This represents that the third rotor 74 rotates in the direction opposite to the magnetic field rotation direction. The simulation results described above with reference to FIG. 31 agree with the relationship of ωmf=−1.25·ωe3, based on the aforementioned equation (47).

Further, FIG. 32 shows an example of changes in the second driving equivalent torque TSE2 and the third and fourth rotor-transmitted torques TR3 and TR4. Also in this case, similarly to the FIG. 30 case, the relationship between the second driving equivalent torque TSE2, and the third and fourth rotor-transmitted torques TR3 and TR4 is represented by TSE2=TR3/1.25=−TR4/2.25 from the aforementioned equation (54). As shown in FIG. 32, the second driving equivalent torque TSE2 is approximately equal to TREF; the third rotor-transmitted torque TR3 is approximately equal to 1.25·TREF; and the fourth rotor-transmitted torque TR4 is approximately equal to −2.25·TREF. The simulation results described above with reference to FIG. 32 agree with the relationship of TSE2=TR3/1.25=−TR4/2.25, based on the aforementioned equation (54).

As described above, in the second rotating machine 71, when the second rotating magnetic field is generated by supplying electric power to the second stator 73, magnetic force lines ML are generated in a manner connecting between the aforementioned second magnet magnetic poles, the cores 75a, and the second armature magnetic poles, and the action of the magnetism of the magnetic force lines ML converts the electric power supplied to the second stator 73 to motive power. The motive power is output from the third rotor 74 or the fourth rotor 75, and there hold the aforementioned relationship between the electrical angular velocities and relationship between the torques. Therefore, when motive power is input to at least one of the third and fourth rotors 74 and 75 in a state where electric power is not being supplied to the second stator 73, to thereby cause the same to rotate with respect to the second stator 73, electric power is generated in the second stator 73, the generated electric power is output from the second stator 73, and the second rotating magnetic field is generated. In this case as well, such magnetic force lines ML that connect between the second magnet magnetic poles, the cores 75a, and the second armature magnetic poles are generated, and the action of the magnetism of the magnetic force lines ML causes the electrical angular velocity relationship shown in the equation (47) and the torque relationship shown in the equation (54) to hold.

That is, assuming that torque equivalent to the generated electric power and the magnetic field electrical angular velocity ωmf is represented by the second electric power-generating equivalent torque TGE2, the relationship shown in the equation (54) also holds between the second electric power-generating equivalent torque TGE2 and the third and fourth rotor-transmitted torques TR3 and TR4. As is apparent from the above, the second rotating machine 71 according to the present embodiment has the same functions as those of an apparatus formed by combining a planetary gear unit and a general one-rotor-type rotating machine.

Further, in the second rotating machine 71, the relationship between the rotational speed of the second rotating magnetic field (hereinafter referred to as the "second magnetic field rotational speed) NMF2, the rotational speed of the third rotor 74 (hereinafter referred to as the "third rotor rotational speed") NR3, and the rotational speed of the fourth rotor 75 (hereinafter referred to as the "fourth rotor rotational speed") NR4 holds if m (the number of the second magnet magnetic poles p/the number of the second armature magnetic poles q)≠1.0, insofar as the equation (47) is satisfied. Furthermore, the relationship between the second driving equivalent torque TSE2 (the second electric power-generating equivalent torque TGE2), and the third and fourth rotor-transmitted torques TR3 and TR4 holds if p/q≠ 1.0, insofar as the equation (54) is satisfied. Therefore, by setting β(=a/c) in these equations (47) and (54), that is, the ratio of the pole pair number a of the second magnet magnetic poles to the pole pair number c of the second armature magnetic poles (hereinafter referred to as the "second pole pair number ratio"), it is possible to freely set the relationship between the second magnetic field rotational speed NMF2, and the third and fourth rotor rotational speeds NR3 and NR4, and the relationship between the second driving equivalent torque TSE2 (the second electric power-generating equivalent torque TGE2), and the third and fourth rotor-transmitted torques TR3 and TR4, thereby making it possible to enhance the degree of freedom in design of the second rotating machine 71. The same advantageous effects can be obtained also when the number of phases of the coils 73c to 73e of the second stator 73 is other than the aforementioned value of 3.

Note that in the present embodiment, since the second pole pair number ratio β=2.0 holds, the relationship between the second magnetic field rotational speed NMF2, and the third and fourth rotor rotational speeds NR3 and NR4 is represented by NMF2=3·NR4−2·NR3, and the relationship between the second driving equivalent torque TSE2 (the second electric power-generating equivalent torque TGE2), and the third and fourth rotor-transmitted torques TR3 and TR4 is represented by TSE2(TGE2)=TR3/2=−TR4/3.

Through the control of the second PDU 42 and the VCU 43, the ECU 2 controls the electric power supplied to the second stator 73 and the second magnetic field rotational speed NMF2 of the second rotating magnetic field generated in accordance with the supply of electric power. Further, through the control of the second PDU 42 and the VCU 43, the ECU 2 controls the electric power generated by the second stator 73 and the second magnetic field rotational speed NMF2 of the second rotating magnetic field generated along with the electric power generation.

Figure 16:
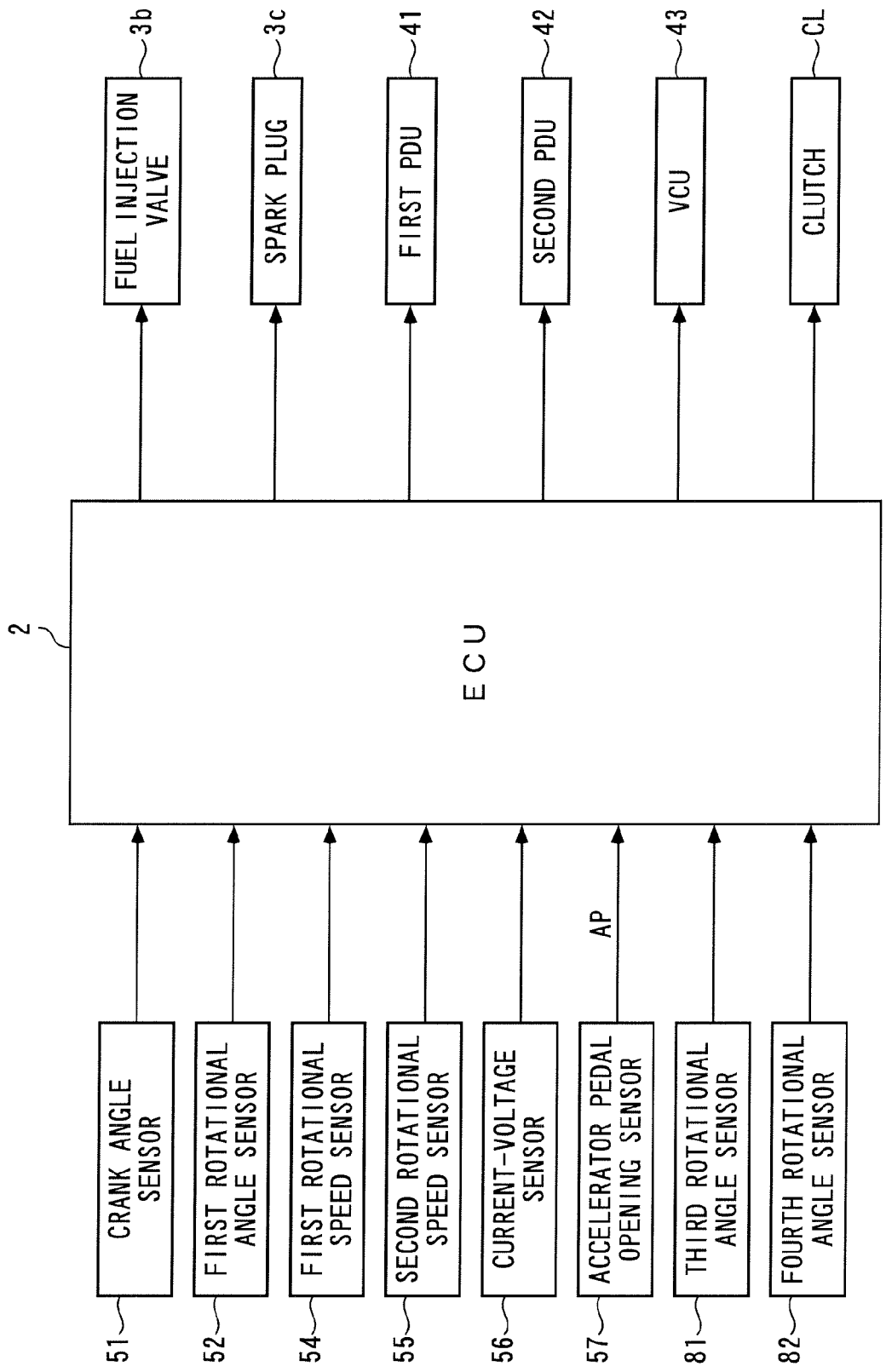
FIG. 16 A block diagram showing an ECU etc. mounted on the vehicle shown in FIG. 15.

Further, as shown in FIG. 16, a third rotational angle sensor 81 and a fourth rotational angle sensor 82 are connected to the ECU 2. The third rotational angle sensors 81 and 82 detect the rotational angular position of the third rotor 74 with respect to the second stator 73 and the rotational angular position of the fourth rotor 75 with respect to the second stator 73, respectively, to deliver respective signals indicative of the detected rotational angular positions of the third and fourth rotors 74 and 75, to the ECU 2. The ECU 2 calculates the third and fourth rotor rotational speeds NR3 and NR4 based on the detected rotational angular positions of the third and fourth rotors 74 and 75, respectively.

Figure 33:
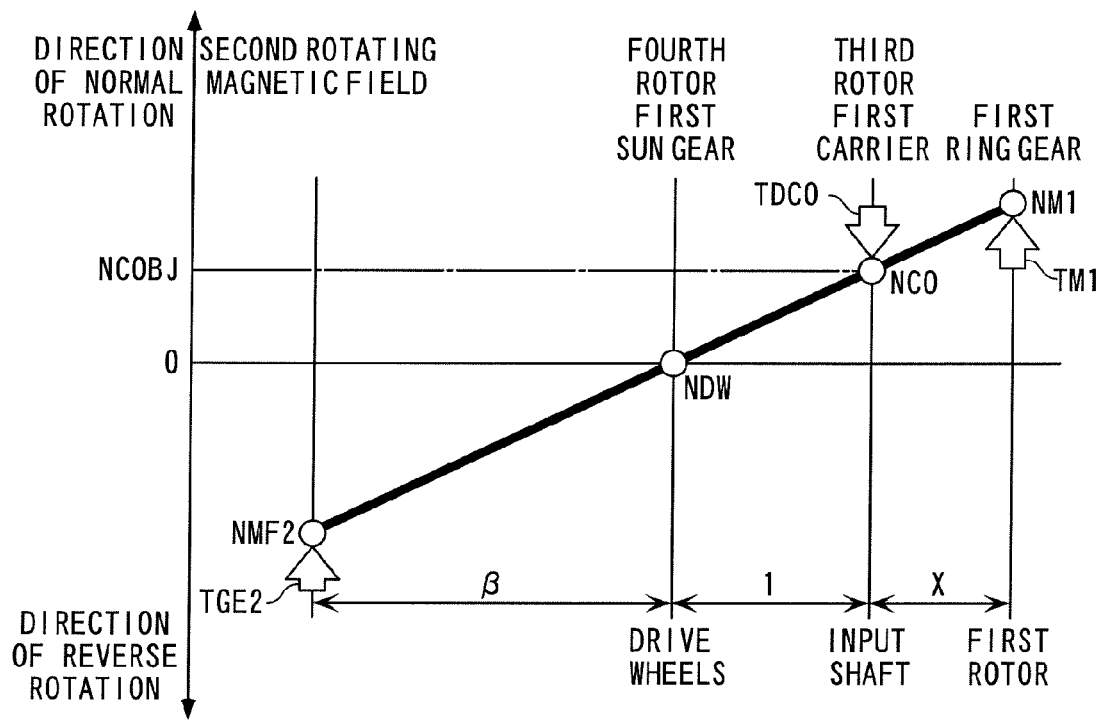
FIG. 33 A velocity collinear chart illustrating an example of the relationship between the rotational speeds of various types of rotary elements of the vehicle shown in FIG. 15 and the relationship between torques thereof, during the vehicle stoppage-time compressor drive mode.

The ECU 2 controls the operations of the engine 3, the clutch CL, and the first and second rotating machines 11 and 71 based on the detection signals from the aforementioned sensors 51, 54 to 57, 81 and 82 of various types according to control programs stored in the ROM. Similarly to the third embodiment, this causes the vehicle VE4 to be operated in the vehicle stoppage-time compressor drive mode, the compressor drive-time EV standing start mode, the EV travel-time compressor drive mode, and the EV travel-time ENG start mode. In this case, due to the above-described difference in construction from the third embodiment, operations in these operation modes are different from the operations in the case of the third embodiment, and hereafter, a description will be given of the different points. Note that also in the following description, similarly to the third embodiment, a velocity collinear chart as shown in FIG. 33 is used. First, a description is given of this velocity collinear chart.

As is apparent from the above-described relationship of connections between the various types of rotary elements of the vehicle VE4, the rotational speed of the first sun gear S1 and the fourth rotor rotational speed NR4 are equal to each other, and are equal to the drive wheel rotational speed NDW provided that a change in speed by the planetary gear unit PGS or the like is ignored. Further, the rotational speed of the first carrier C1 and the third rotor rotational speed NR3 are equal to each other, and are equal to the input shaft rotational speed NCO provided that a change in speed by the belt BE and the first and second pulleys PU1 and PU2 is ignored. Furthermore, the engagement and disengagement of the clutch CL cause the crankshaft 3a to be connected to and disconnected from the input shaft 32, the first carrier C1, and the third rotor 74. Further, the second magnetic field rotational speed NMF2, and the third and fourth rotor rotational speeds NR3 and NR4 are in a predetermined collinear relationship expressed by the aforementioned equation (47).

From the above, during disengagement of the clutch CL, the relationship between the input shaft rotational speed NCO, the drive wheel rotational speed NDW, the first rotating machine rotational speed NM1, and the second magnetic field rotational speed NMF2 is represented by a velocity collinear chart as shown in FIG. 33. Hereinafter, various types of operation modes will be described with reference to the velocity collinear chart shown in FIG. 33, in order from the vehicle stoppage-time compressor drive mode.

[Vehicle Stoppage-Time Compressor Drive Mode]

In the vehicle stoppage-time compressor drive mode, the clutch CL is disengaged, thereby disconnecting the crankshaft 3a from the input shaft 32, the first carrier C1, and the third rotor 74. In this state, electric power is supplied from the battery 44 to the first stator 12 of the first rotating machine 11 to cause the first rotor 13 to perform normal rotation. Further, electric power is generated in the second stator 73 using motive power transmitted to the third rotor 74, as described hereinafter, and the generated electric power is further supplied to the first stator 12. FIG. 33 illustrates the relationship between the rotational speeds of the various types of rotary elements and the relationship between torques thereof, during the vehicle stoppage-time compressor drive mode.

As is apparent from FIG. 33, when the first powering torque TM1 is transmitted, the first ring gear R1 performs normal rotation together with the first rotor 13. Further, the first powering torque TM1 transmitted to the first ring gear R1 is transmitted to the third rotor 74 via the first carrier C1, using the load of the drive wheels DW and DW acting on the first sun gear S1 as a reaction force, thereby causing the third rotor 74 to perform normal rotation. Electric power is generated in the second stator 73, as described above, using the motive power thus transmitted to the third rotor 74, and the second rotating magnetic field generated along with the electric power generation performs reverse rotation. The second electric power-generating equivalent torque TGE2 acts on the second magnetic field rotational speed NMF2 of the second rotating magnetic field performing reverse rotation to lower the second magnetic field rotational speed NMF2. As a consequence, the first powering torque TM1 is transmitted to the input shaft 32, using the second electric power-generating equivalent torque TGE2 as a reaction force, to thereby cause the input shaft 32 to perform normal rotation.

Furthermore, in the vehicle stoppage-time compressor drive mode, the electric power supplied to the first stator 12 and the electric power generated in the second stator 73 are controlled such that the compressor-transmitted torque TDCO becomes equal to the target torque TCOBJ. Specifically, the electric power supplied to the first stator 12 is controlled such that there holds the following equation (55) between the first powering torque TM1 and the target torque TCOBJ. Further, the electric power generated in the second stator 73 is controlled such that there holds the following equation (56) between the second electric power-generating equivalent torque TGE2 and the target torque TCOBJ.

$$TM1 = -(\beta+1)TCOBJ/((\beta+1+X)) \quad (55)$$

$$TGE2 = -X \cdot TCOBJ/(X+1+\beta) \quad (56)$$

Further, the first rotating machine rotational speed NM1 and the second magnetic field rotational speed NMF2 are controlled such that the input shaft rotational speed NCO becomes equal to the target rotational speed NCOBJ and the drive wheel rotational speed NDW becomes equal to 0, i.e. such that there hold the aforementioned equation (8) and the following equation (57):

$$NMF2 = -\beta NCOBJ \quad (57)$$

[Compressor Drive-Time EV Standing Start Mode]

Figure 34:
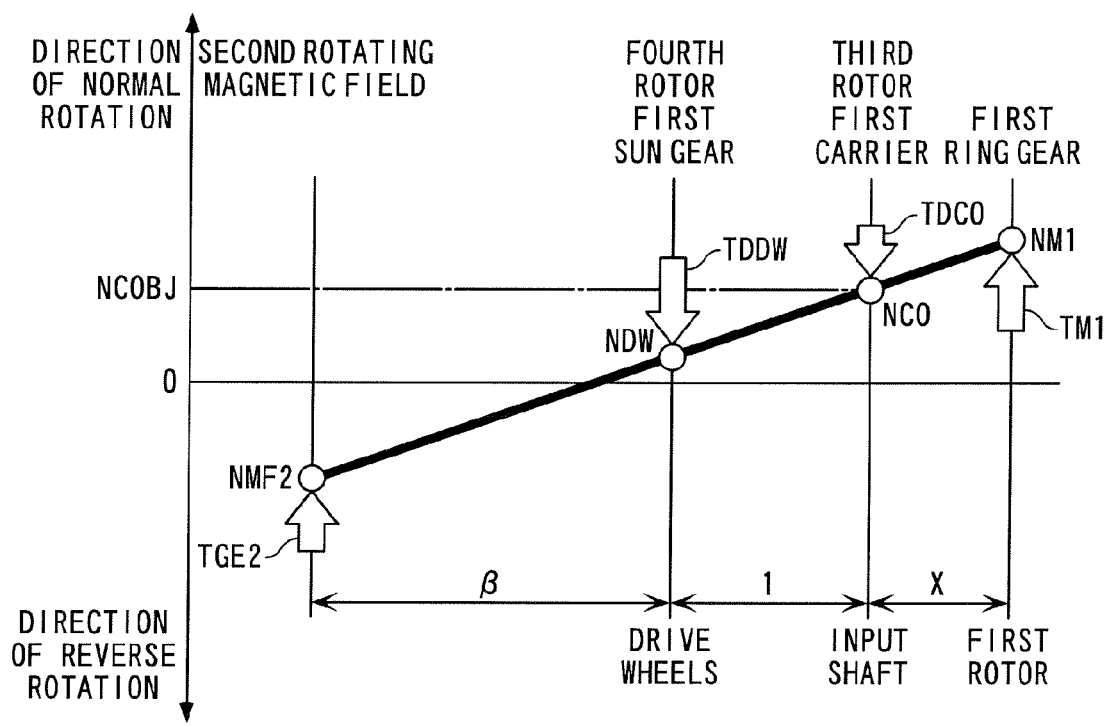
FIG. 34 A velocity collinear chart illustrating an example of the relationship between the rotational speeds of the various types of rotary elements of the vehicle shown in FIG. 15 and the relationship between torques thereof, at the start of the compressor drive-time EV standing start mode.

In the compressor drive-time EV standing start mode, similarly to the case of the vehicle stoppage-time compressor drive mode, in the state where the clutch CL is disengaged, thereby disconnecting the crankshaft 3a from the input shaft 32, the first carrier C1 and the third rotor 74, electric power is supplied from the battery 44 to the first stator 12 to cause the first rotor 13 to perform normal rotation, and the electric power supplied to the first stator 12 is increased. Further, electric power is generated in the second stator 73 by using motive power transmitted to the third rotor 74 to further supply the generated electric power to the first stator 12, and the second magnetic field rotational speed NMF2 is controlled such that it becomes equal to 0. FIG. 34 illustrates the relationship between the rotational speeds of the various types of rotary elements and the relationship between torques thereof, in this case.

By controlling the operations of the first and second rotating machines 11 and 71 as described above, motive power is transmitted not only to the input shaft 32 but also to the drive wheels DW and DW. As shown in FIG. 34, this causes the drive wheels DW and DW to perform normal rotation to increase the drive wheel rotational speed NDW, whereby the vehicle VE4 makes a standing start.

In the compressor drive-time EV standing start mode, the electric power supplied to the first stator 12 and the electric power generated in the second stator 73 are controlled such that the compressor-transmitted torque TDCO becomes equal to the target torque TCOBJ, and the drive wheel-transmitted torque TDDW becomes equal to the above-described demanded torque TREQ. Specifically, the electric power supplied to the first stator 12 is controlled such that there holds the following equation (58) between the first powering torque TM1, the target torque TCOBJ, and the demanded torque TREQ. Further, the electric power generated in the second stator 73 is controlled such that there holds the following equation (59) between the second electric power-generating equivalent torque TGE2, the target torque TCOBJ, and the demanded torque TREQ.

$$TM1 = -\{(\beta+1)TCOBJ + \beta \cdot TREQ\}/(\beta+1+X) \quad (58)$$

$$TGE2 = -\{X \cdot TCOBJ + (X+1)TREQ\}/(X+1+\beta) \quad (59)$$

Furthermore, the first rotating machine rotational speed NM1 and the second magnetic field rotational speed NMF2 are controlled such that the input shaft rotational speed NCO becomes equal to the target rotational speed NCOBJ, while maintaining the drive wheel rotational speed NDW at the time. Specifically, the first rotating machine rotational speed NM1 and the second magnetic field rotational speed NMF2 are controlled such that the aforementioned equation (12) and the following equation (60) hold between the drive wheel rotational speed NDW and the target rotational speed NCOBJ, respectively.

$$NMF2 = (\beta+1)NDW - \beta \cdot NCOBJ \quad (60)$$

Figure 35:
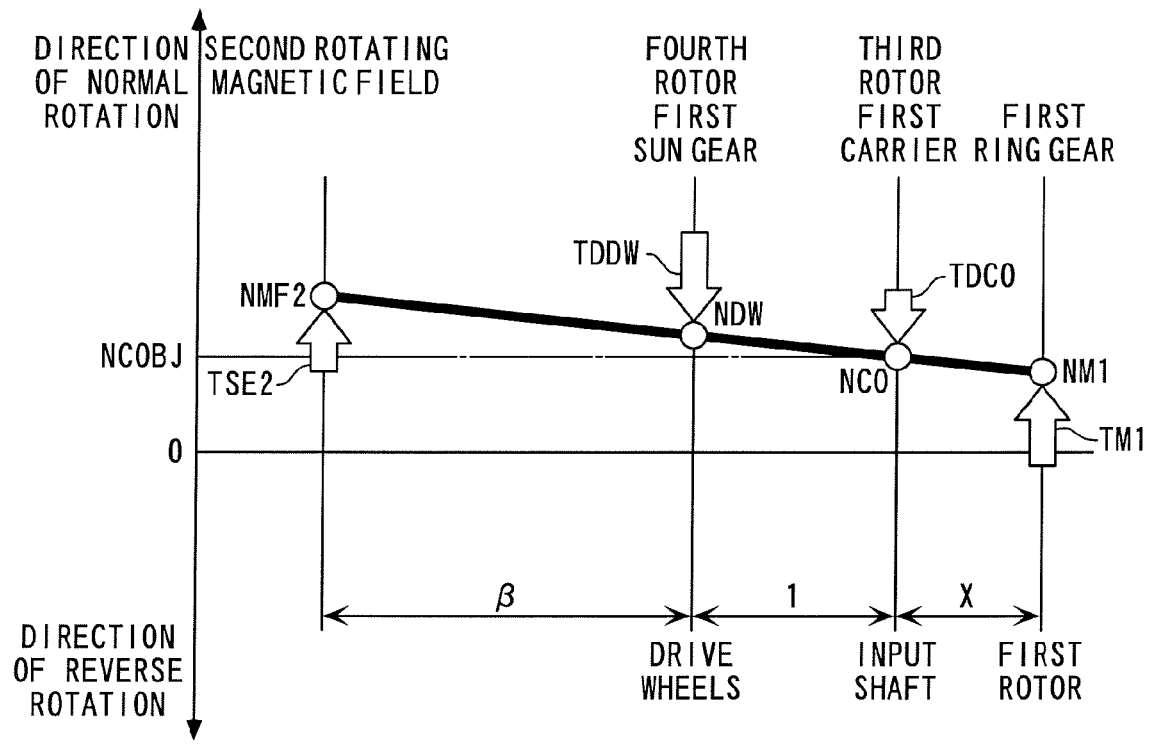
FIG. 35 A velocity collinear chart illustrating an example of the relationship between the rotational speeds of the various types of rotary elements of the vehicle shown in FIG. 15 and the relationship between torques thereof, after the start of the compressor drive-time EV standing start mode.

Further, in the compressor drive-time EV standing start mode, after the second magnetic field rotational speed NMF2 has become equal to 0, electric power is supplied from the battery 44 not only to the first stator 12 but also to the second stator 73, to cause the second rotating magnetic field to perform normal rotation. FIG. 35 illustrates the relationship between the rotational speeds of the various types of rotary elements and the relationship between the torques thereof, in this case.

In this case, as is apparent from FIG. 35, the first powering torque TM1 and the second driving equivalent torque TSE2 are combined in the first planetary gear unit PS1 and the second rotating machine 71, and the combined torque is transmitted to the input shaft 32 and the drive wheels DW and DW, whereby the input shaft 32 and the drive wheels DW and DW continue to perform normal rotation. Further, as is apparent from a comparison between FIG. 34 and FIG. 35, the electric power supplied to the first stator 12 is controlled such that the aforementioned equation (58) holds, and the electric power supplied to the second stator 73 is controlled such that there holds the following equation (61) obtained by replacing the second electric power-generating equivalent torque TGE2 of the aforementioned equation (59) with the second driving equivalent torque TSE2. Furthermore, the first rotating machine rotational speed NM1 and the second magnetic field rotational speed NMF2 are controlled such that the aforementioned equations (12) and (60) hold, respectively.

$$TSE2 = -\{X \cdot TCOBJ + (X+1)TREQ\}/(X+1+\beta) \tag{61}$$

[EV Travel-Time Compressor Drive Mode]

In the EV travel-time compressor drive mode, similarly to the case of the compressor drive-time EV standing start mode, in the state where the clutch CL is disengaged, thereby disconnecting the crankshaft 3*a* from the input shaft 32, the first carrier C1, and the third rotor 74, electric power is supplied from the battery 44 to the first and second stators 12 and 73 to cause the first rotor 13 and the second rotating magnetic field to perform normal rotation. This causes combined torque formed by combining the first powering torque TM1 and the second driving equivalent torque TSE2 to be transmitted to the input shaft 32 and the drive wheels DW and DW, whereby the input shaft 32 and the drive wheels DW and DW continue to perform normal rotation.

Further, in the EV travel-time compressor drive mode, the electric power supplied to the first and second stators 12 and 73 is controlled such that the aforementioned equations (58) and (61) hold, and the first rotating machine rotational speed NM1 and the second magnetic field rotational speed NMF2 are controlled such that the aforementioned equations (12) and (60) hold, respectively.

[EV Travel-Time ENG Start Mode]

In the EV travel-time ENG start mode, when it is immediately after a shift from the EV travel-time compressor drive mode, in the state where the clutch CL is disengaged, thereby disconnecting the crankshaft 3*a* from the input shaft 32, the first carrier C1, and the third rotor 74, electric power is supplied from the battery 44 to the first and second stators 12 and 73 to cause the first rotor 13 and the second rotating magnetic field to perform normal rotation. Further, by controlling the electric power supplied to the first and second stators 12 and 73, the second magnetic field rotational speed NMF2 is increased and the first rotating machine rotational speed NM1 is controlled such that it becomes equal to 0, so as to maintain the drive wheel rotational speed NDW at the time.

Figure 36:
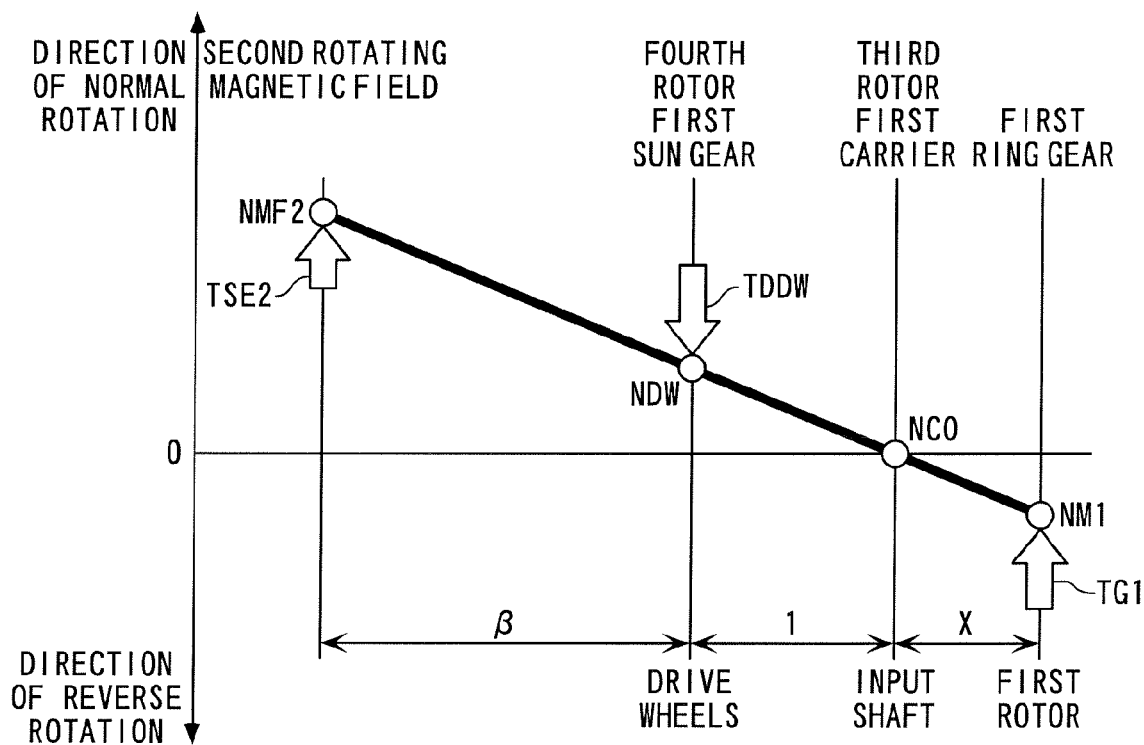
FIG. 36 A velocity collinear chart illustrating an example of the relationship between the rotational speeds of the various types of rotary elements of the vehicle shown in FIG. 15 and the relationship between torques thereof, at the start of the EV travel-time ENG start mode.

When the first rotating machine rotational speed NM1 has become equal to 0, the supply of electric power from the battery 44 to the first stator 12 is stopped, and electric power is generated in the first stator 12 using motive power transmitted from the second rotating machine 71 to the first rotor 13 via the first planetary gear unit PS1. The generated electric power is further supplied to the second stator 73. In this case, the electric power generated in the first stator 12 and the electric power supplied to the second stator 73 are controlled, whereby the second magnetic field rotational speed NMF2 is increased and the first rotating machine rotational speed NM1 is increased in the direction of reverse rotation, so as to maintain the drive wheel rotational speed NDW at the time. FIG. 36 illustrates the relationship between the rotational speeds of the various types of rotary elements and the relationship between the torques thereof, in this case.

As is apparent from FIG. 36, the first electric power generation torque TG1 acts to lower the first rotating machine rotational speed NM1 of the first rotor 13 performing reverse rotation. Further, the second driving equivalent torque TSE2 is transmitted to the drive wheels DW and DW, using the first electric power generation torque TG1 as a reaction force. In this case, by controlling the electric power generated in the first stator 12 and the electric power supplied to the second stator 73, the first electric power generation torque TG1 and the second driving equivalent torque TSE2 are controlled such that the drive wheel-transmitted torque TDDW becomes equal to the demanded torque TREQ. Further, the first rotating machine rotational speed NM1 and the second magnetic field rotational speed NMF2 are controlled such that the drive wheel rotational speed NDW at the time is maintained, and at the same time the rotational speed of the first carrier C1 and the third rotor rotational speed NR3 become equal to 0.

Specifically, the electric power generated in the first stator 12 is controlled such that there holds the following equation (62) between the first electric power generation torque TG1 and the demanded torque TREQ. Further, the electric power supplied to the second stator 73 is controlled such that there holds the following equation (63) between the second powering torque TM2 and the demanded torque TREQ.

$$TG1 = -\beta \cdot TREQ/(\beta+1+X) \tag{62}$$

$$TSE2 = -(X+1)TREQ/(X+1+\beta) \tag{63}$$

Furthermore, the first rotating machine rotational speed NM1 and the second magnetic field rotational speed NMF2 are controlled such that there hold the aforementioned equation (17) and the following equation (64):

$$NMF2 = (\beta+1)NDW \tag{64}$$

Figure 37:
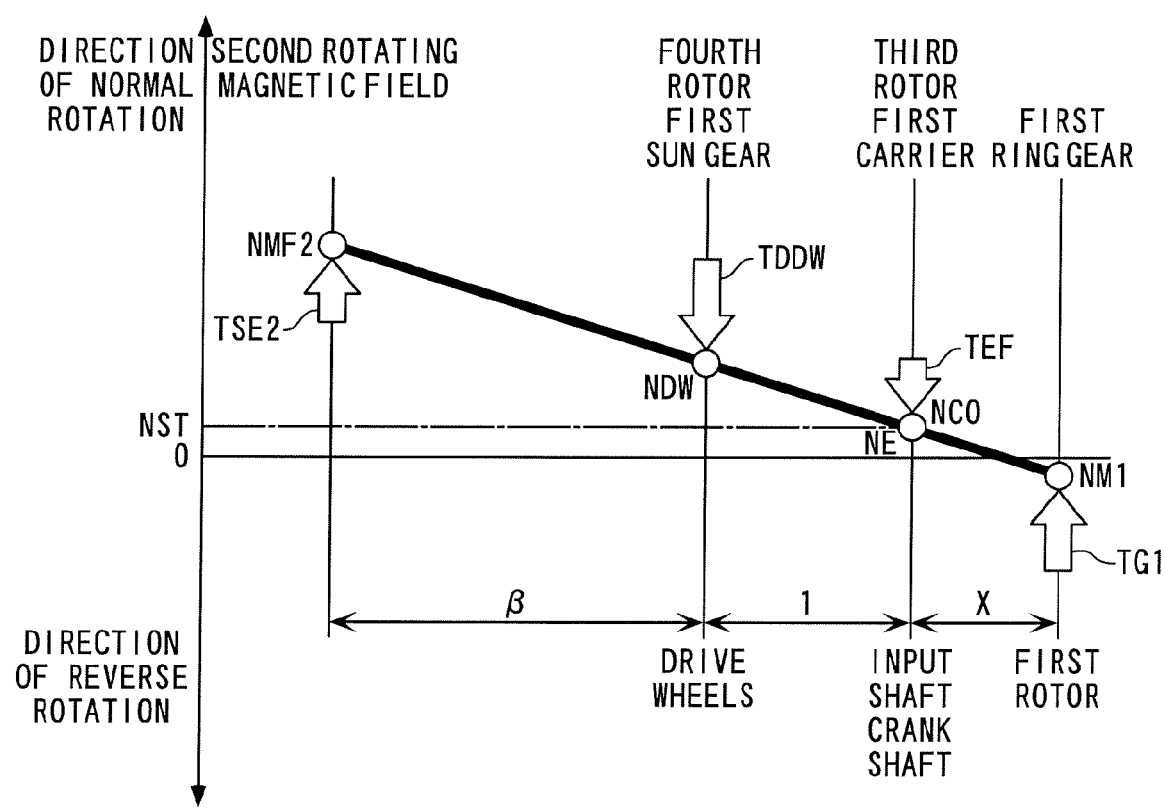
FIG. 37 A velocity collinear chart illustrating an example of the relationship between the rotational speeds of the various types of rotary elements of the vehicle shown in FIG. 15 and the relationship between torques thereof, after the start of the EV travel-time ENG start mode.

When the rotational speed of the first carrier C1 and the third rotor rotational speed NR3 have become equal to 0, the clutch CL, which has been disengaged, is engaged, thereby connecting the crankshaft 3*a* to the first carrier C1 and the third rotor 74. Further, the electric power generated in the first stator 12 and the electric power supplied to the second stator 73 are controlled, whereby while maintaining the drive wheel rotational speed NDW at the time, the first rotating machine rotational speed NM1 of the first rotor 13 performing reverse rotation is controlled such that it becomes equal to 0, and the second magnetic field rotational speed NMF2 of the second magnetic field performing normal rotation is reduced. FIG. 37 illustrates the relationship between the rotational speeds of the various types of rotary elements and the relationship between the torques thereof, in this case.

Through the above-described control of the clutch CL and the first and second rotating machines 11 and 71, torques are transmitted not only to the drive wheels DW and DW but also to the crankshaft 3*a* to cause them to perform normal rotation. As a consequence, the drive wheels DW and DW to continue to perform normal rotation, and the crankshaft 3*a* performs normal rotation to increase the engine speed NE. In this state, the ignition operations of the fuel injection valves 3*b* and the spark plugs 3*c* of the engine 3 are controlled to thereby start the engine 3 at rest.

In this case, by controlling the electric power generated in the first stator 12 and the electric power supplied to the second stator 73, the first electric power generation torque TG1 and the second driving equivalent torque TSE2 are controlled such that the drive wheel-transmitted torque TDDW becomes equal to the demanded torque TREQ. Further, the first rotating machine rotational speed NM1 and the second magnetic field rotational speed NMF2 are controlled such that the engine speed NE becomes equal to the predetermined value NST suitable for starting the engine 3, while maintaining the drive wheel rotational speed NDW at the time.

Specifically, the electric power generated in the first stator 12 is controlled such that there holds the following equation (65) between the first electric power generation torque TG1, the demanded torque TREQ, and the engine friction TEF. Further, the electric power supplied to the second stator 73 is controlled such that there holds the following equation (66) between the second driving equivalent torque TSE2, the demanded torque TREQ, and the engine friction TEF.

$$TG1=-\{\beta \cdot TREQ+(\beta+1)TEF\}/(\beta+1+X) \quad (65)$$

$$TSE2=-\{(X+1)TREQ+X \cdot TEF\}/(X+1+\beta) \quad (66)$$

Further, the first rotating machine rotational speed NM1 and the second magnetic field rotational speed NMF2 are controlled such that there hold the aforementioned equation (21) and the following equation (67):

$$NMF2=(\beta+1)NDW-\beta \cdot NST \quad (67)$$

Note that in the case of controlling the engine speed NE to the predetermined value NST as described above, when the drive wheel rotational speed NDW is relatively low, the direction of rotation of the first rotor 13 determined by the relationship between the two NST and NDW sometimes becomes the direction of normal rotation. In this case, electric power is supplied from the battery 44 to the first stator 12, and the first rotor 13 is caused to perform normal rotation. Further, the electric power supplied to the first stator 12 is controlled such that there holds an equation obtained by replacing the first electric power generation torque TG1 of the aforementioned equation (65) with the first powering torque TM1. Further, not only the engine friction TEF but also the load of the compressor 31 acts on the first carrier C1 and the third rotor 74, and hence in the EV travel-time ENG start mode, the operations of the first and second rotating machines 11 and 71 may be controlled according to the load of the compressor 31.

The above-described fourth embodiment corresponds to the invention as claimed in claims 1 and 5 to 8. Correspondence between various types of elements of the fourth embodiment and various types of elements of the invention as claimed in claims 1 and 5 to 8 (hereinafter referred to, generically, as the "third invention") is as follows: The vehicle VE4 and the drive wheels DW and DW of the fourth embodiment correspond to a moving apparatus and driven parts of the third invention, respectively. Further, the engine 3, the crankshaft 3a, the compressor 31, and the input shaft 32 of the fourth embodiment correspond to a prime mover, an output portion, an accessory, and an input portion of the third invention, respectively. Further, the ECU 2, the VCU 43, and the first and second PDUs 41 and 42 of the fourth embodiment correspond to a controller of the third invention. Furthermore, the second rotating machine 71 of the fourth embodiment corresponds to the restriction means of the invention as claimed in claim 1.

Further, the first planetary gear unit PS1 of the fourth embodiment corresponds to a power transmission mechanism of the third invention, and the first ring gear R1, the first carrier C1, and the first sun gear S1 of the fourth embodiment correspond to a first element, a second element, and a third element of the third invention, respectively. Furthermore, the second stator 73, and the third and fourth rotors 74 and 75 of the fourth embodiment correspond to a stator, and second and third rotors of the invention as claimed in claims 5 to 8, respectively, and the permanent magnets 74a and the cores 75a of the fourth embodiment correspond to magnets and soft magnetic material elements of the invention as claimed in claims 5 to 8, respectively. Further, the iron core 73a and the U-phase to W-phase coils 73c to 73e of the fourth embodiment correspond to an armature row of the invention as claimed in claims 6 to 8.

As described heretofore, according to the fourth embodiment, when the compressor 31 is driven in the state where the drive wheels DW and DW are at rest during stoppage of the engine 3, the vehicle stoppage-time compressor drive mode controls the operations of the first and second rotating machines 11 and 71 to thereby input motive power to the input portion 32, for driving the compressor 31, and restrict the drive wheel rotational speed NDW such that it becomes equal to 0. This makes it possible to properly drive the compressor 31 while positively preventing the drive wheels DW and DW from being driven. Further, in the vehicle stoppage-time compressor drive mode, both the first rotating machine rotational speed NM1 and the second magnetic field rotational speed NMF2 become higher than 0, so that it is possible to prevent the overheating of the first PDU 41, the first rotating machine 11, the second PDU 42, and the second rotating machine 71, and secure a sufficiently large torque of the first and second rotating machines 11 and 71.

Further, by setting the ratio between the number of the second armature magnetic poles, the number of the second magnet magnetic poles, and the number of the cores 75a as desired within a range satisfying a condition of $1:m:(1+m)/2$ ($m \neq 1.0$), it is possible to freely set a collinear relationship in rotational speed between the second rotating magnetic field and the third and fourth rotors 74 and 75. This makes it possible to enhance the degree of freedom in design of the second rotating machine 71.

For the same reason described above, by setting the aforementioned second pole pair number ratio 3 to a larger value, it is possible to set larger the distance between a straight line representing the fourth rotor rotational speed NR4 and a straight line representing the second magnetic field rotational speed NMF2 in the velocity collinear chart. This makes it possible to efficiently obtain the above-mentioned advantageous effects, i.e. the advantageous effects that it is possible to prevent the second PDU 42 and the second rotating machine 71 from being overheated and that it is possible to secure a sufficiently large torque of the second rotating machine 71.

Further, in the vehicle stoppage-time compressor drive mode, the clutch CL holds the crankshaft 3a in a state disconnected from the input shaft 32, the first carrier C1, and the third rotor 74, so that it is possible to prevent motive power from being transmitted from the first rotating machine 11 to the crankshaft 3a, thereby making it possible to improve driving efficiency in driving the compressor 31. Further, similarly to the first embodiment, in the EV travel-time compressor drive mode, the operations of the first and second rotating machines 11 and 71 are controlled such that the compressor-transmitted torque TDCO becomes equal to the target torque TCOBJ, and the input shaft rotational speed NCO becomes equal to the target rotational speed NCOBJ, and hence it is possible to properly drive the compressor 31 and reduce computation load on the ECU 2.

Further, in the compressor drive-time EV standing start mode and the EV travel-time compressor drive mode, the clutch CL holds the crankshaft 3a in a state disconnected from the input shaft 32, the first carrier C1, and the third rotor 74, so that it is possible to prevent motive power from being wastefully transmitted to the crankshaft 3a, and therefore it is possible to improve driving efficiency in driving the drive wheels DW and DW. Further, in the subsequent EV travel-time ENG start mode, by controlling the operations of the first and second rotating machines 11 and 71, the rotational speed of the first carrier C1 and the third rotor rotational speed NR3 are controlled such that they become equal to 0. When the rotational speed of the first carrier C1 and the third rotor rotational speed NR3 have become equal to 0, the clutch CL connects the crankshaft 3a to the input shaft 32, the first carrier C1, and the third rotor 74, and the engine 3 is started. Therefore, it is possible to properly start the engine 3 without causing a shock due to engagement of the clutch CL. This makes it possible to reduce energy required to drive the dog clutch used as the clutch CL.

Note that although in the fourth embodiment, the first carrier C1 and the third rotor 74 are directly connected to each other, if they are mechanically connected to the crankshaft 3a and the input shaft 32, they are not necessarily required to be directly connected to each other, and although the first sun gear S1 and the fourth rotor 75 are directly connected to each other, if they are mechanically connected to the drive wheels DW and DW, they are not necessarily required to be directly connected to each other. Further, although in the fourth embodiment, the first carrier C1 and the third rotor 74 are directly connected to the crankshaft 3a, they may be mechanically connected to the crankshaft 3a via gears, a pulley, a chain, a transmission, or the like. Furthermore, although in the fourth embodiment, the first carrier C1 and the third rotor 74 are connected to the input shaft 32 via the belt BE, and the first and second pulleys PU1 and PU2, they may be mechanically directly connected to the input shaft 32.

Further, although in the fourth embodiment, the first sun gear S1 and the fourth rotor 75 are connected to the drive wheels DW and DW via the chain CH and the differential gear DG, they may be mechanically directly connected to the drive wheels DW and DW. Furthermore, although in the fourth embodiment, the first ring gear R1 is directly connected to the first rotor 13, it may be mechanically connected to the first rotor 13 via gears, a pulley, a chain, a transmission, or the like.

Further, although in the fourth embodiment, the first ring gear R1 is connected to the first rotor 13, and the first sun gear S1 is connected to the drive wheels DW and DW, the relationship of the connections may be reversed, that is, the first ring gear R1 may be mechanically connected to the drive wheels DW and DW, and the first sun gear S1 may be mechanically connected to the first rotor 13. In this case, naturally, mechanical direct connection or mechanical connection using gears, a pulley, a chain, a transmission, or the like may be provided between the first ring gear R1 and the drive wheels DW and DW, and between the first sun gear S1 and the first rotor 13.

Furthermore, although in the fourth embodiment, the first pulley PU1 is provided on the first rotating shaft 61 between the clutch CL and the bearing B1, and the compressor 31 is disposed in the vicinity of the portion of the casing CA, where the second stator 73 is provided, the two PU1 and 31 may be provided e.g. in the following manner: The first pulley PU1 may be provided on the first rotating shaft 61 in the vicinity of the bearing B2, and the compressor 31 may be disposed in the vicinity of the portion of the casing CA, where the first stator 12 is provided.

Figure 38:
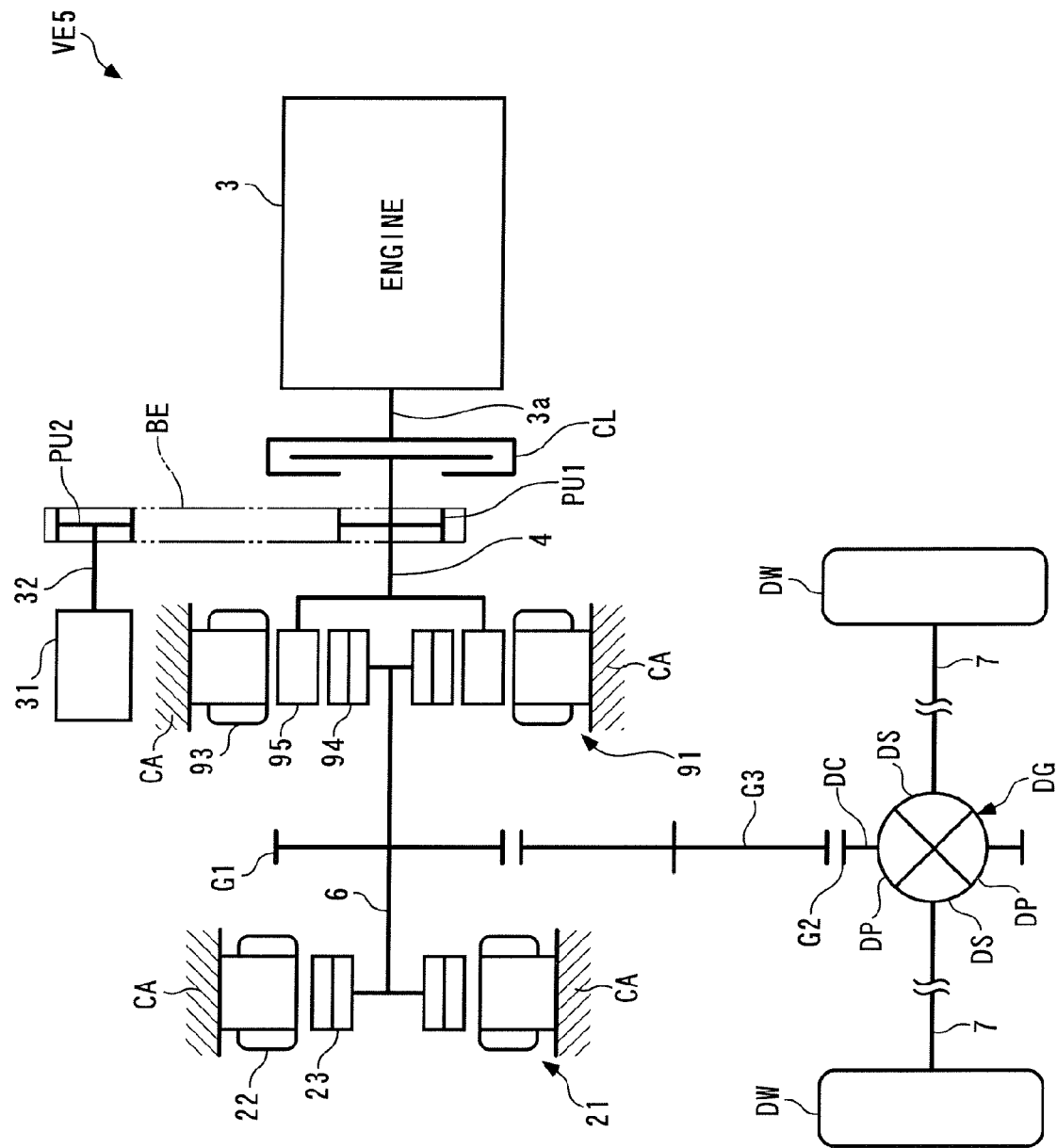
FIG. 38 A schematic view of a vehicle as a moving apparatus according to a fifth embodiment of the present invention.

Next, a vehicle VE5 as a moving apparatus according to a fifth embodiment of the present invention will be described with reference to FIG. 38. The vehicle VE5 is distinguished from the first embodiment mainly in that it includes a first rotating machine 91 in place of the first rotating machine 11 and the planetary gear unit PG. In FIG. 38 and other figures, referred to hereinafter, the same component elements as those of the first embodiment are denoted by the same reference numerals. The following description is mainly given of different points of the vehicle VE5 from the first embodiment.

Figure 41:
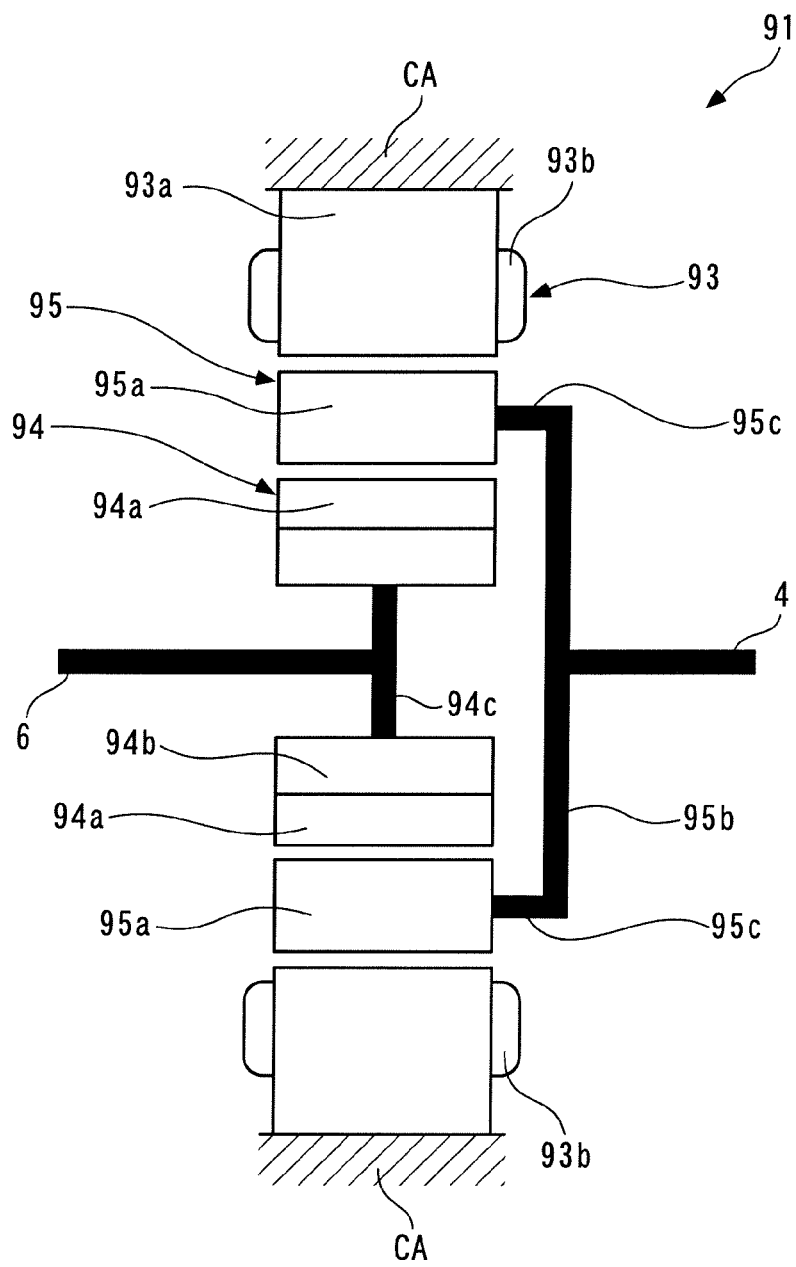
FIG. 41 An enlarged cross-sectional view of a first rotating machine appearing in FIG. 38.

The above-described first rotating machine 91 is configured similarly to the aforementioned second rotating machine 71, and therefore a brief description will be given hereinafter of the construction and the operations thereof. As shown in FIGS. 38 and 41, the first rotating machine 91 includes a first stator 93, a first rotor 94 disposed in a manner opposed to the first stator 93, and a second rotor 95 disposed between the two 93 and 94. The first stator 93, the second rotor 95 and the first rotor 94 are arranged coaxially with each other in the radial direction of the aforementioned first rotating shaft 4 in the mentioned order from outside.

Figure 40:
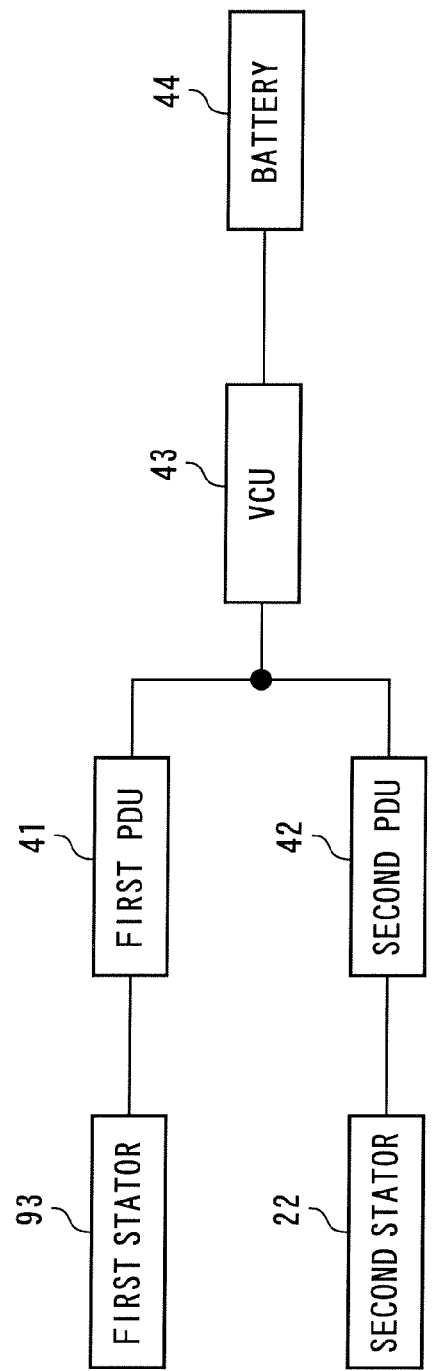
FIG. 40 A block diagram showing a relationship of connections between the first stator, the second stator, the battery, and so forth, which are mounted on the vehicle shown in FIG. 38.

The aforementioned first stator 93 is for generating a first rotating magnetic field, and includes an iron core 93a, and U-phase, V-phase and W-phase coils 93b provided on the iron core 93a. The iron core 93a, which has a hollow cylindrical shape formed by laminating a plurality of steel plates, extends in the axial direction of the first rotating shaft 4, and is fixed to the casing CA. Further, the inner peripheral surface of the iron core 93a is formed with twelve slots (not shown). The slots extend in the axial direction of the first rotating shaft 4, and are arranged at equally-spaced intervals in the circumferential direction of the first rotating shaft 4. The above-described U-phase to W-phase coils 93b are wound in the slots by distributed winding (wave winding). As shown in FIG. 40, the first stator 93 including the U-phase to W-phase coils 93b is electrically connected to the battery 44 via the above-mentioned first PDU 41 and VCU 43. That is, the first and second stators 93 and 22 are electrically connected to each other via the first and second PDUs 41 and 42.

In the first stator 93 constructed as above, when electric power is supplied from the battery 44 and electric currents flow through the U-phase to W-phase coils 93b, or when electric power is generated as described hereinafter, four magnetic poles are generated at an end of the iron core 93a toward the first rotor 94 at equally-spaced intervals in the circumferential direction of the first rotating shaft 4, and the first rotating magnetic field generated by the magnetic poles rotates in the circumferential direction. Hereinafter, the magnetic poles generated on the iron core 93a are referred to as the "first armature magnetic poles". Further, each two first armature magnetic poles which are circumferentially adjacent to each other have polarities different from each other.

The first rotor 94 includes a first magnetic pole row comprising eight permanent magnets 94a (only two of which are shown). These permanent magnets 94a are arranged at equally-spaced intervals in the circumferential direction of the first rotating shaft 4, and the first magnetic pole row is opposed to the iron core 93a of the first stator 93. Each permanent magnet 94a extends in the axial direction of the first rotating shaft 4, and the length thereof in the axial direction is set to the same length as that of the iron core 93a of the first stator 93.

Further, the permanent magnets 94a are mounted on an outer peripheral surface of an annular mounting portion 94b. This mounting portion 94b is formed by a soft magnetic material, such as iron or a laminate of a plurality of steel plates, and has an inner peripheral surface thereof attached to the outer peripheral surface of a disk-shaped flange 94c. The flange 94c is integrally formed on the aforementioned third rotating shaft 6 coaxially therewith. With this arrangement, the first rotor 94 including the permanent magnets 94a is mechanically directly connected to the above-described second rotor 23 of the second rotating machine 21, and is mechanically connected to the drive wheels DW and DW e.g. via the differential gear DG.

Furthermore, the permanent magnets 94a are attached to the outer peripheral surface of the mounting portion 94b formed by the soft magnetic material, as described above, and hence a magnetic pole of (N) or (S) appears on an end of each permanent magnet 94a toward the first stator 93. Further, each two permanent magnets 94a adjacent to each other in the circumferential direction of the first rotating shaft 4 have polarities different from each other.

The second rotor 95 includes a first soft magnetic material element row comprising six cores 95a (only two of which are shown). These cores 95a are arranged at equally-spaced intervals in the circumferential direction of the first rotating shaft 4, and the first soft magnetic material element row is disposed between the iron core 93a of the first stator 93 and the first magnetic pole row of the first rotor 94, in a manner spaced therefrom by respective predetermined distances. Each core 95a is formed by a soft magnetic material, such as a laminate of a plurality of steel plates, and extends in the axial direction of the first rotating shaft 4. Further, similarly to the permanent magnet 94a, the length of the core 95a in the axial direction is set to the same length as that of the iron core 93a of the first stator 93.

Furthermore, the core 95a is mounted on an outer end of a disk-shaped flange 95b via a hollow cylindrical connecting portion 95c slightly extending in the axial direction of the first rotating shaft 4. This flange 95b is integrally formed on the above-described first rotating shaft 4. With this arrangement, the second rotor 95 including the cores 95a is mechanically connected to the input shaft 32 of the compressor 31 e.g. via the first pulley PU1, and is mechanically directly connected to the crankshaft 3a via the clutch CL.

As described hereinabove, the first rotating machine 91 includes the four first armature magnetic poles, the eight magnetic poles of the permanent magnets 94a (hereinafter referred to as the "first magnet magnetic poles"), and the six cores 95a. That is, the ratio between the number of the first armature magnetic poles, the number of the first magnet magnetic poles, and the number of the cores 95a is set to 1:2.0:(1+2.0)/2, similarly to the ratio between the number of the second armature magnetic poles, the number of the second magnet magnetic poles, and the number of the cores 75a of the second rotating machine 71. Further, the ratio of the number of pole pairs of the first magnet magnetic poles to the number of pole pairs of the first armature magnetic poles (hereinafter referred to as the "first pole pair number ratio α") is set to 2.0, similarly to the second pole pair number ratio β of the second rotating machine 71. As described above, since the first rotating machine 91 is constructed similarly to the second rotating machine 71, it has the same functions as those of the second rotating machine 71.

More specifically, the first rotating machine 91 converts electric power supplied to the first stator 93 to motive power, for outputting the motive power from the first rotor 94 or the second rotor 95, and converts motive power input to the first rotor 94 or the second rotor 95 to electric power, for outputting the electric power from the first stator 93. Further, during such input and output of electric power and motive power, the first rotating magnetic field and the first and second rotors 94 and 95 rotate while holding such a collinear relationship in rotational speed, as shown in the equation (47) concerning the aforementioned second rotating machine 71. That is, in this case, between the rotational speed of the first rotating magnetic field (hereinafter referred to as the "first magnetic field rotational speed NMF1"), and the rotational speeds of the first and second rotors 94 and 95 (hereinafter referred to as the "first rotor rotational speed NR1" and the "second rotor rotational speed NR2", respectively), there holds the following equation (68):

$$NMF1 = (\alpha + 1)NR2 - \alpha \cdot NR1 \qquad (68)$$
$$= 3 \cdot NR2 - 2 \cdot NR1$$

Further, if torque equivalent to the electric power supplied to the first stator 93 and the first magnetic field rotational speed NMF1 is represented by the "first driving equivalent torque TSE1", there holds the following equation (69) between the first driving equivalent torque TSE1, and torques transmitted to the first and second rotors 94 and 95 (hereinafter referred to as the "first rotor-transmitted torque TR1" and the "second rotor-transmitted torque TR2", respectively):

$$TSE1 = TR1/\alpha = -TR2/(\alpha + 1) \qquad (69)$$
$$= TR1/2 = -TR2/3$$

Furthermore, if torque equivalent to the electric power generated by the first stator 93 and the first magnetic field rotational speed NMF1 is represented by the first electric power-generating equivalent torque TGE1, between the first electric power-generating equivalent torque TGE1 and the first and second rotor-transmitted torques TR1 and TR2, there holds the following equation (70). As described above, similarly to the second rotating machine 71, the first rotating machine 91 has the same functions as those of an apparatus formed by combining a planetary gear unit and a general one-rotor-type rotating machine.

$$TGE1 = TR1/\alpha = -TR2/(1 + \alpha) \qquad (70)$$
$$= TR1/2 = -TR2/3$$

Through the control of the first PDU 41 and the VCU 43, the ECU 2 controls the electric power supplied to the first stator 93 of the first rotating machine 91 and the first magnetic field rotational speed NMF1 of the first rotating magnetic field generated by the first stator 93 along with the supply of electric power. Further, through the control of the first PDU 41 and the VCU 43, the ECU 2 controls the electric power generated by the first stator 93 and the first magnetic field rotational speed NMF1 of the first rotating magnetic field generated by the first stator 93 along with the electric power generation.

Figure 39:
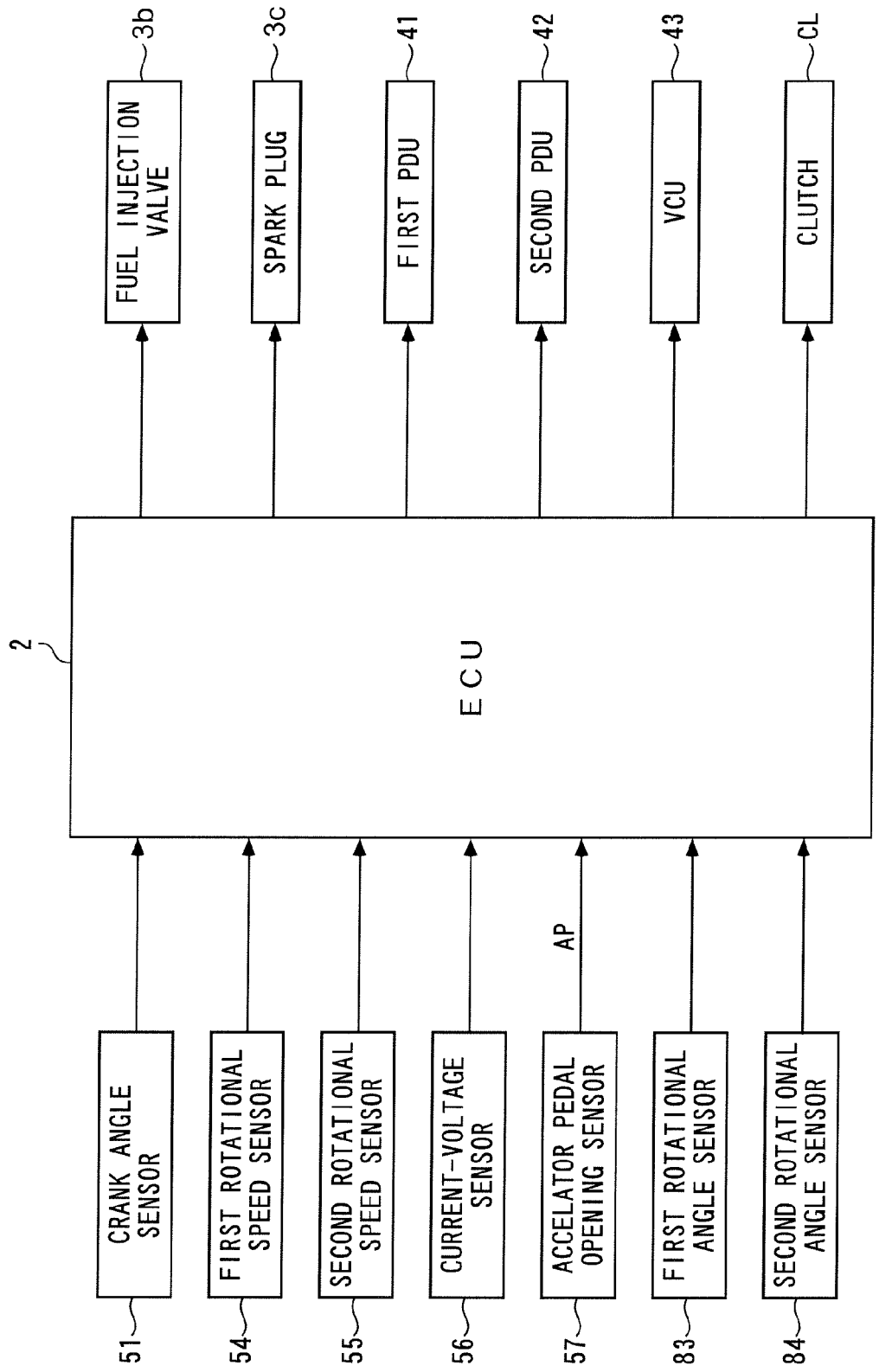
FIG. 39 A block diagram showing an ECU etc. mounted on the vehicle shown in FIG. 38.

Further, as shown in FIG. 39, a first rotational angle sensor 83, and a second rotational angle sensor 84 are connected to the ECU 2. The first rotational angle sensors 83 and 84 detect the rotational angular position of the first rotor 94 with respect to the first stator 93 and the rotational angular position of the second rotor 95 with respect to the first stator 93, respectively, to deliver respective signals indicative of the detected rotational angular positions of the first and second rotors 94 and 95, to the ECU 2. The ECU 2 calculates the first and second rotor rotational speeds NR1 and NR2 based on the detected rotational angular positions of the first and second rotors 94 and 95, respectively. Further, since the first and second rotors 94 and 23 are mechanically directly connected to each other as described hereinabove, the ECU 2 calculates the rotational angular position of the second rotor 23 with respect to the second stator 22, based on the detected rotational angular position of the first rotor 94, to calculate the second rotating machine rotational speed NM2.

Figure 42:
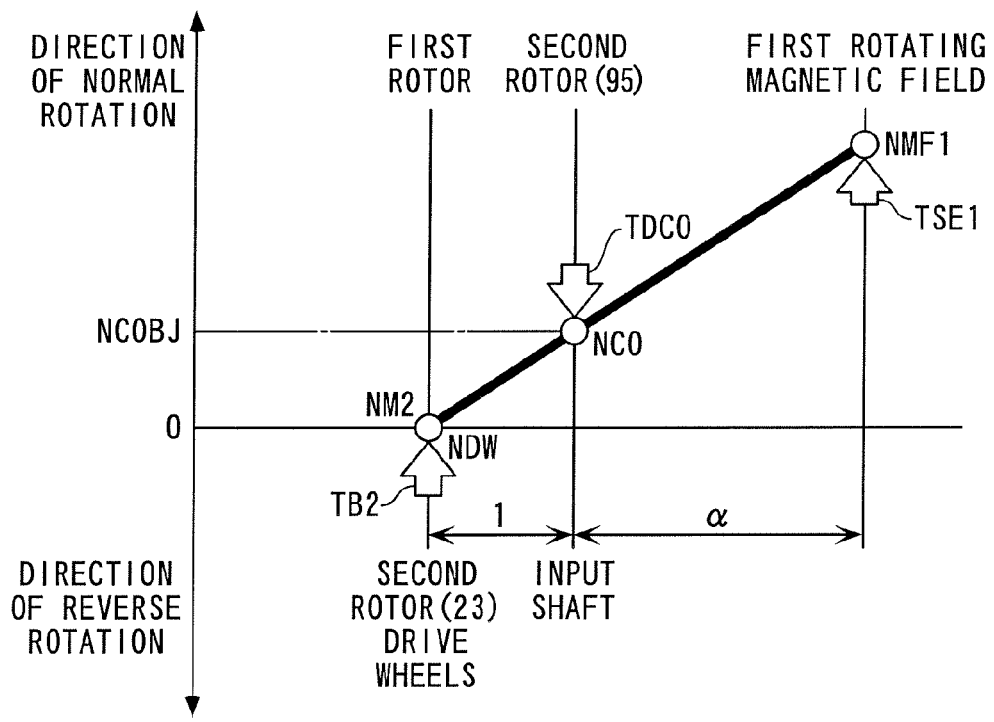
FIG. 42 A velocity collinear chart illustrating an example of the relationship between the rotational speeds of various types of rotary elements of the vehicle shown in FIG. 38 and the relationship between torques thereof, during the vehicle stoppage-time compressor drive mode.

The ECU 2 controls the operations of the engine 3, the clutch CL, and the first and second rotating machines 91 and 21 based on the detection signals from the aforementioned sensors 51, 54 to 57, 83 and 84 of various types according to control programs stored in the ROM. Similarly to the first embodiment, this causes the vehicle VE5 to be operated in various types of operation modes, including the vehicle stoppage-time compressor drive mode and the EV travel-time compressor drive mode. In this case, due to the above-described difference in construction from the first embodiment, operations in these operation modes are different from the operations in the case of the first embodiment, and hereafter, a description will be given of the different points. Note that also in the following description, similarly to the first embodiment, a velocity collinear chart as shown in FIG. 42 is used. First, a description is given of this velocity collinear chart.

As is apparent from the above-described relationship of connections between the various types of rotary elements of the vehicle VE5, the first rotor rotational speed NR1 and the second rotating machine rotational speed NM2 are equal to each other, and are equal to the drive wheel rotational speed NDW provided that a change in speed by the differential gear DG or the like is ignored. Further, the second rotor rotational speed NR2 is equal to the input shaft rotational speed NCO provided that a change in speed by the belt BE and the first and second pulleys PU1 and PU2 is ignored. Furthermore, the clutch CL is engaged and disengaged, thereby connecting and disconnecting the crankshaft 3a to and from the input shaft 32 and the second rotor 95. Further, the first magnetic field rotational speed NMF1, and the first and second rotor rotational speeds NR1 and NR2 are in a predetermined collinear relationship expressed by the aforementioned equation (68).

From the above, during disengagement of the clutch CL, the relationship between the input shaft rotational speed NCO, the drive wheel rotational speed NDW, the first magnetic field rotational speed NMF1, and the second rotating machine rotational speed NM2 is represented by a velocity collinear chart as shown in FIG. 42. Hereinafter, the various types of operation modes will be described with reference to the velocity collinear chart shown in the figure, in order from the vehicle stoppage-time compressor drive mode. Note that in FIG. 42 and other velocity collinear charts, described hereinafter, in order to identify the second rotor 95 of the first rotating machine 91 and the second rotor 23 of the second rotating machine 21, reference numerals thereof are parenthesized.

[Vehicle Stoppage-Time Compressor Drive Mode]

In the vehicle stoppage-time compressor drive mode, the clutch CL is disengaged, thereby disconnecting the crankshaft 3a from the input shaft 32 and the second rotor 95. In this state, electric power is supplied from the battery 44 to the first stator 93 of the first rotating machine 91 to cause the first rotating magnetic field to perform normal rotation. Further, similarly to the first embodiment, electric current is caused to flow through the second stator 22 of the second rotating machine 21 such that the second rotor 23 is held at rest. FIG. 42 illustrates the relationship between the rotational speeds of the various types of rotary elements and the relationship between torques thereof, during the vehicle stoppage-time compressor drive mode.

As is apparent from FIG. 42, the first driving equivalent torque TSE1 is transmitted to the input shaft 32 via the second rotor 95, using the second braking torque TB2 acting on the first rotor 94 as a reaction force, thereby causing the input shaft 32 to perform normal rotation together with the second rotor 95. Thus, motive power is transmitted from the first rotating machine 91 to the input shaft 32, whereby the compressor 31 is driven.

Further, in the vehicle stoppage-time compressor drive mode, the electric power supplied to the first stator 93 is controlled such that the compressor-transmitted torque TDCO becomes equal to the target torque TCOBJ. Specifically, the electric power supplied to the first stator 93 is controlled such that there holds the following equation (71) between the first driving equivalent torque TSE1 and the target torque TCOB.

$$TSE1 = -TCOBJ/(1+\alpha) \quad (71)$$

Furthermore, the first magnetic field rotational speed NMF1 is controlled such that the input shaft rotational speed NCO becomes equal to the target rotational speed NCOBJ, i.e. such that there holds the following equation (72):

$$NMF1 = (1+\alpha)NCOBJ \quad (72)$$

In the vehicle stoppage-time compressor drive mode, as is apparent from FIG. 42, the first driving equivalent torque TSE1 acts on the first rotor 94 and the drive wheels DW and DW to cause the first rotor 94 and the drive wheels DW and DW to perform reverse rotation, using the load of the compressor 31 acting on the second rotor 95 as a reaction force, but similarly to the first embodiment, the second rotor 23 is held at rest together with the first rotor 94 and the drive wheels DW and DW, as described above, so that the drive wheels DW and DW do not perform reverse rotation.

[EV Travel-Time Compressor Drive Mode]

Similarly to the first embodiment, first, a brief description will be given of the EV travel mode. During the EV travel mode, the clutch CL is disengaged, thereby disconnecting the crankshaft 3a from the input shaft 32 and the second rotor 95. In this state, electric power is supplied from the battery 44 to the second stator 22 to cause the second rotor 23 to perform normal rotation. The motive power of the second rotating machine 21 generated along with the normal rotation of the second rotor 23 is transmitted to the first rotor 94 and the drive wheels DW and DW. As a consequence, the first rotor 94 and the drive wheels DW and DW perform normal rotation, and in turn the vehicle VE5 travels forward.

Figure 43:
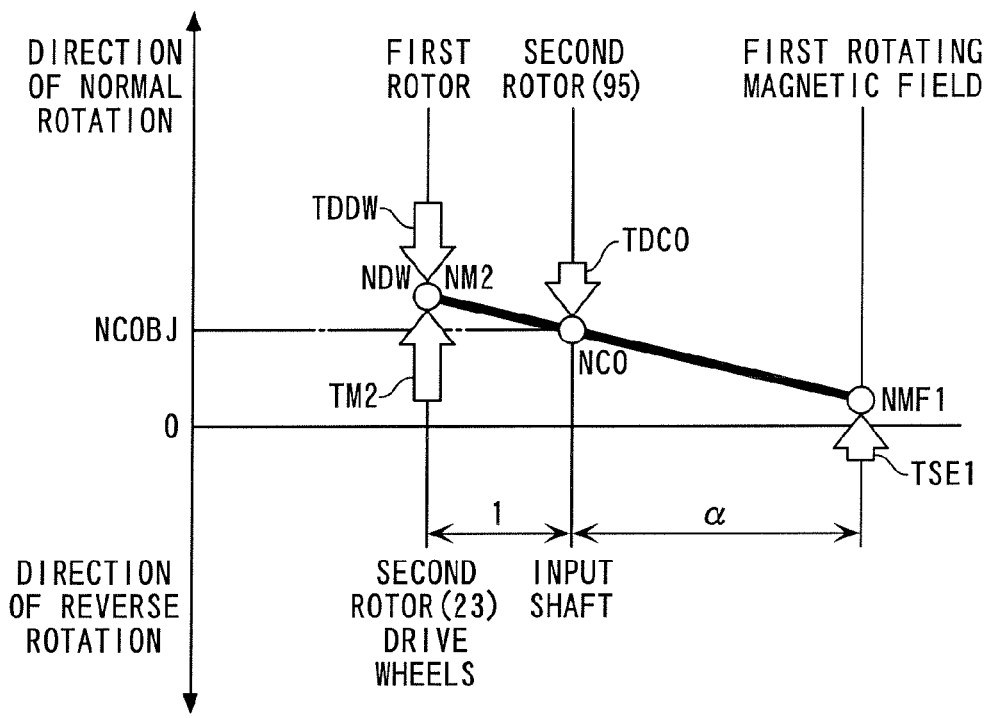
FIG. 43 A velocity collinear chart illustrating an example of the relationship between the rotational speeds of the various types of rotary elements of the vehicle shown in FIG. 38 and the relationship between torques thereof, during the EV travel-time compressor drive mode.

In a case where the operation mode is shifted to the EV travel-time compressor drive mode from the above state to thereby drive the compressor 31, the clutch CL and the second rotating machine 21 are controlled similarly to the EV travel mode to thereby continue to hold the crankshaft 3a in the state disconnected from the input shaft 32 and the second rotor 95, and continue to cause the drive wheels DW and DW to perform normal rotation. In this state, electric power is generated in the first stator 93 using the motive power transmitted to the first rotor 94, as described above, and the generated electric power is supplied to the second stator 22. The first rotating magnetic field generated at the early stage of the electric power generation performs reverse rotation since the first rotor 94 performs normal rotation and the second rotor rotational speed NR2 is approximately equal to 0. Further, the first magnetic field rotational speed NMF1 of the first rotating magnetic field thus performing reverse rotation is controlled such that it becomes equal to 0. Then, after the first magnetic field rotational speed NMF1 has become equal to 0, electric power is supplied from the battery 44 to the first stator 93 to cause the first rotating magnetic field to perform normal rotation. FIG. 43 illustrates the relationship between the rotational speeds of the various types of rotary elements and the relationship between the torques thereof, in this case.

As is apparent from FIG. 43, part of the second powering torque TM2 is transmitted to the first rotor 94, and is transmitted to the second rotor 95 using the first driving equivalent torque TSE1 as a reaction force, and further to the input shaft 32. In other words, combined torque formed by combining the first rotor-transmitted torque TR1 and the first driving equivalent torque TSE1 is transmitted to the input shaft 32. This causes the input shaft 32 to perform normal rotation to cause the compressor 31 to be driven. Further, the remainder of the second powering torque TM2 is transmitted to the drive wheels DW and DW, whereby the drive wheels DW and DW continue to perform normal rotation.

In this case, the electric powers supplied to the first and second stators 93 and 22 are controlled such that the compressor-transmitted torque TDCO becomes equal to the above-mentioned target torque TCOBJ, and the drive wheel-transmitted torque TDDW becomes equal to the demanded torque TREQ.

Specifically, the electric power supplied to the first stator 93 is controlled such that the aforementioned equation (71) holds between the first driving equivalent torque TSE1 and the target torque TCOBJ. Further, the second powering torque TM2 is transmitted to the input shaft 32 and the drive wheels DW and DW, as described above, and hence the electric power supplied to the second stator 22 is controlled such that there holds the following equation (73) between the second powering torque TM2, the target torque TCOBJ, and the demanded torque TREQ.

$$TM2 = -\{[\alpha \cdot TCOBJ/(1+\alpha)] + TREQ\} \quad (73)$$

Furthermore, the second rotating machine rotational speed NM2 is controlled such that it becomes equal to the drive wheel rotational speed NDW, and the first magnetic field rotational speed NMF1 is controlled such that the input shaft rotational speed NCO becomes equal to the target rotational speed NCOBJ, while maintaining the drive wheel rotational speed NDW at the time, i.e. such that there holds the following equation (74):

$$NMF1 = (\alpha+1)NCOBJ - \alpha \cdot NDW \quad (74)$$

Note that the direction of rotation of the first rotating magnetic field determined by the relationship between the drive wheel rotational speed NDW and the target rotational speed NCOBJ sometimes becomes the direction of reverse rotation. In such a case, electric power is generated in the first stator 93, and the generated electric power is supplied to the second stator 22. Further, the electric power generated in the first stator 93 is controlled such that there holds the following equation (75) obtained by replacing the first driving equivalent torque TSE1 of the aforementioned equation (71) with the first electric power-generating equivalent torque TGE1.

$$TGE1 = -TCOBJ/(1+\alpha) \quad (75)$$

The above-described fifth embodiment corresponds to the invention as claimed in claims 9 and 10. Correspondence between various types of elements of the fifth embodiment and various types of elements of the invention as claimed in claims 9 and 10 (hereinafter referred to as the "fourth invention") is as follows: The vehicle VE5 and the drive wheels DW and DW of the fifth embodiment correspond to a moving apparatus and driven parts of the fourth invention, respectively. Further, the engine 3, the crankshaft 3a, the compressor 31 and the input shaft 32 of the fifth embodiment corresponds to a prime mover, a first output portion, an accessory, and an input portion of the fourth invention. Further, the ECU 2, the VCU 43, and the first and second PDUs 41 and 42 of the fifth embodiment correspond to a controller of the fourth invention.

Furthermore, the permanent magnets 94a and the cores 95a of the fifth embodiment correspond to first magnets and first soft magnetic material elements of the fourth invention, respectively, and the iron core 93a and the U-phase to W-phase coils 93b of the fifth embodiment correspond to a first armature row of the invention as claimed in claim 10. Further, the second rotating machine 21 of the fifth embodiment corresponds to restriction means of the fourth invention.

As described heretofore, according to the fifth embodiment, when the compressor 31 is driven in the state where the drive wheels DW and DW are at rest during stoppage of the engine 3, the vehicle stoppage-time compressor drive mode controls the operation of the first rotating machine 91 such that motive power is input to the input portion 32 to drive the compressor 31, and controls the operation of the second rotating machine 21 to thereby restrict the drive wheel rotational speed NDW such that it becomes equal to 0. This makes it possible to properly drive the compressor 31 while positively preventing the drive wheels DW and DW from being driven. Further, in the vehicle stoppage-time compressor drive mode, the clutch CL holds the crankshaft 3a in the state disconnected from the input shaft 32 and the second rotor 95, so that it is possible to prevent motive power from being transmitted from the first rotating machine 91 to the crankshaft 3a, thereby making it possible to improve driving efficiency in driving the compressor 31.

Furthermore, similarly to the first embodiment, in the EV travel-time compressor drive mode, the operations of the first and second rotating machines 91 and 21 are controlled such that the compressor-transmitted torque TDCO becomes equal to the target torque TCOBJ and the input shaft rotational speed NCO becomes equal to the target rotational speed NCOBJ, and hence it is possible to properly drive the compressor 31 and reduce computation load on the ECU 2.

Further, by setting the ratio between the number of the first armature magnetic poles, the number of the first magnet magnetic poles, and the number of the cores 95a as desired within a range satisfying a condition of $1:n:(1+n)/2$ ($n \neq 1.0$), it is possible to freely set a collinear relationship in rotational speed between the first rotating magnetic field and the first and second rotors 94 and 95. Therefore, it is possible to enhance the degree of freedom in design of the first rotating machine 91.

Figure 44:
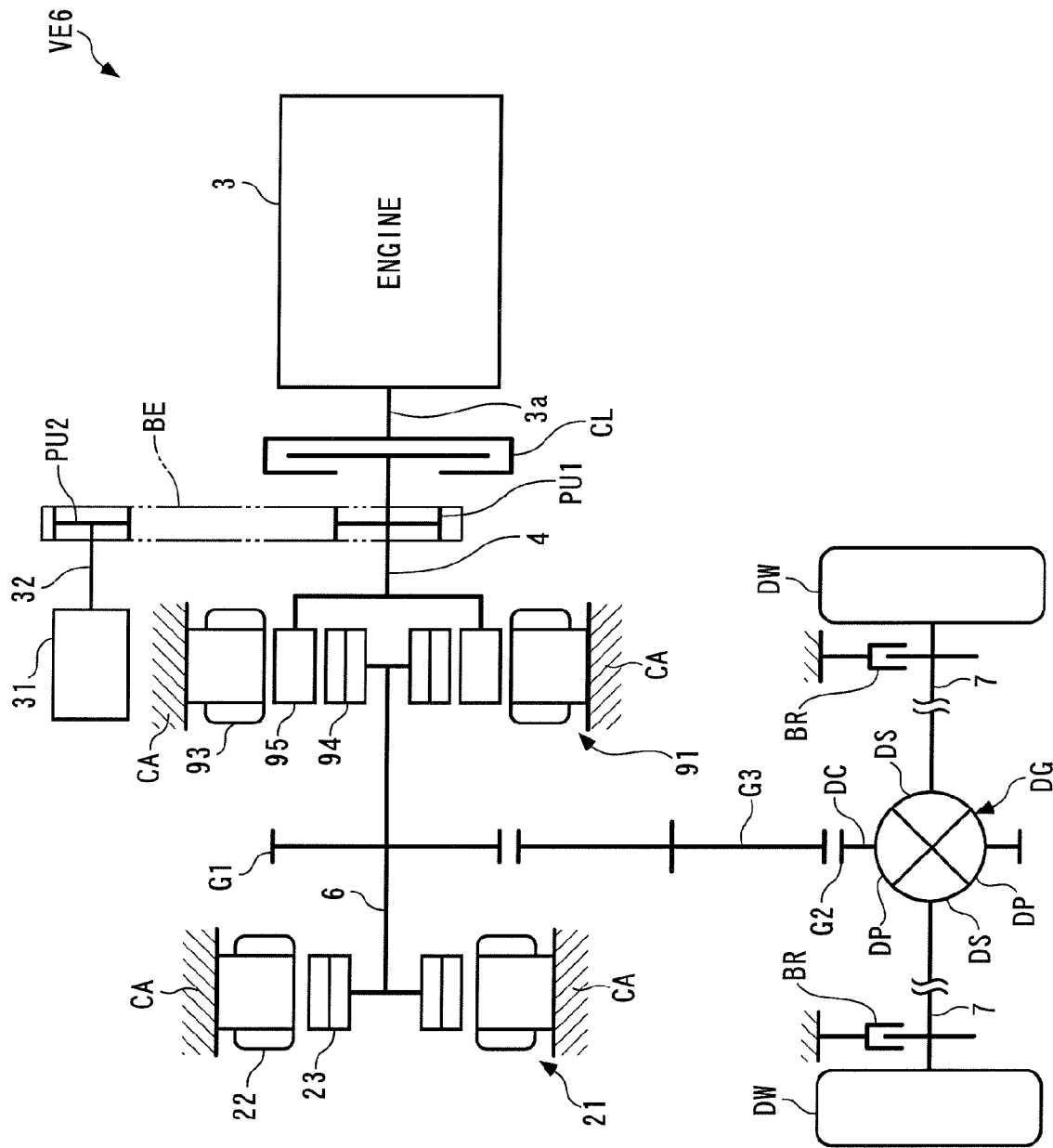
FIG. 44 A schematic view of a vehicle as a moving apparatus according to a sixth embodiment of the present invention.

Next, a vehicle VE6 as a moving apparatus according to a sixth embodiment of the present invention will be described with reference to FIG. 44. The vehicle VE6 is distinguished from the fifth embodiment mainly in that it further includes the left and right brakes BR and BR for braking the drive wheels DW and DW described in the second embodiment. In FIG. 44 and other figures, referred to hereinafter, the same component elements as those of the second and fifth embodiments are denoted by the same reference numerals. The following description is mainly given of different points of the vehicle VE6 from the second and fifth embodiments.

Figure 45:
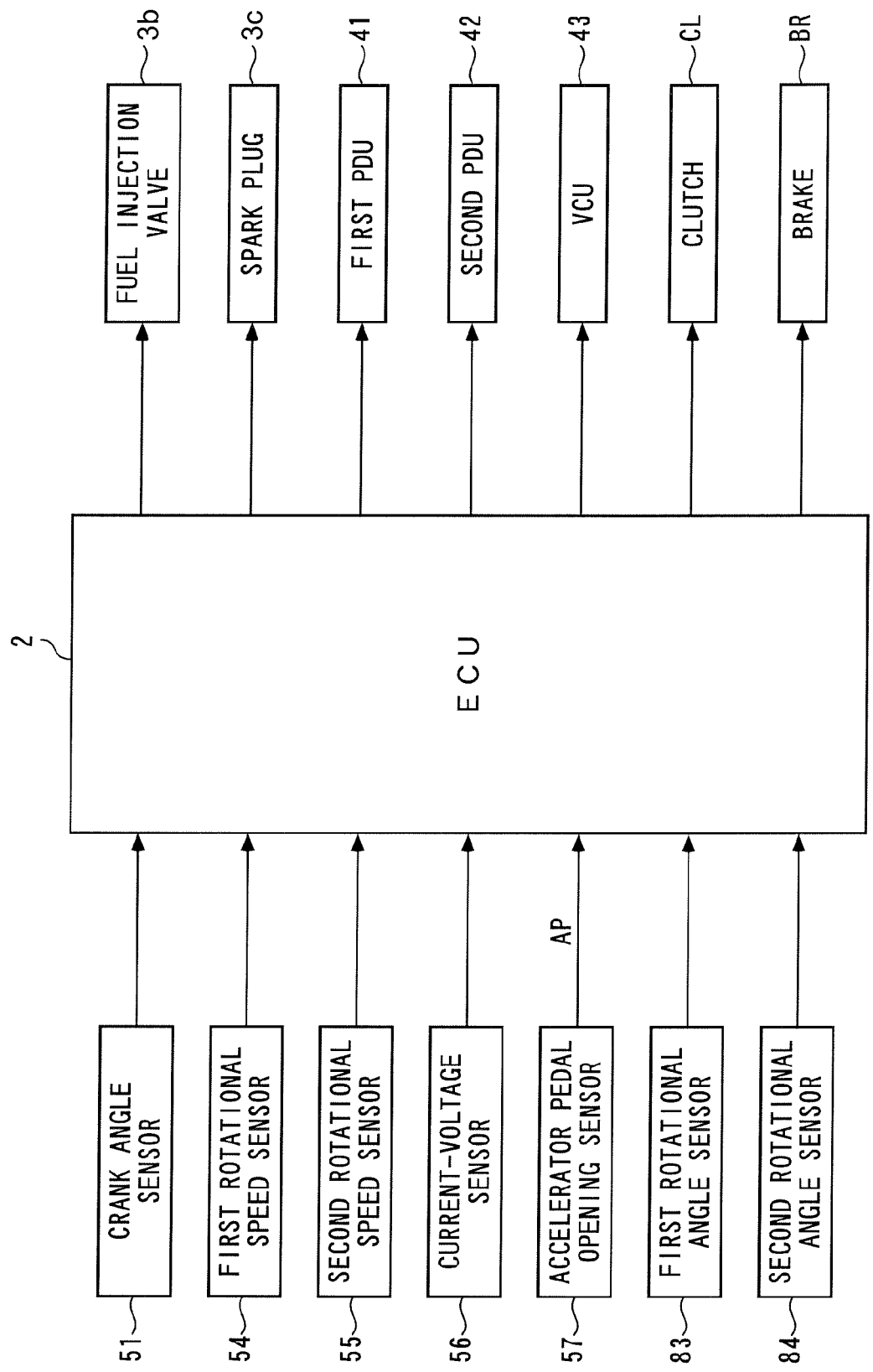
FIG. 45 A block diagram showing an ECU etc. mounted on the vehicle shown in FIG. 44.

As shown in FIG. 45, each brake BR is connected to the ECU 2. Similarly to the second embodiment, under the control of the ECU 2, the brakes BR brake the drive wheels DW and DW when applied, whereas when released, they permit rotation of the drive wheels DW and DW. Further, the degree of application of the brakes BR is changed by the ECU 2, whereby the braking force of each brake BR is controlled.

The ECU 2 controls the operations of the engine 3, the clutch CL, the brakes BR, and the first and second rotating machines 91 and 21 based on the detection signals from the aforementioned sensors 51, 54 to 57, 83 and 84 of various types, according to control programs stored in the ROM. Similarly to the fifth embodiment, this causes the vehicle VE6 to be operated in various types of operation modes. Next, a description is mainly given of different points of the vehicle stoppage-time compressor drive mode from the fifth embodiment.

[Vehicle Stoppage-Time Compressor Drive Mode]

Figure 46:
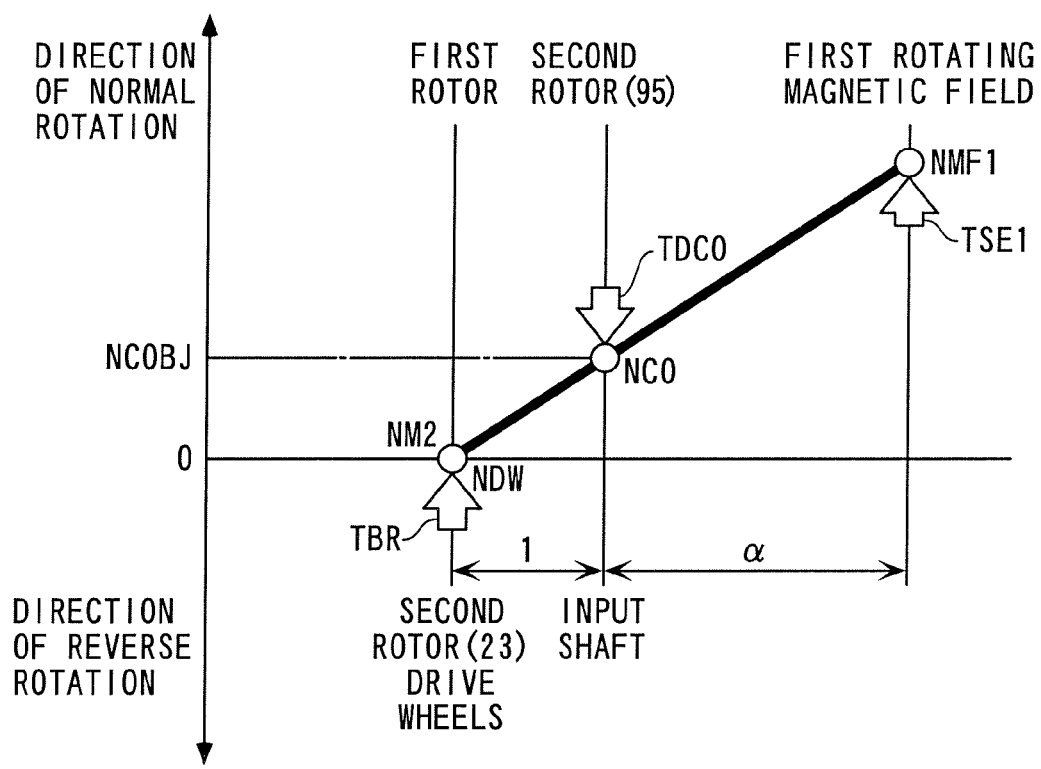
FIG. 46 A velocity collinear chart illustrating an example of the relationship between the rotational speeds of various types of rotary elements of the vehicle shown in FIG. 44 and the relationship between torques thereof, during the vehicle stoppage-time compressor drive mode.

In the sixth embodiment, the control of the second rotating machine 21, described in the fifth embodiment, is not performed, but similarly to the second embodiment, the brakes BR are each controlled to the applied state, whereby the drive wheels DW and DW are held at rest. Note that the control of the clutch CL and the first rotating machine 91 is carried out similarly to the fifth embodiment. FIG. 46 illustrates the relationship between the rotational speeds of the various types of rotary elements and the relationship between torques thereof, during the vehicle stoppage-time compressor drive mode.

As is apparent from FIG. 46, the first driving equivalent torque TSE1 is transmitted to the input shaft 32 via the second rotor 95, using the braking torque TBR of the brakes BR acting on the first rotor 94 as a reaction force, to thereby cause the input shaft 32 to perform normal rotation. As described above, motive power is transmitted from the first rotating machine 91 to the input shaft 32, whereby the compressor 31 is driven. Further, in this case, similarly to the fifth embodiment, the first driving equivalent torque TSE1 acts on the drive wheels DW and DW to cause the drive wheels DW and DW to perform reverse rotation, using the load of the compressor 31 as a reaction force, but as described above, since the drive wheels DW and DW are held at rest, the drive wheels DW and DW do not perform reverse rotation.

Note that in the EV travel-time compressor drive mode, the control of the various types of elements, such as the first rotating machine 91, is carried out similarly to the fifth embodiment, except that the brakes BR are controlled to the released state. Further, when the vehicle stoppage-time compressor drive mode is shifted to the EV travel mode to start the vehicle, the braking torque TBR of the brakes BR is progressively reduced.

Further, the above-described sixth embodiment corresponds to the fourth invention (invention as claimed in claims 9 and 10). Correspondence between various types of elements of the sixth embodiment and various types of elements of the fourth invention is as follows: The vehicle VE6 of the sixth embodiment correspond to the moving apparatus of the fourth invention. Correspondence between the other elements is the same as in the fifth embodiment.

As described above, according to the sixth embodiment, when the compressor 31 is driven in the state where the drive wheels DW and DW are at rest during stoppage of the engine 3, the vehicle stoppage-time compressor drive mode controls the operation of the first rotating machine 91 such that motive power is input to the input portion 32 to drive the compressor 31, and controls the operation of the brakes BR and BR to thereby restrict the drive wheel rotational speed NDW such that it becomes equal to 0. This makes it possible to properly drive the compressor 31 while positively preventing the drive wheels DW and DW from being driven. In addition to this, according to the present embodiment, it is possible to obtain the same advantageous effects as provided by the fifth embodiment, i.e. the advantageous effect of improving the driving efficiency in driving the compressor 31 using the clutch CL in the vehicle stoppage-time compressor drive mode.

Further, a hydraulic brake of which the braking force can be changed is used as each of the brakes BR and BR, and when the vehicle stoppage-time compressor drive mode is shifted to the EV travel mode to make a standing start of the vehicle, the braking torque TBR of the brakes BR is progressively reduced, so that it is possible to progressively increase the drive wheel rotational speed NDW, thereby making it possible to smoothly start the vehicle.

Note that although in the fifth and sixth embodiments, the second rotor 95 is directly connected to the crankshaft 3a, it may be mechanically connected to the crankshaft 3a via gears, a pulley, a chain, a transmission, or the like. Further, although in the fifth and sixth embodiments, the first rotor 94 of the first rotating machine 91 and the second rotor 23 of the second rotating machine 21 are directly connected to each other, if they are mechanically connected to the drive wheels DW and DW, they are not necessarily required to be directly connected to each other. Furthermore, although in the fifth and sixth embodiments, the first rotor 94 and the second rotor 23 are connected to the drive wheels DW and DW via the differential gear DG and the like, they may be mechanically directly connected to the drive wheels DW and DW. Further, although in the fifth and sixth embodiments, the second rotor 95 is connected to the input shaft 32 via the first and second pulleys PU1 and PU2 and the like, it may be mechanically directly connected to the input shaft 32.

Figure 47:
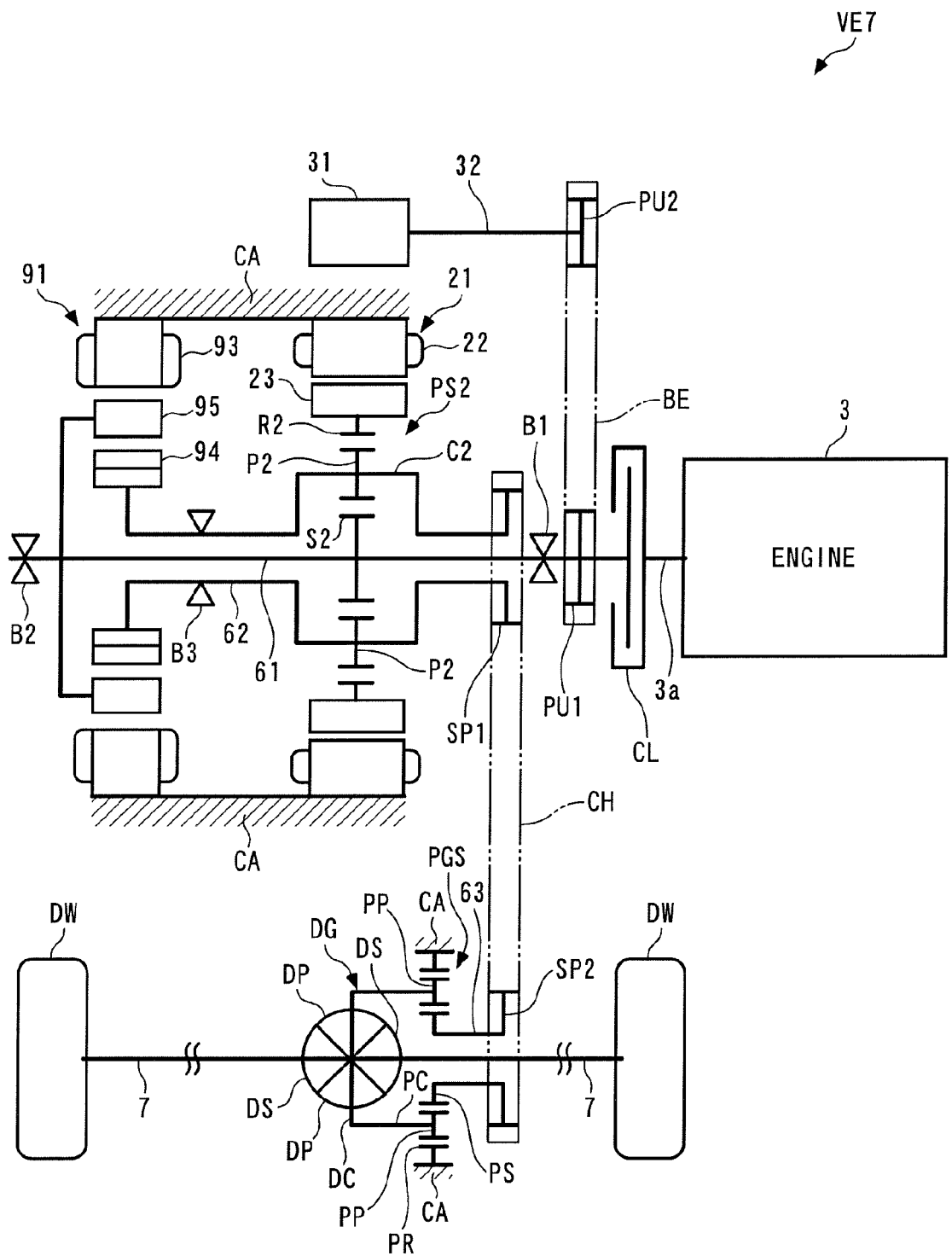
FIG. 47 A schematic view of a vehicle as a moving apparatus according to a seventh embodiment of the present invention.

Next, a vehicle VE7 as a moving apparatus according to a seventh embodiment of the present invention will be described with reference to FIG. 47. The vehicle VE7 is distinguished from the third embodiment mainly in that it includes the first rotating machine 91 described in the fifth embodiment in place of the first rotating machine 11 and the first planetary gear unit PS1. In FIG. 47 and other figures, referred to hereinafter, the same component elements as those of the third and fifth embodiments are denoted by the same reference numerals. The following description is mainly given of different points of the vehicle VE7 from the third and fifth embodiments.

Figure 49:
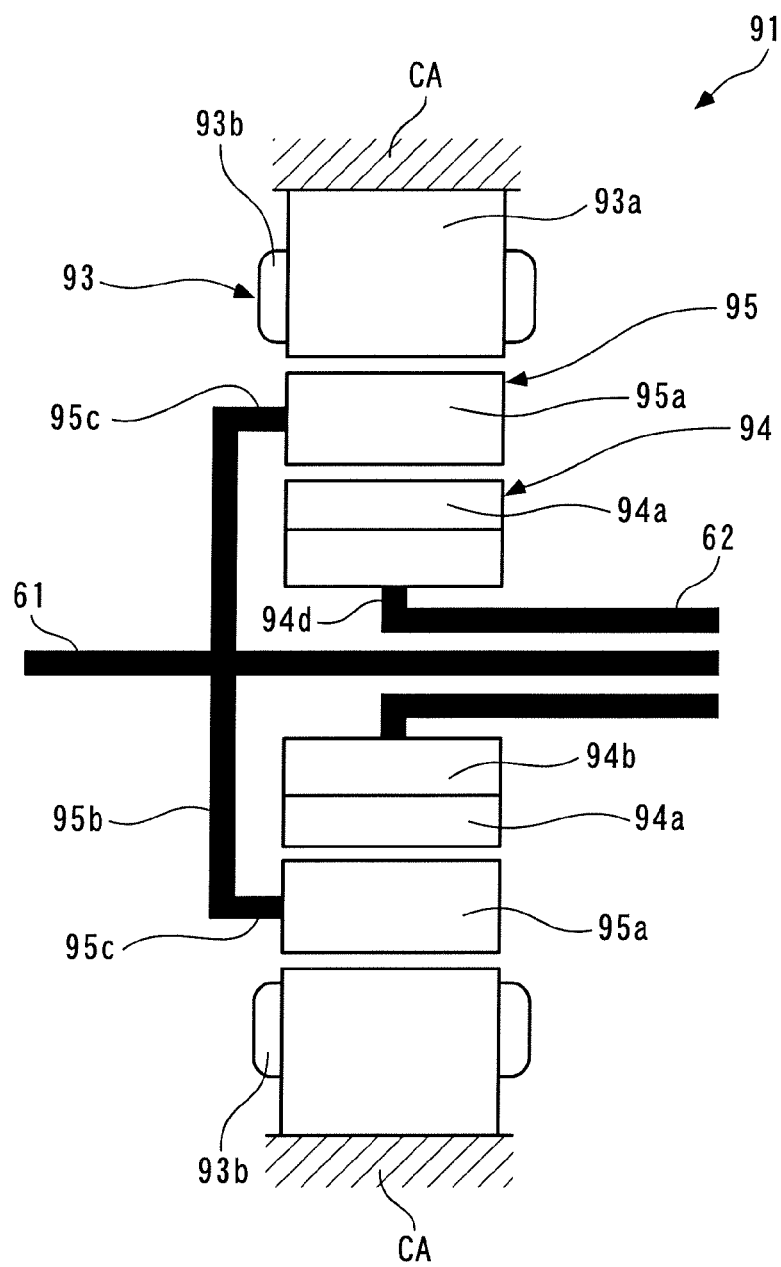
FIG. 49 An enlarged cross-sectional view of a first rotating machine appearing in FIG. 47.

The first and second rotors 94 and 95 of the first rotating machine 91 are arranged coaxially with the crankshaft 3a. Further, as shown in FIG. 49, the mounting portion 94b of the first rotor 94 is integrally formed on the aforementioned second rotating shaft 62 via an annular plate-shaped flange 94d. Furthermore, the flange 95b of the second rotor 95 is integrally formed on the aforementioned first rotating shaft 61. Further, the first and second rotors 94 and 95 are arranged between the bearings B1 and B2 toward the bearing B2.

Furthermore, as shown in FIG. 47, in the vehicle VE6, the second rotor 95 and the second sun gear S2 are mechanically directly connected to each other, and are mechanically connected to the input shaft 32 of the compressor 31 via the belt BE and the first and second pulleys PU1 and PU2. Further, the clutch CL is engaged and disengaged, thereby connecting and disconnecting the crankshaft 3a to and from the input shaft 32, the second rotor 95, and the second sun gear S2. Furthermore, the first rotor 94 and the second carrier C2 are mechanically directly connected to each other, and are mechanically connected to the drive wheels DW and DW via the chain CH, the planetary gear unit PGS, the differential gear DG, and the like. Further, the second ring gear R2 is mechanically directly connected to the second rotor 23.

Figure 48:
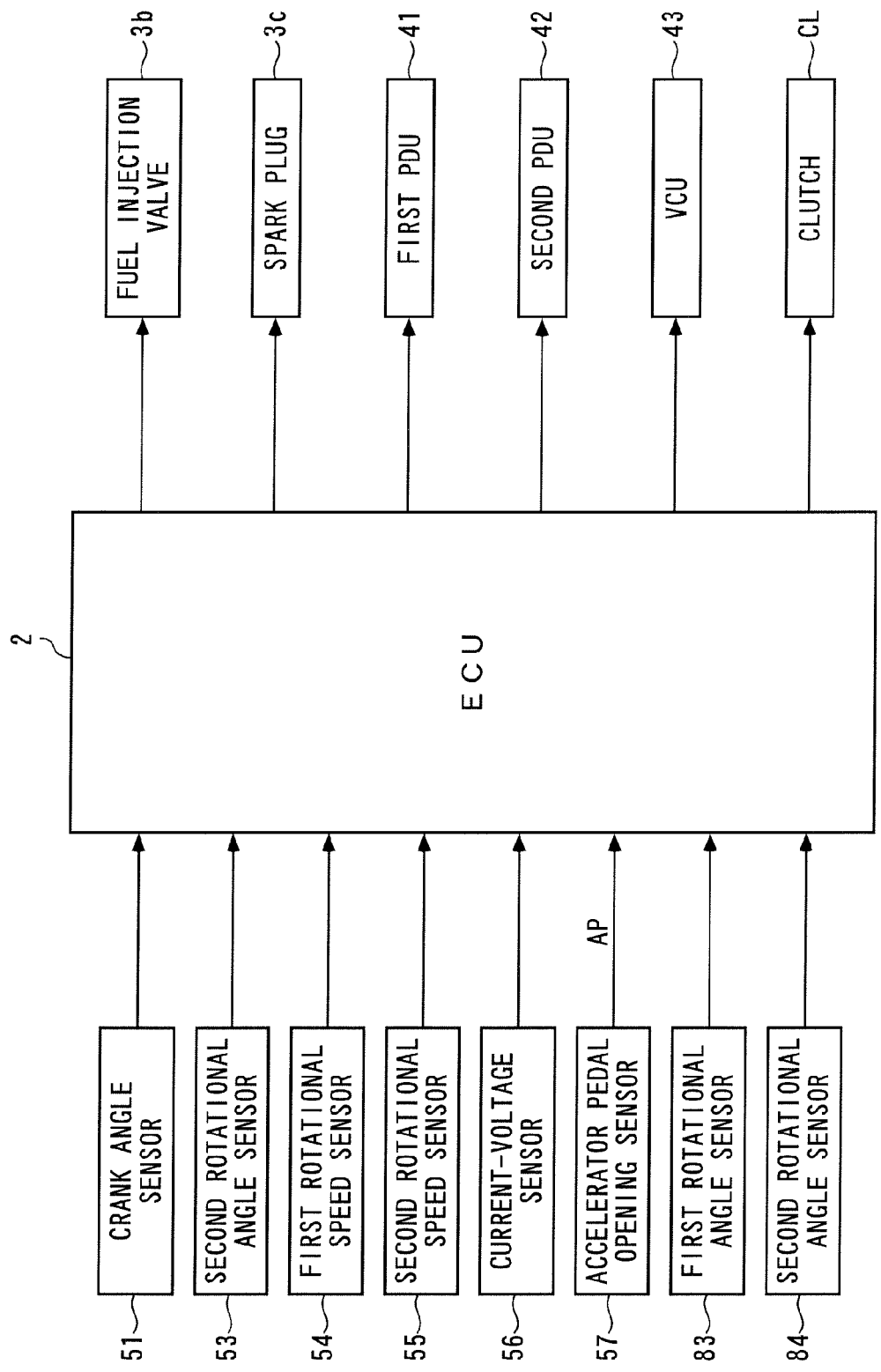
FIG. 48 A block diagram showing an ECU etc. mounted on the vehicle shown in FIG. 47.

Further, as shown in FIG. 48, the second rotational angle sensor 53 delivers a detection signal indicative of a detected rotational angle position of the second rotor 23 with respect to the second stator 22, to the ECU 2. Further, the respective first and second rotational angle sensors 83 and 84 deliver detection signals indicative of detected rotational angle positions of the first and second rotors 94 and 95 with respect to the first stator 93, to the ECU 2. Similarly to the third and fifth embodiments, the ECU 2 calculates the second rotating machine rotational speed NM2 and the first and second rotor rotational speeds NR1 and NR2, based on these detection signals.

Figure 50:
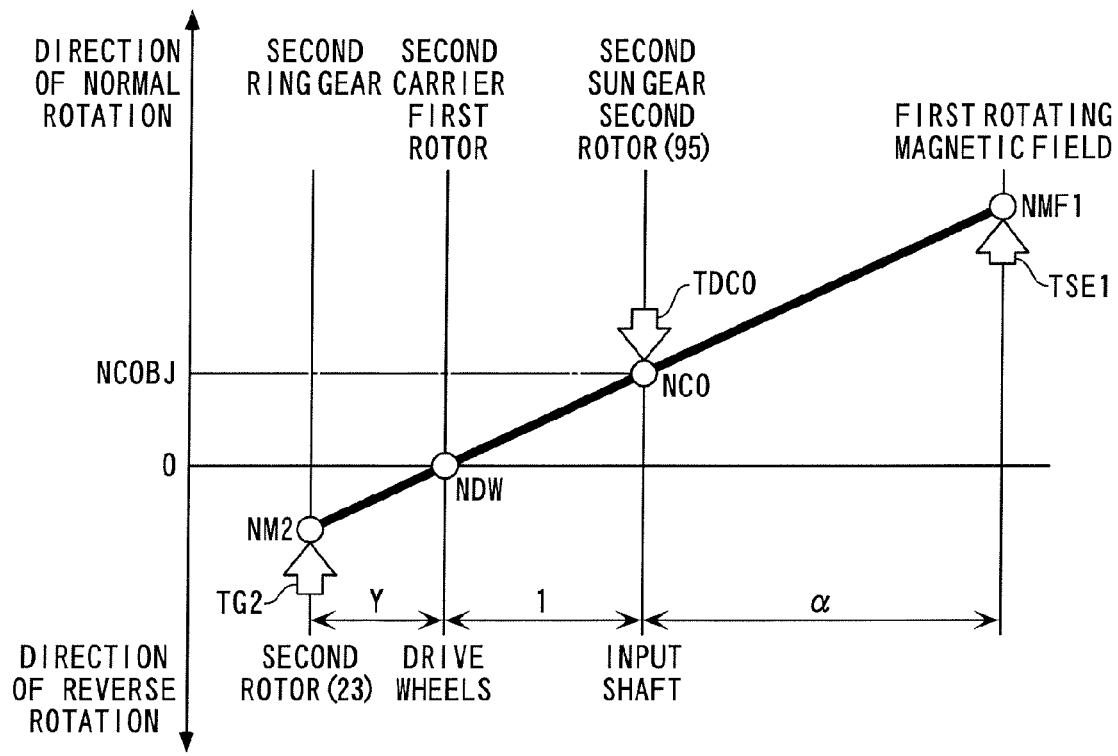
FIG. 50 A velocity collinear chart illustrating an example of the relationship between the rotational speeds of various types of rotary elements of the vehicle shown in FIG. 47 and the relationship between torques thereof, during the vehicle stoppage-time compressor drive mode.

The ECU 2 controls the operations of the engine 3, the clutch CL, and the first and second rotating machines 91 and 21 based on the detection signals from the aforementioned sensors 51, 53 to 57, 83 and 84 of various types according to control programs stored in the ROM. Similarly to the third embodiment, this causes the vehicle VE7 to be operated in the vehicle stoppage-time compressor drive mode, the compressor drive-time EV standing start mode, the EV travel-time compressor drive mode, and the EV travel-time ENG start mode. In this case, due to the above-described difference in construction from the third embodiment, operations in these operation modes are different from the operations in the case of the third embodiment, and hereafter, a description will be given of the different points. Note that also in the following description, similarly to the third embodiment, a velocity collinear chart as shown in FIG. 50 is used. First, a description is given of this velocity collinear chart.

As is apparent from the above-described relationship of connections between the various types of rotary elements of the vehicle VE7, the second rotor rotational speed NR2 and the rotational speed of the second sun gear S2 are equal to each other, and are equal to the input shaft rotational speed NCO provided that a change in speed by the belt BE and the first and second pulleys PU1 and PU2 is ignored. Further, the engagement and disengagement of the clutch CL cause the crankshaft 3a to be connected to and disconnected from the input shaft 32, the second rotor 95, and the second sun gear S2. Furthermore, the first rotor rotational speed NR1 and the rotational speed of the second carrier C2 are equal to each other, and are equal to the drive wheel rotational speed NDW provided that a change in speed by the planetary gear unit PGS and the like is ignored. Further, the first magnetic field rotational speed NMF1, the first and second rotor rotational speeds NR1 and NR2 are in a predetermined collinear relationship expressed by the aforementioned equation (68), and the rotational speeds of the second sun gear S2, the second carrier C2 and the second ring gear R2 are in a predetermined collinear relationship defined by the number of the gear teeth of the second sun gear S2 and that of the gear teeth of the second ring gear R2.

From the above, during disengagement of the clutch CL, the relationship between the input shaft rotational speed NCO, the drive wheel rotational speed NDW, the first magnetic field rotational speed NMF1, and the second rotating machine rotational speed NM2 is represented by the velocity collinear chart as shown in FIG. 50. Hereinafter, various types of operation modes will be described with reference to the velocity collinear chart shown in the figure, in order from the vehicle stoppage-time compressor drive mode. Note that in FIG. 50 and other velocity collinear charts, described hereinafter, in order to identify the second rotor 95 of the first rotating machine 91 and the second rotor 23 of the second rotating machine 21, reference numerals thereof are parenthesized.

[Vehicle Stoppage-Time Compressor Drive Mode]

In the vehicle stoppage-time compressor drive mode, the clutch CL is disengaged, thereby disconnecting the crankshaft 3a from the input shaft 32, the second rotor 95, and the second sun gear S2. In this state, electric power is supplied from the battery 44 to the first stator 93 of the first rotating machine 91 to thereby cause the first rotating magnetic field to perform normal rotation. Further, electric power is generated in the second stator 22 using motive power transmitted to the second rotor 23, as described hereinafter, and the generated electric power is further supplied to the first stator 93. FIG. 50 illustrates the relationship between the rotational speeds of the various types of rotary elements and the relationship between torques thereof, during the vehicle stoppage-time compressor drive mode.

As is apparent from FIG. 50, the first driving equivalent torque TSE1 is transmitted to the second rotor 23 via the second ring gear R2 using the load of the drive wheels DW and DW acting on the second carrier C2 as a reaction force, causing the second rotor 23 to perform reverse rotation together with the second ring gear R2. Electric power is generated in the second stator 22, as described above, using motive power thus transmitted to the second rotor 23, and the second electric power generation torque TG2 generated along with the electric power generation acts to lower the second rotating machine rotational speed NM2 of the second rotor 23 performing reverse rotation. As a consequence, the first driving equivalent torque TSE1 is transmitted to the input shaft 32, using the second power generation torque TG2 as a reaction force, to thereby cause the input shaft 32 to perform normal rotation.

Furthermore, in the vehicle stoppage-time compressor drive mode, the electric power supplied to the first stator 93 and the electric power generated in the second stator 22 are controlled such that the compressor-transmitted torque TDCO becomes equal to the target torque TCOBJ. Specifically, the electric power supplied to the first stator 93 is controlled such that there holds the following equation (76) between the first driving equivalent torque TSE1 and the target torque TCOBJ. Further, the electric power generated by the second stator 22 is controlled such that there holds the following equation (77) between the second power generation torque TG2 and the target torque TCOBJ.

$$TSE1 = -(Y+1)TCOBJ/(Y+1+\alpha) \tag{76}$$

$$TG2 = -\alpha \cdot TCOBJ/(\alpha+1+Y) \tag{77}$$

Further, the First Magnetic Field Rotational speed NMF1 and the second rotating machine rotational speed NM2 are controlled such that the input shaft rotational speed NCO becomes equal to the target rotational speed NCOBJ, and the drive wheel rotational speed NDW becomes equal to 0, i.e. such that the aforementioned equations (72) and (9) hold.

[Compressor Drive-Time EV Standing Start Mode]

In the compressor drive-time EV standing start mode, similarly to the case of the vehicle stoppage-time compressor drive mode, in the state where the clutch CL is disengaged, thereby disconnecting the crankshaft 3a from the input shaft 32, the second rotor 95, and the second sun gear S2, electric power is supplied from the battery 44 to the first stator 93 to cause the first rotating magnetic field to perform normal rotation, and the electric power supplied to the first stator 93 is increased. Further, electric power is generated in the second stator 22 using motive power transmitted to the second rotor 23. The generated electric power is further supplied to the first stator 93, and the second rotating machine rotational speed NM2 is controlled such that it becomes equal to 0. FIG. 43 illustrates the relationship between the rotational speeds of the various types of rotary elements and the relationship between torques thereof, in this case.

Figure 51:
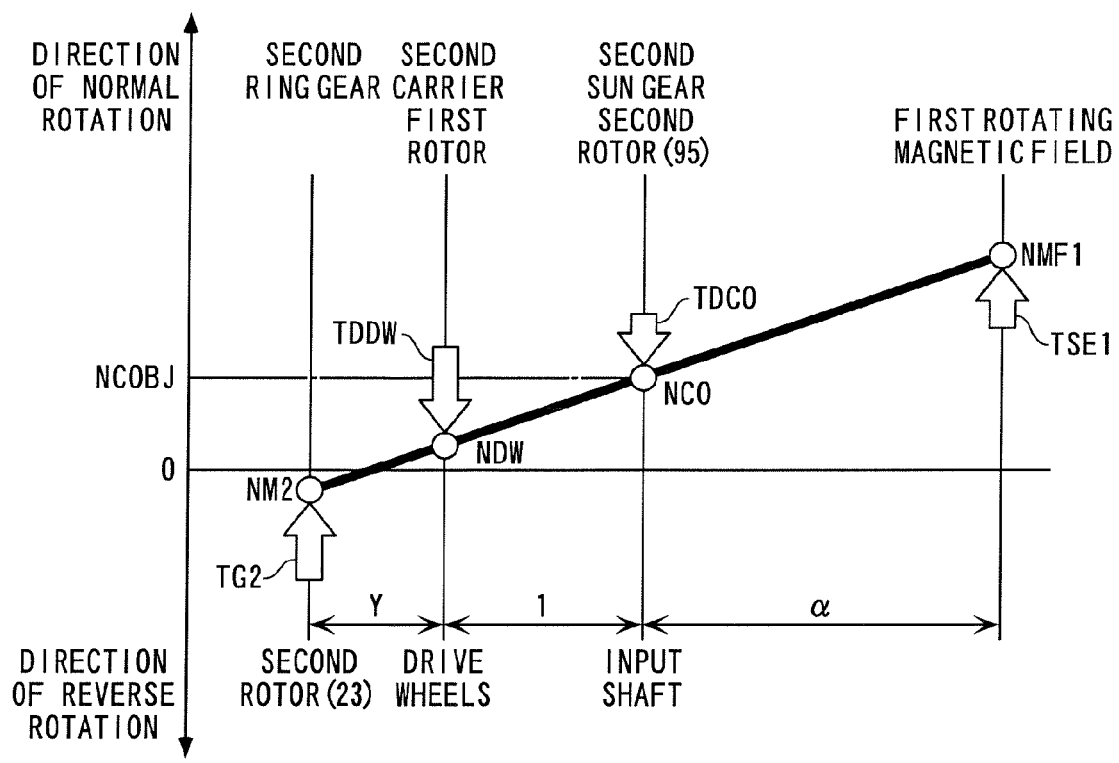
FIG. 51 A velocity collinear chart illustrating an example of the relationship between the rotational speeds of the various types of rotary elements of the vehicle shown in FIG. 47 and the relationship between torques thereof, at the start of the compressor drive-time EV standing start mode.

By controlling the operations of the first and second rotating machines 91 and 21 as described above, motive power is transmitted not only to the input shaft 32 but also to the drive wheels DW and DW. This causes, as shown in FIG. 51, the drive wheels DW and DW to perform normal rotation and increase the drive wheel rotational speed NDW, whereby the vehicle VE7 makes a standing start.

In the compressor drive-time EV standing start mode, the electric power supplied to the first stator 93 and the electric power generated in the second stator 22 are controlled such that the compressor-transmitted torque TDCO becomes equal to the target torque TCOBJ, and the drive wheel-transmitted torque TDDW becomes equal to the above-described demanded torque TREQ. Specifically, the electric power supplied to the first stator 93 is controlled such that there holds the following equation (78) between the first driving equivalent torque TSE1, the target torque TCOBJ, and the demanded torque TREQ. Further, the electric power generated in the second stator 22 is controlled such that there holds the following equation (79) between the second power generation torque TG2, the target torque TCOBJ, and the demanded torque TREQ:

$$TSE1 = -\{(Y+1)TCOBJ + Y \cdot TREQ\}/(Y+1+\alpha) \quad (78)$$

$$TG2 = -\{\alpha \cdot TCOBJ + (\alpha+1)TREQ\}/(\alpha+1+Y) \quad (79)$$

Furthermore, the first magnetic field rotational speed NMF1 and the second rotating machine rotational speed NM2 are controlled such that the input shaft rotational speed NCO becomes equal to the target rotational speed NCOBJ, while maintaining the drive wheel rotational speed NDW at the time. Specifically, the first magnetic field rotational speed NMF1 and the second rotating machine rotational speed NM2 are controlled such that the aforementioned equations (74) and (13) hold between the drive wheel rotational speed NDW and the target rotational speed NCOBJ, respectively.

Figure 52:
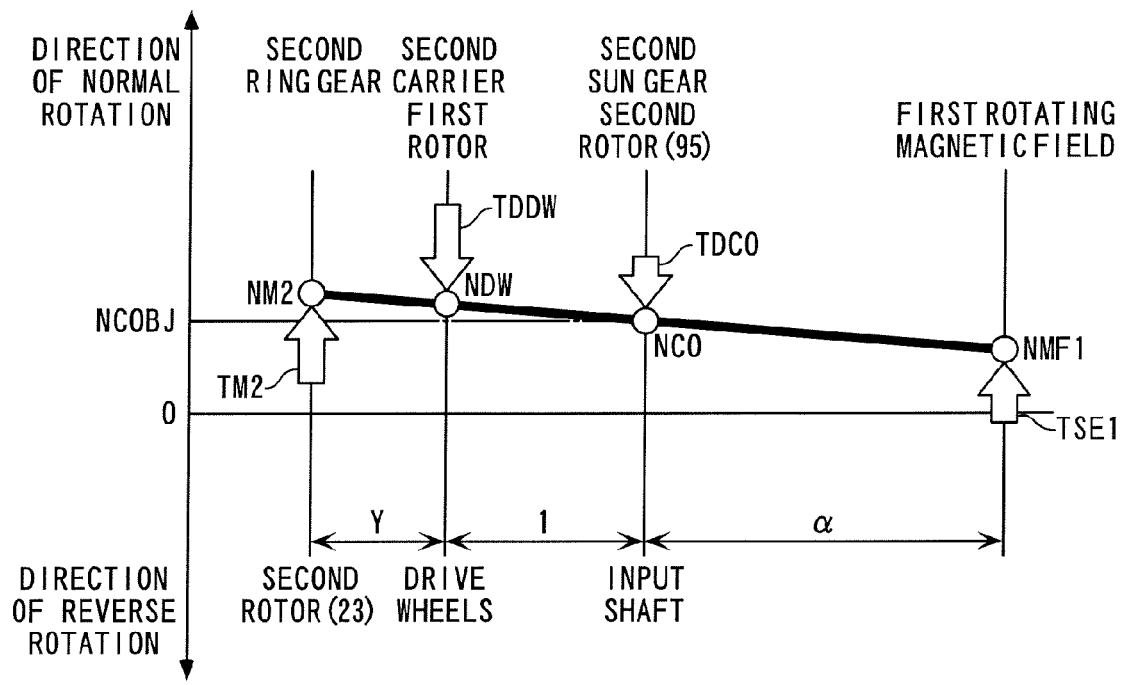
FIG. 52 A velocity collinear chart illustrating an example of the relationship between the rotational speeds of the various types of rotary elements of the vehicle shown in FIG. 47 and the relationship between torques thereof, after the start of the compressor drive-time EV standing start mode.

Further, in the compressor drive-time EV standing start mode, after the second rotating machine rotational speed NM2 has become equal to 0, electric power is supplied from the battery 44 not only to the first stator 93 but also to the second stator 22 to cause the second rotor 23 to perform normal rotation. FIG. 52 illustrates the relationship between the rotational speeds of the various types of rotary elements and the relationship between the torques thereof, in this case.

In this case, as is apparent from FIG. 52, the first driving equivalent torque TSE1 and the second powering torque TM2 are combined in the first rotating machine 91 and the second planetary gear unit PS2, and the combined torque is transmitted to the input shaft 32 and the drive wheels DW and DW, whereby the input shaft 32 and the drive wheels DW and DW continue to perform normal rotation. Further, as is apparent from a comparison between FIG. 51 and FIG. 52, the electric power supplied to the first stator 93 is controlled such that the aforementioned equation (78) holds, and the electric power supplied to the second stator 22 is controlled such that there holds the following equation (80) obtained by replacing the second power generation torque TG2 of the aforementioned equation (79) with the second powering torque TM2. Furthermore, the first magnetic field rotational speed NMF1 and the second rotating machine rotational speed NM2 are controlled such that the aforementioned equations (74) and (13) hold, respectively.

$$TM2 = -\{\alpha \cdot TCOBJ + (\alpha+1)TREQ\}/(\alpha+1+Y) \quad (80)$$

[EV Travel-Time Compressor Drive Mode]

This EV travel-time compressor drive mode is selected subsequent to the compressor drive-time EV standing start mode. In the EV travel-time compressor drive mode, similarly to the case of the compressor drive-time EV standing start mode shown in FIG. 52, in the state where the clutch CL is disengaged, thereby disconnecting the crankshaft 3a from the input shaft 32, the second rotor 95, and the second sun gear S2, electric power is supplied from the battery 44 to the first and second stators 93 and 22 to cause the first rotating magnetic field and the second rotor 23 to perform normal rotation. This causes combined torque formed by combining the first driving equivalent torque TSE1 and the second powering torque TM2 to be transmitted to the input shaft 32 and the drive wheels DW and DW, whereby the input shaft 32 and the drive wheels DW and DW continue to perform normal rotation.

Further, in the EV travel-time compressor drive mode, the electric power supplied to the first and second stators 93 and 22 is controlled such that the aforementioned equations (78) and (80) hold, respectively, and the first magnetic field rotational speed NMF1 and the second rotating machine rotational speed NM2 are controlled such that the aforementioned equations (74) and (13) hold, respectively.

[EV travel-time ENG start mode]

In the EV travel-time ENG start mode, immediately after a shift from the EV travel-time compressor drive mode, in the state where the clutch CL is disengaged, thereby disconnecting the crankshaft 3a from the input shaft 32, the second rotor 95, and the second sun gear S2, electric power is supplied from the battery 44 to the first and second stators 93 and 22 to cause the first rotating magnetic field and the second rotor 23 to perform normal rotation. Further, by controlling the electric power supplied to the first and second stators 93 and 22, the second rotating machine rotational speed NM2 is increased and the first magnetic field rotational speed NMF1 is controlled such that it becomes equal to 0, so as to maintain the drive wheel rotational speed NDW at the time.

Figure 53:
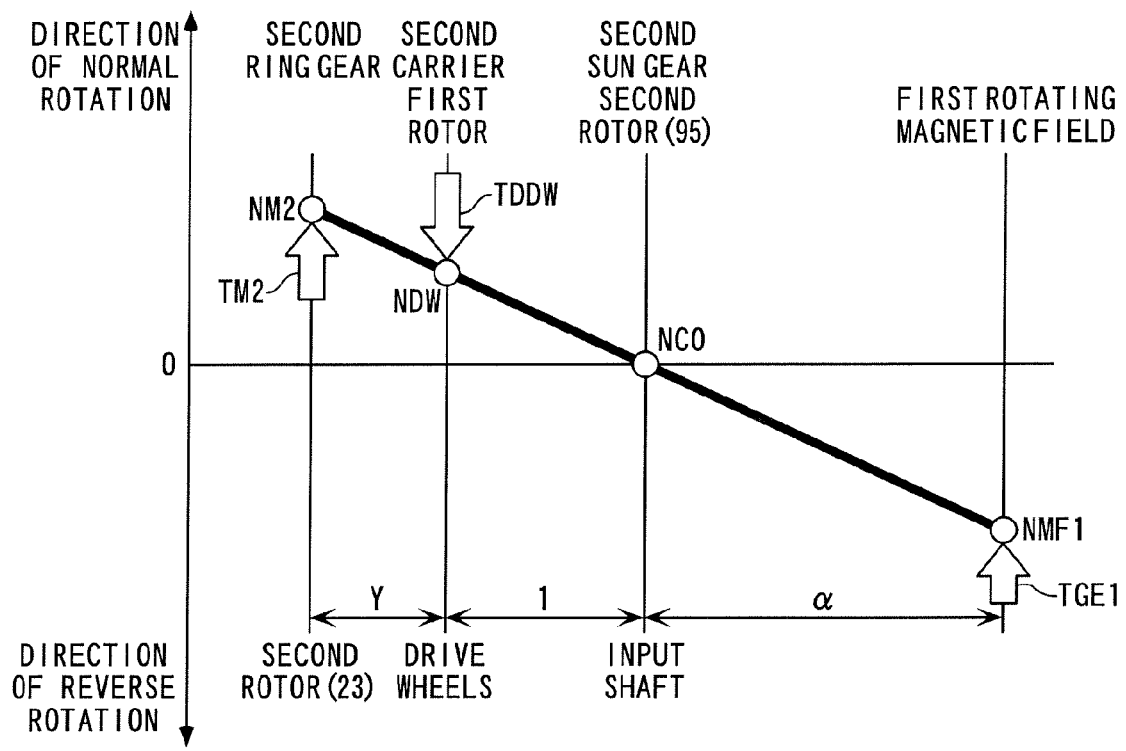
FIG. 53 A velocity collinear chart illustrating an example of the relationship between the rotational speeds of the various types of rotary elements of the vehicle shown in FIG. 47 and the relationship between torques thereof, at the start of the EV travel-time ENG start mode.

When the first magnetic field rotational speed NMF1 has become equal to 0, the supply of electric power from the battery 44 to the first stator 93 is stopped, and electric power is generated in the first stator 93 using motive power transmitted from the second rotor 23 to the first and second rotors 94 and 95 via the second planetary gear unit PS2. The generated electric power is further supplied to the second stator 22. In this case, the electric power generated in the first stator 93 and the electric power supplied to the second stator 22 are controlled, whereby while maintaining the drive wheel rotational speed NDW at the time, the second rotating machine rotational speed NM2 is increased and the first magnetic field rotational speed NMF1 is increased in the direction of reverse rotation, such that the second rotor rotational speed NR2 and the rotational speed of the second sun gear S2 become equal to 0. FIG. 53 illustrates the relationship between the rotational speeds of the various types of rotary elements and the relationship between the torques thereof, in this case.

As is apparent from FIG. 53, the first electric power-generating equivalent torque TGE1 acts to lower the first magnetic field rotational speed NMF1 of the first rotating magnetic field performing reverse rotation. Further, the second powering torque TM2 is transmitted to the drive wheels DW and DW, using the first electric power-generating equivalent torque TGE1 as a reaction force. In this case, by controlling the electric power generated in the first stator 93 and the electric power supplied to the second stator 22, the first electric power-generating equivalent torque TGE1 and the second powering torque TM2 are controlled such that the drive wheel-transmitted torque TDDW becomes equal to the demanded torque TREQ. Further, the first magnetic field rotational speed NMF1 and the second rotating machine rotational speed NM2 are controlled such that the second rotor rotational speed NR2 and the rotational speed of the second sun gear S2 become equal to 0, while maintaining the drive wheel rotational speed NDW at the time.

Specifically, the electric power generated in the first stator 93 is controlled such that there holds the following equation (81) between the first electric power-generating equivalent torque TGE1 and the demanded torque TREQ. Further, the electric power supplied to the second stator 22 is controlled such that there holds the following equation (82) between the second powering torque TM2 and the demanded torque TREQ.

$$TGE1 = -Y \cdot TREQ/(Y+1+\alpha) \tag{81}$$

$$TM2 = -(\alpha+1)TREQ/(\alpha+1+Y) \tag{82}$$

Further, the first magnetic field rotational speed NMF1 and the second rotating machine rotational speed NM2 are controlled such that the following equation (83) and the aforementioned equation (18) hold, respectively.

$$NMF1 = -\alpha \cdot NDW \tag{83}$$

Figure 54:
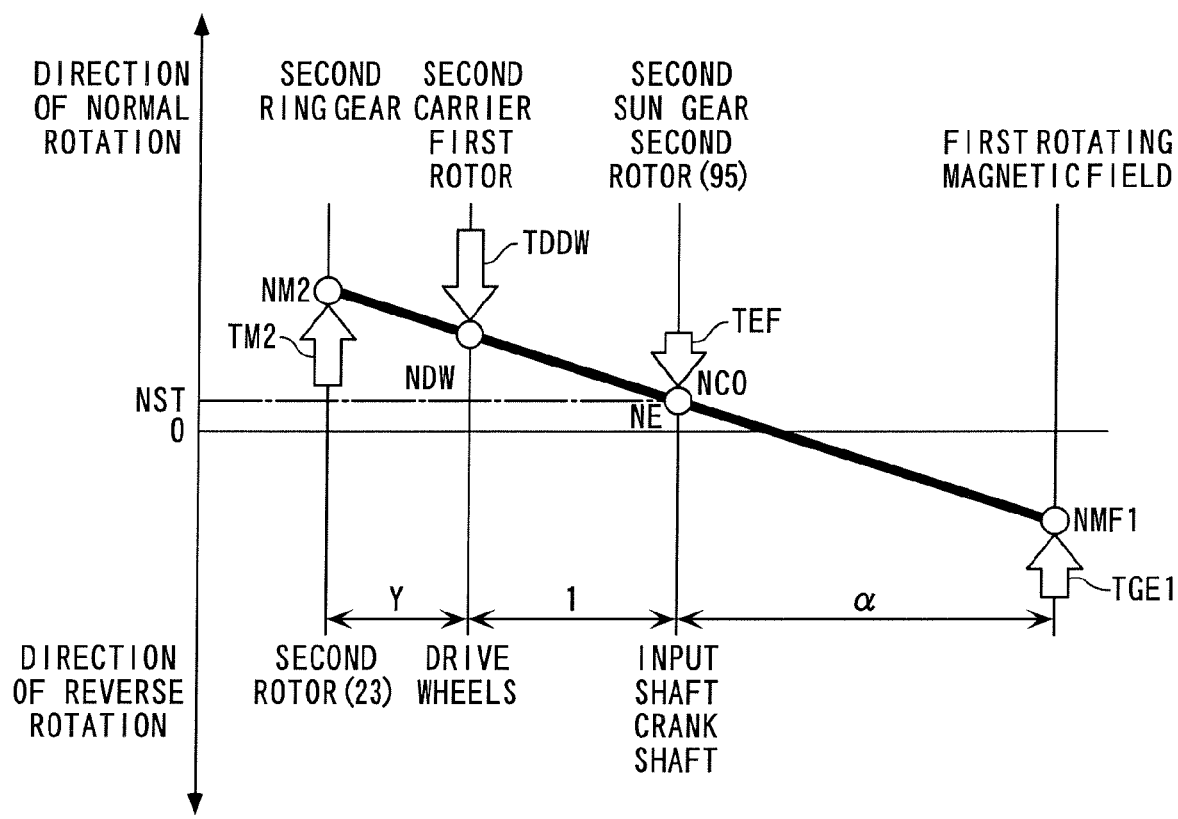
FIG. 54 A velocity collinear chart illustrating an example of the relationship between the rotational speeds of the various types of rotary elements of the vehicle shown in FIG. 47 and the relationship between torques thereof, after the start of the EV travel-time ENG start mode.

When the second rotor rotational speed NR2 and the rotational speed of the second sun gear S2 have become equal to 0, the clutch CL, which has been disengaged, is engaged, thereby connecting the crankshaft 3a to the second rotor 95 and the second sun gear S2. Further, the electric power generated in the first stator 93 and the electric power supplied to the second stator 22 are controlled, whereby while maintaining the drive wheel rotational speed NDW at the time, the first magnetic field rotational speed NMF1 of the first rotating magnetic field performing reverse rotation is controlled such that it becomes equal to 0, and the second rotating machine rotational speed NM2 of the second rotor 23 performing normal rotation is lowered. FIG. 54 illustrates the relationship between the rotational speeds of the various types of rotary elements and the relationship between the torques thereof, in this case.

Through the above-described control of the clutch CL and the first and second rotating machines 91 and 21, torques are transmitted not only to the drive wheels DW and DW but also to the crankshaft 3a to cause them to perform normal rotation. As a consequence, the drive wheels DW and DW continue to perform normal rotation, and the crankshaft 3a performs normal rotation to increase the engine speed NE. In this state, the ignition operations of the fuel injection valves 3b and the spark plugs 3c of the engine 3 are controlled, whereby the engine 3 at rest is started.

In this case, by controlling the electric power generated in the first stator 93 and the electric power supplied to the second stator 22, the first electric power-generating equivalent torque TGE1 and the second powering torque TM2 are controlled such that the drive wheel-transmitted torque TDDW becomes equal to the demanded torque TREQ. Further, the first magnetic field rotational speed NMF1 and the second rotating machine rotational speed NM2 are controlled such that the engine speed NE becomes equal to the predetermined value NST suitable for starting the engine 3, while maintaining the drive wheel rotational speed NDW at the time.

Specifically, the electric power generated in the first stator 93 is controlled such that there holds the following equation (84) between the first electric power-generating equivalent torque TGE1, the demanded torque TREQ, and the engine friction TEF. Further, the electric power supplied to the second stator 22 is controlled such that there holds the following equation (85) between the second powering torque TM2, the demanded torque TREQ, and the engine friction TEF.

$$TGE1 = -\{Y \cdot TREQ + (Y+1)TEF\}/(Y+1+\alpha) \tag{84}$$

$$TM2 = -\{(\alpha+1)TREQ + \alpha \cdot TEF\}/(\alpha+1+Y) \tag{85}$$

Further, the first magnetic field rotational speed NMF1 and the second rotating machine rotational speed NM2 are controlled such that the following equation (86) and the aforementioned equation (22) hold, respectively.

$$NMF1 = (\alpha+1)NST - \alpha \cdot NDW \tag{86}$$

Note that in the case where the engine speed NE is controlled to the predetermined value NST as described above, when the drive wheel rotational speed NDW is relatively low, the direction of rotation of the first rotor 13 determined by the relationship between the two NST and NDW sometimes becomes the direction of normal rotation. In this case, electric power is supplied from the battery 44 to the first stator 93, and the first rotating magnetic field is caused to perform normal rotation. Further, the electric power supplied to the first stator 93 is controlled such that there holds an equation obtained by replacing the first electric power-generating equivalent torque TGE1 of the aforementioned equation (84) with the first driving equivalent torque TSE1. Furthermore, not only the engine friction TEF but also the load of the compressor 31 acts on the second rotor 95 and the second sun gear S2, and hence in the EV travel-time ENG start mode, the operations of the first and second rotating machines 91 and 21 may be controlled according to the load of the compressor 31.

The above-described seventh embodiment corresponds to the invention as claimed in claims 9 and 10 to 13. Correspondence between various types of elements of the seventh embodiment and various types of elements of the invention as claimed in claims 9 and 10 to 13 (hereinafter referred to, generically, as the "fifth invention") is as follows: The vehicle VE7 and the drive wheels DW and DW of the seventh embodiment correspond to a moving apparatus and driven parts of the fifth invention, respectively. Further, the engine 3, the crankshaft 3a, the compressor 31, and the input shaft 32 of the seventh embodiment corresponds to a prime mover, a first output portion, an accessory, and an input portion of the fifth invention.

Further, the ECU 2, the VCU 43, and the first and second PDUs 41 and 42 of the seventh embodiment correspond to a controller of the fifth invention. Furthermore, the permanent magnets 94a and the cores 95a of the seventh embodiment correspond to the first magnets and the first soft magnetic material elements of the fifth invention, respectively, and the iron core 93a and the U-phase to W-phase coils 93b of the seventh embodiment correspond to the first armature row of the invention as claimed in claims 10 to 13. Further, the second rotating machine 21 and the second rotor 23 of the seventh embodiment correspond to restriction means of the invention as claimed in claim 9, and a second output portion of the invention as claimed in claims 11 to 13, respectively. Furthermore, the second planetary gear unit PS2, the second sun gear S2, the second carrier C2, and the second ring gear R2 correspond to a power transmission mechanism, a first element, a second element, and a third element of the invention as claimed in claims 11 to 13, respectively.

As described heretofore, according to the seventh embodiment, when the compressor 31 is driven in the state where the drive wheels DW and DW are at rest during stoppage of the engine 3, the vehicle stoppage-time compressor drive mode controls the operations of the first and second rotating machines 91 and 21 to thereby input motive power to the input portion 32, for driving the compressor 31, and restrict the drive wheel rotational speed NDW such that it becomes equal to 0. Therefore, it is possible to properly drive the compressor 31 while positively preventing the drive wheels DW and DW from being driven. Further, in the vehicle stoppage-time compressor drive mode, both the first magnetic field rotational speed NMF1 and the second rotating machine rotational speed NM2 become higher than 0, so that it is possible to prevent the overheating of the first PDU 41, the first rotating machine 91, the second PDU 42, and the second rotating machine 21, and secure a sufficiently large torque of the first and second rotating machines 91 and 21.

Furthermore, similarly to the fifth embodiment, by setting the ratio between the number of the first armature magnetic poles, the number of the first magnet magnetic poles, and the number of the cores 95a as desired within a range satisfying the condition of $1:n:(1+n)/2$ ($n \neq 1.0$), it is possible to freely set a collinear relationship in rotational speed between the first rotating magnetic field and the first and second rotors 94 and 95. Therefore, it is possible to enhance the degree of freedom in design of the first rotating machine 91.

For the same reason described above, by setting the aforementioned first pole pair number ratio α to a larger value, it is possible to set larger the distance between a straight line representing the second rotor rotational speed NR2 and a straight line representing the first magnetic field rotational speed NMF1 in the velocity collinear chart. This makes it possible to efficiently obtain the above-mentioned advantageous effects, i.e. the advantageous effects that it is possible to prevent the first PDU 41 and the first rotating machine 91 from being overheated and that it is possible to secure a sufficiently large torque of the first rotating machine 91.

Further, in the vehicle stoppage-time compressor drive mode, the clutch CL holds the crankshaft 3a in the state disconnected from the input shaft 32, the second rotor 95, and the second sun gear S2, so that it is possible to prevent motive power from being transmitted from the first rotating machine 91 to the crankshaft 3a, thereby making it possible to improve driving efficiency in driving the compressor 31. Further, similarly to the third embodiment, in the EV travel-time compressor drive mode, the operations of the first and second rotating machines 91 and 21 are controlled such that the compressor-transmitted torque TDCO becomes equal to the target torque TCOBJ, and the input shaft rotational speed NCO becomes equal to the target rotational speed NCOBJ, and hence it is possible to properly drive the compressor 31 and reduce computation load on the ECU 2.

Further, in the compressor drive-time EV standing start mode and the EV travel-time compressor drive mode, the clutch CL holds the crankshaft 3a in the state disconnected from the input shaft 32, the second rotor 95, and the second sun gear S2, so that it is possible to prevent motive power from being wastefully transmitted to the crankshaft 3a, and therefore it is possible to improve driving efficiency in driving the drive wheels DW and DW. Further, in the subsequent EV travel-time ENG start mode, by controlling the operations of the first and second rotating machines 91 and 21, the second rotor rotational speed NR2 and the rotational speed of the second sun gear S2 are controlled such that they become equal to 0. When the second rotor rotational speed NR2 and the rotational speed of the second sun gear S2 have become equal to 0, the clutch CL connects the crankshaft 3a to the input shaft 32, the second rotor 95, and the second sun gear S2, and the engine 3 is started. Therefore, it is possible to properly start the engine 3 without causing a shock due to engagement of the clutch CL. This makes it possible to reduce energy required to drive the dog clutch used as the clutch CL.

Note that although in the seventh embodiment, the second rotor 95 and the second sun gear S2 are directly connected to each other, if they are mechanically connected to the crankshaft 3a and the input shaft 32, they are not necessarily required to be directly connected to each other, and although the first rotor 94 and the second carrier C2 are directly connected to each other, if they are mechanically connected to the drive wheels DW and DW, they are not necessarily required to be directly connected to each other. Further, although in the seventh embodiment, the second rotor 95 and the second sun gear S2 are directly connected to the crankshaft 3a, they may be mechanically connected to the crankshaft 3a via gears, a pulley, a chain, a transmission, and the like. Furthermore, although in the seventh embodiment, the second rotor 95 and the second sun gear S2 are connected to the input shaft 32 via the belt BE, and the first and second pulleys PU1 and PU2, they may be mechanically directly connected to the input shaft 32.

Further, although in the seventh embodiment, the first rotor 94 and the second carrier C2 are connected to the drive wheels DW and DW via the chain CH and the differential gear DG, they may be mechanically directly connected to the drive wheels DW and DW. Furthermore, although in the seventh embodiment, the second ring gear R2 is directly connected to the second rotor 23, it may be mechanically connected to the second rotor 23 via gears, a pulley, a chain, a transmission, or the like.

Further, although in the seventh embodiment, the second ring gear R2 is connected to the second rotor 23, and the second sun gear S2 is connected to the crankshaft 3a and the input shaft 32, the relationship of the connections may be reversed, that is, the second ring gear R2 may be mechanically connected to the crankshaft 3a and the input shaft 32, and the second sun gear S2 may be mechanically connected to the second rotor 23. In this case, naturally, mechanical direct connection or mechanical connection using gears, a pulley, a chain, a transmission, or the like may be provided between the second ring gear R2, and the crankshaft 3a and the input shaft 32, and between the second sun gear S2 and the second rotor 23.

Furthermore, although in the seventh embodiment, similarly to the third embodiment, the first pulley PU1 is provided on the first rotating shaft 61 between the clutch CL and the bearing B1, and the compressor 31 is disposed in the vicinity of the portion of the casing CA, where the second stator 22 is provided, the two PU1 and 31 may be provided e.g. in the following manner: The first pulley PU1 may be provided in the vicinity of the bearing B2 on the first rotating shaft 61, and the compressor 31 may be disposed in the vicinity of a portion of the casing CA, where the first stator 93 is provided.

Figure 55:
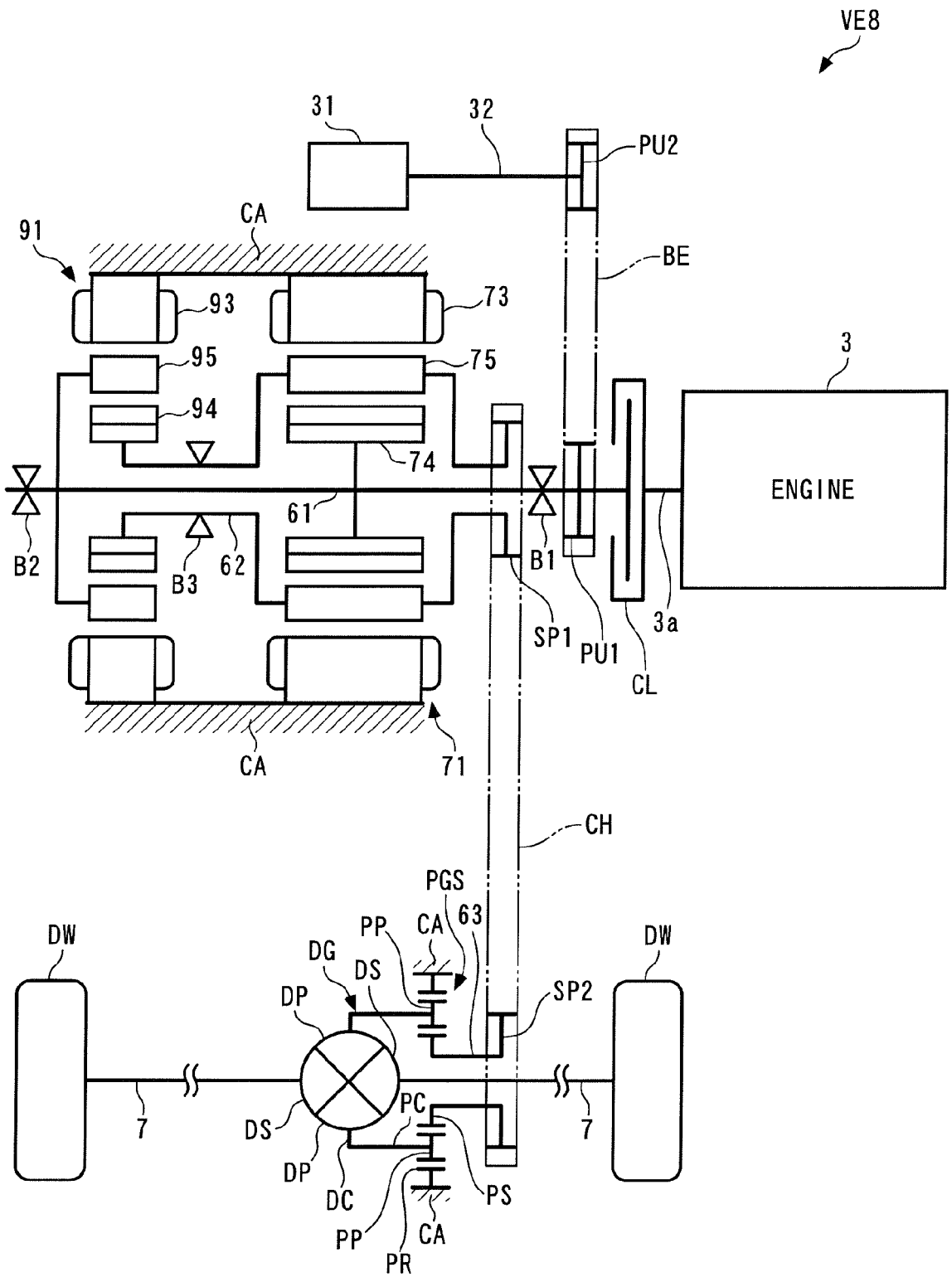
FIG. 55 A schematic view of a vehicle as a moving apparatus according to an eighth embodiment of the present invention.

Next, a vehicle VE8 as a moving apparatus according to an eighth embodiment of the present invention will be described with reference to FIG. 55. The vehicle VE8 is distinguished from the seventh embodiment mainly in that it includes the second rotating machine 71 described in the fourth embodiment, in place of the second rotating machine 21 and the second planetary gear unit PS2. In FIG. 55 and other figures, referred to hereinafter, the same component elements as those of the fourth and seventh embodiments are denoted by the same reference numerals. The following description is mainly given of different points of the vehicle VE8 from the fourth and seventh embodiments.

Referring to FIG. 55, the second rotor 95 of the first rotating machine 91 and the third rotor 74 of the second rotating machine 71, which are mechanically directly connected to each other via the first rotating shaft 61, are mechanically connected to the input shaft 32 of the compressor 31 via the belt BE and the first and second pulleys PU1 and PU2, and are mechanically directly connected to the crankshaft 3a via the clutch CL. Further, the first rotor 94 of the first rotating machine 91 and the fourth rotor 75 of the second rotating machine 71 are mechanically directly connected to each other via the second rotating shaft 62, and are mechanically connected to the drive wheels DW and DW via the chain CH, the planetary gear unit PGS, the differential gear DG, or the like.

Figure 56:
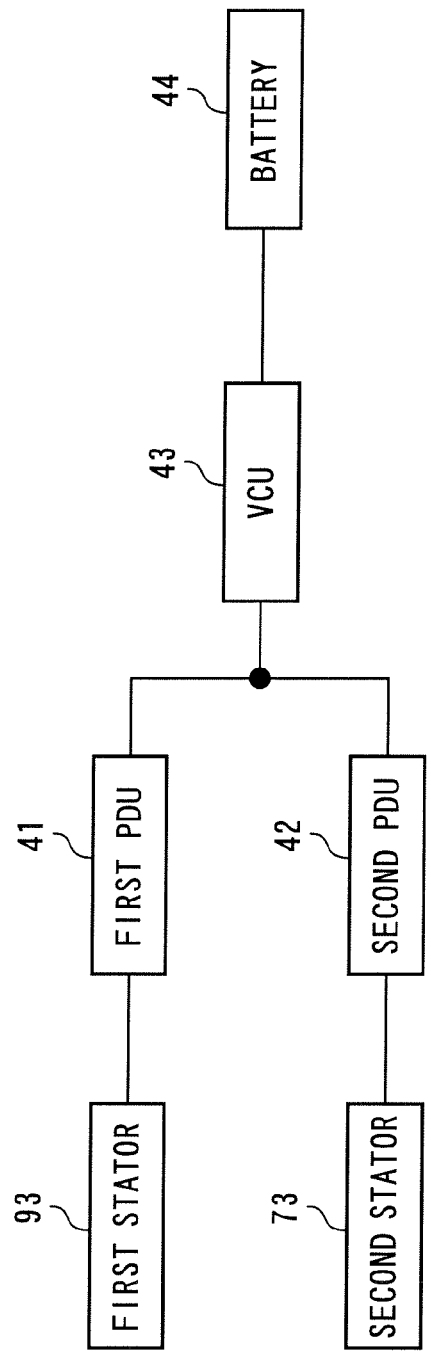
FIG. 56 A block diagram showing a relationship of connections between the first stator, the second stator, the battery, and so forth, which are mounted on the vehicle shown in FIG. 55.

Further, as shown in FIG. 56, the first stator 93 is electrically connected to the battery 44 via the first PDU 41 and VCU 43, and the second stator 73 is electrically connected to the battery 44 via the second PDU 42 and VCU 43. The two stators 93 and 73 are electrically connected to each other via the first and second PDUs 41 and 42.

Further, although not shown, similarly to the fifth embodiment, the first and second rotational angle sensors 83 and 84 deliver the rotational angular positions of the first and second rotors 94 and 95 with respect to the first stator 93, to the ECU 2. Since the first and fourth rotors 94 and 75 are directly connected to each other as described hereinabove, the ECU 2 calculates the rotational angular position of the fourth rotor 75 with respect to the second stator 73 and the fourth rotor rotational speed NR4, based on the detected rotational angular position of the first rotor 94. Further, since the second and third rotors 95 and 74 are directly connected to each other, the ECU 2 calculates the rotational angular position of the third rotor 74 with respect to the second stator 73 and the third rotor rotational speed NR3, based on the detected rotational angular position of the second rotor 95.

Figure 57:
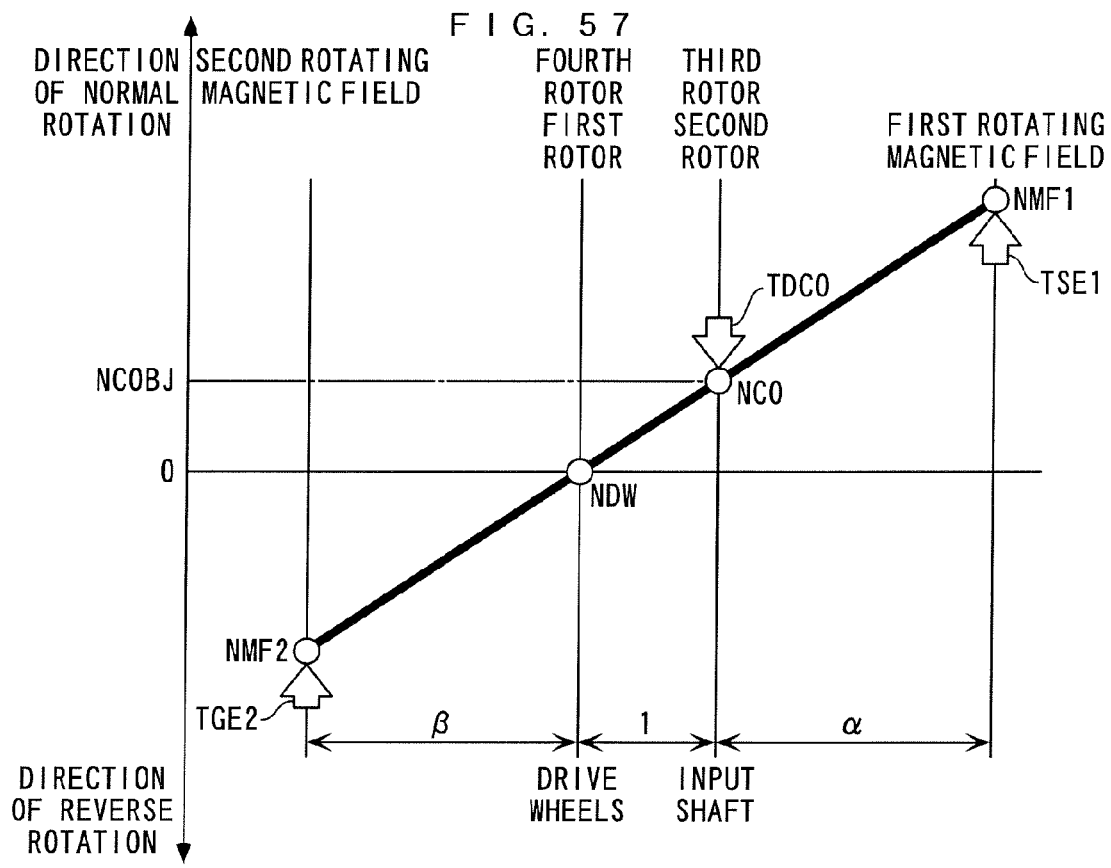
FIG. 57 A velocity collinear chart illustrating an example of the relationship between the rotational speeds of various types of rotary elements of the vehicle shown in FIG. 55 and the relationship between torques thereof, during the vehicle stoppage-time compressor drive mode.

The ECU 2 controls the operations of the engine 3, the clutch CL, and the first and second rotating machines 91 and 71, based on the detection signals from the aforementioned sensors 51, 54 to 57, 83 and 84 of various types according to control programs stored in the ROM. Similarly to the seventh embodiment, this causes the vehicle VE8 to be operated in the vehicle stoppage-time compressor drive mode, the compressor drive-time EV standing start mode, the EV travel-time compressor drive mode, and the EV travel-time ENG start mode. In this case, due to the above-described difference in construction from the seventh embodiment, operations in these operation modes are different from the operations in the case of the seventh embodiment, and hereafter, a description will be given of the different points. Note that also in the following description, similarly to the seventh embodiment, a velocity collinear chart as shown in FIG. 57 is used. First, a description is given of this velocity collinear chart.

As is apparent from the above-described relationship of connections between the various types of rotary elements of the vehicle VE8, the second and third rotor rotational speeds NR2 and NR3 are equal to each other, and are equal to the input shaft rotational speed NCO provided that a change in speed by the belt BE and the first and second pulleys PU1 and PU2 is ignored. Further, the engagement and disengagement of the clutch CL cause the crankshaft 3a to be connected to and disconnected from the input shaft 32 and the second and third rotors 95 and 74. Furthermore, the first and fourth rotor rotational speeds NR1 and NR4 are equal to each other, and are equal to the drive wheel rotational speed NDW provided that a change in speed by the planetary gear unit PGS and the like is ignored. Further, the first magnetic field rotational speed NMF1, the first and second rotor rotational speeds NR1 and NR2 are in the predetermined collinear relationship expressed by the aforementioned equation (68), and the second magnetic field rotational speed NMF2, and the third and fourth rotor rotational speeds NR3 and NR4 are in the predetermined collinear relationship expressed by the aforementioned equation (47).

From the above, during disengagement of the clutch CL, the relationship between the input shaft rotational speed NCO, the drive wheel rotational speed NDW, the first and second magnetic field rotational speeds NMF1 and NMF2 is represented by a velocity collinear chart as shown in FIG. 57. Hereinafter, various types of operation modes will be described with reference to the velocity collinear chart shown in the figure, in order from the vehicle stoppage-time compressor drive mode.

[Vehicle Stoppage-Time Compressor Drive Mode]

In the vehicle stoppage-time compressor drive mode, the clutch CL is disengaged, thereby disconnecting the crankshaft 3a from the input shaft 32 and the second and third rotors 95 and 74. In this state, electric power is supplied from the battery 44 to the first stator 93 of the first rotating machine 91 to cause the first rotating magnetic field to perform normal rotation. Further, electric power is generated in the second stator 73 using motive power transmitted to the third rotor 74, as described hereinafter, and the generated electric power is further supplied to the first stator 93. FIG. 57 illustrates the relationship between the rotational speeds of the various types of rotary elements and the relationship between torques thereof, during the vehicle stoppage-time compressor drive mode.

As is apparent from FIG. 57, the first driving equivalent torque TSE1 is transmitted to the third rotor 74 via the second rotor 95 using the load of the drive wheels DW and DW acting on the first rotor 94 as a reaction force, causing the third rotor 74 to perform normal rotation. Electric power is generated by the second stator 73, as described above, using motive power thus transmitted to the third rotor 74. The second rotating magnetic field generated along with the electric power generation performs reverse rotation, and the second electric power-generating equivalent torque TGE2 acts to lower the second magnetic field rotational speed NMF2 of the second rotating magnetic field performing reverse rotation. As a consequence, the first driving equivalent torque TSE1 is transmitted to the input shaft 32, using the second electric power-generating equivalent torque TGE2 as a reaction force, to thereby cause the input shaft 32 to perform normal rotation.

Furthermore, in the vehicle stoppage-time compressor drive mode, the electric power supplied to the first stator 93 and the electric power generated in the second stator 73 are controlled such that the compressor-transmitted torque TDCO becomes equal to the target torque TCOBJ. Specifically, the electric power supplied to the first stator 93 is controlled such that there holds the following equation (87) between the first driving equivalent torque TSE1 and the target torque TCOBJ. Further, the electric power generated by the second stator 73 is controlled such that there holds the following equation (88) between the second electric power-generating equivalent torque TGE2 and the target torque TCOBJ.

$$TSE1=-(\beta+1)TCOBJ/(\beta+1+\alpha) \qquad (87)$$

$$TGE2=-\alpha \cdot TCOBJ/(\alpha+1+\beta) \qquad (88)$$

Further, the first and second magnetic field rotational speed NMF1 and NMF2 are controlled such that the input shaft rotational speed NCO becomes equal to the target rotational speed NCOBJ, and the drive wheel rotational speed NDW becomes equal to 0, i.e. such that the aforementioned equations (72) and (57) hold, respectively.

[Compressor Drive-Time EV Standing Start Mode]

Figure 58:
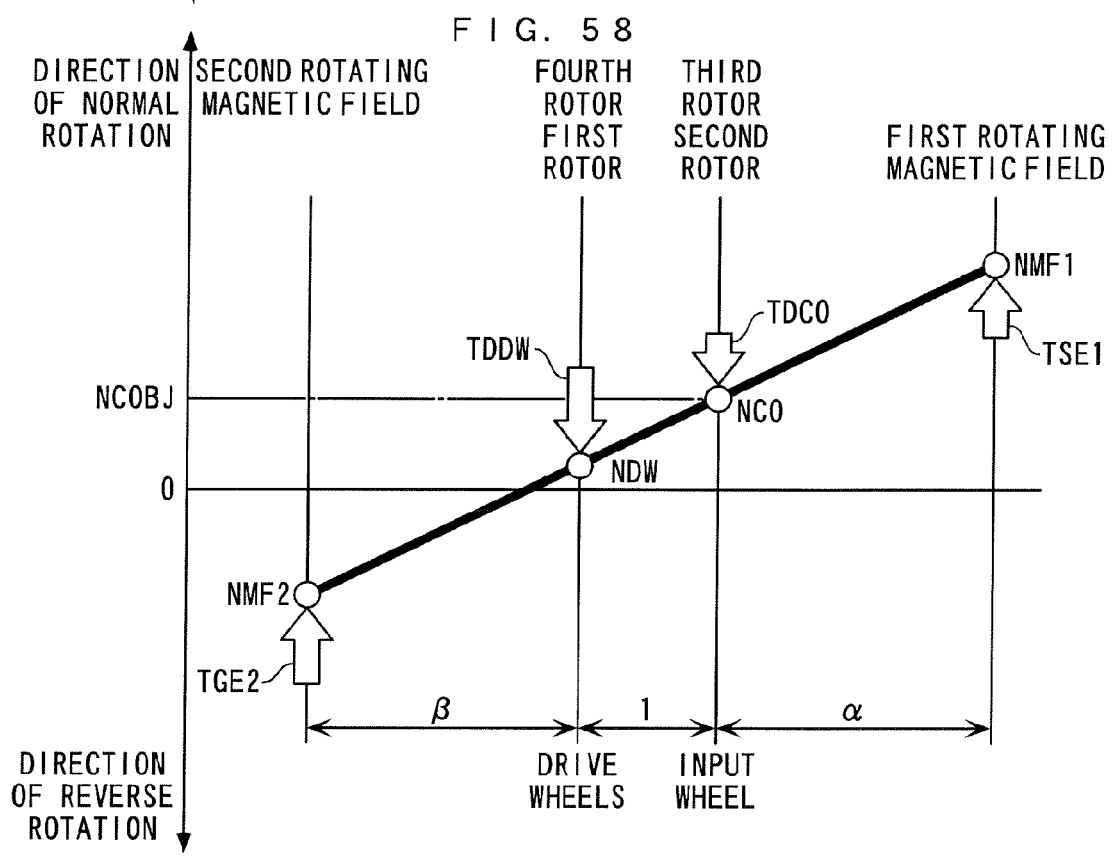
FIG. 58 A velocity collinear chart illustrating an example of the relationship between the rotational speeds of the various types of rotary elements of the vehicle shown in FIG. 55 and the relationship between torques thereof, at the start of the compressor drive-time EV standing start mode.

In the compressor drive-time EV standing start mode, similarly to the case of the vehicle stoppage-time compressor drive mode, in the state where the clutch CL is disengaged, thereby disconnecting the crankshaft 3a from the input shaft 32 and the second and third rotors 95 and 74, electric power is supplied from the battery 44 to the first stator 93 to cause the first rotating magnetic field to perform normal rotation, and the electric power supplied to the first stator 93 is increased. Further, electric power is generated in the second stator 73 using motive power transmitted to the third rotor 74. The generated electric power is further supplied to the first stator 93, and the second magnetic field rotational speed NMF2 is controlled such that it becomes equal to 0. FIG. 58 illustrates the relationship between the rotational speeds of the various types of rotary elements and the relationship between torques thereof, in this case.

By controlling the operations of the first and second rotating machines 91 and 71 as described above, motive power is transmitted not only to the input shaft 32 but also to the drive wheels DW and DW. This causes, as shown in FIG. 58, the drive wheels DW and DW to perform normal rotation and increase the drive wheel rotational speed NDW, whereby the vehicle VE8 makes a standing start.

In the compressor drive-time EV standing start mode, the electric power supplied to the first stator 93 and the electric power generated in the second stator 73 are controlled such that the compressor-transmitted torque TDCO becomes equal to the target torque TCOBJ, and the drive wheel-transmitted torque TDDW becomes equal to the above-described demanded torque TREQ. Specifically, the electric power supplied to the first stator 93 is controlled such that there holds the following equation (89) between the first driving equivalent torque TSE1, the target torque TCOBJ, and the demanded torque TREQ. Further, the electric power generated in the second stator 73 is controlled such that there holds the following equation (90) between the second electric power-generating equivalent torque TGE2, the target torque TCOBJ, and the demanded torque TREQ:

$$TSE1 = -\{(\beta+1)TCOBJ + \beta \cdot TREQ\}/(\beta+1+\alpha) \quad (89)$$

$$TGE2 = -\{\alpha \cdot TCOBJ + (\alpha+1)TREQ\}/(\alpha+1+\beta) \quad (90)$$

Furthermore, the first and second magnetic field rotational speed NMF1 and NMF2 are controlled such that the input shaft rotational speed NCO becomes equal to the target rotational speed NCOBJ, while maintaining the drive wheel rotational speed NDW at the time. Specifically, the first and second magnetic field rotational speeds NMF1 and NMF2 are controlled such that the aforementioned equations (74) and (60) hold between the drive wheel rotational speed NDW and the target rotational speed NCOBJ, respectively.

Figure 59:
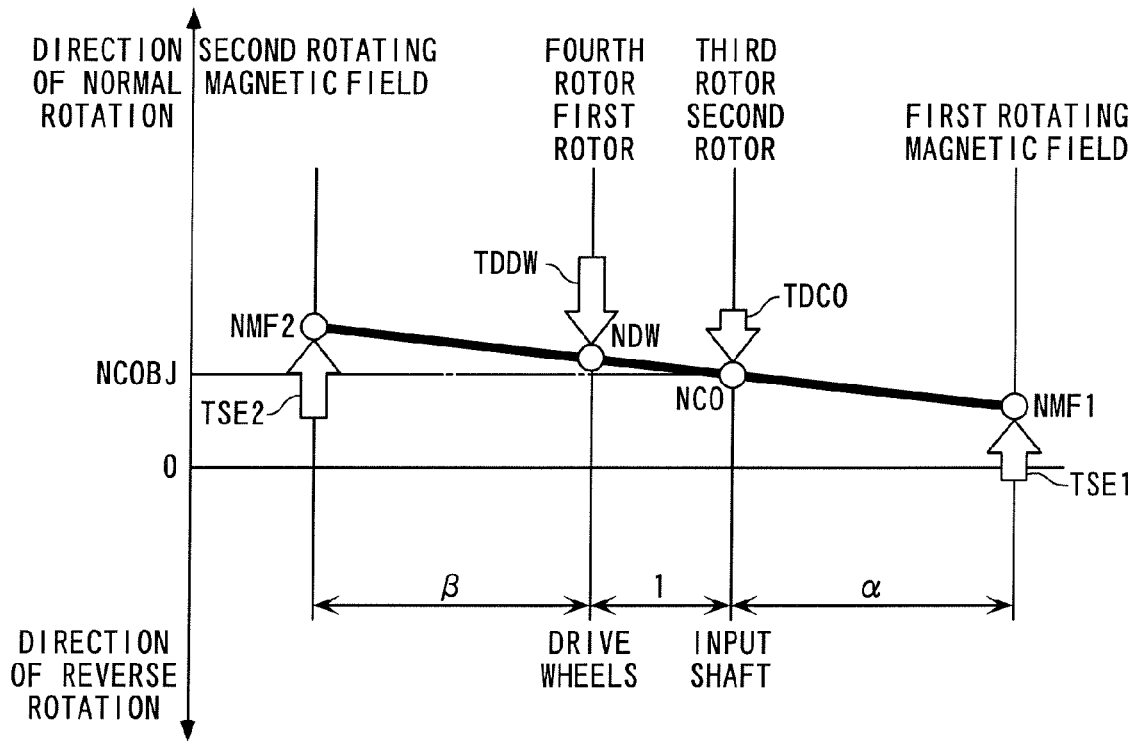
FIG. 59 A velocity collinear chart illustrating an example of the relationship between the rotational speeds of the various types of rotary elements of the vehicle shown in FIG. 55 and the relationship between torques thereof, after the start of the compressor drive-time EV standing start mode.

Further, in the compressor drive-time EV standing start mode, after the second magnetic field rotational speed NMF2 has become equal to 0, electric power is supplied from the battery 44 not only to the first stator 93 but also to the second stator 73, to cause the second rotating magnetic field to perform normal rotation. FIG. 59 illustrates the relationship between the rotational speeds of the various types of rotary elements and the relationship between the torques thereof, in this case.

In this case, as is apparent from FIG. 59, the first and second driving equivalent torques TSE1 and TSE2 are combined in the first and second rotating machines 91 and 71, and the combined torque is transmitted to the input shaft 32 and the drive wheels DW and DW, whereby the input shaft 32 and the drive wheels DW and DW continue to perform normal rotation. Further, as is apparent from a comparison between FIG. 58 and FIG. 59, the electric power supplied to the first stator 93 is controlled such that the aforementioned equation (89) holds, and the electric power supplied to the second stator 73 is controlled such that there holds the following equation (91) obtained by replacing the second electric power-generating equivalent torque TGE2 of the aforementioned equation (90) with the second driving equivalent torque TSE2. Furthermore, the first and second magnetic field rotational speed NMF1 and NMF2 are controlled such that the aforementioned equations (74) and (60) hold, respectively.

$$TSE2 = -\{\alpha \cdot TCOBJ + (\alpha+1)TREQ\}/(\alpha+1+\beta) \quad (91)$$

[EV travel-time compressor drive mode]

In the EV travel-time compressor drive mode, similarly to the case of the compressor drive-time EV standing start mode shown in FIG. 59, in the state where the clutch CL is disengaged, thereby disconnecting the crankshaft 3a from the input shaft 32, the second and third rotors 95 and 74, electric power is supplied from the battery 44 to the first and second stators 93 and 73 to cause the first and second rotating magnetic fields to perform normal rotation. This causes combined torque formed by combining the first and second driving equivalent torques TSE1 and TSE2 to be transmitted to the input shaft 32 and the drive wheels DW and DW, whereby the input shaft 32 and the drive wheels DW and DW continue to perform normal rotation.

Further, in the EV travel-time compressor drive mode, the electric power supplied to the first and second stators 93 and 73 is controlled such that the aforementioned equations (89) and (91) hold, respectively, and the first and second magnetic field rotational speeds NMF1 and NMF2 are controlled such that the aforementioned equations (74) and (60) hold, respectively. [EV travel-time ENG start mode]

In the EV travel-time ENG start mode, immediately after a shift from the EV travel-time compressor drive mode, in the state where the clutch CL is disengaged, thereby disconnecting the crankshaft 3a from the input shaft 32 and the second and third rotors 95 and 74, electric power is supplied from the battery 44 to the first and second stators 93 and 73 to cause the first and second rotating magnetic fields to perform normal rotation. Further, by controlling the electric power supplied to the first and normal rotation. Further, by controlling the electric power supplied to the first and second stators 93 and 73, the second magnetic field rotational speed NMF2 is increased and the first magnetic field rotational speed NMF1 is controlled such that it becomes equal to 0, so as to maintain the drive wheel rotational speed NDW at the time.

Figure 60:
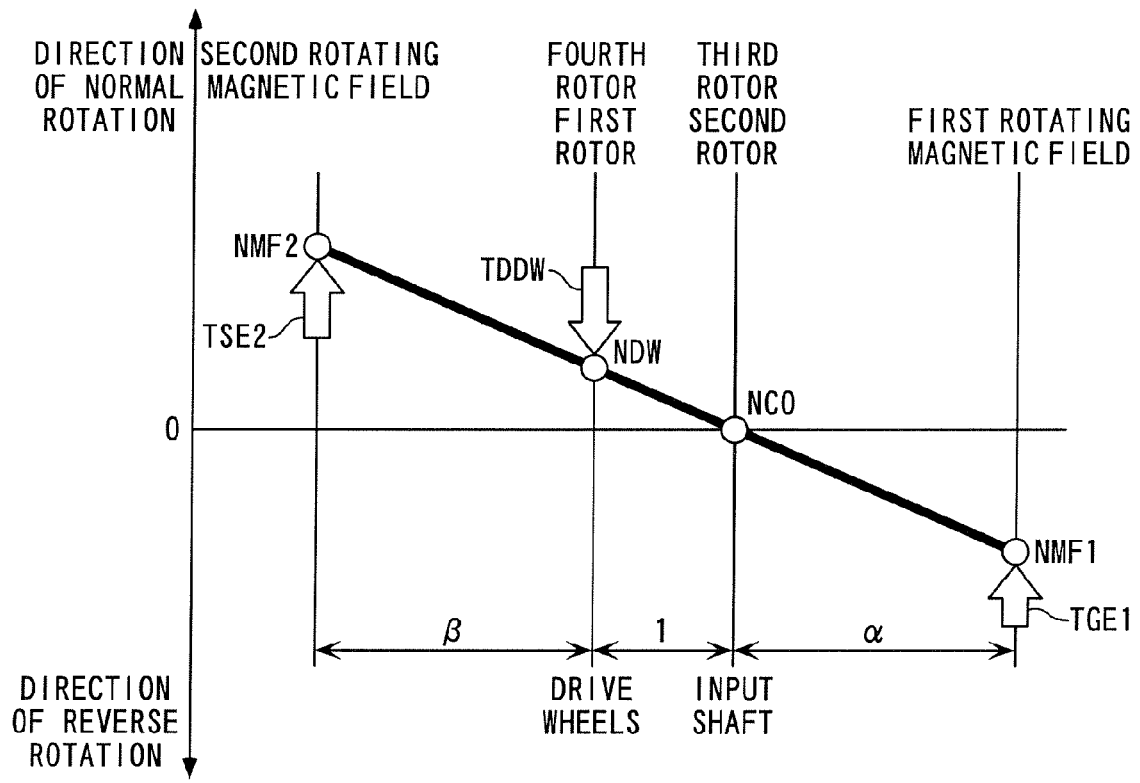
FIG. 60 A velocity collinear chart illustrating an example of the relationship between the rotational speeds of the various types of rotary elements of the vehicle shown in FIG. 55 and the relationship between torques thereof, at the start of the EV travel-time ENG start mode.

When the first magnetic field rotational speed NMF1 has become equal to 0, the supply of electric power from the battery 44 to the first stator 93 is stopped, and electric power is generated in the first stator 93 using motive power transmitted from the second rotating machine 71 to the first and second rotors 94 and 95. The generated electric power is further supplied to the second stator 73. In this case, the electric power generated in the first stator 93 and the electric power supplied to the second stator 73 are controlled, whereby while maintaining the drive wheel rotational speed NDW at the time, the second magnetic field rotational speed NMF2 is increased and the first magnetic field rotational speed NMF1 is increased in the direction of reverse rotation, such that the second and third rotor rotational speeds NR2 and NR3 become equal to 0. FIG. 60 illustrates the relationship between the rotational speeds of the various types of rotary elements and the relationship between the torques thereof, in this case.

As is apparent from FIG. 60, the first electric power-generating equivalent torque TGE1 acts to lower the first magnetic field rotational speed NMF1 of the first rotating magnetic field performing reverse rotation. Further, the second driving equivalent torque TSE2 is transmitted to the drive wheels DW and DW, using the first electric power-generating equivalent torque TGE1 as a reaction force. In this case, by controlling the electric power generated in the first stator 93 and the electric power supplied to the second stator 73, the first electric power-generating equivalent torque TGE1 and the second driving equivalent torque TSE2 are controlled such that the drive wheel-transmitted torque TDDW becomes equal to the demanded torque TREQ. Further, the first and second magnetic field rotational speeds NMF1 and NMF2 are controlled such that the second and third rotor rotational speeds NR2 and NR3 become equal to 0, while maintaining the drive wheel rotational speed NDW at the time.

Specifically, the electric power generated in the first stator 93 is controlled such that there holds the following equation (92) between the first electric power-generating equivalent torque TGE1 and the demanded torque TREQ. Further, the electric power supplied to the second stator 73 is controlled such that there holds the following equation (93) between the second driving equivalent torque TSE2 and the demanded torque TREQ.

$$TGE1 = -\beta \cdot TREQ/(\beta+1+\alpha) \quad (92)$$

$$TSE2 = -(\alpha+1)TREQ/(\alpha+1+\beta) \quad (93)$$

Further, the first and second magnetic field rotational speeds NMF1 and NMF2 are controlled such that the aforementioned equations (83) and (64) hold, respectively.

Figure 61:
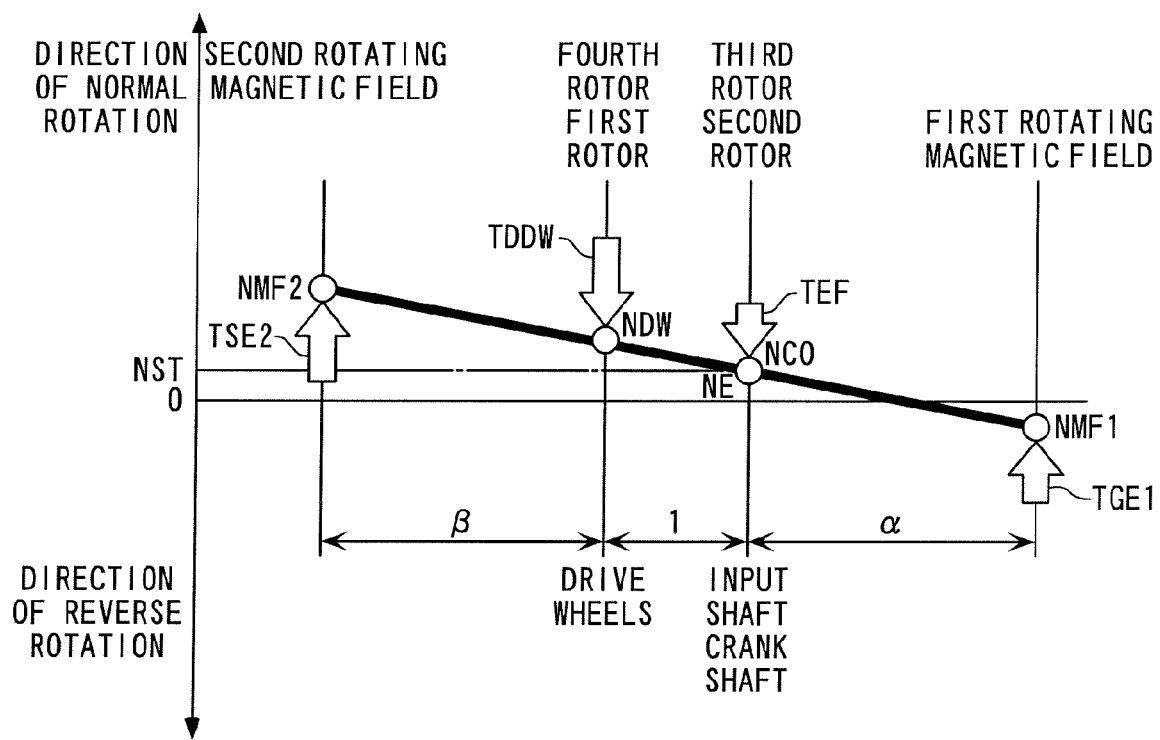
FIG. 61 A velocity collinear chart illustrating an example of the relationship between the rotational speeds of the various types of rotary elements of the vehicle shown in FIG. 55 and the relationship between torques thereof, after the start of the EV travel-time ENG start mode.

When the second and third rotor rotational speeds NR2 and NR3 have become equal to 0, the clutch CL, which has been disengaged until the time, is engaged, thereby connecting the crankshaft 3a to the second and third rotor 95 and 74. Further, the electric power generated in the first stator 93 and the electric power supplied to the second stator 73 are controlled, whereby while maintaining the drive wheel rotational speed NDW at the time, the first magnetic field rotational speed NMF1 of the first rotating magnetic field performing reverse rotation is controlled such that it becomes equal to 0, and the second magnetic field rotational speed NMF2 of the second rotating magnetic field performing normal rotation is lowered. FIG. 61 illustrates the relationship between the rotational speeds of the various types of rotary elements and the relationship between the torques thereof, in this case.

Through the above-described control of the clutch CL and the first and second rotating machines 91 and 71, torques are transmitted not only to the drive wheels DW and DW but also to the crankshaft 3a to cause them to perform normal rotation. As a consequence, the drive wheels DW and DW to continue to perform normal rotation, and the crankshaft 3a performs normal rotation to increase the engine speed NE. In this state, the ignition operations of the fuel injection valves 3b and the spark plugs 3c of the engine 3 are controlled, whereby the engine 3 at rest is started.

In this case, by controlling the electric power generated in the first stator 93 and the electric power supplied to the second stator 73, the first electric power-generating equivalent torque TGE1 and the second driving equivalent torque TSE2 are controlled such that the drive wheel-transmitted torque TDDW becomes equal to the demanded torque TREQ. Further, the first and second magnetic field rotational speed NMF1 and NMF2 are controlled such that the engine speed NE becomes equal to the predetermined value NST suitable for starting the engine 3, while maintaining the drive wheel rotational speed NDW at the time.

Specifically, the electric power generated in the first stator 93 is controlled such that there holds the following equation (94) between the first electric power-generating equivalent torque TGE1, the demanded torque TREQ, and the engine friction TEF. Further, the electric power supplied to the second stator 73 is controlled such that there holds the following equation (95) between the second driving equivalent torque TSE2, the demanded torque TREQ, and the engine friction TEF.

$$TGE1 = -\{\beta \cdot TREQ + (\beta+1)TEF\}/(\beta+1+\alpha) \quad (94)$$

$$TSE2 = -\{(\alpha+1)TREQ + \alpha \cdot TEF\}/(\alpha+1+\beta) \quad (95)$$

Further, the first and second magnetic field rotational speeds NMF1 and NMF2 are controlled such that the aforementioned equations (86) and (67) hold, respectively.

Note that in the case where the engine speed NE is controlled to the predetermined value NST as described above, when the drive wheel rotational speed NDW is relatively low, the direction of rotation of the first rotating magnetic field determined by the relationship between the two NST and NDW sometimes becomes the direction of normal rotation. In this case, electric power is supplied from the battery 44 to the first stator 93, and the first rotating magnetic field is caused to perform normal rotation. Further, electric power supplied to the first stator 93 is controlled such that there holds an equation obtained by replacing the first electric power-generating equivalent torque TGE1 of the aforementioned equation (94) with the first driving equivalent torque TSE1. Furthermore, not only the engine friction TEF but also the load of the compressor 31 acts on the second and third rotors 95 and 74, and hence in the EV travel-time ENG start mode, the operations of the first and second rotating machines 91 and 71 may be controlled according to the load of the compressor 31.

The above-described eighth embodiment corresponds to the invention as claimed in claims 9, 10 and 14 to 17. Correspondence between various types of elements of the eighth embodiment and various types of elements of the invention as claimed in claims 9, 10 and 14 to (hereinafter referred to, generically, as the "sixth invention") is as follows: The vehicle VE8 and the drive wheels DW and DW of the eighth embodiment correspond to a moving apparatus and driven parts of the sixth invention, respectively. Further, the engine 3, the crankshaft 3a, the compressor 31, and the input shaft 32 of the eighth embodiment corresponds to a prime mover, a first output portion, an accessory, and an input portion of the sixth invention. Further, the ECU 2, the VCU 43, and the first and second PDUs 41 and 42 of the eighth embodiment correspond to a controller of the sixth invention.

Furthermore, the permanent magnets 94a and the cores 95a of the eighth embodiment correspond to the first magnets and the first soft magnetic material elements of the sixth invention, respectively, and the iron core 93a and the U-phase to W-phase coils 93b of the eighth embodiment correspond to the first armature row of the invention as claimed in claims 10 and 14 to 17. Further, the second rotating machine 71 of the eighth embodiment corresponds to restriction means of the invention as claimed in claim 9. Furthermore, the permanent magnets 74a and the cores 75a of the eighth embodiment correspond to the second magnets and the second soft magnetic material elements of the invention as claimed in claims 14 to 17, respectively, and the iron core 73a and the U-phase to W-phase coils 73c to 73e of the eighth embodiment correspond to a second armature row of the invention as claimed in claims 15 to 17.

As described heretofore, according to the eighth embodiment, when the compressor 31 is driven in the state where the drive wheels DW and DW are at rest during stoppage of the engine 3, the vehicle stoppage-time compressor drive mode controls the operations of the first and second rotating machines 91 and 71 to thereby input motive power to the input portion 32, for driving the compressor 31, and restrict the drive wheel rotational speed NDW such that it becomes equal to 0. Therefore, it is possible to properly drive the compressor 31 while positively preventing the drive wheels DW and DW from being driven. Further, in the vehicle stoppage-time compressor drive mode, both the first and second magnetic field rotational speed NMF1 and NMF2 become higher than 0, so that it is possible to prevent the overheating of the first PDU 41, the first rotating machine 91, the second PDU 42, and the second rotating machine 71, and secure a sufficiently large torque of the first and second rotating machines 91 and 71.

Furthermore, similarly to the fifth embodiment, by setting the ratio between the number of the first armature magnetic poles, the number of the first magnet magnetic poles, and the number of the cores 95a as desired within a range satisfying the condition of 1:n:(1+n)/2 (n≠1.0), it is possible to freely set a collinear relationship in rotational speed between the first rotating magnetic field and the first and second rotors 94 and 95. Therefore, it is possible to enhance the degree of freedom in design of the first rotating machine 91. Further, similarly to the fourth embodiment, by setting the ratio between the number of the second armature magnetic poles, the number of the second magnet magnetic poles, and the number of the cores 75a as desired within a range satisfying the condition of 1:m:(1+m)/2 (m≠1.0), it is possible to freely set a collinear relationship in rotational speed between the second rotating magnetic field and the third and fourth rotors 74 and 75. Therefore, it is possible to enhance the degree of freedom in design of the second rotating machine 71.

For the same reason described above, by setting the aforementioned first pole pair number ratio α to a larger value, it is possible to set larger the distance between a straight line representing the second rotor rotational speed NR2 and a straight line representing the first magnetic field rotational speed NMF1 in the velocity collinear chart. Further, by setting the aforementioned second pole pair number ratio 3 to a larger value, it is possible to set larger the distance between a straight line representing the fourth rotor rotational speed NR4 and a straight line representing the second magnetic field rotational speed NMF2 in the velocity collinear chart. This makes it possible to efficiently obtain the above-mentioned advantageous effects, i.e. the advantageous effects that it is possible to prevent the first PDU 41, the first rotating machine 91, the second PDU 42, and the second rotating machine 71 from being overheated and that it is possible to secure sufficiently large torques of the first and second rotating machines 91 and 71.

Further, in the vehicle stoppage-time compressor drive mode, the clutch CL holds the crankshaft 3a in the state disconnected from the input shaft 32 and the second and third rotors 95 and 74, so that it is possible to prevent motive power from being transmitted from the first rotating machine 91 to the crankshaft 3a, thereby making it possible to improve driving efficiency in driving the compressor 31. Further, similarly to the third embodiment, in the EV travel-time compressor drive mode, the operations of the first and second rotating machines 91 and 71 are controlled such that the compressor-transmitted torque TDCO becomes equal to the target torque TCOBJ, and the input shaft rotational speed NCO becomes equal to the target rotational speed NCOBJ, and hence it is possible to properly drive the compressor 31 and reduce computation load on the ECU 2.

Further, in the compressor drive-time EV standing start mode and the EV travel-time compressor drive mode, the clutch CL holds the crankshaft 3a in the state disconnected from the input shaft 32 and the second and third rotors 95 and 74, so that it is possible to prevent motive power from being wastefully transmitted to the crankshaft 3a, and therefore it is possible to improve driving efficiency in driving the drive wheels DW and DW. Further, in the subsequent EV travel-time ENG start mode, by controlling the operations of the first and second rotating machines 91 and 71, the second and third rotor rotational speed NR2 and NR3 are controlled such that they become equal to 0. When the second and third rotor rotational speed NR2 and NR3 have become equal to 0, the clutch CL connects the crankshaft 3a to the input shaft 32 and the second and third rotors 95 and 74, and the engine 3 is started. Therefore, it is possible to properly start the engine 3 without causing a shock due to engagement of the clutch CL. This makes it possible to reduce energy required to drive the dog clutch used as the clutch CL.

Note that although in the eighth embodiment, the second and third rotors 95 and 74 are directly connected to each other, if they are mechanically connected to the crankshaft 3a and the input shaft 32, they are not necessarily required to be directly connected to each other, and although the first and fourth rotors 94 and 75 are directly connected to each other, if they are mechanically connected to the drive wheels DW and DW, they are not necessarily required to be directly connected to each other. Further, although in the eighth embodiment, the second and third rotors 95 and 74 are directly connected to the crankshaft 3a, they may be mechanically connected to the crankshaft 3a via gears, a pulley, a chain, a transmission, or the like. Furthermore, although in the eighth embodiment, the first and fourth rotors 94 and 75 are connected to the drive wheels DW and DW via the chain CH and the differential gear DG, they may be mechanically directly connected to the drive wheels DW and DW. Further, although in the eighth embodiment, the second and third rotors 95 and 74 are connected to the input shaft 32 via the belt BE, and the first and second pulleys PU1 and PU2, they may be mechanically directly connected to the input shaft 32.

Furthermore, although in the eighth embodiment, similarly to the fourth embodiment, the first pulley PU1 is provided on the first rotating shaft 61 between the clutch CL and the bearing B1, and the compressor 31 is disposed in the vicinity of the portion of the casing CA, where the second stator 73 is provided, the two PU1 and 31 may be provided e.g. in the following manner: The first pulley PU1 may be provided in the vicinity of the bearing B2 on the first rotating shaft 61, and the compressor 31 may be disposed in the vicinity of the portion of the casing CA, where the first stator 93 is provided.

Figure 62:
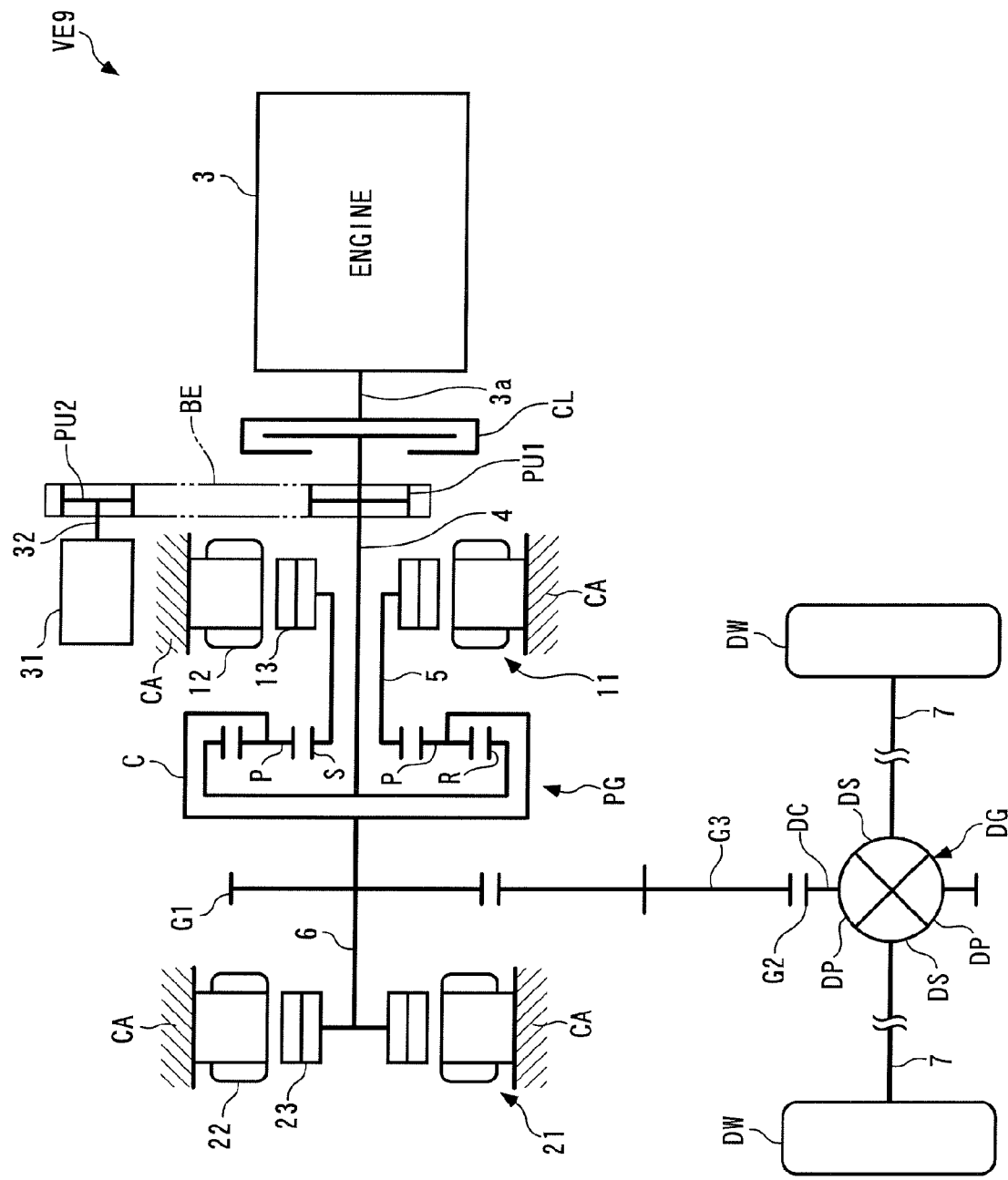
FIG. 62 A schematic view of a vehicle as a moving apparatus according to a ninth embodiment of the present invention.

Next, a vehicle VE9 as a moving apparatus according to a ninth embodiment of the present invention will be described with reference to FIG. 62. The vehicle VE9 is distinguished from the first embodiment mainly in that the relationship of connections of the input shaft 32 and the drive wheels DW and DW to the carrier C and the ring gear R is reversed. In FIG. 62, the same component elements as those of the first embodiment are denoted by the same reference numerals. The following description is mainly given of different points of the vehicle VE9 from the first embodiment.

As shown in FIG. 62, in the vehicle VE9, differently from the first embodiment, the carrier C is integrally formed not on the aforementioned first rotating shaft 4 but on the third rotating shaft 6. Thus, the carrier C is mechanically directly connected to the second rotor 23 of the second rotating machine 21, and is mechanically connected to the drive wheels DW and DW via the differential gear DG and the like. Further, differently from the first embodiment, the ring gear R is integrally formed not on the third rotating shaft 6 but on the first rotating shaft 4. Thus, the ring gear R is mechanically connected to the input shaft 32 via the belt BE, and the first and second pulleys PU1 and PU2, and is mechanically directly connected to the crankshaft 3a via the clutch CL.

Figure 63:
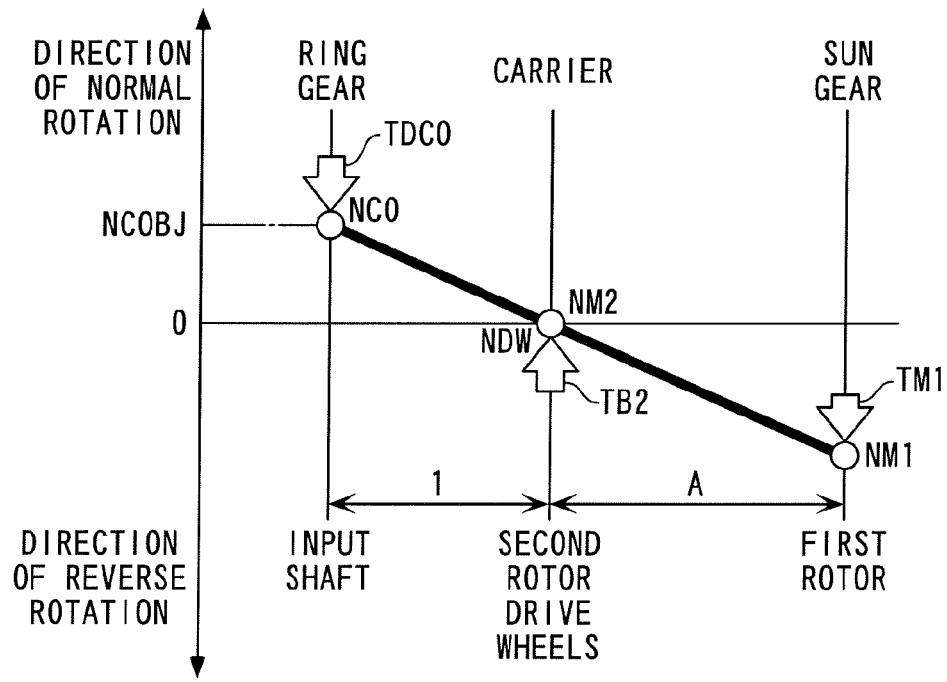
FIG. 63 A velocity collinear chart illustrating an example of the relationship between the rotational speeds of various types of rotary elements of the vehicle shown in FIG. 62 and the relationship between torques thereof, during the vehicle stoppage-time compressor drive mode.

The ECU 2 controls the operations of the engine 3, the clutch CL, and the first and second rotating machines 11 and 21 based on the detection signals from the aforementioned sensors 51 to 57 of various types, according to control programs stored in the ROM. Similarly to the first embodiment, this causes the vehicle VE9 to be operated in various types of operation modes. In this case, due to the above-described difference in construction from the first embodiment, operations in these operation modes are different from the operations in the case of the first embodiment, and hereafter, a description will be given of the different points. Note that also in the following description, similarly to the first embodiment, a velocity collinear chart as shown in FIG. 63 is used. First, a description is given of this velocity collinear chart.

As is apparent from the above-described relationship of connections between the various types of rotary elements of the vehicle VE9, the rotational speed of the sun gear S and the first rotating machine rotational speed NM1 are equal to each other. Further, the rotational speed of the carrier C and the second rotating machine rotational speed NM2 are equal to each other, and are equal to the drive wheel rotational speed NDW provided that a change in speed by the differential gear DG and the like is ignored. Furthermore, the rotational speed of the ring gear R is equal to the input shaft rotational speed NCO provided that a change in speed by the belt BE and the first and second pulleys PU1 and PU2 is ignored. Further, the clutch CL is engaged and disengaged to thereby connect and disconnect the crankshaft 3a to and from the input shaft 32 and the ring gear R.

From the above, during disengagement of the clutch CL, the relationship between the input shaft rotational speed NCO, the drive wheel rotational speed NDW, the first and second rotating machine rotational speeds NM1 and NM2 is represented by a velocity collinear chart as shown in FIG. 63. Hereinafter, various types of operation modes will be described with reference to the velocity collinear chart shown in the figure, in order from the vehicle stoppage-time compressor drive mode.

[Vehicle Stoppage-Time Compressor Drive Mode]

In the vehicle stoppage-time compressor drive mode, the clutch CL is disengaged, thereby disconnecting the crankshaft 3a from the input shaft 32 and the ring gear R. In this state, electric power is supplied from the battery 44 to the first stator 12 of the first rotating machine 11 to cause the first rotor 13 to perform reverse rotation. Further, electric current is caused to flow through the second stator 22 of the second rotating machine 21 such that the second rotor 23 is held at rest. FIG. 63 illustrates the relationship between the rotational speeds of the various types of rotary elements and the relationship between torques thereof, during the vehicle stoppage-time compressor drive mode.

As is apparent from FIG. 63, by transmitting the first powering torque TM1 to the sun gear S, the sun gear S performs reverse rotation together with the first rotor 13. Further, the first powering torque TM1 transmitted to the sun gear S is transmitted to the input shaft 32 via the ring gear R, using the second braking torque TB2 acting on the carrier C as a reaction force, to cause the input shaft 32 to perform normal rotation together with the ring gear R. As described above, motive power is transmitted from the first rotating machine 11 to the input shaft 32, whereby the compressor 31 is driven.

Further, in the vehicle stoppage-time compressor drive mode, the electric power supplied to the first stator 12 is controlled such that the compressor-transmitted torque TDCO becomes equal to the target torque TCOBJ. Specifically, the electric power supplied to the first stator 12 is controlled such that there holds the following equation (96) between the first powering torque TM1 and the target torque TCOBJ.

$$TM1 = TCOBJ/A \tag{96}$$

Furthermore, the first rotating machine rotational speed NM1 is controlled such that the input shaft rotational speed NCO becomes equal to the target rotational speed NCOBJ, i.e. such that there holds the following equation (97):

$$NM1 = -A \cdot NCOBJ \tag{97}$$

In the vehicle stoppage-time compressor drive mode, as is apparent from FIG. 63, although the first powering torque TM1 transmitted to the sun gear S acts on the carrier C and the drive wheels DW and DW to cause the carrier C and the drive wheels DW and DW to perform reverse rotation, using the load of the compressor 31 acting on the ring gear R as a reaction force, the second rotor 23 is held, as described above, at rest together with the carrier C and the drive wheels DW and DW, so that the drive wheels DW and DW do not perform reverse rotation.

[EV Travel-Time Compressor Drive Mode]

First, a brief description will be given of the EV travel mode. During the EV travel mode, the clutch CL is disengaged, thereby disconnecting the crankshaft 3a from the input shaft 32 and the ring gear R. In this state, electric power is supplied from the battery 44 to the second stator 22 to cause the second rotor 23 to perform normal rotation. The motive power of the second rotating machine 21 generated along with the normal rotation of the second rotor 23 is transmitted to the carrier C and the drive wheels DW and DW, whereby the carrier C and the drive wheels DW and DW perform normal rotation to cause the vehicle VE9 to travel forward. In this case, when the load of the compressor 31 acting on the ring gear R is larger than the friction of the second rotor 23 acting on the sun gear S, the rotational speed of the ring gear R and the input shaft rotational speed NCO become approximately equal to 0, and the motive power transmitted from the second rotating machine 21 to the carrier C, as described above, is transmitted to the sun gear S and the first rotor 13, so that the two S and 13 idly rotate in the direction of normal rotation.

In a case where the operation mode is shifted to the EV travel-time compressor drive mode from the above state to drive the compressor 31, the clutch CL and the second rotating machine 21 are controlled similarly to the EV travel mode, thereby continuing to hold the crankshaft 3a in the state disconnected from the input shaft 32 and the ring gear R, and continuing to cause the drive wheels DW and DW to perform normal rotation. In this state, electric power is generated in the first stator 12 using the motive power transmitted to the first rotor 13 as described above, and the generated electric power is supplied to the second stator 22.

Figure 64:
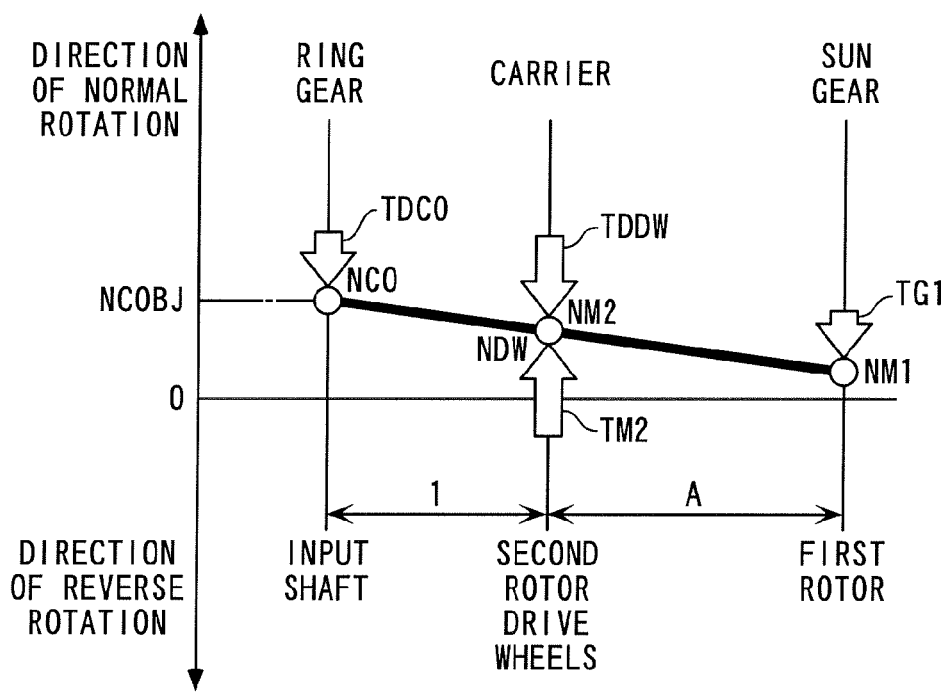
FIG. 64 A velocity collinear chart illustrating an example of the relationship between the rotational speeds of the various types of rotary elements of the vehicle shown in FIG. 62 and the relationship between torques thereof, during the EV travel-time compressor drive mode.

FIG. 64 illustrates the relationship between the rotational speeds of the various types of rotary elements and the relationship between the torques thereof, in this case.

As is apparent from FIG. 64, part of the second powering torque TM2 is transmitted to the carrier C, and is transmitted to the ring gear R using the first electric power generation torque TG1 transmitted to the sun gear S as a reaction force, to be further transmitted to the input shaft 32. This causes the input shaft 32 to perform normal rotation, and causes the compressor 31 to be driven. Further, the remainder of the second powering torque TM2 is transmitted to the drive wheels DW and DW, whereby the drive wheels DW and DW continue to perform normal rotation.

In this case, the electric power generated in the first stator 12 and the electric power supplied to the second stator 22 are controlled such that the compressor-transmitted torque TDCO becomes equal to the target torque TCOBJ, and the drive wheel-transmitted torque TDDW becomes equal to the demanded torque TREQ.

Specifically, the electric power generated in the first stator 12 is controlled such that there holds the following equation (98) between the first electric power generation torque TG1 and the target torque TCOBJ. Further, since the second powering torque TM2 transmitted to the carrier C is transmitted to the input shaft 32 and the drive wheels DW and DW as described above, the electric power supplied to the second stator 22 is controlled such that there holds the following equation (99) between the target torque TCOBJ and the demanded torque TREQ.

$$TG1 = TCOBJ/A \quad (98)$$

$$TM2 = -\{[(A+1)TCOBJ/A] + TREQ\} \quad (99)$$

Furthermore, the second rotating machine rotational speed NM2 is controlled such that it becomes equal to the drive wheel rotational speed NDW, and the first rotating machine rotational speed NM1 is controlled such that there holds the following equation (100):

$$NM1 = (A+1)NDW - A \cdot NCOBJ \quad (100)$$

Note that the direction of rotation of the first rotor 13 determined by the relationship between the drive wheel rotational speed NDW and the target rotational speed NCOBJ sometimes becomes the direction of reverse rotation. In this case, electric power is supplied from the battery 44 to the first stator 12. Further, the electric power supplied to the first stator 12 is controlled such that the aforementioned equation (96) holds.

The above-mentioned ninth embodiment corresponds to the first invention (invention as claimed in claim 1). Correspondence between various types of elements of the ninth embodiment and various types of elements of the first invention is as follows: The vehicle VE9 of the ninth embodiment corresponds to the moving apparatus of the first invention. Correspondence between the other elements is the same as in the first embodiment.

As described above, according to the ninth embodiment, it is possible to obtain the same advantageous effects as provided by the first embodiment, including the advantageous effect that it is possible to properly drive the compressor 31, while positively preventing the drive wheels DW and DW from being driven.

Figure 65:
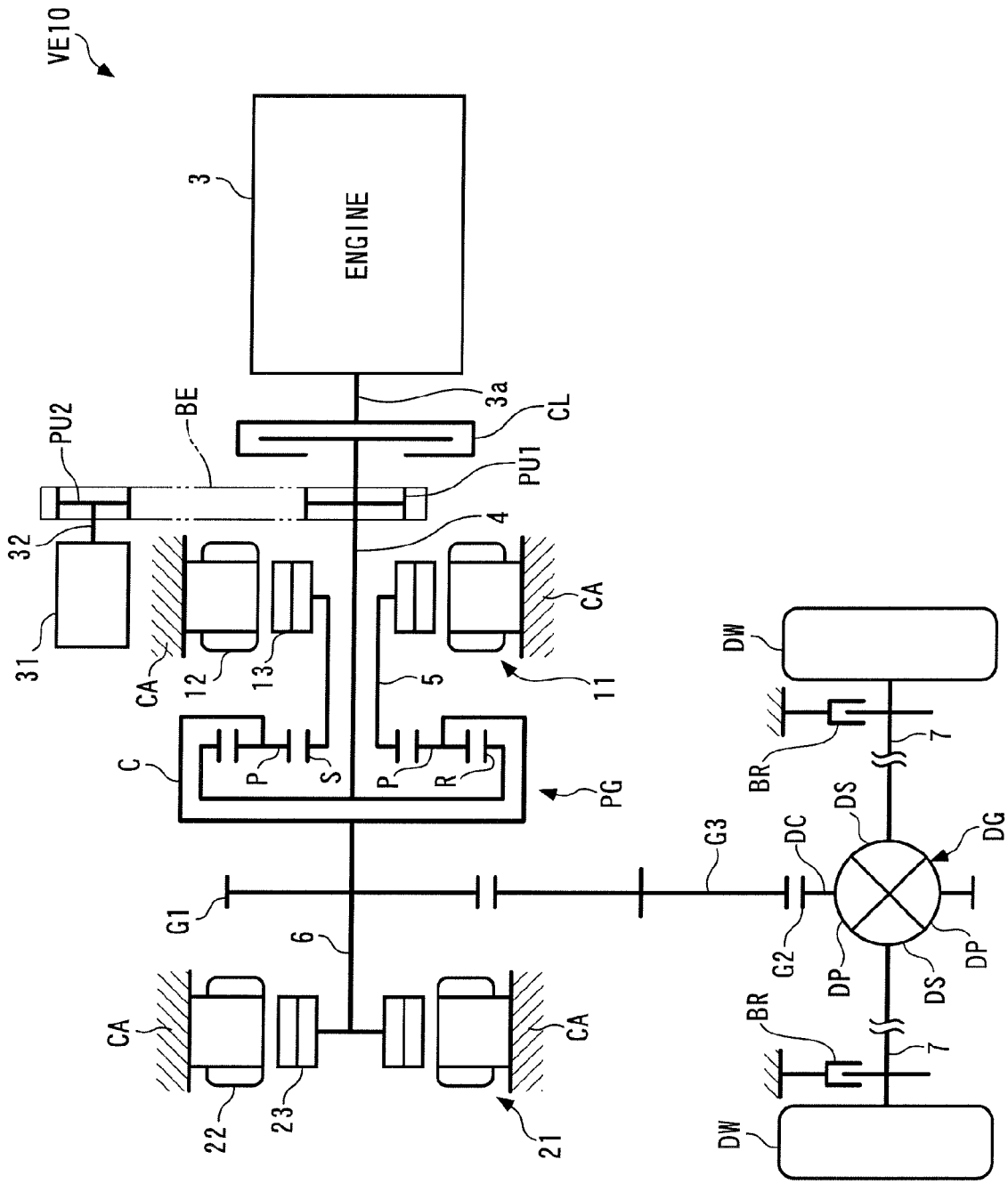
FIG. 65 A schematic view of a vehicle as a moving apparatus according to a tenth embodiment of the present invention.

Next, a vehicle VE10 as a moving apparatus according to a tenth embodiment of the present invention will be described with reference to FIG. 65. The vehicle VE10 is distinguished from the ninth embodiment mainly in that it further includes the left and right brakes BR and BR described in the second embodiment. In FIG. 65 and other figures, referred to hereinafter, the same component elements as those of the first embodiment are denoted by the same reference numerals. The following description is mainly given of different points of the vehicle VE10 from the second and ninth embodiments.

The ECU 2 controls the operations of the engine 3, the clutch CL, the brakes BR, and the first and second rotating machines 11 and 21 based on the detection signals from the aforementioned sensors 51 to 57 of various types, according to control programs stored in the ROM. Similarly to the first embodiment, this causes the vehicle VE10 to be operated in various types of operation modes. Next, a description is mainly given of different points of the vehicle stoppage-time compressor drive mode from the eighth embodiment.

[Vehicle Stoppage-Time Compressor Drive Mode]

Figure 66:
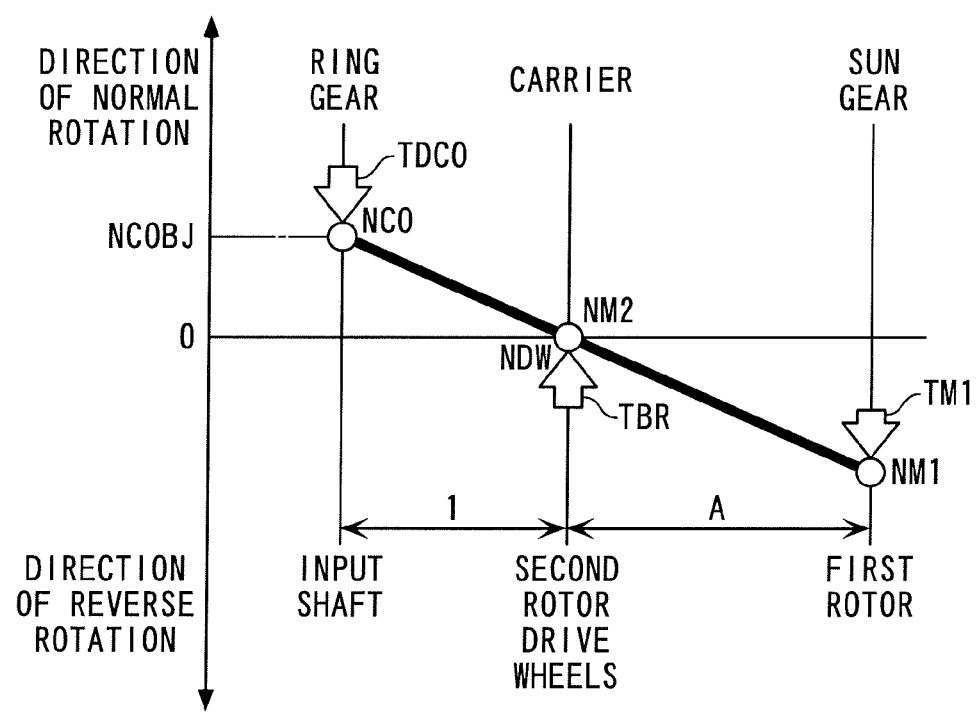
FIG. 66 A velocity collinear chart illustrating an example of the relationship between the rotational speeds of various types of rotary elements of the vehicle shown in FIG. 65 and the relationship between torques thereof, during the vehicle stoppage-time compressor drive mode.

In the tenth embodiment, the control of the second rotating machine 21, described in the ninth embodiment, is not performed, but similarly to the second embodiment, the brakes BR are each controlled to the applied state, whereby the drive wheels DW and DW are held at rest. Note that the control of the clutch CL and the first rotating machine 11 is carried out similarly to the ninth embodiment. FIG. 66 illustrates the relationship between the rotational speeds of the various types of rotary elements and the relationship between torques thereof, during the vehicle stoppage-time compressor drive mode.

As is apparent from FIG. 66, the first powering torque TM1 transmitted to the sun gear S is transmitted to the input shaft 32 via the ring gear R, using the braking torque TBR of the brakes BR acting on the carrier C as a reaction force, to cause the input shaft 32 to perform normal rotation together with the ring gear R. Motive power is thus transmitted from the first rotating machine 11 to the input shaft 32, whereby the compressor 31 is driven. Further, in this case, similarly to the ninth embodiment, although the first powering torque TM1 acts on the drive wheels DW and DW to cause the drive wheels DW and DW to perform reverse rotation, using the load of the compressor 31 as a reaction force, since the drive wheels DW and DW are held at rest as described above, the drive wheels DW and DW do not perform reverse rotation.

Note that in the EV travel-time compressor drive mode, the control of the various types of elements, such as the first rotating machine 11, is carried out similarly to the ninth embodiment, except that the brakes BR are each controlled to the released state. Further, when the vehicle stoppage-time compressor drive mode is shifted to the EV travel mode to cause the vehicle to make a standing start, the braking torque TBR of the brakes BR is progressively reduced.

Further, the above-described tenth embodiment corresponds to the first invention (invention as claimed in claim 1). Correspondence between various types of elements of the tenth embodiment and various types of elements of the first invention is as follows: The vehicle VE10 of the tenth embodiment correspond to the moving apparatus of the first invention. Correspondence between the other elements is the same as in the second embodiment.

As described above, according to the tenth embodiment, it is possible to obtain the same advantageous effects as provided by the second embodiment, including the advantageous effect that it is possible to properly drive the compressor 31, while positively preventing the drive wheels DW and DW from being driven.

Note that although in the ninth and tenth embodiments, the ring gear R is directly connected to the crankshaft 3a, it may be mechanically connected to the crankshaft 3a via gears, a pulley, a chain, a transmission, or the like. Further, although in the ninth and tenth embodiments, the sun gear S is directly connected to the first rotor 13, it may be mechanically connected to the first rotor 13 via gears, a pulley, a chain, a transmission, or the like. Further, although in the ninth and tenth embodiments, the carrier C and the second rotor 23 are directly connected to each other, if they are mechanically connected to the drive wheels DW and DW, they are not necessarily required to be directly connected to each other. Furthermore, although in the ninth and tenth embodiments, the carrier C and the second rotor 23 are connected to the drive wheels DW and DW via the differential gear DG and the like, they may be mechanically directly connected to the drive wheels DW and DW. Further, although in the ninth and tenth embodiments, the ring gear R is connected to the input shaft 32 e.g. via the first and second pulleys PU1 and PU2, it may be mechanically directly connected to the input shaft 32.

Further, although in the ninth and tenth embodiments, the sun gear S is connected to the first rotor 13, and the ring gear R is connected to the crankshaft 3a and the input shaft 32, the relationship of these connections may be reversed, that is, the sun gear S may be mechanically connected to the crankshaft 3a and the input shaft 32, and the ring gear R may be mechanically connected to the first rotor 13. In this case, naturally, mechanical direct connection or mechanical connection using gears, a pulley, a chain, a transmission, or the like may be provided between the sun gear S, and the crankshaft 3a and the input shaft 32, and between the ring gear R and the first rotor 13.

Figure 67:
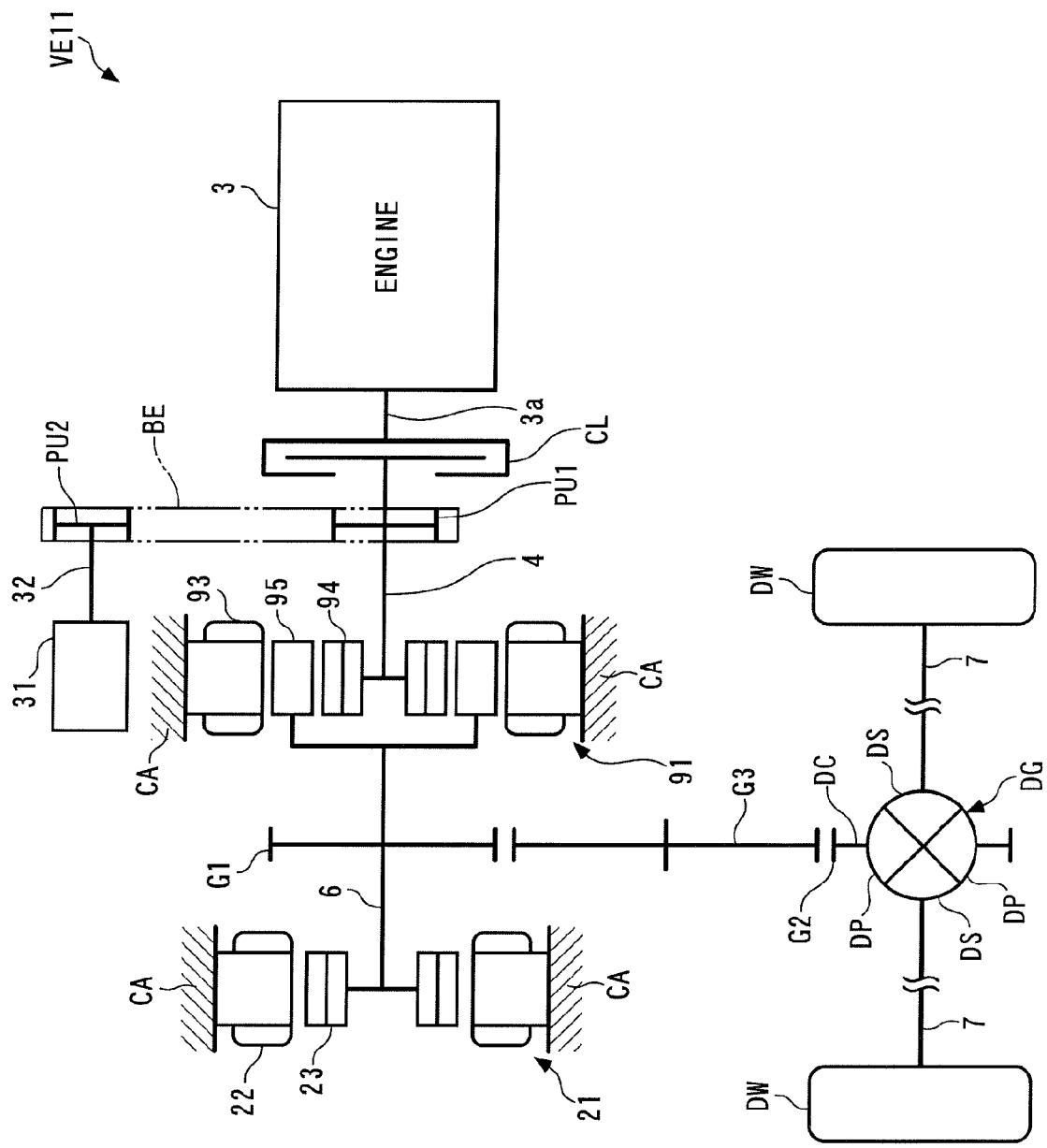
FIG. 67 A schematic view of a vehicle as a moving apparatus according to an eleventh embodiment of the present invention.

Next, a vehicle VE11 as a moving apparatus according to an eleventh embodiment of the present invention will be described with reference to FIG. 67. The vehicle VE11 is distinguished from the fifth embodiment mainly in that the relationship of connections of the input shaft 32 and the drive wheels DW and DW to the first and second rotors 74 and 75 of the first rotating machine 91 is reversed. In FIG. 67, the same component elements as those of the fifth embodiment are denoted by the same reference numerals. The following description is mainly given of different points of the vehicle VE11 from the fifth embodiment.

As shown in FIG. 67, in the vehicle VE11, differently from the fifth embodiment, the first rotor 94 is integrally formed not on the aforementioned third rotating shaft 6 but on the first rotating shaft 4. Thus, the first rotor 94 is mechanically connected to the input shaft 32 via the belt BE, and the first and second pulleys PU1 and PU2, and is mechanically directly connected to the input shaft 32 via the clutch CL. Further, differently from the fifth embodiment, the second rotor 95 is integrally formed not on the first rotating shaft 4 but on the third rotating shaft 6. Thus, the second rotor 95 is mechanically directly connected to the second rotor 23 of the second rotating machine 21, and is mechanically connected to the drive wheels DW and DW via the differential gear DG and the like.

Further, although not shown, in the vehicle VE11, similarly to the fifth embodiment, the second rotational angle sensor 84 detects the rotational angular position of the second rotor 95 with respect to the first stator 93 of the first rotating machine 91, and delivers a signal indicative of the detected rotational angular position of the second rotor 95 to the ECU 2. Since the second rotor 95 and the second rotor 23 of the second rotating machine 21 are directly connected to each other, the ECU 2 calculates the rotational angular position of the second rotor 23 with respect to the second stator 22, based on the detected rotational angular position of the second rotor 95 and calculates the second rotating machine rotational speed NM2.

Figure 68:
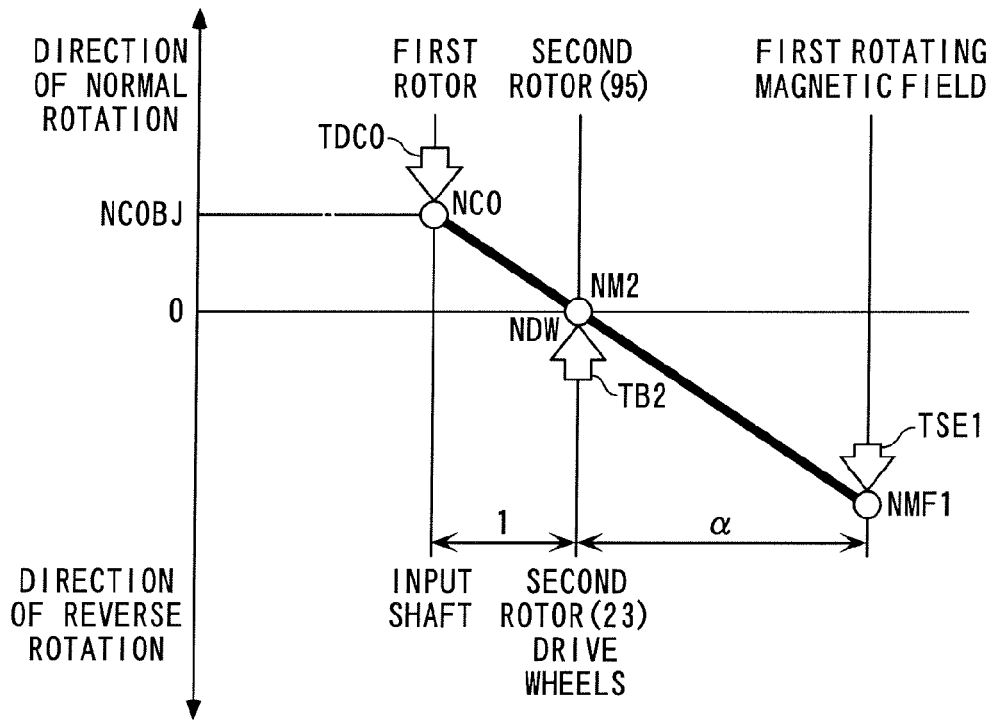
FIG. 68 A velocity collinear chart illustrating an example of the relationship between the rotational speeds of various types of rotary elements of the vehicle shown in FIG. 67 and the relationship between torques thereof, during the vehicle stoppage-time compressor drive mode.

The ECU 2 controls the operations of the engine 3, the clutch CL, and the first and second rotating machines 91 and 21 based on the detection signals from the aforementioned sensors 51, 54 to 57, 83 and 84 of various types, according to control programs stored in the ROM. Similarly to the fifth embodiment, this causes the vehicle VE11 to be operated in various types of operation modes. In this case, due to the above-described difference in construction from the fifth embodiment, operations in these operation modes are different from the operations in the case of the fifth embodiment, and hereafter, a description will be given of the different points. Note that also in the following description, similarly to the fifth embodiment, a velocity collinear chart as shown in FIG. 68 is used. First, a description is given of this velocity collinear chart.

As is apparent from the above-described relationship of connections between the various types of rotary elements of the vehicle VE11, the first rotor rotational speed NR1 is equal to the input shaft rotational speed NCO provided that a change in speed by the belt BE and the first and second pulleys PU1 and PU2 is ignored. Further, the engagement and disengagement of the clutch CL causes the crankshaft 3a to be connected to and disconnected from the input shaft 32 and the first rotor 94. Furthermore, the second rotor rotational speed NR2 and the second rotating machine rotational speed NM2 are equal to each other, and are equal to the drive wheel rotational speed NDW provided that a change in speed by the differential gear DG and the like is ignored. Further, the first magnetic field rotational speed NMF1, and the first and second rotor rotational speeds NR1 and NR2 are in the predetermined collinear relationship expressed by the aforementioned equation (68).

From the above, during disengagement of the clutch CL, the relationship between the input shaft rotational speed NCO, the drive wheel rotational speed NDW, the first magnetic field rotational speed NMF1, and the second rotating machine rotational speed NM2 is represented by a velocity collinear chart as shown in FIG. 68. Hereinafter, various types of operation modes will be described with reference to a velocity collinear chart as shown in the figure, in order from the vehicle stoppage-time compressor drive mode. Note that in FIG. 68 and other velocity collinear charts, described hereinafter, in order to identify the second rotor 95 of the first rotating machine 91 and the second rotor 23 of the second rotating machine 21, reference numerals thereof are parenthesized.

[Vehicle Stoppage-Time Compressor Drive Mode]

In the vehicle stoppage-time compressor drive mode, the clutch CL is disengaged, thereby disconnecting the crankshaft 3a from the input shaft 32 and the first rotor 94. In this state, electric power is supplied from the battery 44 to the first stator 93 to cause the first rotating magnetic field to perform reverse rotation. Further, electric current is caused to flow through the second stator 22 of the second rotating machine 21 such that the second rotor 23 is held at rest. FIG. 68 illustrates the relationship between the rotational speeds of the various types of rotary elements and the relationship between torques thereof, during the vehicle stoppage-time compressor drive mode.

As is apparent from FIG. 68, the first driving equivalent torque TSE1 is transmitted to the input shaft 32 via the first rotor 94, using the second braking torque TB2 acting on the second rotor 95 as a reaction force, and causes the input shaft 32 to perform normal rotation together with the first rotor 94. Thus, motive power is transmitted from the first rotating machine 91 to the input shaft 32, whereby the compressor 31 is driven.

Further, in the vehicle stoppage-time compressor drive mode, the electric power supplied to the first stator 93 is controlled such that the compressor-transmitted torque TDCO becomes equal to the target torque TCOBJ. Specifically, the electric power supplied to the first stator 93 is controlled such that there holds the following equation (101) between the first driving equivalent torque TSE1 and the target torque TCOBJ.

$$TSE1 = TCOBJ/\alpha \tag{101}$$

Furthermore, the first magnetic field rotational speed NMF1 is controlled such that the input shaft rotational speed NCO becomes equal to the target rotational speed NCOBJ, i.e. such that there holds the following equation (102):

$$NMF1 = -\alpha \cdot NCOBJ \tag{102}$$

In the vehicle stoppage-time compressor drive mode, as is apparent from FIG. 68, although the first driving equivalent torque TSE1 acts on the second rotor 95 and the drive wheels DW and DW to cause the second rotor 95 and the drive wheels DW and DW to perform reverse rotation, using the load of the compressor 31 acting on the first rotor 94 as a reaction force, the second rotor 23 is held at rest as described above, together with the second rotor 95 and the drive wheels DW and DW, so that the drive wheels DW and DW do not perform reverse rotation.

[EV Travel-Time Compressor Drive Mode]

First, a brief description will be given of the EV travel mode. During the EV travel mode, the clutch CL is disengaged, thereby disconnecting the crankshaft 3a from the input shaft 32 and the first rotor 94. In this state, electric power is supplied from the battery 44 to the second stator 22 to cause the second rotor 23 to perform normal rotation. The motive power of the second rotating machine 21 generated along with the normal rotation of the second rotor 23 is transmitted to the second rotor 95 and the drive wheels DW and DW, whereby the second rotor 95 and the drive wheels DW and DW perform normal rotation, and in turn the vehicle VE11 travels forward.

Figure 69:
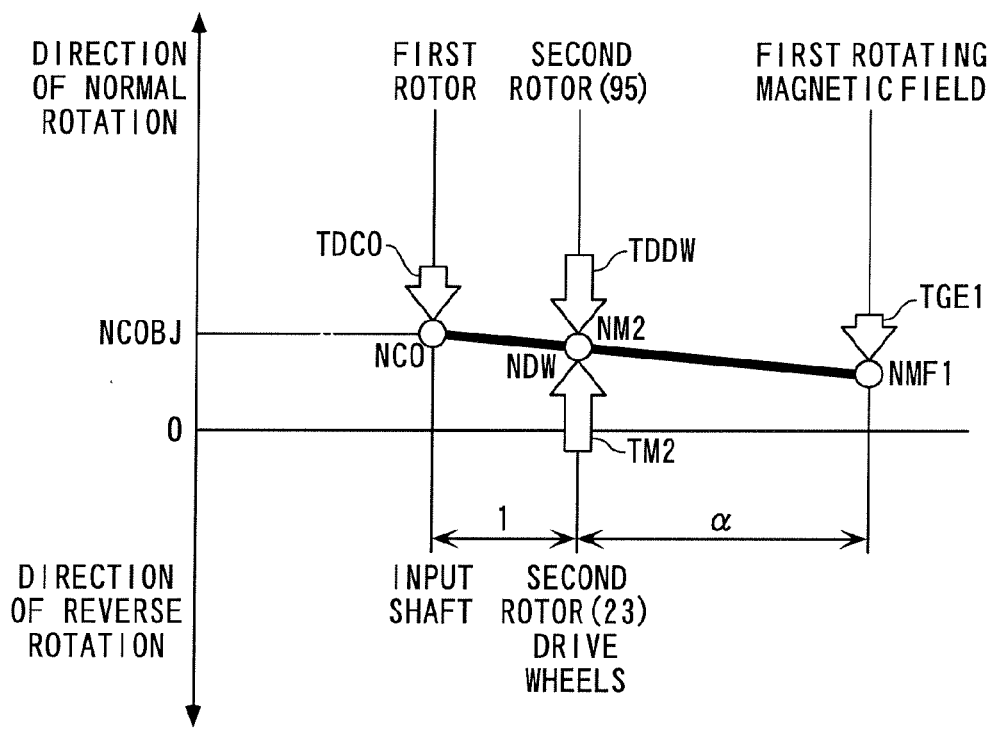
FIG. 69 A velocity collinear chart illustrating an example of the relationship between the rotational speeds of the various types of rotary elements of the vehicle shown in FIG. 67 and the relationship between torques thereof, during the EV travel-time compressor drive mode.

In a case where the operation mode is shifted to the EV travel-time compressor drive mode from the above state to drive the compressor 31, the clutch CL and the second rotating machine 21 are controlled in the same manner as in the EV travel mode, whereby the crankshaft 3a continues to be held in the state disconnected from the input shaft 32 and the first rotor 94 and the drive wheels DW and DW continue to caused to perform normal rotation. In this state, electric power is generated in the first stator 93 using the motive power transmitted to the second rotor 95 as described above, and the generated electric power is supplied to the second stator 22. FIG. 69 illustrates the relationship between the rotational speeds of the various types of rotary elements and the relationship between the torques thereof, in this case.

As is apparent from FIG. 69, part of the second powering torque TM2 is transmitted to the second rotor 95, and is transmitted to the first rotor 94 using the first electric power-generating equivalent torque TGE1 as a reaction force, to be further transmitted to the input shaft 32. This causes the input shaft 32 to perform normal rotation, and causes the compressor 31 to be driven. Further, the remainder of the second powering torque TM2 is transmitted to the drive wheels DW and DW, so that the drive wheels DW and DW continue to perform normal rotation.

In this case, the electric power generated in the first stator 93 and the electric power supplied to the second stator 22 are controlled such that the compressor-transmitted torque TDCO becomes equal to the target torque TCOBJ, and the drive wheel-transmitted torque TDDW becomes equal to the demanded torque TREQ.

Specifically, the electric power generated in the first stator 93 is controlled such that there holds the following equation (103) between the first electric power-generating equivalent torque TGE1 and the target torque TCOBJ. Further, since the second powering torque TM2 transmitted to the second stator 95 is transmitted to the input shaft 32 and the drive wheels DW and DW as described above, the electric power supplied to the second stator 22 is controlled such that there holds the following equation (104) between the second powering torque TM2, the target torque TCOBJ, and the demanded torque TREQ:

$$TGE1 = TCOBJ/\alpha \quad (103)$$

$$TM2 = -\{[(\alpha+1)TCOBJ/\alpha] + TREQ\} \quad (104)$$

Furthermore, the second rotating machine rotational speed NM2 is controlled such that it becomes equal to the drive wheel rotational speed NDW, and the first magnetic field rotational speed NMF1 is controlled such that there holds the following equation (105):

$$NMF1 = (\alpha+1)NDW - \alpha \cdot NCOBJ \quad (105)$$

Note that the direction of rotation of the first rotating magnetic field determined by the relationship between the drive wheel rotational speed NDW and the target rotational speed NCOBJ sometimes becomes the direction of reverse rotation. In this case, electric power is supplied from the battery 44 to the first stator 93, to cause the first rotating magnetic field to perform reverse rotation. Further, the electric power supplied to the first stator 12 is controlled such that the aforementioned equation (101) holds.

The above-described eleventh embodiment corresponds to the fourth invention (invention as claimed in claims 9 and 10). Correspondence between various types of elements of the eleventh embodiment and various types of elements of the fourth invention is as follows: The vehicle VE11 of the eleventh embodiment corresponds to the moving apparatus of the fourth invention. Correspondence between the other elements is the same as in the fifth embodiment.

As described above, according to the eleventh embodiment, it is possible to obtain the same advantageous effects as provided by the fifth embodiment, i.e. the advantageous effect of properly driving the compressor 31, while positively preventing the drive wheels DW and DW from being driven.

Figure 70:
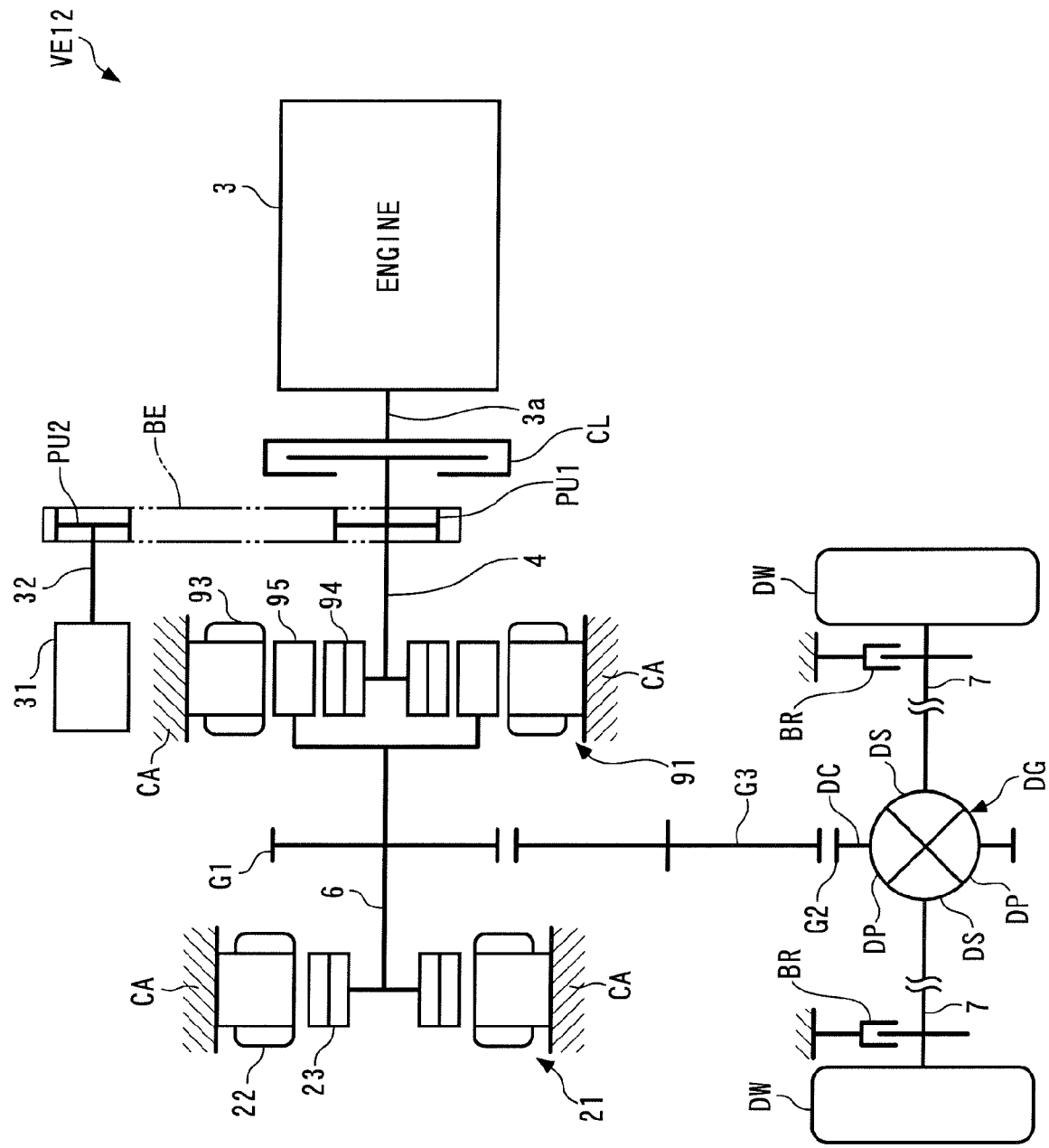
FIG. 70 A schematic view of a vehicle as a moving apparatus according to a twelfth embodiment of the present invention.

Next, a vehicle VE12 as a moving apparatus according to a twelfth embodiment of the present invention will be described with reference to FIG. 70. The vehicle VE12 is distinguished from the eleventh embodiment mainly in that it further includes the left and right brakes BR and BR for braking the drive wheels DW and DW described in the second embodiment. In other words, the vehicle VE12 is distinguished from the sixth embodiment mainly in that the relationship of connections of the input shaft 32 and the drive wheels DW and DW to the first and second rotors 94 and 95 of the first rotating machine 91 is reversed. In FIG. 70 and other figures, referred to hereinafter, the same component elements as those of the second, sixth and eleventh embodiments are denoted by the same reference numerals. The following description is mainly given of different points of the vehicle VE12 from the second, sixth and eleventh embodiments.

The ECU 2 controls the operations of the engine 3, the clutch CL, the brakes BR, and the first and second rotating machines 91 and 21 based on the detection signals from the aforementioned sensors 51, 54 to 57, 83 and 84 of various types, according to control programs stored in the ROM. Similarly to the eleventh embodiment, this causes the vehicle VE12 to be operated in various types of operation modes. Next, a description is mainly given of different points of the vehicle stoppage-time compressor drive mode from the eleventh embodiment.

[Vehicle Stoppage-Time Compressor Drive Mode]

Figure 71:
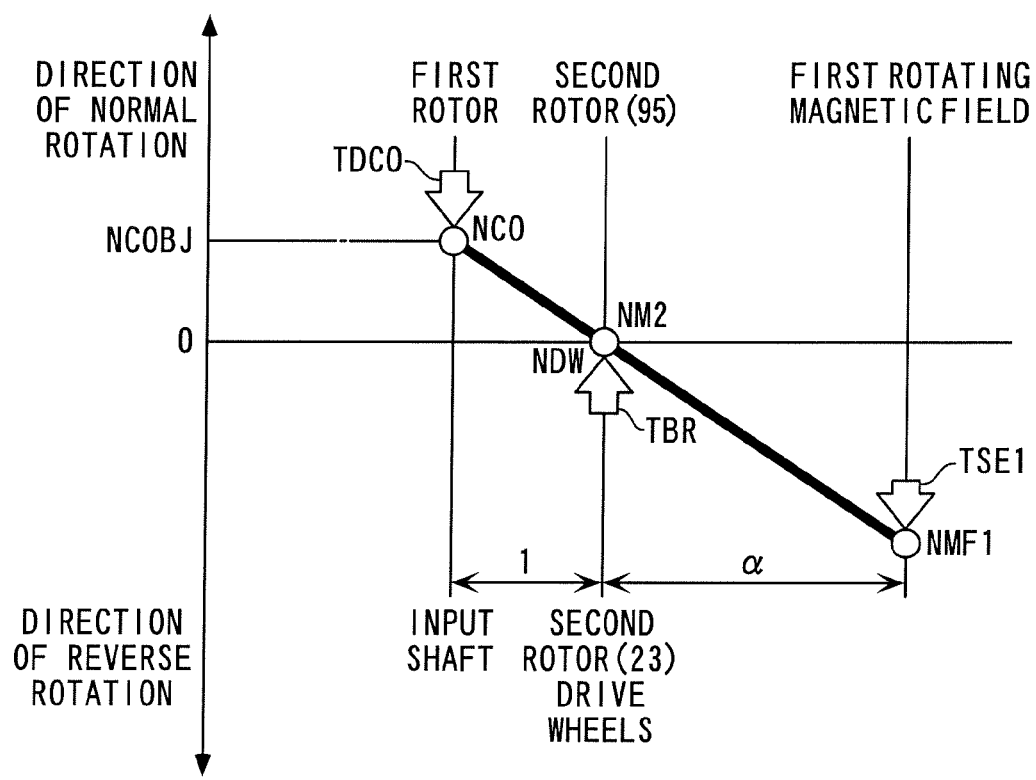
FIG. 71 A velocity collinear chart illustrating an example of the relationship between the rotational speeds of various types of rotary elements of the vehicle shown in FIG. 70 and the relationship between torques thereof, during the vehicle stoppage-time compressor drive mode.

In the twelfth embodiment, the control of the second rotating machine 21, described in the eleventh embodiment, is not performed, but similarly to the second embodiment, the brakes BR are controlled to the applied state, whereby the drive wheels DW and DW are held at rest. Note that the control of the clutch CL and the first rotating machine 91 is carried out similarly to the eleventh embodiment. FIG. 71 illustrates the relationship between the rotational speeds of the various types of rotary elements and the relationship between torques thereof, during the vehicle stoppage-time compressor drive mode.

As is apparent from FIG. 71, the first driving equivalent torque TSE1 is transmitted to the input shaft 32 via the first rotor 94, using the braking torque TBR of the brakes BR acting on the second rotor 95 as a reaction force, to cause the input shaft 32 to perform normal rotation together with the first rotor 94. Thus, motive power is transmitted from the first rotating machine 91 to the input shaft 32, whereby the compressor 31 is driven. Further, in this case, although similarly to the eleventh embodiment, the first driving equivalent torque TSE1 acts on the drive wheels DW and DW to cause the drive wheels DW and DW to perform reverse rotation, using the load of the compressor 31 as a reaction force, since the drive wheels DW and DW are held at rest as described above, the drive wheels DW and DW do not perform reverse rotation.

Note that in the EV travel-time compressor drive mode, the control of various types of elements, such as the first rotating machine 91, is carried out similarly to the eleventh embodiment, except that the brakes BR are each controlled to the released state. Further, when the vehicle stoppage-time compressor drive mode is shifted to the EV travel mode to cause the vehicle to make a standing start, the braking torque TBR of the brakes BR is progressively reduced.

The above-described twelfth embodiment corresponds to the fourth invention (invention as claimed in claims 9 and 10). Correspondence between various types of elements of the twelfth embodiment and various types of elements of the fourth invention is as follows: The vehicle VE12 of the twelfth embodiment corresponds to the moving apparatus of the fourth invention. Correspondence between the other elements is the same as in the sixth embodiment.

As described hereinabove, according to the twelfth embodiment, it is possible to obtain the same advantageous effects as provided by the sixth embodiment including the advantageous effect that it is possible to properly drive the compressor 31, while positively preventing the drive wheels DW and DW from being driven.

Note that although in the eleventh and twelfth embodiments, the first rotor 94 is directly connected to the crankshaft 3a, it may be mechanically connected to the crankshaft 3a via gears, a pulley, a chain, a transmission, or the like. Further, although in the eleventh and twelfth embodiments, the second rotor 95 of the first rotating machine 91 and the second rotor 23 of the second rotating machine 21 are directly connected to each other, if they are mechanically connected to the drive wheels DW and DW, they are not necessarily required to be directly connected to each other. Furthermore, although in the eleventh and twelfth embodiments, the second rotor 95 and the second rotor 23 are connected to the drive wheels DW and DW via the differential gear DG and the like, they may be mechanically directly connected to each other. Further, although in the eleventh and twelfth embodiments, the first rotor 94 is connected to the input shaft 32 e.g. via the first and second pulleys PU1 and PU2, it may be mechanically directly connected to the input shaft 32.

Further, although in the first, second, ninth and tenth embodiments, the planetary gear unit PG of a single pinion type is used, there may be used another suitable mechanism, such as a planetary gear unit of a double pinion type or the differential gear DG, insofar as it includes the first to third elements that are capable of transmitting motive power while maintaining a collinear relationship in rotational speed therebetween. Alternatively, such a mechanism may be employed that has a plurality of rollers for transmitting motive power by friction between surfaces in place of the gears of the planetary gear unit, and has the functions equivalent to the planetary gear unit. Furthermore, although detailed description thereof is omitted, there may be employed such a mechanism as disclosed in Japanese Laid-Open Patent Publication (Kokai) No. 2008-39045, which comprises a combination of a plurality of magnets and soft magnetic material elements. This also similarly applies to the first planetary gear unit PS1 of the third and fourth embodiments, and the second planetary gear unit PS2 of the third and seventh embodiments.

Furthermore, although in the first to fourth, ninth and tenth embodiments, the first rotating machine 11 is a synchronous DC motor, another suitable device, such as an AC motor of a synchronous or induction type, may be used insofar as it is capable of converting input electric power to motive power, and outputting the motive power, and also capable of converting input motive power to electric power. This also similarly applies to the second rotating machine 21 of the first to third, fifth to seventh, and ninth to twelfth embodiments.

Further, although in the second, sixth, tenth and twelfth embodiments, hydraulic brakes are used as the brakes BR, electromagnetic brakes or known parking brakes may be used insofar as they are capable of restricting the rotation of the drive wheels DW and DW.

Further, in the fourth and eighth embodiments, there are arranged four second armature magnetic poles, eight second magnet magnetic poles, and six cores 75a in the second rotating machine 71. That is, the ratio between the number of the second armature magnetic poles, the number of the second magnet magnetic poles, and the number of the cores 75a is 1:2:1.5, by way of example. However, respective desired numbers of the second armature magnetic poles, the second magnet magnetic poles, and the cores 75a can be employed, insofar as the ratio therebetween satisfies $1:m:(1+m)/2$ ($m \neq 1.0$). Further, although in the fourth and eighth embodiments, the cores 75a are formed by steel plates, they may be formed by other soft magnetic materials. Further, although in the fourth and eighth embodiments, the second stator 73 and the third rotor 74 are arranged at respective radially outer and inner locations, this is not limitative, but inversely, they may be arranged at respective radially inner and outer locations.

Further, although in the fourth and eighth embodiments, the second rotating machine 71 is constructed as a so-called radial type by arranging the second stator 73 and the third and fourth rotors 74 and 75 in the radial direction, the second rotating machine 71 may be constructed as a so-called axial type by arranging the second stator 73 and the third and fourth rotors 74 and 75 in the axial direction. Further, although in the fourth and eighth embodiments, one second magnet magnetic pole is formed by a magnetic pole of a single permanent magnet 74a, it may be formed by magnetic poles of a plurality of permanent magnets. For example, if one second magnet magnetic pole is formed by arranging two permanent magnets in an inverted-V shape such that the magnetic poles thereof become closer to each other toward the second stator 73, it is possible to improve the directivity of the aforementioned magnetic force line ML. Further, in the fourth and eighth embodiments, electromagnets may be used in place of the permanent magnets 74a.

Further, although in the fourth and eighth embodiments, the coils 73c to 73e are formed by three-phase coils of U-phase to W-phase, the number of phases of the coils can be set as desired insofar as the coils can generate the second rotating magnetic field. Further, it is to be understood that in the fourth and eighth embodiments, a desired number of slots, other than that used in the above-described embodiments may be employed as the number of the slots 73b. Further, although in the fourth and eighth embodiments, the U-phase to W-phase coils 73c to 73e are wound in the slots 73b by distributed winding, this is not limitative, but they may be wound by concentrated winding. Further, although in the fourth and eighth embodiments, the slots 73b, the permanent magnets 74a, and the cores 75a are arranged at equally-spaced intervals, they may be arranged at unequally-spaced intervals.

The above-described variations of the second rotating machine 71 similarly apply to the first rotating machine 91 in the fifth to eighth, eleventh and twelfth embodiments. Further, in the fourth to eighth, eleventh and twelfth embodiments, the first and second rotating machines 71 and 91 each may be replaced by another suitable device, such as a rotating machine disclosed in Japanese Laid-Open Patent Publication (Kokai) No. 2008-179344, insofar as it has the functions as claimed in the claims.

Further, although in the first to twelfth embodiments (hereafter generically referred to as the "embodiment"), the controller for controlling the engine 3, the clutch CL, the brakes BR and the first and second rotating machines 11, 91, 21, and 71 are formed by the ECU 2, the VCU 43, and the first and second PDUs 41 and 42, it may be formed by a combination of a microcomputer and an electric circuit. Further, although in the embodiment, the battery 44 is used, any other suitable device, such as a capacitor, may be used insofar as it is an electric power storage device capable of being charged and discharged. Further, although in the embodiment, the target torque TCOBJ and the target rotational speed NCOBJ are set to a predetermined fixed torque value and a predetermined fixed rotational speed, respectively, they may be changed according to a set temperature of an air conditioner or the like. Furthermore, although in the embodiment, the compressor-transmitted torque TDCO is controlled such that it becomes equal to the target torque TCOBJ, and the input shaft rotational speed NCO is controlled such that it becomes equal to the target rotational speed NCOBJ, such control may be performed on one of the compressor-transmitted torque TDCO and the input shaft rotational speed NCO.

Further, although in the embodiment, the clutch CL is a dog clutch, it may be a friction clutch or an electromagnetic clutch. Furthermore, in the embodiment, the clutch CL may be omitted. Further, although in the embodiment, the accessory of the present invention is the compressor 31, there may be used any other suitable accessory, such as an oil pump for supplying lubricating oil or working fluid to the various types of mechanisms installed on the vehicles VE1 to VE12. Further, although in the embodiment, the engine 3 as a prime mover is a gasoline engine, it is to be understood that a desired prime mover may be employed which has an output part capable of outputting motive power (first output portion). For example, as the engine 3 there may be employed various industrial engines other than a gasoline engine, e.g. a diesel engine, and engines for ship propulsion machines, such as an outboard motor having a vertically-disposed crankshaft. Alternatively, there may be employed e.g. an external combustion engine, an electric motor, a water turbine, a windmill, and a human-powered pedal.

Furthermore, in the embodiment, desired means for connecting between the various types of rotary elements can be employed insofar as they satisfy the conditions of the present invention. For example, the gears described in the embodiment may be replaced with pulleys or the like. Further, although in the embodiment, the moving apparatuses according to the present invention are the vehicles VE1 to VE12, there may be employed boats or aircrafts. It is to be further understood that various changes and modifications may be made without departing from the spirit and scope thereof without departing from the spirit and scope thereof.

INDUSTRIAL APPLICABILITY

The present invention relates to a moving apparatus provided with a plurality of motive power sources different from each other, and is particularly useful in properly driving an accessory while preventing driven parts from being driven, when the accessory is driven in a state where the driven parts are at rest.

[Reference Signs List]

| | |
|---|---|
| VE1 | vehicle (moving apparatus) |
| VE2 | vehicle (moving apparatus) |
| VE3 | vehicle (moving apparatus) |
| VE4 | vehicle (moving apparatus) |
| VE5 | vehicle (moving apparatus) |
| VE6 | vehicle (moving apparatus) |
| VE7 | vehicle (moving apparatus) |
| VE8 | vehicle (moving apparatus) |
| VE9 | vehicle (moving apparatus) |
| VE10 | vehicle (moving apparatus) |
| VE11 | vehicle (moving apparatus) |
| VE12 | vehicle (moving apparatus) |
| DW, DW | drive wheels (driven parts) |
| 2 | ECU (controller) |
| 3 | engine (prime mover) |
| 3a | crankshaft (output portion, first output portion) |
| 11 | first rotating machine |
| 13 | first rotor |
| 21 | second rotating machine (restriction means) |
| 23 | second rotor (second output portion) |
| PG | planetary gear unit (power transmission mechanism) |
| S | sun gear (first element) |
| R | ring gear (third element) |
| C | carrier (second element) |
| 31 | compressor (accessory) |
| 32 | input shaft (input portion) |
| CL | clutch |
| BR | brake (restriction means) |
| 41 | first PDU (controller) |
| 42 | second PDU (controller) |
| 43 | VCU (controller) |
| PS1 | first planetary gear unit (power transmission mechanism) |
| S1 | first sun gear (third element) |
| R1 | first ring gear (first element) |
| C1 | first carrier (second element) |
| PS2 | second planetary gear unit (power transmission mechanism) |
| S2 | second sun gear (second element) |
| R2 | second ring gear (fourth element) |
| C2 | second carrier (third element) |
| 71 | second rotating machine (restriction means) |
| 73 | second stator (stator) |
| 73a | iron core (armature row, second armature row) |
| 73c | U-phase coil (armature row, second armature row) |
| 73d | V-phase coil (armature row, second armature row) |
| 73e | W-phase coil (armature row, second armature row) |
| 74 | third rotor (second rotor) |
| 74a | permanent magnet (magnet, second magnet) |
| 75 | fourth rotor (third rotor) |
| 75a | core (soft magnetic material element, second soft magnetic material element) |
| 91 | first rotating machine |
| 93 | first stator |
| 93a | iron core (first armature row) |
| 93b | U-phase to W-phase coils (first armature row) |
| 94 | first rotor |
| 94a | permanent magnet (first magnet) |
| 95 | second rotor |
| 95a | core (first soft magnetic material element) |

The invention claimed is:

1. A moving apparatus that moves by transmitting motive power to driven parts thereof, comprising:
a prime mover including an output portion for outputting motive power;
an accessory driven by input of motive power to an input portion thereof;
a first rotating machine that includes a first rotor and is capable of converting input electric power to motive power to output the motive power from said first rotor, and converting motive power input to said first rotor to electric power;
restriction means for restricting rotation of the driven parts;

a controller for controlling operations of said first rotating machine and said restriction means; and a power transmission mechanism including a first element, a second element, and a third element that are capable of transmitting motive power therebetween, said first to third elements being configured to rotate during transmission of the motive power while maintaining a collinear relationship in rotational speed therebetween, with straight lines representing respective rotational speeds of said first to third elements being sequentially aligned in a collinear chart representing the collinear relationship in rotational speed, wherein said first element is mechanically connected to said first rotor, one of said second and third elements being mechanically connected to said output portion and said input portion while the other of said second and third elements being mechanically connected to the driven parts, and wherein when said accessory is driven in a state where the driven parts are at rest during stoppage of said prime mover, said controller controls the operations of said first rotating machine and said restriction means such that motive power is input to said input portion and a rotational speed of the driven parts is restricted to approximately 0.

2. The moving apparatus as claimed in claim 1, wherein said power transmission mechanism further includes a fourth element, said first to fourth elements being configured to rotate during transmission of the motive power while maintaining a collinear relationship in rotational speed therebetween, with straight lines representing respective rotational speeds of said first to fourth elements being sequentially aligned in a collinear chart representing the collinear relationship in rotational speed, wherein said second element is mechanically connected to said output portion and said input portion, and said third element is mechanically connected to the driven parts, and wherein said restriction means is a second rotating machine that includes a second rotor mechanically connected to said fourth element and is configured to be capable of converting input electric power to motive power to output the motive power from said second rotor, and converting motive power input to said second rotor to electric power.

3. The moving apparatus as claimed in claim 2, further including a clutch for connecting and disconnecting between said output portion and said second element, and said controller controls an operation of said clutch.

4. The moving apparatus as claimed in claim 3, wherein said prime mover is an internal combustion engine, and wherein said controller controls the operation of said clutch so as to disconnect said output portion from said second element during an EV operation mode in which said controller causes the driven parts to be driven by controlling operations of said first and second rotating machines during stoppage of said prime mover, controls the operations of said first and second rotating machines when said prime mover is started during the EV operation mode, such that the rotational speed of said second element becomes approximately equal to 0, and when the rotational speed of said second element has become approximately equal to 0, controls the operation of said clutch so as to connect between said output portion and said second element, and starts said prime mover.

5. The moving apparatus as claimed in claim 1, wherein said restriction means is a second rotating machine that includes an unmovable stator for generating a rotating magnetic field, a second rotor formed by magnets and disposed in a manner opposed to said stator, and a third rotor formed by a soft magnetic material and disposed between said stator and said second rotor, and is configured such that electric power and motive power are input and output between said stator and said second and third rotors along with generation of the rotating magnetic field, and such that the rotating magnetic field and said third and second rotors rotate along with input and output of the electric power and the motive power while maintaining a collinear relationship in rotational speed therebetween, with straight lines representing respective rotational speeds of the rotating magnetic field and said third and second rotors being sequentially aligned in a collinear chart representing the collinear relationship in rotational speed, and wherein said second element and said second rotor are mechanically connected to said output portion and said input portion, and said third element and said third rotor are mechanically connected to the driven parts.

6. The moving apparatus as claimed in claim 5, wherein a predetermined plurality of magnet magnetic poles arranged in a circumferential direction are formed by said magnets, and a magnetic pole row is formed by arranging the plurality of magnet magnetic poles such that each two magnet magnetic poles adjacent to each other have polarities different from each other, wherein said second rotor is configured to be rotatable in the circumferential direction, wherein said stator has an armature row that generates a predetermined plurality of armature magnetic poles, to thereby cause the rotating magnetic field rotating in the circumferential direction to be generated between said stator and said magnetic pole row, wherein said soft magnetic material is formed by a predetermined plurality of soft magnetic material elements arranged in the circumferential direction in a manner spaced from each other, and a soft magnetic material element row formed by said plurality of soft magnetic material elements is disposed between said magnetic pole row and said armature row, wherein said third rotor is configured to be rotatable in the circumferential direction, and wherein a ratio between the number of the armature magnetic poles, the number of the magnet magnetic poles, and the number of said soft magnetic material elements is set to $1:m:(1+m)/2(m\neq 1.0)$.

7. The moving apparatus as claimed in claim 5, further including a clutch for connecting and disconnecting said output portion to and from said second element and said second rotor, and said controller controls an operation of said clutch.

8. The moving apparatus as claimed in claim 7, wherein said prime mover is an internal combustion engine, and wherein said controller controls the operation of said clutch so as to disconnect said output portion from said second element and said second rotor during an EV operation mode in which said controller causes the driven parts to be driven by controlling operations of said first and second rotating machines during stoppage of said prime mover, controls the operations of said first and second rotating machines when said prime mover is started during the EV operation mode, such that the respective rotational speeds of said second element and said second rotor become approximately equal to 0, and when the respective rotational speeds of said second element and said second rotor have become approximately equal to 0, controls the operation of said clutch so as to connect said output portion to said second element and said second rotor, and starts said prime mover.

9. A moving apparatus that moves by transmitting motive power to driven parts thereof, comprising:
- a prime mover including a first output portion for outputting motive power;
- an accessory driven by input of motive power to an input portion thereof;
- a first rotating machine including an unmovable first stator for generating a first rotating magnetic field, a first rotor formed by first magnets and disposed in a manner opposed to said first stator, and a second rotor formed by a first soft magnetic material and disposed between said first stator and said first rotor, said first rotating machine being configured such that electric power and motive power are input and output between said first stator and said first and second rotors along with generation of the first rotating magnetic field, and such that the first rotating magnetic field and said second and first rotors rotate along with input and output of the electric power and the motive power while maintaining a collinear relationship in rotational speed therebetween, with straight lines representing respective rotational speeds of the first rotating magnetic field and said second and first rotors being sequentially aligned in a collinear chart representing the collinear relationship in rotational speed;
- restriction means for restricting rotation of the driven parts; and
- a controller for controlling operations of said first rotating machine and said restriction means, wherein one of said first and second rotors is mechanically connected to said first output portion and said input portion while the other of said first and second rotors is mechanically connected to the driven parts, and wherein when said accessory is driven in a state where the driven parts are at rest during stoppage of said prime mover, said controller controls the operations of said first rotating machine and said restriction means such that motive power is input to said input portion and a rotational speed of the driven parts is restricted to approximately 0;

further including a power transmission mechanism including a first element, a second element, and a third element that are capable of transmitting motive power therebetween, said first to third elements being configured to rotate during transmission of the motive power while maintaining a collinear relationship in rotational speed therebetween, with straight lines representing respective rotational speeds of said first to third elements being sequentially aligned in a collinear chart representing the collinear relationship in rotational speed, and wherein said restriction means is a second rotating machine that includes a second output portion and is configured to be capable of converting input electric power to motive power to output the motive power from said second output portion, and converting motive power input to said second output portion to electric power, and wherein said first rotor and said second element are mechanically connected to the driven parts, said second rotor and said first element are mechanically connected to said first output portion and said input portion, and said third element is mechanically connected to said second output portion.

10. The moving apparatus as claimed in claim 9, wherein a predetermined plurality of first magnet magnetic poles arranged in a first circumferential direction are formed by said first magnets, and a first magnetic pole row is formed by arranging the plurality of first magnet magnetic poles such that each two first magnet magnetic poles adjacent to each other have polarities different from each other, wherein said first rotor is configured to be rotatable in the first circumferential direction, wherein said first stator has a first armature row that generates a predetermined plurality of first armature magnetic poles, to thereby cause the first rotating magnetic field rotating in the first circumferential direction to be generated between said first stator and said first magnetic pole row, wherein said first soft magnetic material is formed by a predetermined plurality of first soft magnetic material elements arranged in the first circumferential direction in a manner spaced from each other, and a first soft magnetic material element row formed by said plurality of first soft magnetic material elements is disposed between said first magnetic pole row and said first armature row, wherein said second rotor is configured to be rotatable in the first circumferential direction, and wherein a ratio between the number of the first armature magnetic poles, the number of the first magnet magnetic poles, and the number of said first soft magnetic material elements is set to $1:m:(1+m)/2 (m \neq 1.0)$.

11. The moving apparatus as claimed in claim 9, further including a clutch for connecting and disconnecting said first output portion to and from said second rotor and said first element.

12. The moving apparatus as claimed in claim 11, wherein said prime mover is an internal combustion engine, and wherein said controller controls the operation of said clutch so as to disconnect said first output portion from said second rotor and said first element during an EV operation mode in which said controller causes the driven parts to be driven by controlling operations of said first and second rotating machines during stoppage of said prime mover, controls the operations of said first and second rotating machines when said prime mover is started during the EV operation mode, such that the respective rotational speeds of said second rotor and said first element become approximately equal to 0, and when the respective rotational speeds of said second rotor and said first element have become approximately equal to 0, controls the operation of said clutch so as to connect said first output portion to said second rotor and said first element, and starts said prime mover.

13. The moving apparatus as claimed in claim 9, wherein said restriction means is a second rotating machine that includes an unmovable second stator for generating a second rotating magnetic field, a third rotor formed by second magnets and disposed in a manner opposed to said second stator, and a fourth rotor formed by a second soft magnetic material and disposed between said second stator and said third rotor, and is configured such that electric power and motive power are input and output between said second stator and said third and fourth rotors along with generation of the second rotating magnetic field, and such that the second rotating magnetic field and said fourth and third rotors rotate along with input and output of the electric power and the motive power while maintaining a collinear relationship in rotational speed therebetween, with straight lines representing respective rotational speeds of the second rotating magnetic field and said fourth and third rotors being sequentially aligned in a collinear chart representing the collinear relationship in rotational speed, and wherein said second and third rotors are mechanically connected to said first output portion and said input portion, and said first and fourth rotors are mechanically connected to the driven parts.

14. The moving apparatus as claimed in claim 13, wherein a predetermined plurality of second magnet magnetic poles arranged in a second circumferential direction are formed by said second magnets, and a second magnetic pole row is formed by arranging the plurality of second magnet magnetic poles such that each two second magnet magnetic poles adjacent to each other have polarities different from each other,
wherein said third rotor is configured to be rotatable in the second circumferential direction,
wherein said second stator has a second armature row that generates a predetermined plurality of second armature magnetic poles, to thereby cause the second rotating magnetic field rotating in the second circumferential direction to be generated between said second stator and said second magnetic pole row,
wherein said second soft magnetic material is formed by a predetermined plurality of second soft magnetic material elements arranged in the second circumferential direction in a manner spaced from each other, and a second soft magnetic material element row formed by said plurality of second soft magnetic material elements is disposed between said second magnetic pole row and said second armature row,
wherein said fourth rotor is configured to be rotatable in the second circumferential direction, and
wherein a ratio between the number of the second armature magnetic poles, the number of the second magnet magnetic poles, and the number of said second soft magnetic material elements is set to $1:n:(1+n)/2(n \neq 1.0)$.

15. The moving apparatus as claimed in claim 13, further including a clutch for connecting and disconnecting said first output portion to and from said second and third rotors.

16. The moving apparatus as claimed in claim 15, wherein said prime mover is an internal combustion engine, and
wherein said controller controls the operation of said clutch so as to disconnect said first output portion from said second and third rotors during an EV operation mode in which said controller causes the driven parts to be driven by controlling operations of said first and second rotating machines during stoppage of said prime mover, controls the operations of said first and second rotating machines when said prime mover is started during the EV operation mode, such that the respective rotational speeds of said second and third rotors become approximately equal to 0, and when the respective rotational speeds of said second and third rotors have become approximately equal to 0, controls the operation of said clutch so as to connect said first output portion to said second and third rotors, and starts said prime mover.

* * * * *